United States Patent [19]

Nito et al.

[11] Patent Number: 5,659,411
[45] Date of Patent: Aug. 19, 1997

[54] OPTICAL DEVICE HAVING AN OPTICALLY TRANSPARENT BIREFRINGENT MEDIUM THAT SELECTIVELY SHIFTS THE OPTICAL AXIS

[75] Inventors: Keiichi Nito; Akio Yasuda, both of Tokyo; Nobue Kataoka, Kanagawa; Hidehiko Takanashi, Kanagawa; Eriko Matsui, Kanagawa; Yang Ying Bao, Saitama; Fumitomo Hide, Kanagawa, all of Japan

[73] Assignee: Sony Corporation, Tokyo, Japan

[21] Appl. No.: 261,342

[22] Filed: Jun. 16, 1994

[30] Foreign Application Priority Data

Jun. 18, 1993 [JP] Japan ................... 5-172316

[51] Int. Cl.$^6$ ................... G02F 1/1335
[52] U.S. Cl. ................... 349/117
[58] Field of Search ................... 359/73, 53

[56] References Cited

U.S. PATENT DOCUMENTS

| | | | |
|---|---|---|---|
| 5,132,826 | 7/1992 | Johnson et al. | 359/93 |
| 5,231,521 | 7/1993 | Johnson et al. | 359/93 |
| 5,243,455 | 9/1993 | Johnson et al. | 359/53 |
| 5,369,266 | 11/1994 | Nohda et al. | 250/208.1 |
| 5,381,253 | 1/1995 | Sharp et al. | 359/53 |
| 5,414,541 | 5/1995 | Patel et al. | 359/93 |
| 5,437,814 | 8/1995 | Koden et al. | 359/104 |

*Primary Examiner*—William L. Sikes
*Assistant Examiner*—James A. Dudek
*Attorney, Agent, or Firm*—Hill, Steadman & Simpson

[57] ABSTRACT

An optical device according to this invention includes a phase modulating optical unit comprising a plurality of optically transparent base members each of which includes an optically transparent electrode and an alignment film formed in this order, and an optically transparent birefringent medium, wherein the optically transparent base members are spaced from one another at predetermined intervals so that the electrode and the alignment film of a base member is confronted to the electrode and the alignment film of another base member, and at least one kind of liquid crystal selected from the group consisting of ferroelectric liquid crystal (FLC), antiferroelectric liquid crystal (AFLC) and smectic liquid crystal having an electro clinic effect (SmA) (or mixed liquid crystals thereof) is injected into gaps between the base members.

37 Claims, 82 Drawing Sheets

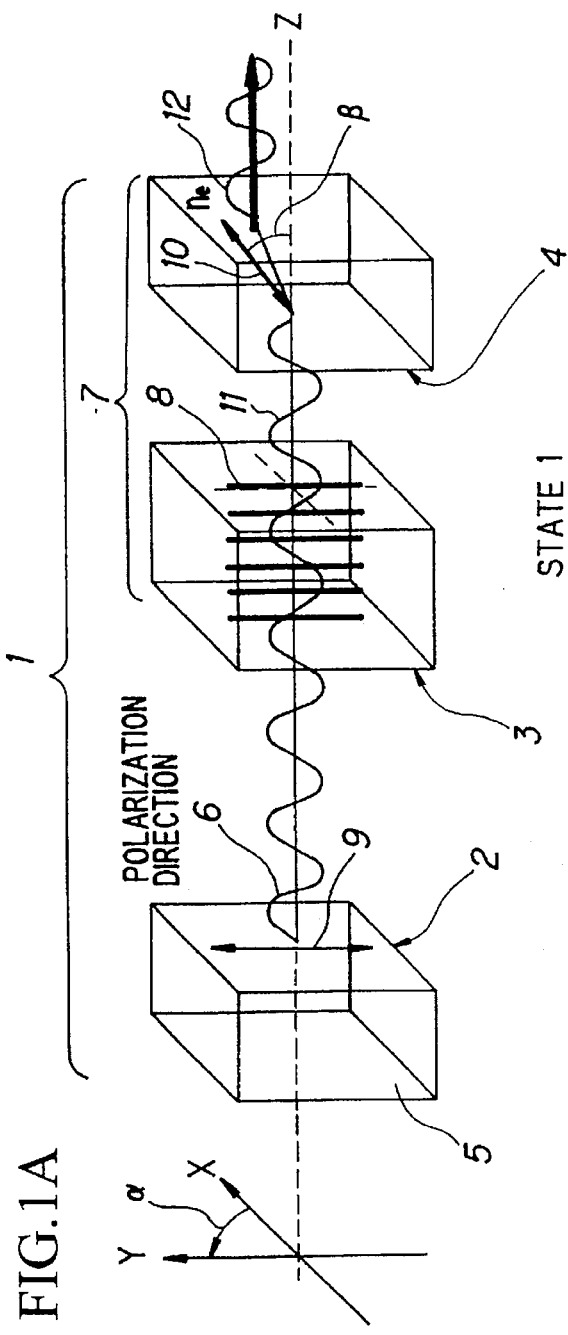
FIG.1A
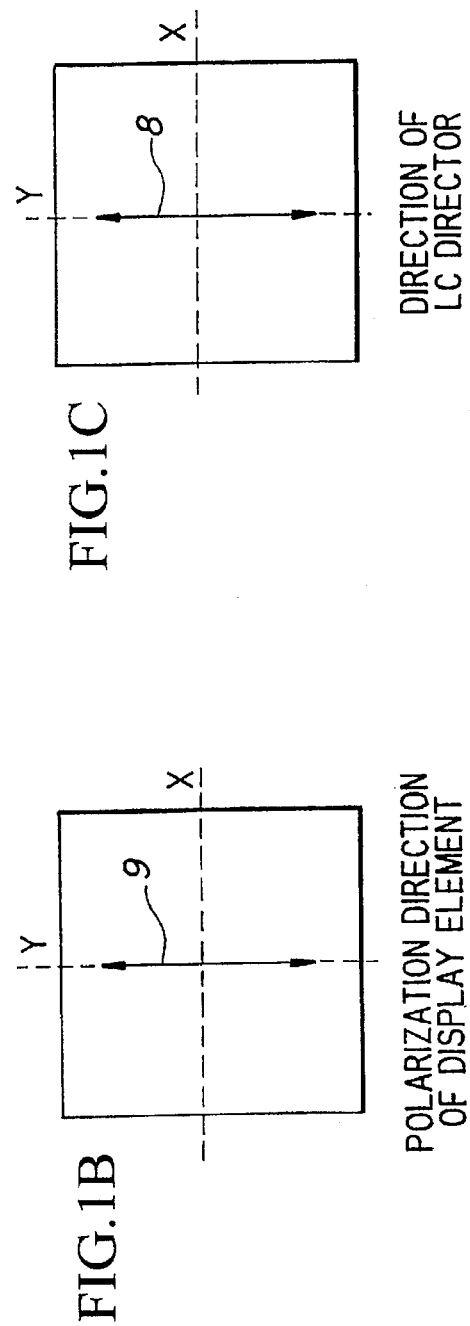
FIG.1B
FIG.1C

TEMPARATURE-DEPENDENCE OF CONE ANGLE OF CS-1014 LC

TEMPARATURE-DEPENDENCE OF CONE ANGLE OF ZLI-3774 LC

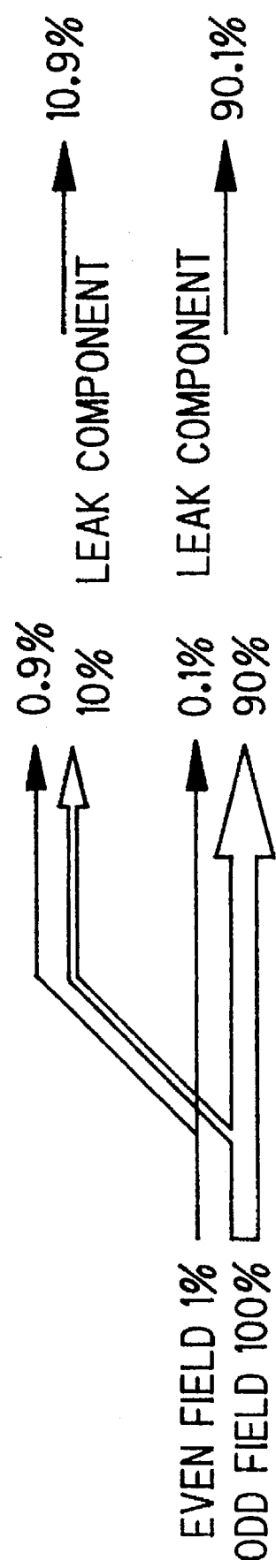

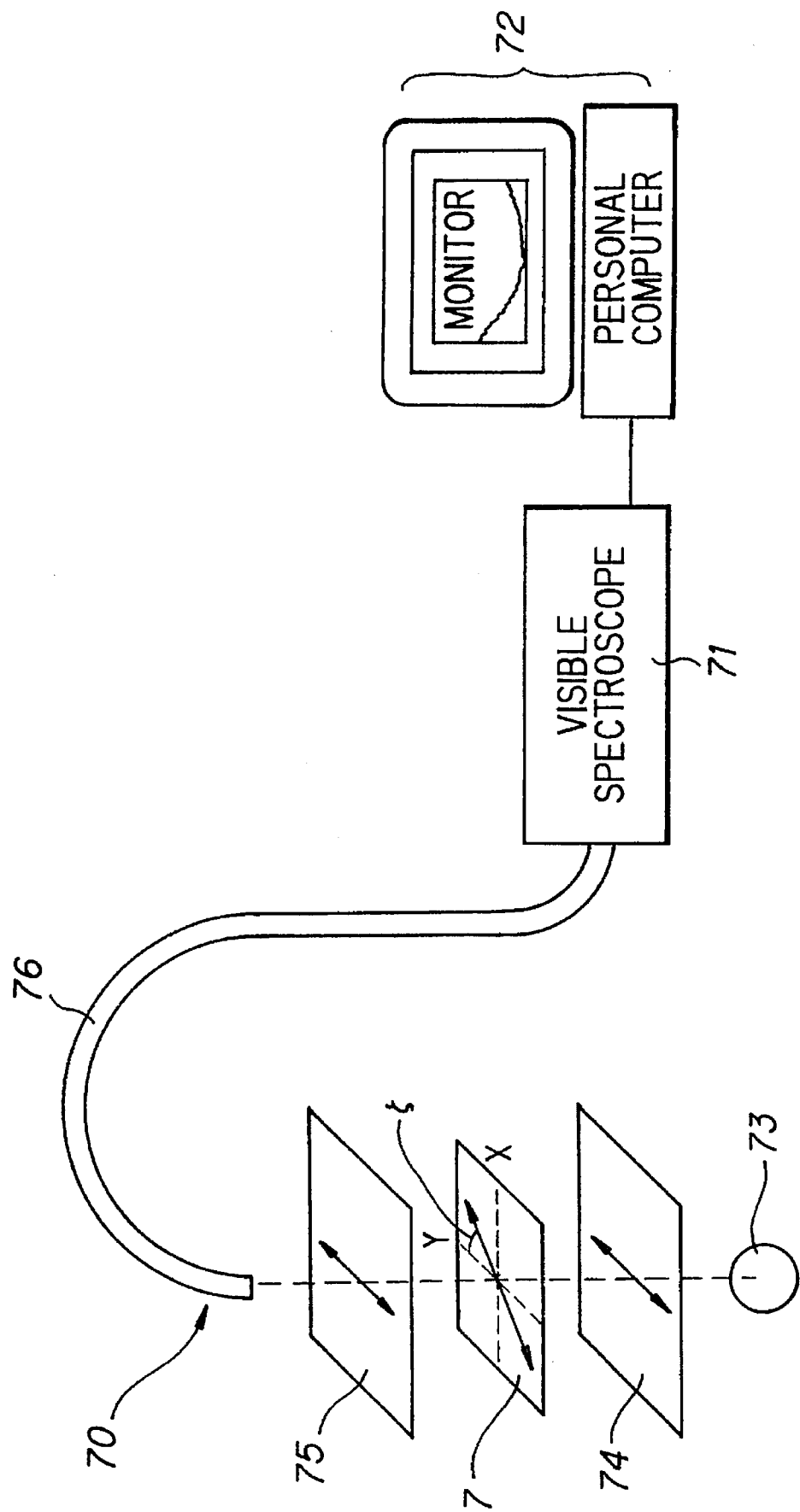

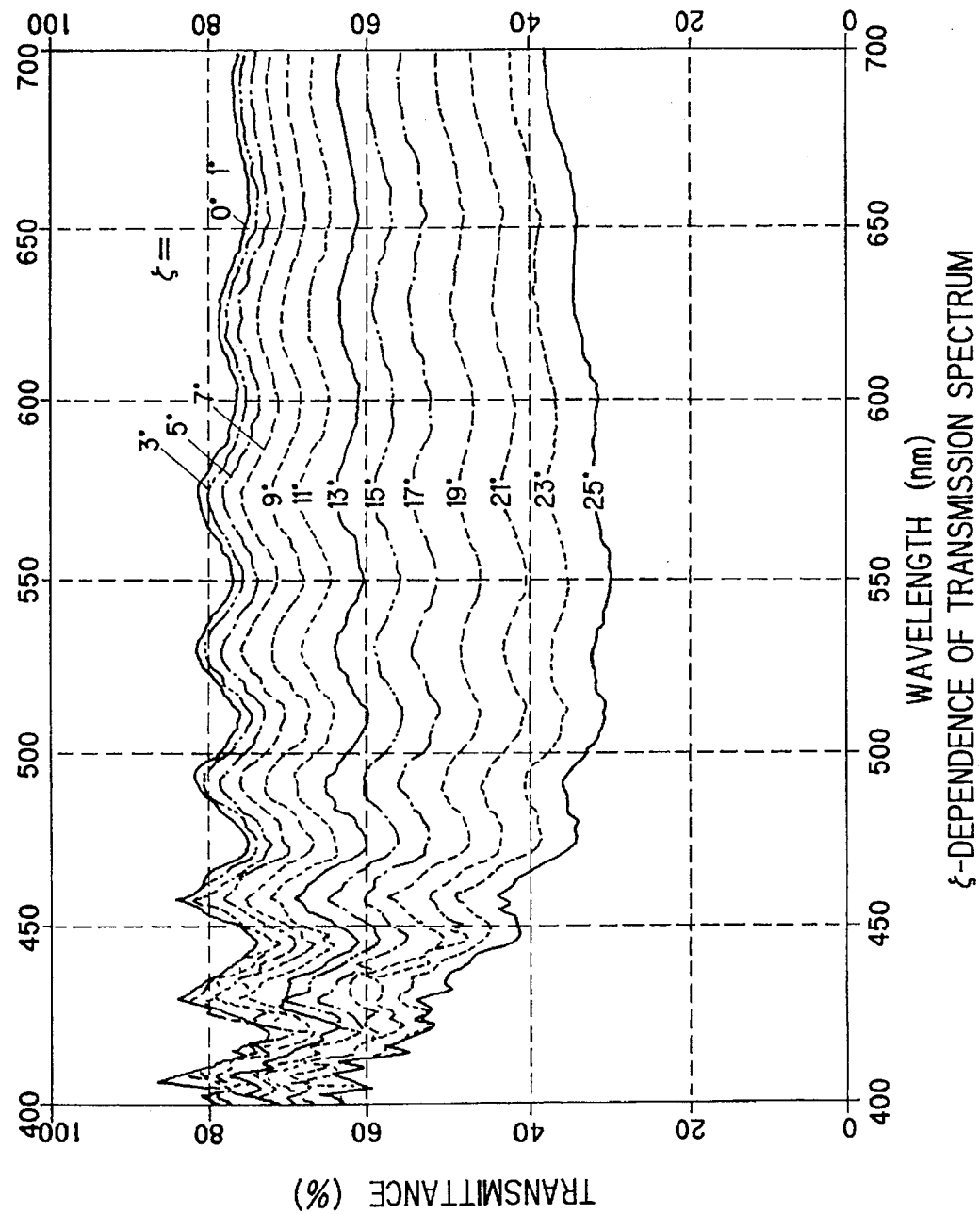

ζ-DEPENDENCE OF TRANSMISSION SPECTRUM

DEPENDENCE OF TRANSMITTANCE ON SLOPE ANGLE $\zeta$

DEPENDENCE OF TRANSMITTANCE ON SLOPE ANGLE $\zeta$

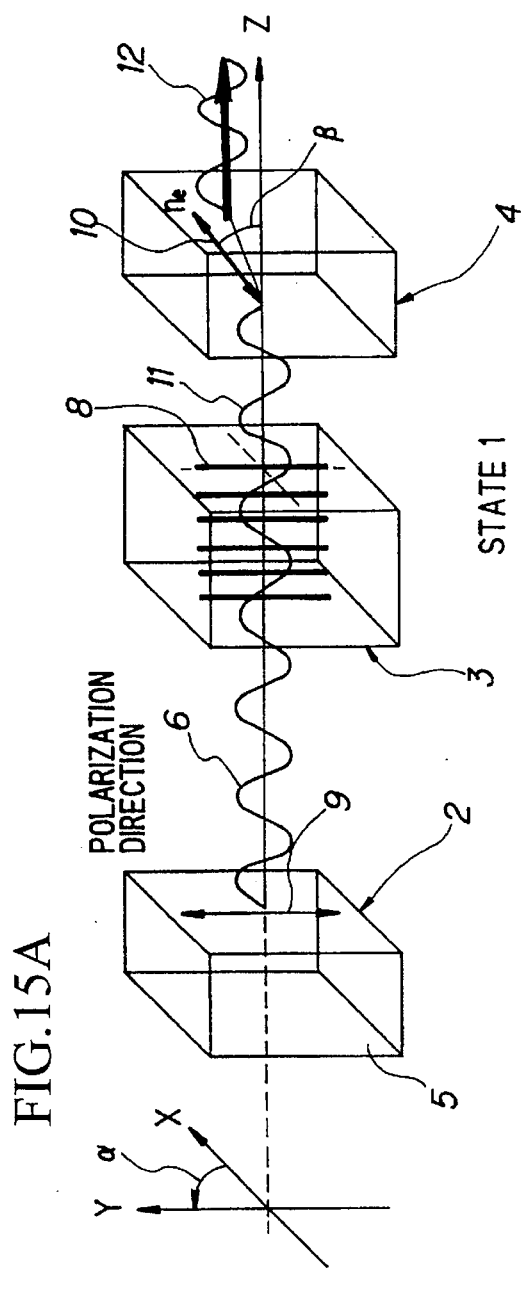
FIG.15A
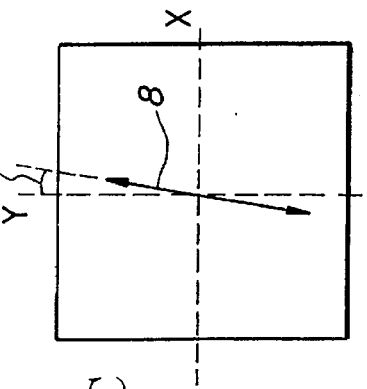
FIG.15C DIRECTION OF LC DIRECTOR
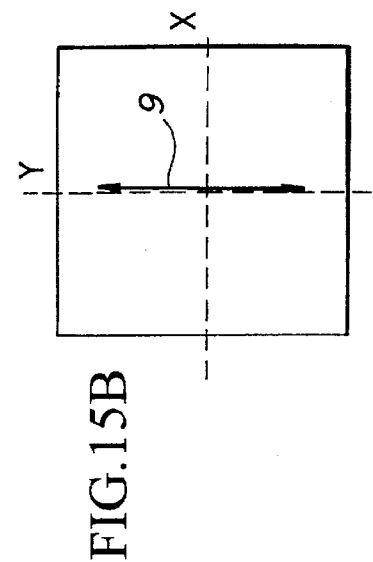
FIG.15B POLARIZATION DIRECTION OF DISPLAY ELEMENT

TRANSMISSION SPECTRUM OF RGB FILTERS

CELL STRUCTURE

RELATIONSHIP BETWEEN GAP AND PHASE DIFFERENCE

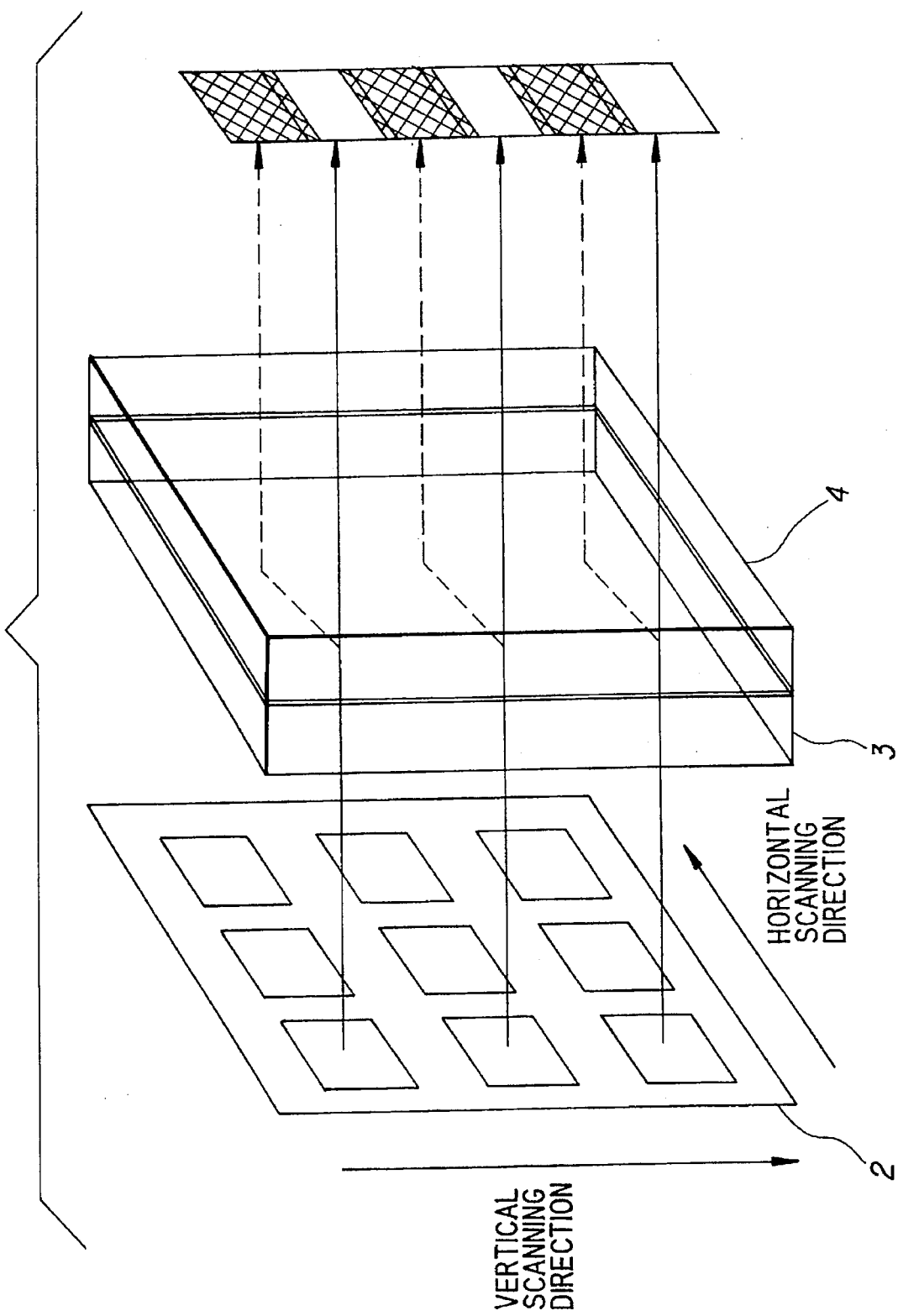

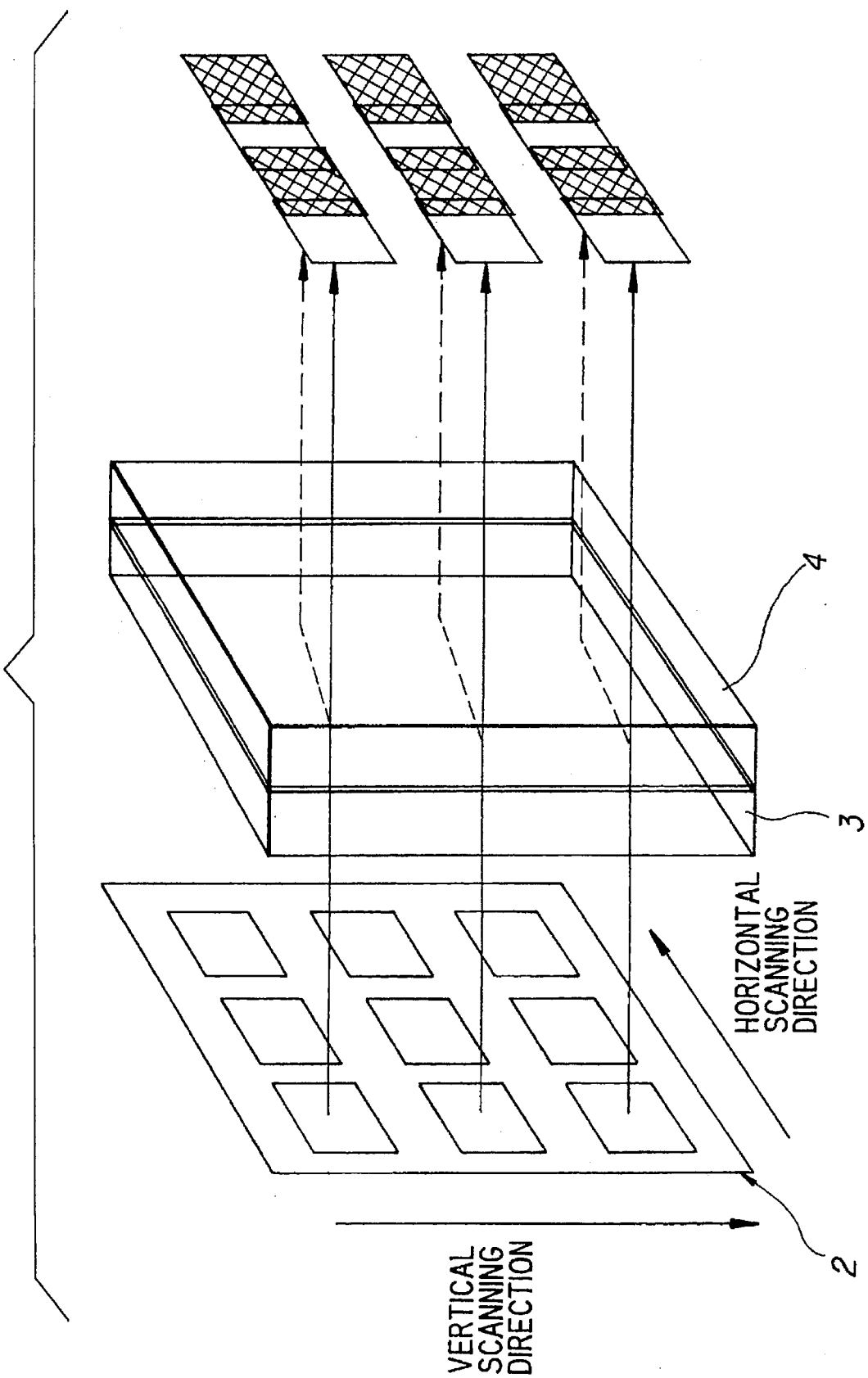

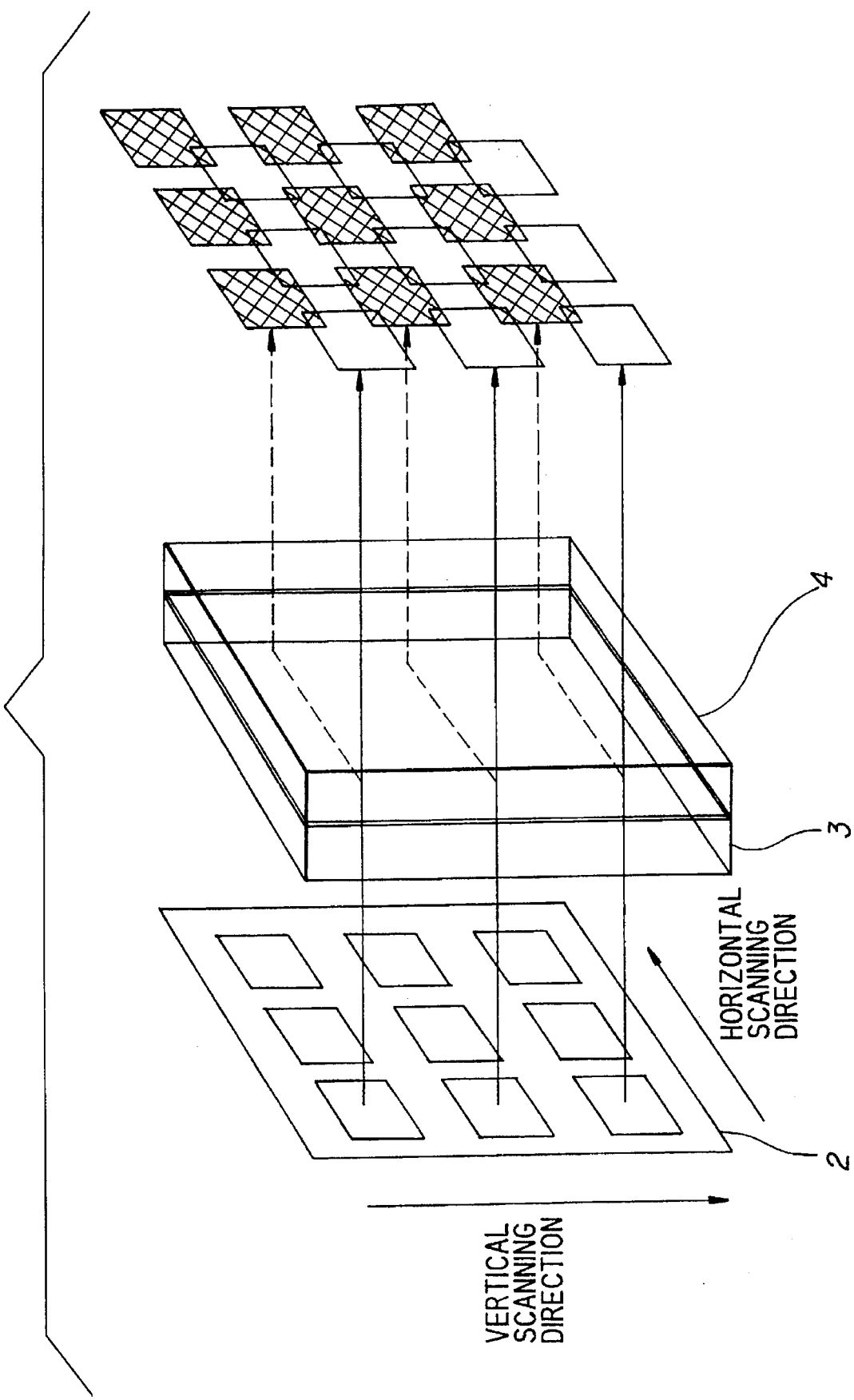

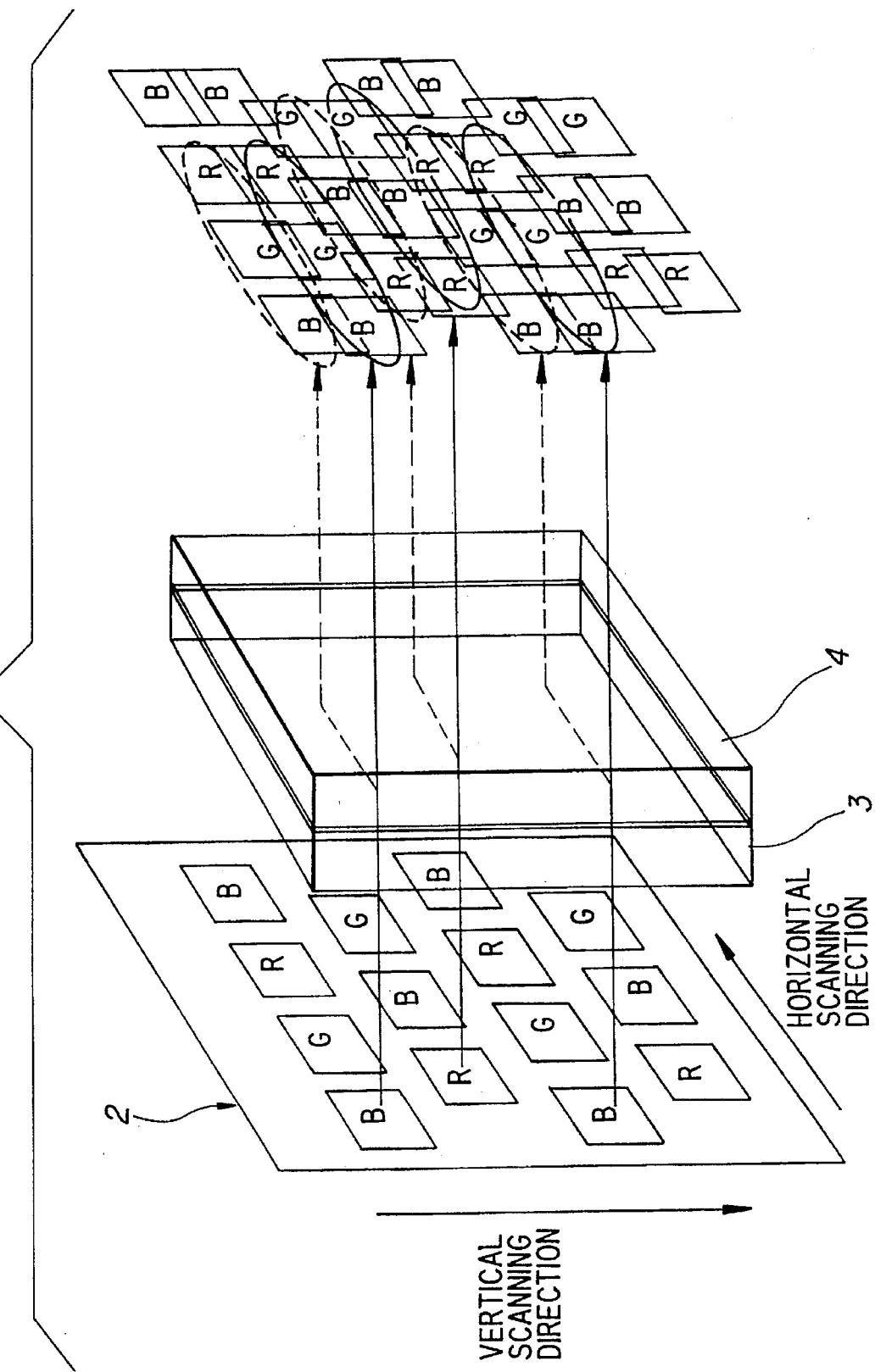

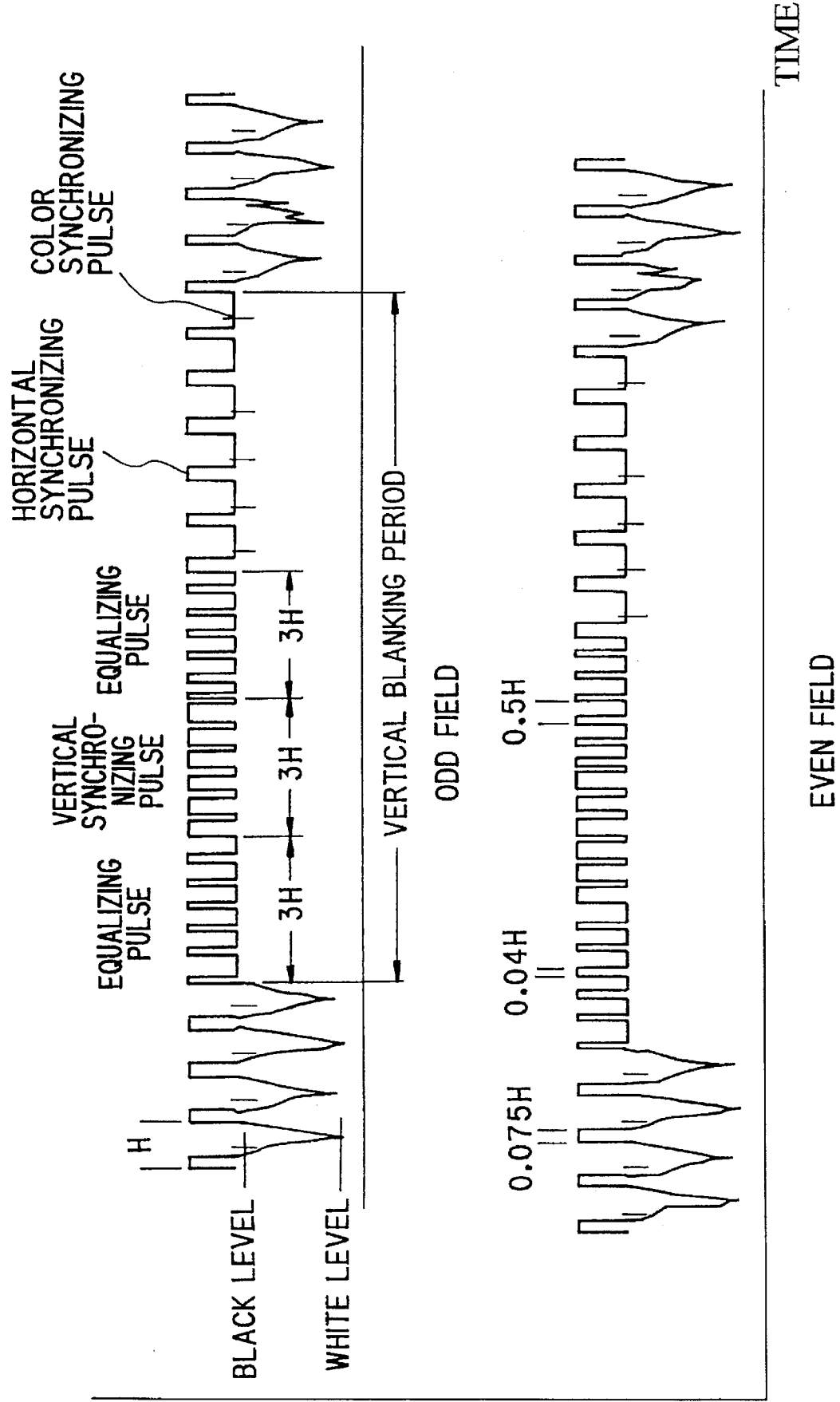

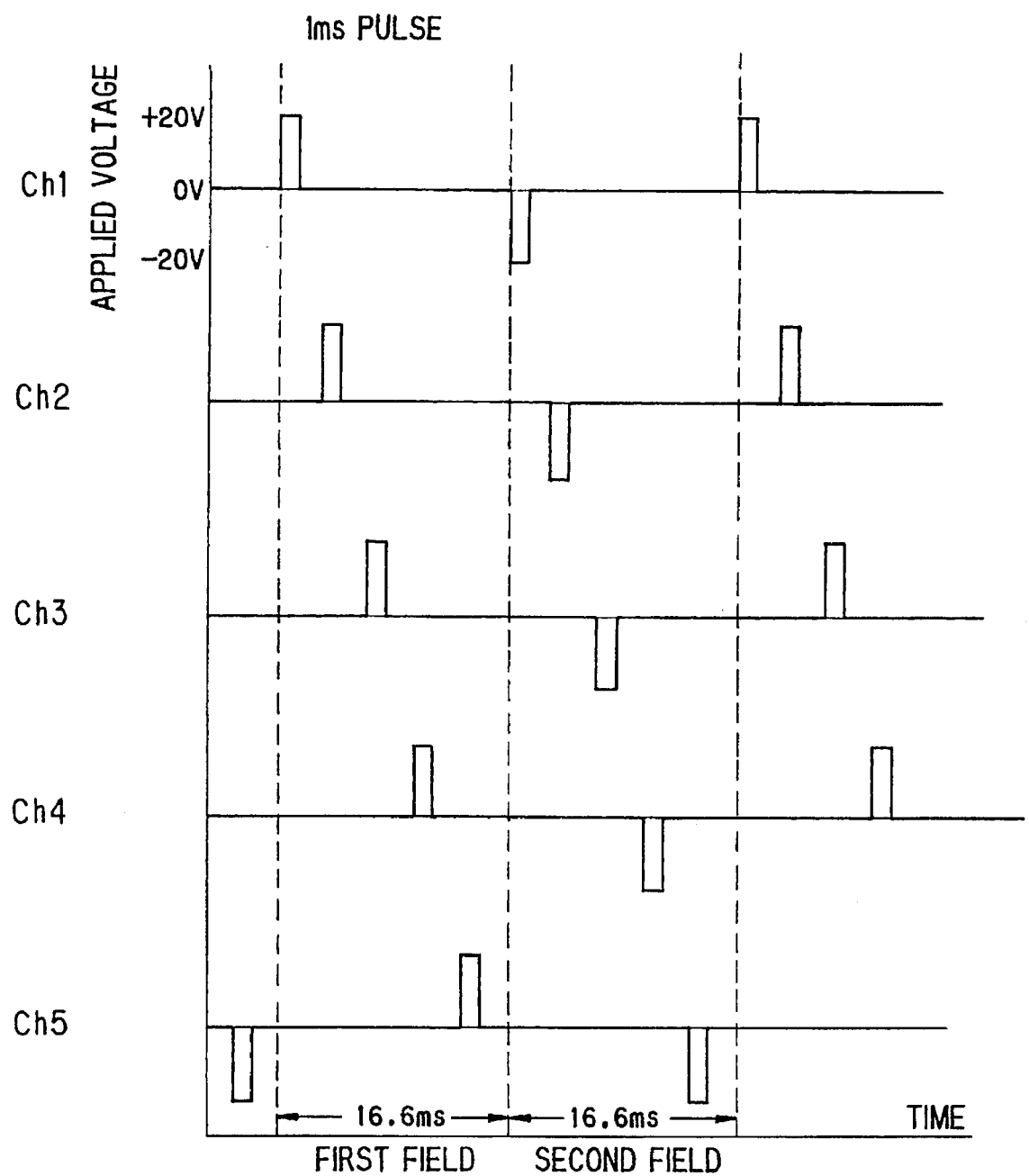

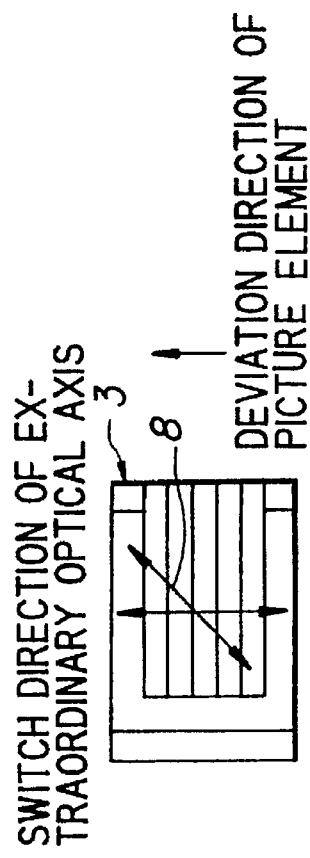
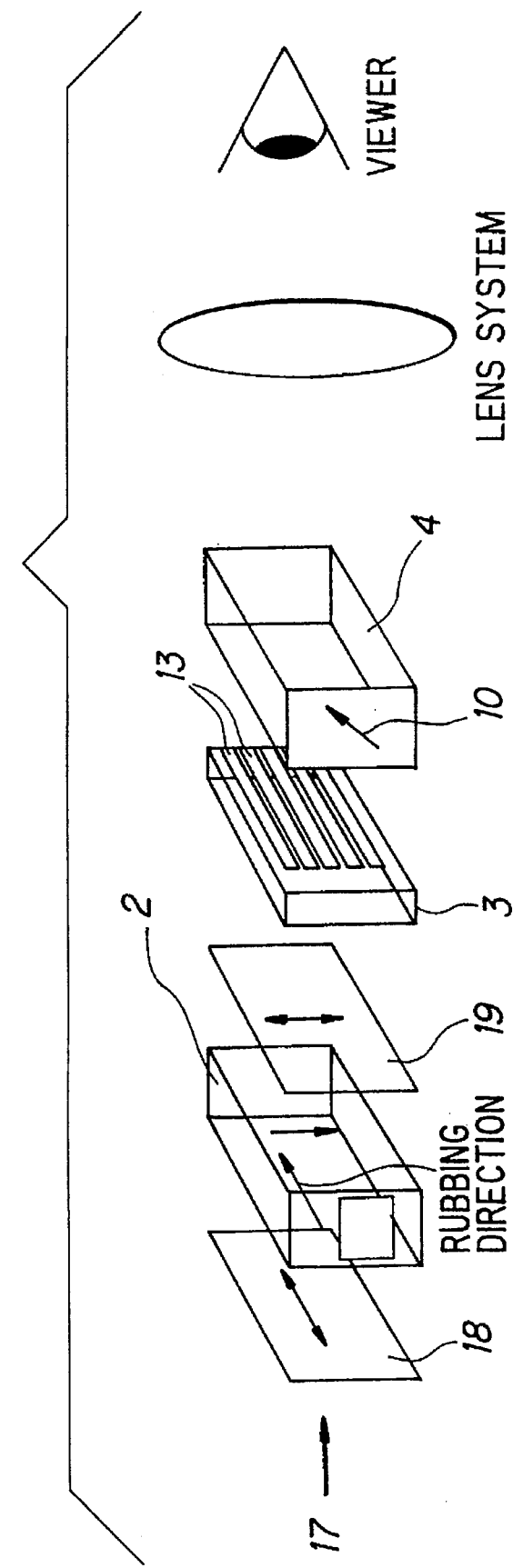
FIG. 40B
FIG. 40A

POLARIZATION DIRECTION OF POLARIZER

DIRECTION OF LC DIRECTOR

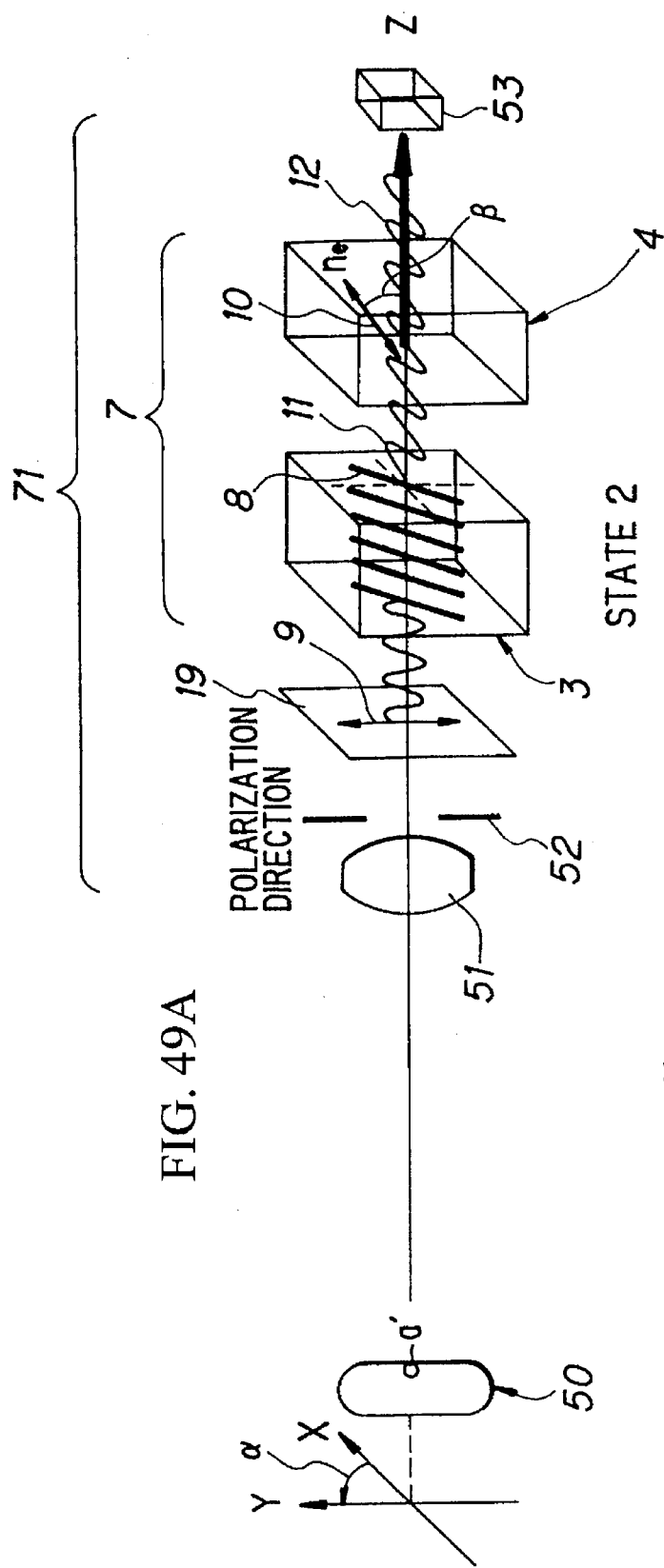
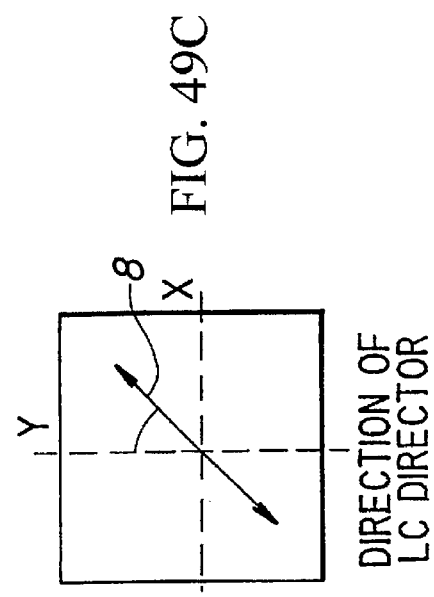
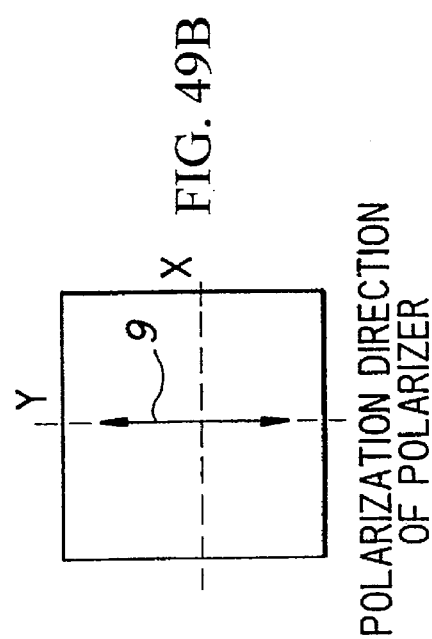
FIG. 49A
FIG. 49B
FIG. 49C

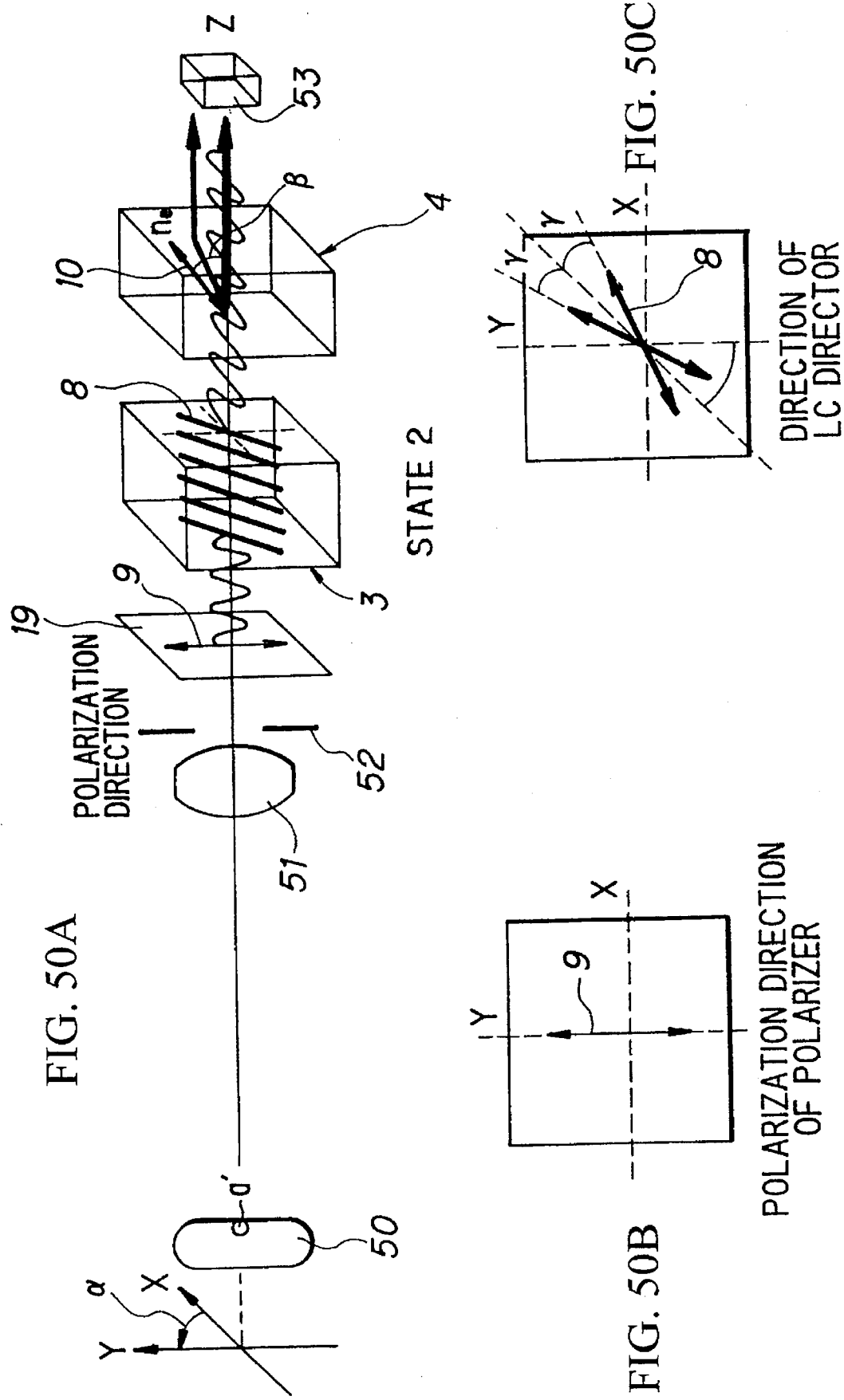

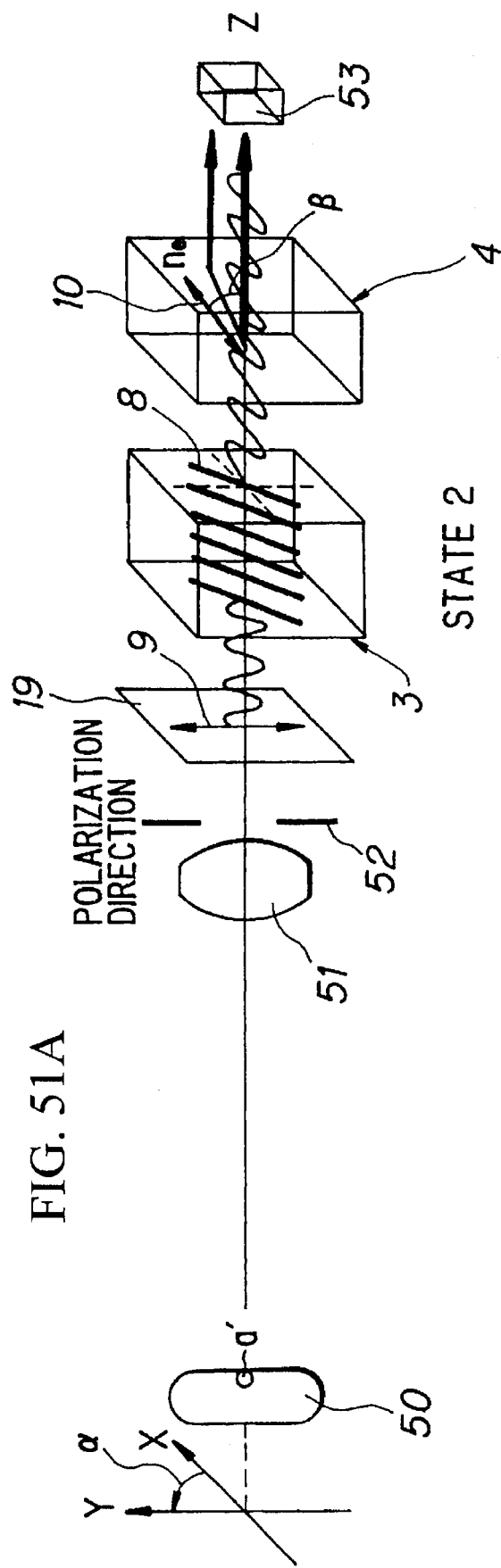
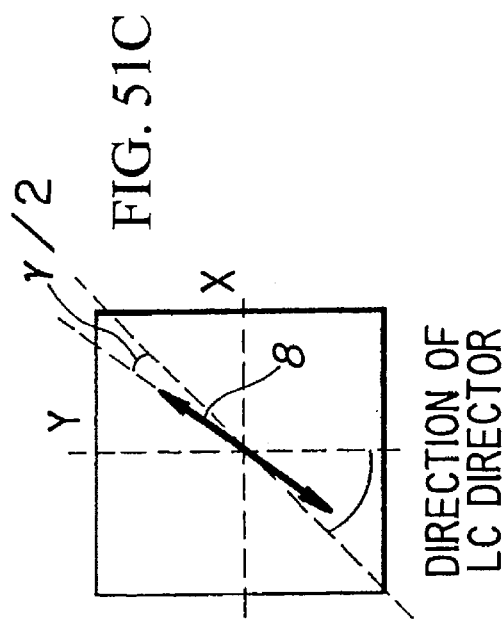
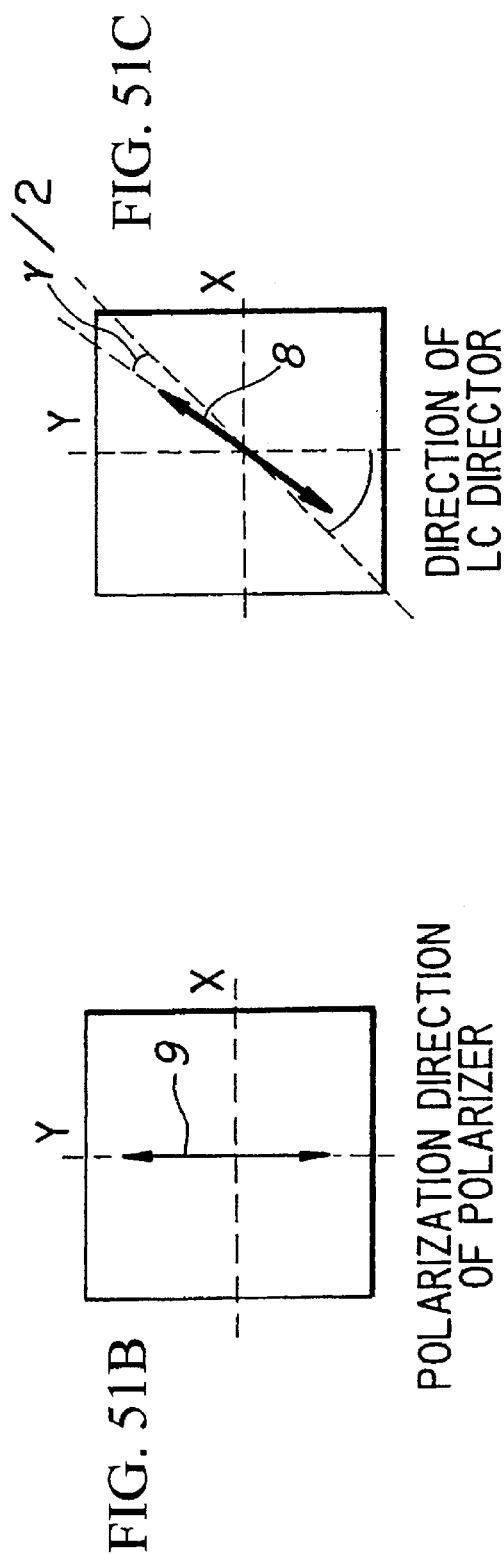

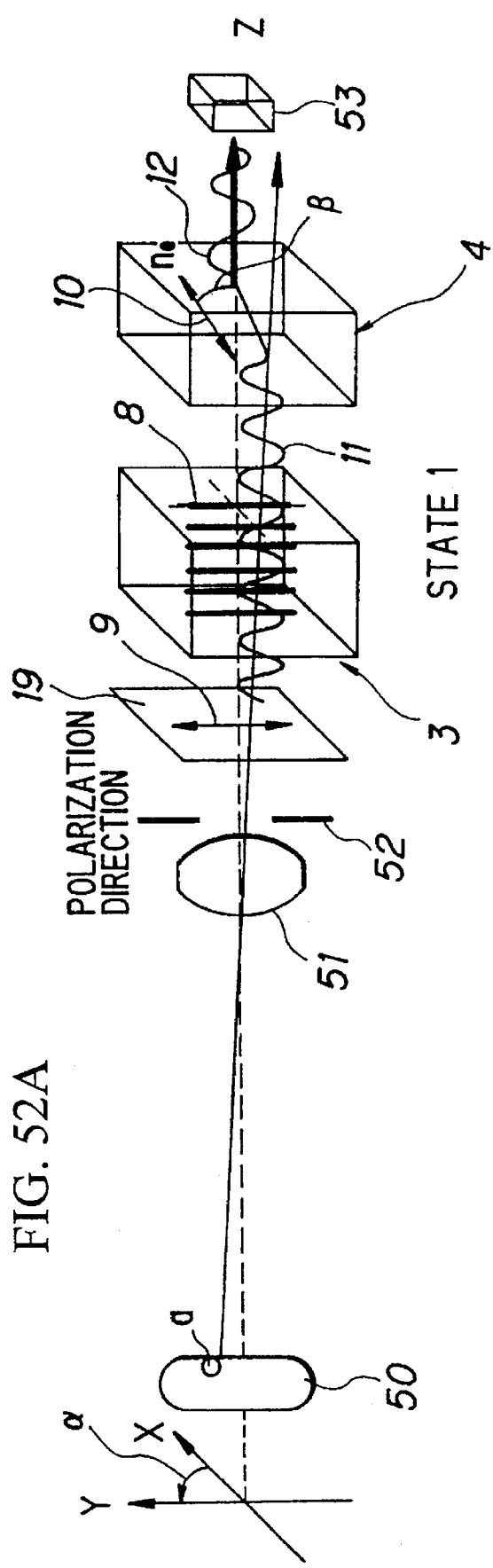
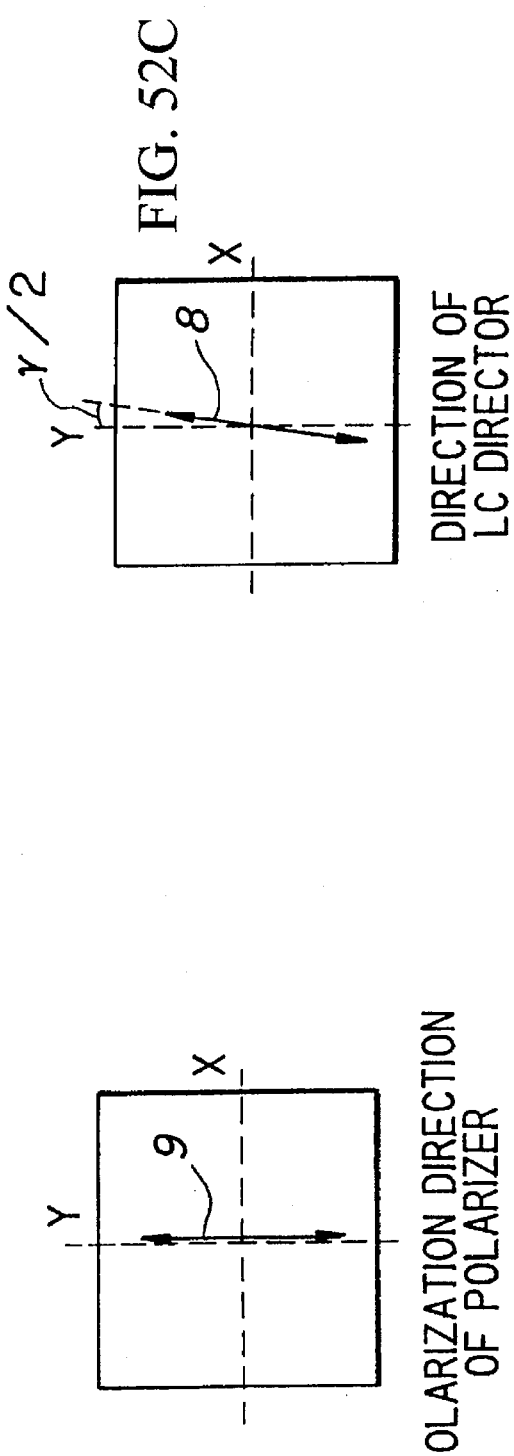
FIG. 52A
FIG. 52B
FIG. 52C

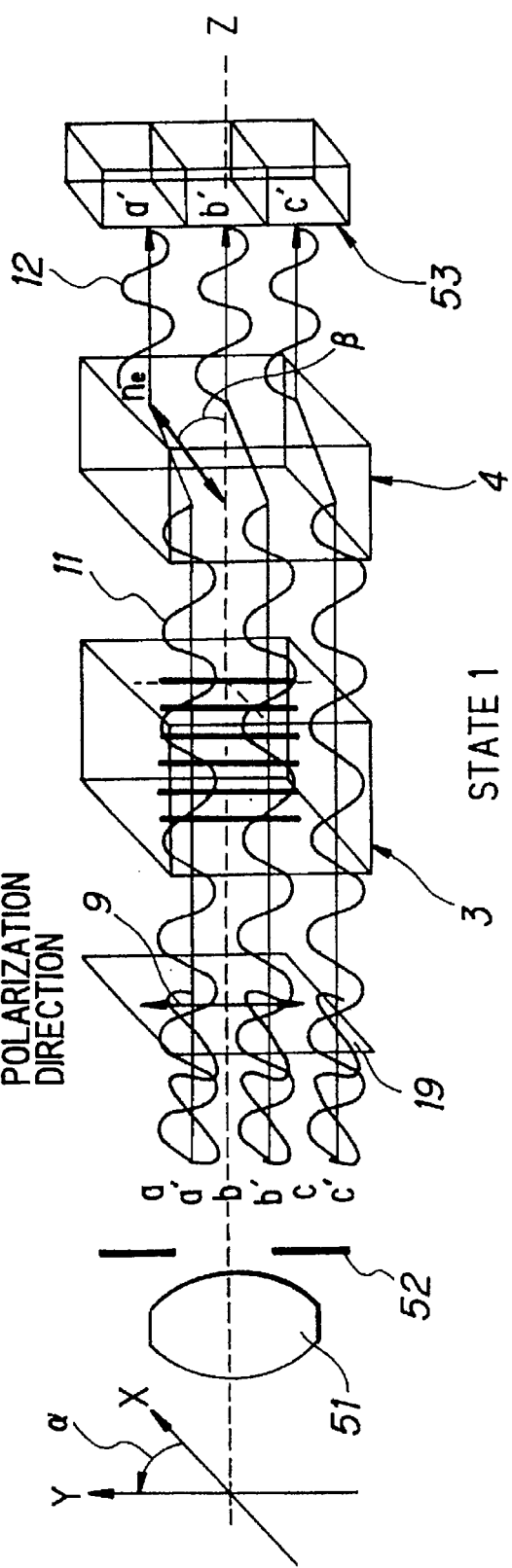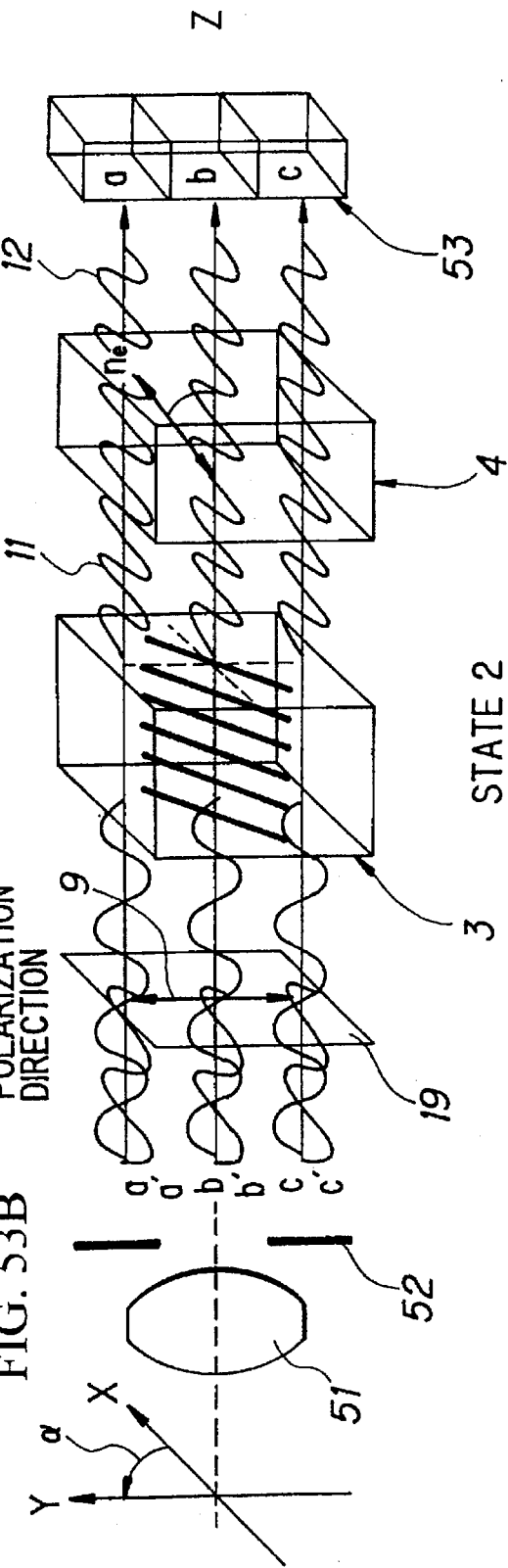

7-POINTS BLUR

DIRECTION OF EXTRAORDINARY REFRACTION VIEWED FROM LIGHT INCIDENCE SIDE

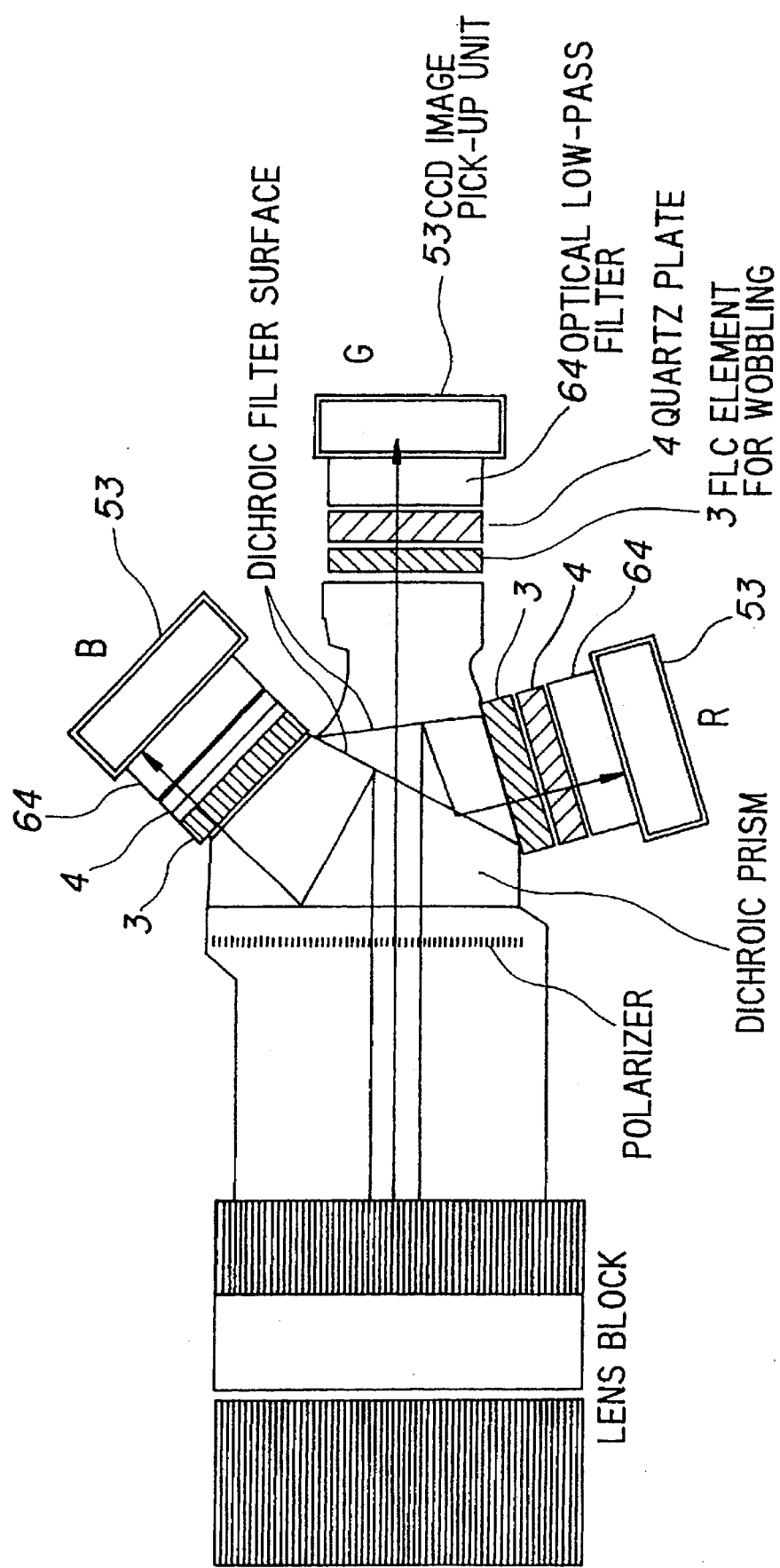

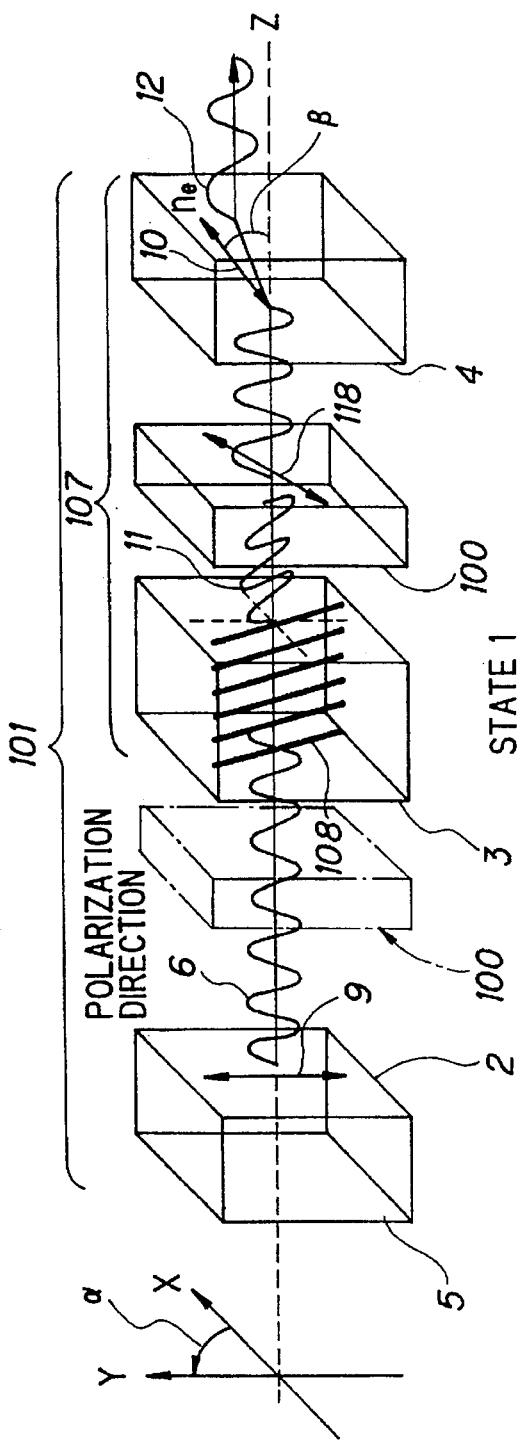
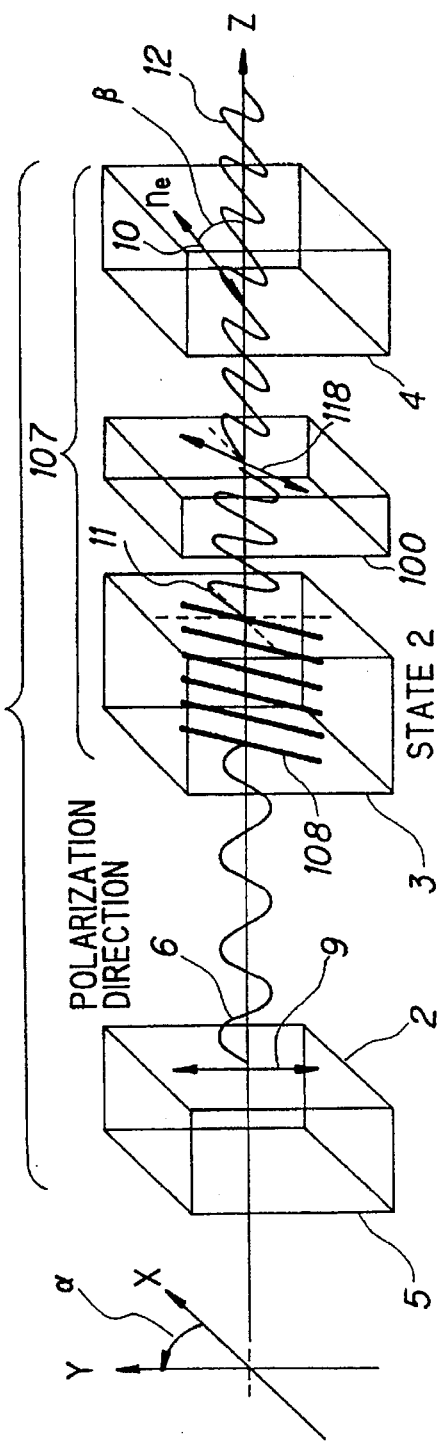
FIG. 60A
FIG. 60B

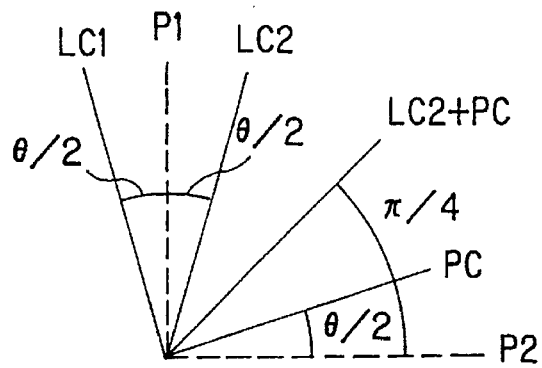
COMBINATION OF FLC DEVICE AND PHASE-COMPENSATON FILM
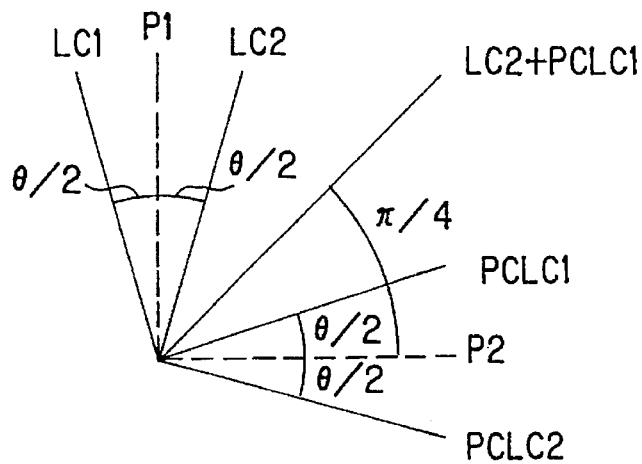
COMBINATION OF FLC DEVICE AND PHASE-COMPENSATON FLC DEVICE
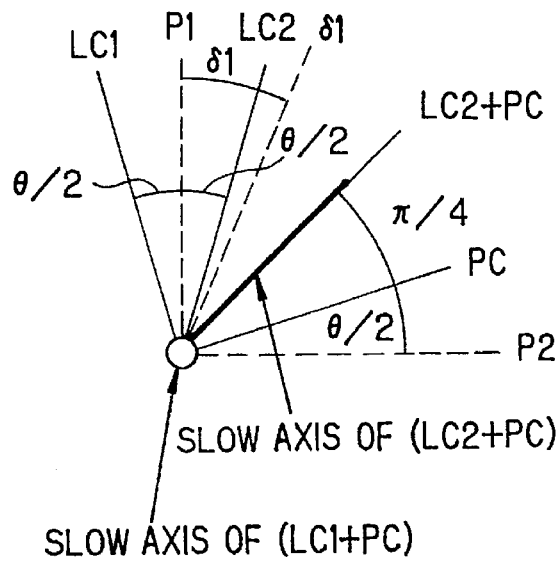
COMBINATION OF FLC DEVICE AND PHASE-COMPENSATON FILM

TRANSMITTANCE SPECTRUM OF SWITCH STATE LC1

TRANSMITTANCE SPECTRUM OF SWITCH STATE LC2

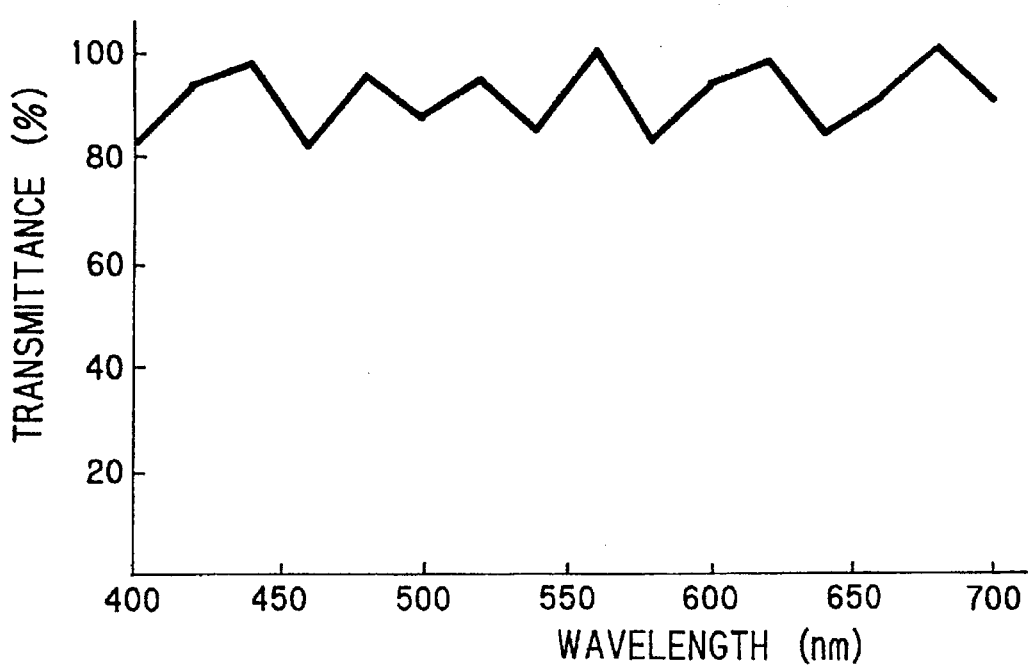
TRANSMITTANCE SPECTRUM OF SWITCH STATE LC1
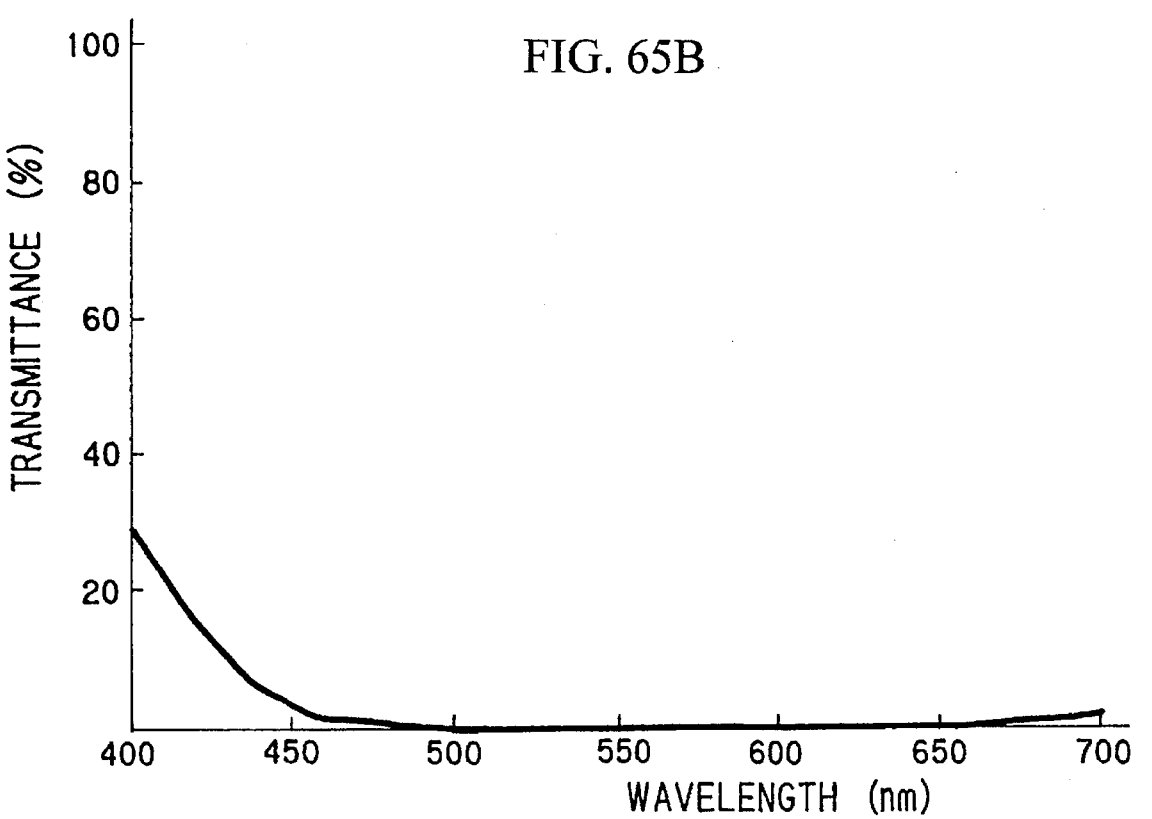
FIG. 65B
TRANSMITTANCE SPECTRUM OF SWITCH STATE LC2

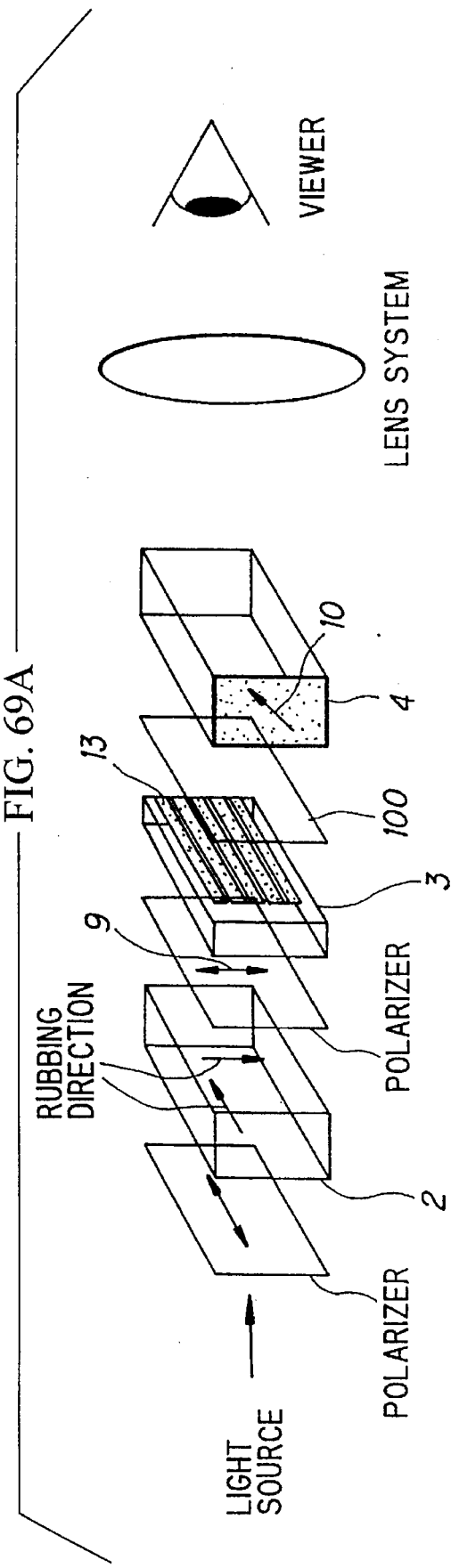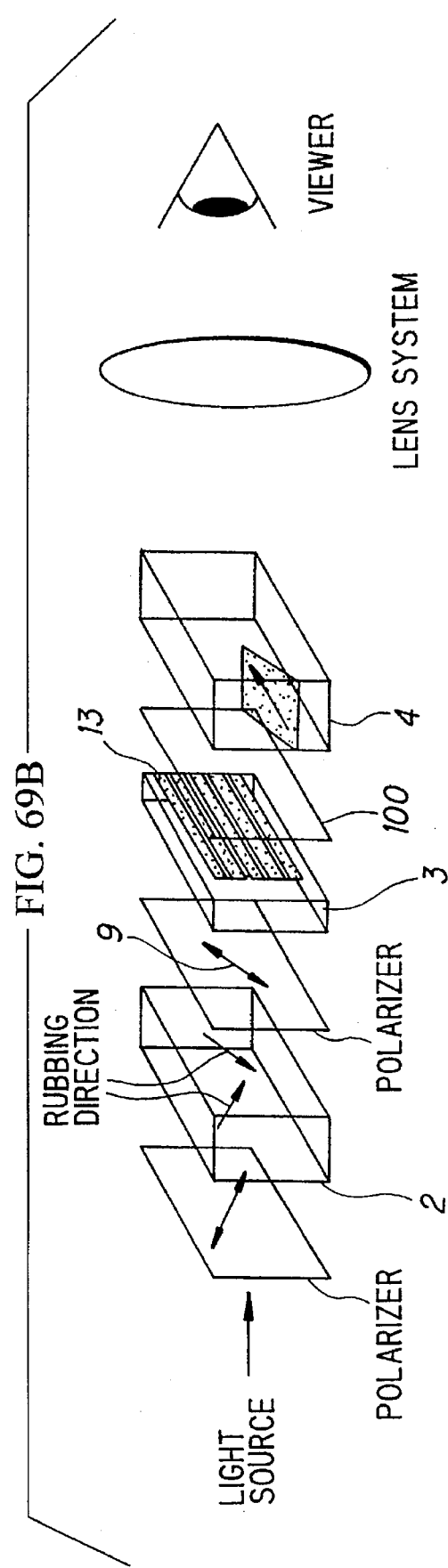

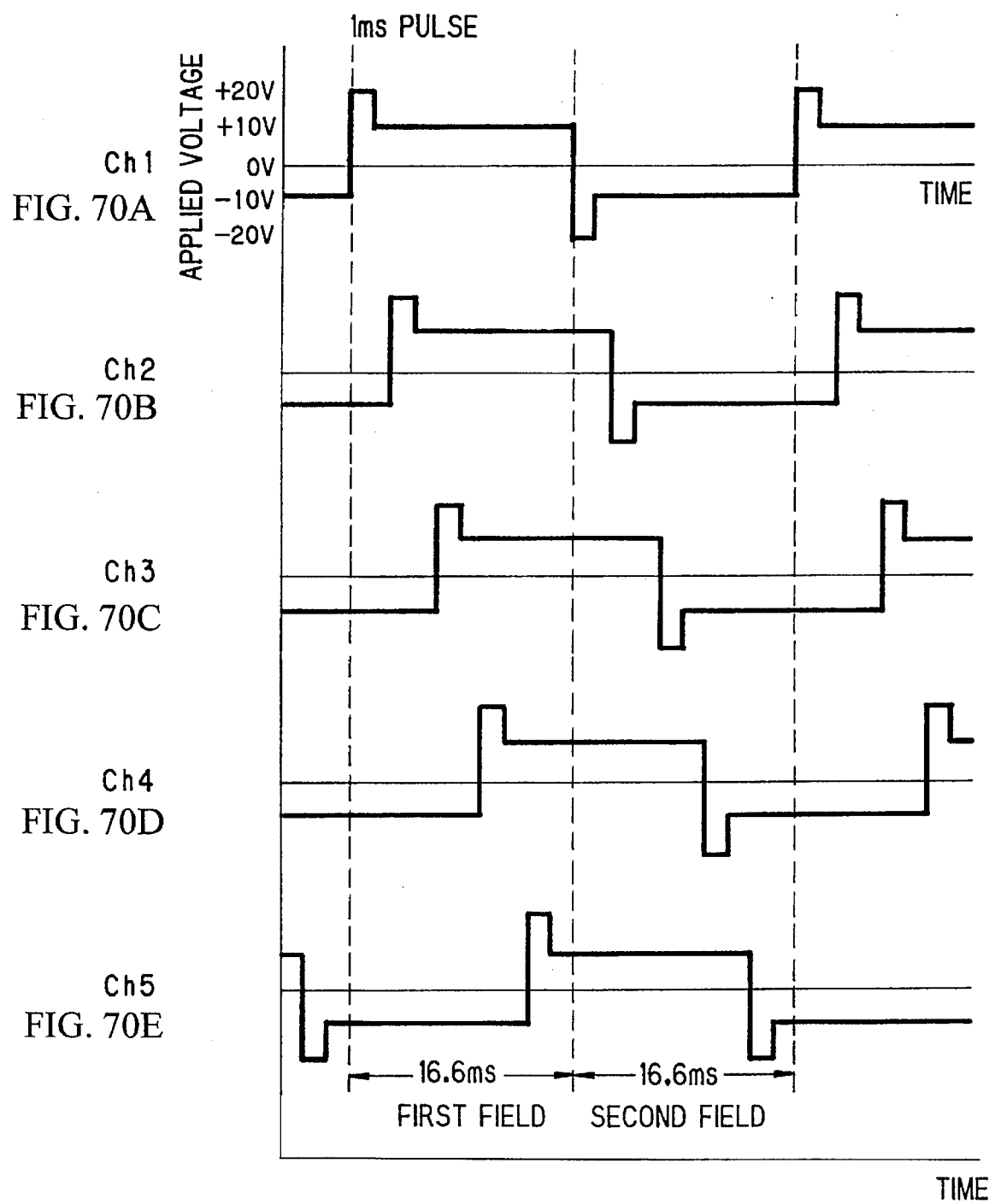

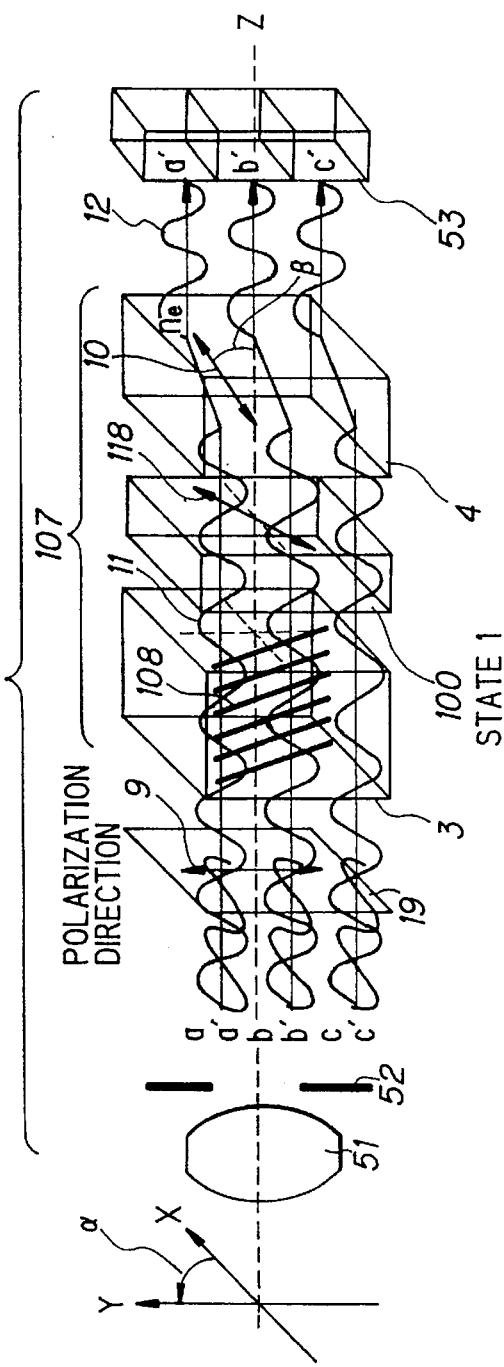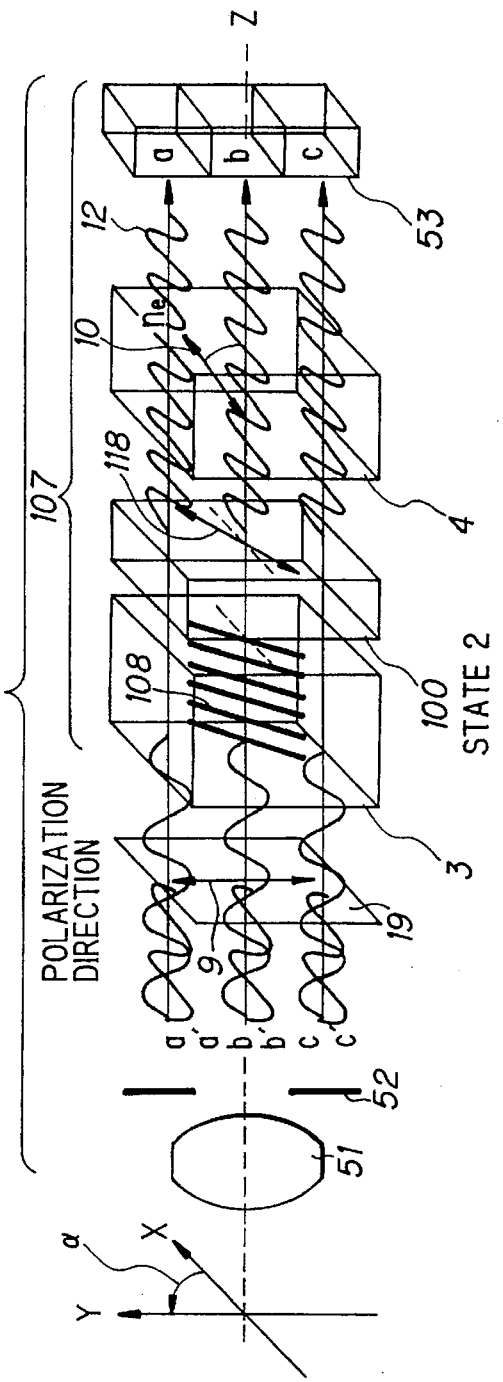

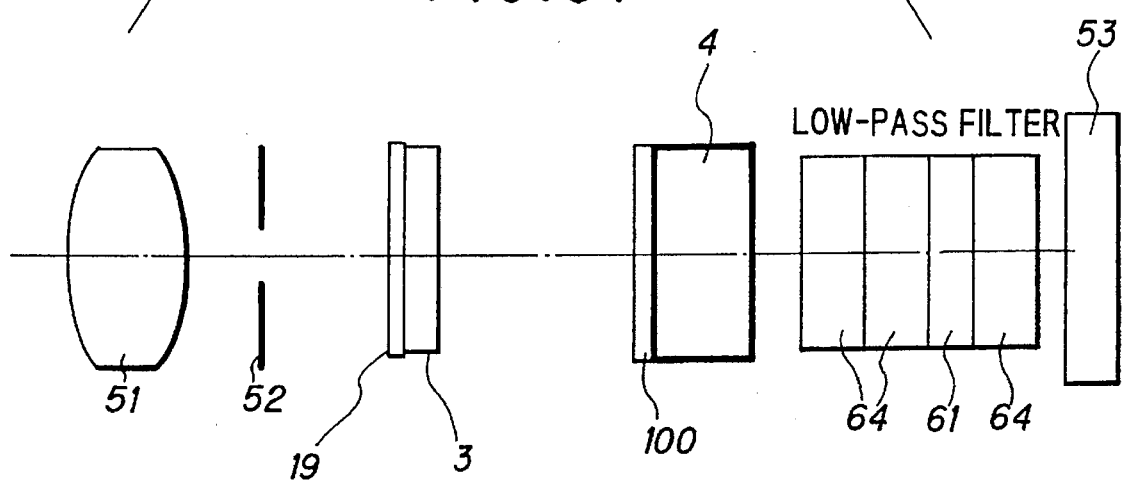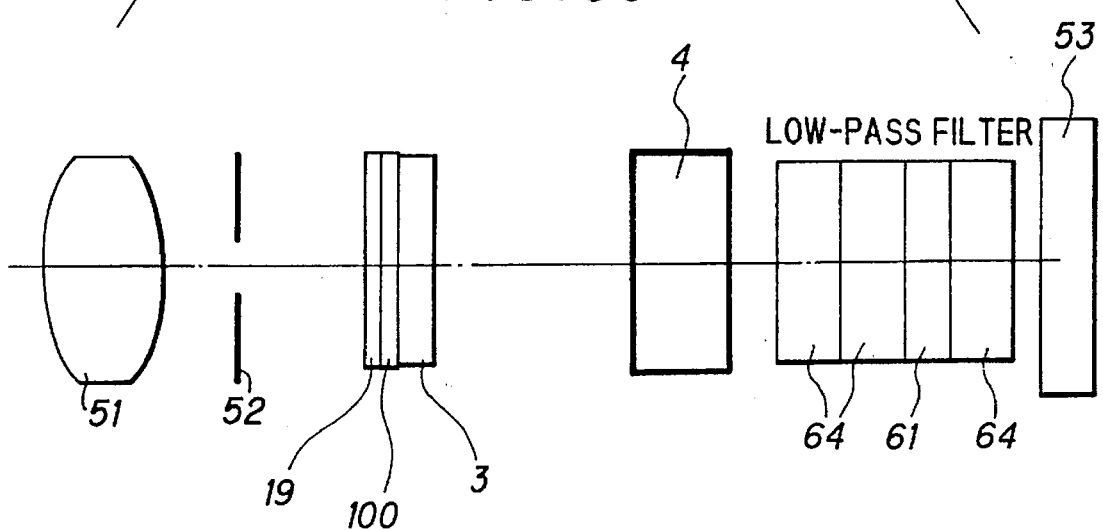

OPTICAL DEVICE HAVING AN OPTICALLY TRANSPARENT BIREFRINGENT MEDIUM THAT SELECTIVELY SHIFTS THE OPTICAL AXIS

BACKGROUND OF THE INVENTION

This invention relates to an optical device suitable for a display device having discretely-arranged picture elements such as a liquid crystal display, a plasma display, an EL (Electroluminescence) display or the like, and a solid image pick-up device such as a CCD (Charge Coupled Device) having discretely-arranged picture elements for image pick-up.

When an image display operation of a line sequential scanning type is carried out using an NTSC system or the like in a display device having picture elements which are arranged in a discrete form, for example, in a mosaic form, a dot form or the like on a screen thereof, brightness signals which should be originally analog signals are roughly sampled, and a part of positional information on an image on the screen in a horizontal direction is lost. Further, when the picture-element resolution in a vertical direction which is matched to the number of scanning lines cannot be achieved, it has been hitherto adopted that information of scanning lines is intentionally thinned out or an over-writing is performed on the same picture elements. Therefore, in this method, positional resolution of brightness signals or the like (that is, the resolution of a display) has been reduced.

For example, in a liquid crystal viewfinder of a TFT(Thin-Film-Transistor)-TN(Twisted Nematic) type which is driven in the NTSC system, one frame (that is, a picture displayed on the viewfinder) is formed of two fields which comprise even-numbered scanning lines and odd-numbered scanning lines respectively, and a frame frequency is set to 30 Hz (that is, field frequency is set to 60 Hz).

With respect to a present TFT viewfinder, 525 scanning lines whose number is presently used for the NTSC system cannot be actually provided to the present TFT viewfinder, and thus a method has been adopted in which information on an even field and information on an odd field are over-written on the same picture elements. Therefore, an actual vertical resolution is practically lower than a resolution which is expected on the basis of the principle of the NTSC system.

Further, a mosaic frame having a discrete picture-element arrangement becomes remarkable because picture elements are designed in a large size and such a display device has a joint portion at a non-display picture-element portion (a portion located between neighboring picture elements) such as a black matrix or the like, so that a frame texture is deteriorated.

In view of the foregoing, a method of spatially deviating picture images of odd fields and even fields from each other by using a wobbling technique with a picture-element (pixel) deviating unit has been proposed to improve the vertical resolution. This method may be applied to a horizontal direction to improve the horizontal resolution.

However, any wobbling element which has been hitherto proposed has low-speed responsibility response and thus it cannot be driven at a video rate, so that it is not practically usable. Further, these devices have been designed in an insufficient construction condition.

SUMMARY OF THE INVENTION

An object of this invention is to provide an optical device in which a high-speed wobbling operation (pixel deviating operation) can be performed for a display having discretely-arranged picture elements, a solid image pick-up device having a discretely-arranged light receiving elements, etc. to effectively improve the resolution of these devices, and a mosaic-like stipple frame (picture) can be improved to obtain a continuous frame (picture) having no joint portion at non-display picture-element portions.

Another object of this invention is to provide an optical device in which high contrast and high resolution can be obtained and unevenness of color can be suppressed, and which can be designed to have excellent performance in low cost.

In order to attain the above objects, the optical device according to this invention includes a phase modulating optical unit comprising a plurality of optically transparent base members each of which includes an optically transparent electrode and an orientation film formed in this order, and an optically transparent birefringent medium, wherein the optically transparent base members are spaced from one another at predetermined intervals so that the electrode and the orientation film of a base member is confronted to the electrode and the orientation film of another base member, and at least one kind of liquid crystal selected from the group consisting of ferroelectric liquid crystal (FLC), antiferroelectric liquid crystal (AFLC) and smectic liquid crystal having an electro clinic effect (SmA) (or mixed liquid crystals thereof) is injected into gaps between the base members.

According to the optical device of this invention, the phase of light is varied by the phase-modulating optical unit to deviate the polarization plane of the light, and the incident light is selectively refracted by the birefringent medium, so that the wobbling operation can be effectively performed for the discretely-arranged picture elements. Therefore, the resolution can be improved and excellent image quality can be obtained. Particularly, the spatial resolution at the video rate can be improved, and a mosaic-like stipple frame (picture) can be improved to a continuous frame (picture) having no join portion.

Further, the ferroelectric liquid crystal and other liquid crystals which are used for the phase-modulating optical unit according to this invention have extremely high-speed responsibility because the liquid crystal director thereof can be easily varied (for example, the rise-up and fall times thereof are in μsec order, and these are extremely shorter than the fall time of twisted nematic liquid crystal), so that a driving operation at a video rate can be sufficiently performed.

According to this invention, the phase-modulating optical unit and the birefringent medium are sequentially disposed in an optical path between a view position (viewer) and a display device whose resolution is to be improved, or between a subject and an image pick-up device whose resolution is to be improved, thereby constituting a wobbling unit, and the display device or the image pick-up device is wobbled one-dimensionally or two-dimensionally.

Further, according to this invention, the birefringent medium comprises a transparent substrate which deviates an optical axis in accordance with the polarization direction of an incident light thereto, and it is disposed to have a component of equivalently uniaxial extraordinary optical axis in a wobbling direction, or so that facing surfaces of the substrate through which the light is transmitted are not in parallel to each other and an apparent extraordinary axis is in parallel to or vertical to a plane which is vertical to both of the surfaces.

In this invention, a wavelength range of light in which the polarization plane can be rotated by about 90 degrees can be broadened through improvement of the resolution, thereby performing improvement in resolution and contrast, and further suppress unevenness of color. Further, since the wavelength range in which a wobbling effect can be obtained can be broadened, particularly the resolution of a display device or image pick-up device comprising three plates of red (R), green (G) and blue (B) can be improved with only one wobbling element, so that the cost can be more reduced.

In addition, the shift of phase difference (retardation) of a chiral smectic element, that is, the condition of the shift of gap precision can be moderated, and thus the yield can be also improved. Particularly, for the image pick-up device, an effect of a low-pass filter can be sufficiently obtained, so that an image can be picked up with high resolution while reducing moire fringes and color dummy signals.

In this case, it is preferable that the birefringent medium for phase adjustment comprises any material selected from the group consisting of an element composed of liquid material containing a π-electron system, an active liquid crystal element which is sandwiched at least between transparent electrodes, and a polymer film containing a π-electron system, and the cross-talk which corresponds to an integral value in an used wavelength range between fields at a wobbling time is reduced to a value lower than the cross-talk of a wobbling element which is not subjected to the phase adjustment.

The birefringent medium for phase adjustment may formed of any material selected from the group consisting of smectic liquid crystal element which is optically transparent and uniformly orientated (containing chiral liquid crystal), nematic liquid crystal element, main-chain type of polymer liquid crystal, side-chain type of polymer liquid crystal, aromatic polyester-based film, polycarbonate film, polystyrene or styrene-based resin film, methacrylate-based resin film, vinyl-based resin film, cellulose-based film, polyamide-based resin film, polyphenylene-based film, polyphenylene sulfide based film, polysulfone-based film, amorphous polyallylate film, polyether sulfone based film, polyether imide based film, polyether ketone based film, polyamide imide based film and polyimide based film.

Further, it is preferable that a phase-adjusting film constituting a wobbling element for the display device is not directly attached to the phase-modulating optical unit formed of chiral smectic liquid crystal, and a phase-adjusting film constituting a wobbling element for the image pick-up device and a polarizer are not directly attached to the phase-modulating optical unit formed of chiral smectic liquid crystal.

In addition, the phase difference (retardation) of the phase-modulating optical unit formed of chiral smectic liquid crystal, the phase difference (retardation) of the birefringent medium for phase adjustment, the axis of the polarization of incident light, the slow axis of the phase-modulating optical unit, the slow axis of the birefringent medium for phase adjustment, and the direction of the extraordinary optical axis of the birefringent medium for optical axis shift can be adjusted in order to rotate the polarization plane by about 90 degrees in a broad wavelength range and minimize the cross-talk of the wobbling.

The orientation treatment direction of the phase-modulating optical unit formed of chiral smectic liquid crystal may be in parallel or vertical to the pixel deviating direction, and it orientation treatment may be conducted by a rubbing or vacuum-deposition method.

Further, it is preferable that the phase difference (retardation) at 632.8 nm of the phase-modulating optical unit formed of chiral smectic liquid crystal is set in a range of 160 nm to 380 nm, the birefringent medium for phase adjustment shows retardation of 160 nm to 380 nm and thus has the same retardation as the phase-modulating optical unit at 632.8 nm, and the slow axis of the birefringent medium for phase adjustment is substantially perpendicular to the slow axis of any one of the two switching states of the liquid crystal director of the phase-modulating optical unit.

Still further, the display device or image pick-up device whose resolution is to be improved may comprise a liquid crystal display device of twisted nematic liquid crystal, ferroelectric liquid crystal, antiferroelectric liquid crystal or the like, a spontaneous emission type of display device such as a light emitting diode, a CCD or the like.

When the light from the display device whose resolution is to be improved or the subject is not polarized, an element for polarizing light is preferably disposed in an optical path between the wobbling element and the display device or the subject.

The liquid crystal used in this invention may be chiral smectic liquid crystal having a liquid crystal layer structure of quasi-bookshelf, quasi-bookshelf or chevron structure.

In this case, the pre-tilt angle of the chiral smectic liquid crystal is preferably set to 0 to 45 degrees. Further, the apparent cone angle θ of an used liquid crystal is preferably set to 26 to 64 degrees.

A bisector between the directors of two switch states of the liquid crystal used for the phase modulating optical unit of this invention is preferably intersected to the polarization plane (P1) of light from the display unit or a line (P2) perpendicular to the polarization plane (P1) at an angle $\delta=22.5\pm10$ degrees when no phase adjustment (compensation) is conducted. Further, in the phase-modulating optical unit which is subjected to phase adjustment (compensation), a bisector between P1 (or P2) and the slow axis of birefringence having a larger absolute value in the switch states of the liquid crystal after the phase compensation is preferably intersected to the polarization plane (P1) of light from the display device or the line (P2) perpendicular to the polarization plane (P1) at an angle of $\delta1=22.5\pm10$ degrees.

When a display device whose resolution is to be improved, such as a liquid crystal display or an image pick-up device comprises a single plate in which a pixel comprises trio picture elements of red, green and blue, the phase difference which is measured using a light source of 632.8 nm is preferably set in a range of 130 nm to 370 nm.

When the display device whose resolution is to be improved, such as the liquid crystal display or the image pick-up device is a triple-plate, representing upper and lower limits of a wavelength range of a transmittance characteristic of each filter to be combined by $\lambda_{Max}$ and $\lambda_{Min}$, a permissible phase difference is in the range of $\lambda_{Max}/2$ to $\lambda_{Min}/2$. When fluorescent materials of red, green and blue are used as light sources, the effective phase difference range of each material is preferably set in the range of $(\lambda c-100)/2$ to $(\lambda c+100)/2$ ($\lambda c$ represents the wavelength at the center of the range, and the unit of each phase difference is "nm").

In a case where an image pick-up device is also used in combination, the phase difference measured using a light source of 632.8 nm is preferably set in the range of 350 nm to 600 nm when the image pick-up wavelength contains the wavelength of infrared rays (700 to 1200 nm).

The phase modulating optical unit can be driven with a bipolar applied voltage of pulse drive or the like. In this case, it is preferably that the response time of each of the leading edge and the trailing edge of the driving voltage at the wobbling time is set to a value below one-third of a field time and the ratio of the rise and fall times does not exceed two times.

Representing a pixel aperture (a picture-element aperture for a monochromatic frame or a triple-plate, an aperture for picture-element trio of red, green and blue for a single plate) and a pixel pitch by $L_A$ and $L_P$, the pixel shift amount L is preferably set to satisfy the following inequality:

$$Min(L_P-L_A, L_A/2) \leq L \leq Max(L_A, L_P-L_A/2)$$

Here, Min(x,y) and Max (x,y) represent functions which provide smallest and largest values of x,y, respectively).

Further, a display device having a horizontal scanning line number of N is preferably combined with a phase modulating optical unit having a driving electrode which is divided into one to N segments (the number of segments is preferably three to N, more preferably below N/2 parts or (N+1)/2 parts and above three). In this case, the distance of the divided electrode is preferably longer than the gap of liquid crystal cells (further, it is preferably shorter than a non-display portion such as a black matrix portion).

At the wobbling time, the driving of the display device is synchronized with the driving of the phase modulating optical unit on the basis of detected video vertical synchronizing signals, a one-field time is divided into parts whose number is equal to the number of required electrodes and a time delay within a field is sequentially provided at each channel of the phase modulating optical unit to perform a driving operation.

Further, the driving of the image pick-up device is synchronized with the driving of the phase modulating optical unit on the basis of the synchronizing signals, an image pick-up operation is carried out within each field, and data are transferred, whereby a frame can be formed.

According to the optical device of this invention, the birefringent medium for deviating the optical axis and the phase-modulating optical unit may be adhesively attached to each other with optical adhesive agent, or the quartz plate serving as the birefringent medium may be provided with a transparent electrode and an orientation film and unified with a liquid crystal element.

Further, the optical device of this invention may be designed in a direct vision type, a reflection type or a projection type of display, and it may be used in a visible wavelength band.

Still further, a wobbling element may be combined with a solid image pick-up device to form a visible or infrared image pick-up device. Moreover, a wobbling element, an optical low-pass filter and a solid image pick-up element may be combined with each other. In this case, a quarter wavelength plate is preferably disposed in an optical path between the wobbling element and the optical low-pass filter.

BRIEF DESCRIPTION OF THE DRAWINGS

FIGS. 1A–1C are schematic and graphical views showing a display device in a state 1 according to an embodiment of this invention in a state 1;

FIG. 7 is a schematic view showing a cross-talk between fields at a wobbling (pixel shift) time;

FIG. 8 is a schematic view showing an optical transmission measuring system at wobbling;

FIG. 9 is a graph showing variation of transmission spectrum of liquid crystal;

FIGS. 15A–15B are schematic and graphical views of the liquid crystal director in the state 1 like FIG. 1;

FIG. 30 is a schematic view showing a wobbling state;

FIG. 31 is a schematic view showing another wobbling state;

FIG. 32 is a schematic view showing another wobbling state;

FIG. 33 is a schematic view showing a wobbling state of an RGB in-line arranged display device;

FIG. 37 is waveform diagrams of synchronizing signals of respective fields of a TV;

FIG. 39 is a driving waveform diagram of an electrode division type of phase modulating unit;

FIGS. 40A and 40B are schematic views showing a display device using the above elements;

FIGS. 49A–49C are schematic and graphical views showing the image pick-up device in a state 2;

FIGS. 50A–50C are schematic and graphical views showing shift of an extraordinary axis of FLC of the image pick-up device like FIG. 49;

FIGS. 51A–51C are schematic and graphical views showing an improved liquid crystal director in a state 2 like FIG. 49;

FIGS. 52A–52C are schematic and graphical views showing the liquid crystal director in a state 1 like FIG. 48;

FIGS. 53A–53B are schematic views showing concrete examples of the image pick-up device;

FIGS. 56A–56C are schematic views showing a principle for explaining occurrence of blurring due to three quartz filters;

FIG. 59 is a cross-sectional view of another actual installation state;

FIGS. 60A and 60B are a schematic diagram showing a display device of another embodiment in each state;

FIGS. 61A, 61B and 61C show the relationship of an optical axis at each state between the FLC device and the phase compensation (adjustment) film of the display device;

FIGS. 65A and 65B are transmittance spectra at each state in the optical arrangement;

FIGS. 69A–69B are schematic views showing a method of improving the resolution in the vertical and horizontal directions;

FIGS. 70A–70E are driving waveform diagrams for a liquid crystal device driving method;

FIGS. 83A and 83B are a schematic view of an image pick-up device of another embodiment according to this invention;

FIG. 84 is a cross-sectional view of a structure of the image pick-up device;

FIG. 85 is a cross-sectional view of another structure of the image pick-up device;

DETAILED DESCRIPTION OF THE PREFERRED EMBODIMENTS

Figure 2A:
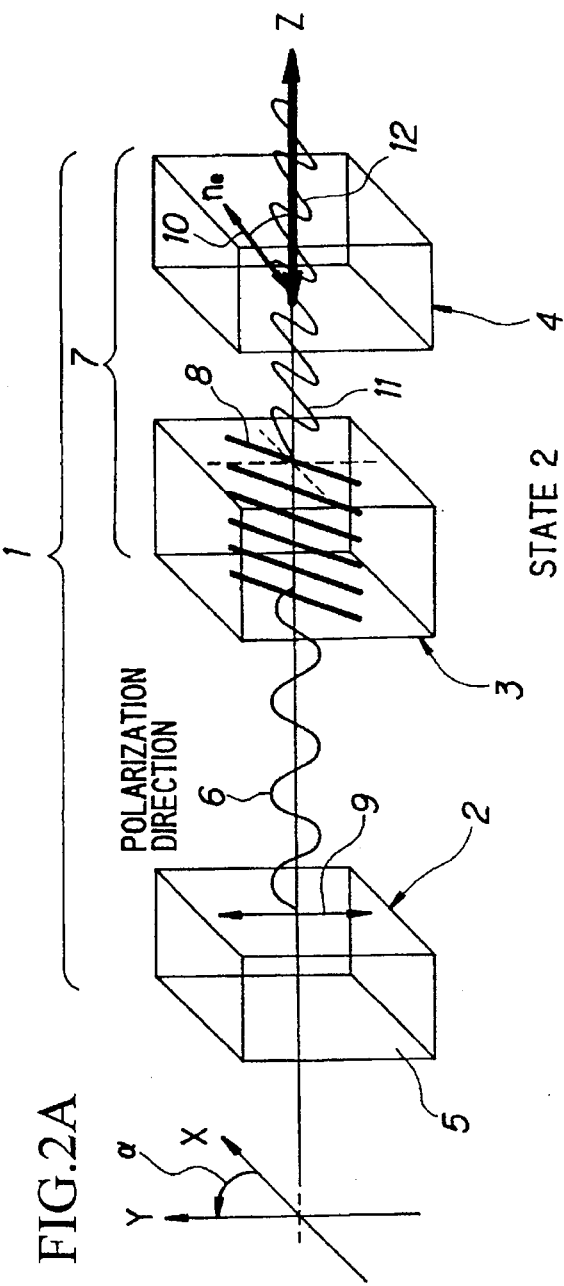
FIGS. 2A–2C are schematic and graphical views showing the display device in a state 2.
Figure 2C:
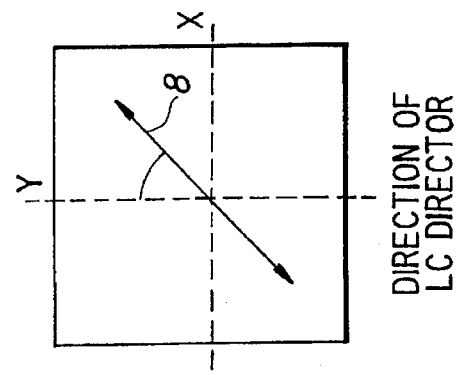
Figure 2B:
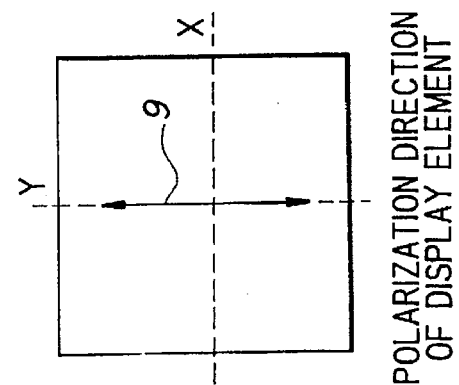

Preferred embodiments according to this invention will be described with reference to the accompanying drawings.

FIGS. 1A–C and 2A–C are schematic views of a first embodiment of an optical device in which a wobbling element is installed. FIGS. 1A–C corresponds to the FLC extraordinary optical axis being coincident with the polarization direction; and FIGS. 2A–2C corresponds to the FLC extraordinary optical axis intersecting the polarization direction by 45 degrees.

This embodiment relates to a case where this invention is applied to a liquid crystal optical display device 1. The optical device of this embodiment includes a liquid crystal display device (LCD) 2, a ferroelectric liquid crystal device (FLC) 3 serving as a phase modulating optical unit and a birefringent medium 4 comprising a transparent substrate formed of a quartz plate or the like, which are sequentially disposed along a light propagating direction in the same optical path. In order to make the understanding of this invention clear, these elements are illustrated in correspondence to a section for a display picture element 5 of the liquid crystal display device (LCD) 2.

The picture elements 5 of the LCD 2 are discretely arranged in a mosaic form as a whole, and an used liquid crystal is TN (twisted nematic), STN (super twisted nematic), SH (super homeotropic), FLC or the like. It is well known that the LCD 2 has a polarizing plate (polarizer) on a panel thereof (not shown) and an output light 6 therefrom is linearly polarized.

The pixel shift in a horizontal or vertical direction is performed for the linearly-polarized light 6 with a wobbling element (pixel shifting element) 7 comprising the FLC 3 and the birefringent medium 4. In order to perform the pixel shift, the FLC device 3 is disposed so that one extraordinary optical axis 8 thereof is in parallel to or vertical to a polarization plane 9 of the picture element 5, and further a projection component of an extraordinary optical axis 10 of the transparent substrate 4 having an equivalently uniaxial optical axis (uniaxial optical anisotropy) onto an X-Y plane (at an incident side) is disposed in parallel to (in Y-direction) or vertically to (in X-direction) the polarization plane 9.

Any liquid crystal used for the FLC device 3 is usable insofar as it can perform a high-speed switching operation at a video rate, and for example a chiral smectic liquid crystal or the like may be used. Further, a quartz plate or the like may be used as the birefringent medium 4. In place of FLC, antiferroelectric liquid crystal (AFLC) or smectic liquid crystal having an electrical inclination effect (for example, smectic A) is effectively usable, and any birefringent element other than the quartz plate may be used.

Next, a wobbling operation for the display device 1 thus constructed will be schematically described.

First, in a case where the switching state of the ferroelectric liquid crystal device 3 is a state 1 as shown in FIG. 1, since the polarization plane 9 of light 6 irradiated from the display device 2 is in parallel to the extraordinary optical axis 8 of the ferroelectric liquid crystal device 3, a transmitted light 11 through the ferroelectric liquid crystal device 3 is irradiated to a quartz plate 4 having birefringence with keeping its polarization plane 9. In the quartz plate 4, the extraordinary optical axis 10 of the quartz plate 4 is contained on the polarization plane of the incident light. Therefore, the light which is polarized in the Y-axis direction is refracted in an inclination direction of the extraordinary optical axis 10 of the quartz plate 4, and it will be in parallel to the optical axis when it passes out to an air layer 12 again, so that any shift from the optical axis of the incident light occurs in the Y-axis direction.

On the other hand, in a case where the switching state of the ferroelectric liquid crystal device 3 is a state 2 as shown in FIG. 2, the transmitted light 11 is rotated in the inclination direction of the extraordinary optical axis because the polarization plane 9 and the extraordinary optical axis 8 are intersected to each other at about 45 degrees. Therefore, the polarization state of the transmission light is varied in the ferroelectric liquid crystal device 3 as follows: linear polarization (Y-axial direction)→elliptic polarization→circular polarization→elliptic polarization→linear polarization (X-axial direction), so that the polarization plane is rotated from its initial state by 90 degrees and then incident to the quartz plate 4. In the quartz plate 4, the light 11 keeps its optical axis without being refracted, and then emitted as an emission light 12 from the quartz plate 4 to the air layer again.

As described above, the optical axis can deviated through refraction or non-refraction of the incident light by the quartz plate 4 in accordance with the switching state, that is, the state 1 or the state 2 of the FLC 3, and the pixel shift can be performed by utilizing this optical axis shift as an operating principle for the pixel shift.

Here, a cone angle de liquid crystal state for determining the switching state in the FLC 3 as described above will be described. With respect to ferroelectric liquid crystal (the same effect is also obtained for antiferroelectric liquid crystal), a switching behavior of a liquid crystal director in accordance with an applied voltage is subjected to a Nanbu-Goldstone mode described at page 150 of "LIQUID CRYSTAL DICTIONARY" issued by Baifukan in which a liquid crystal molecule is moved on an imaginary cone. With respect to smectic A liquid crystal having an electrical inclination effect (described at page 145 of the "LIQUID CRYSTAL DICTIONARY") has a cone angle inherent to each liquid crystal component which is similar to a cone angle even when a soft mode as described at page 119 of the "LIQUID CRYSTAL DICTIONARY" is used.

Figure 3:
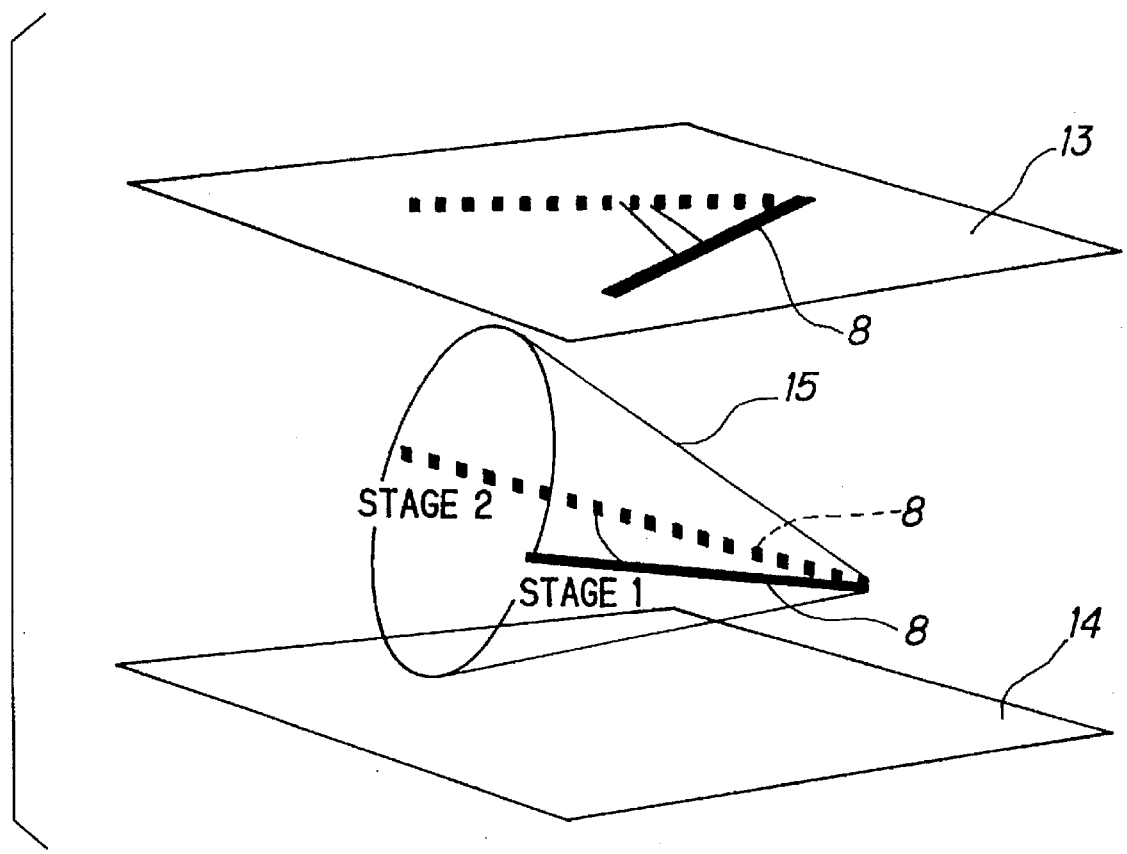
FIG. 3 is a schematic view showing a cone angle of ferroelectric liquid crystal (FLC) used in the display device.

That is, there is now considering a cone model of a liquid crystal 15 which is sandwiched between transparent electrodes 13 and 14 formed of ITO (Indiumtin oxide obtained by doping indium with tin) as shown in FIG. 3. FIG. 3 described the cone angle and chiral smectic LC sandwiched by transparent electrodes. An open angle of the cone is referred to as "cone angle $\theta r$" and a projection of the cone angle onto a glass substrate having a transparent electrode is referred to as "apparent cone angle $\theta$". It is optically sufficient to consider the apparent cone angle $\theta$. The cone angle has a temperature-dependent characteristic, and thus it develops the following phenomenon. That is, even when a cone angle of 45 degrees is obtained at 25° C. for example to obtain an effective wobbling effect, the cone angle is varied in accordance with an environmental temperature, that is, it is increased at a low-temperature side while it is decreased at a high-temperature side.

For example, as shown in the following table 1 and FIG. 4, for an antiparallel cell having a SiO obliquely-deposited aligning film using FLC liquid crystal CS-1014 produced by Chisso Petrochemical Corporation, the apparent cone angle is about 45 degrees at about 25° C., however, it is increased to 51.6 degrees at 0° C. and reduced to 7 degrees at 55° C. Further, as shown in the following table 2 and FIG. 5, for a similar cell using FLC liquid crystal ZL1-3774 produced by E. Merck Company, an apparent cone angle is about 45 degrees at 25° C., however, it is increased at a low temperature side, for example, to 54.8 degrees at −10° C.

TABLE 1

(TEMPERATURE-DEPENDENCE OF CONE ANGLE OF CS-1014 LIQUID CRYSTAL)

| Measured Temperature (°C.) | Apparent Cone Angle (degree) |
| --- | --- |
| 0.00 | 51.6 |
| 15.0 | 49.2 |
| 26.3 | 46.7 |
| 30.0 | 46.3 |
| 40.0 | 42.2 |
| 45.0 | 40.3 |
| 50.0 | 28.3 |
| 53.0 | 17.0 |
| 55.0 | 7.00 |

TABLE 2

(TEMPERATURE-DEPENDENCE OF CONE ANGLE ZLI-3774 LIQUID CRYSTAL)

| Measuured Temperature (°C.) | Apparent Cone Angle (degree) |
| --- | --- |
| −10.0 | 54.8 |
| 0.0 | 52.2 |
| 10.0 | 49.7 |
| 20.0 | 47.6 |
| 30.0 | 45.0 |
| 35.0 | 44.0 |
| 40.0 | 43.0 |
| 45.0 | 40.5 |
| 50.0 | 36.5 |
| 55.0 | 30.6 |
| 60.0 | 25.0 |
| 65.0 | 10.5 |

As described above, when the apparent cone angle θ, that is, the intersection angle of the extraordinary optical axis 8 of the liquid crystal before and after a switching degrees) of the polarization plane as described above cannot be obtained, and various kinds problems occur.

Further, in order to consider the effect of the cone angle, CS-2003 (60 degrees in cone angle) produced by Chisso Petrochemical Corporation, CS-2002 (64 degrees in cone angle) and CS-2004 (88 degrees in cone angle) are usable as a liquid crystal having a large cone angle at 25° C. All of these compositions show the phase change of Iso-N*-SmC*-Cryst. Compositions having a cone angle of 65 to 80 degrees are prepared by blending CS-2002 (64 degrees in cone angle) and CS-2004 (88 degrees in cone angle).

The measurement of the cone angle is performed by measuring an intersection angle between the liquid crystal directors in the two switching states. Specifically, the cone angle was measured by observing a liquid crystal cell under a polarization microscope having polarizers which are perpendicular to each other and determining the cone angle on the basis of a rotational angle of a stage at an extinction position (where a transmission light through the polarizers becomes dark).

Through earnest endeavors of the inventor of this application, the following combination of the optical axis has been proved to be effective.

In a case where the apparent cone angle is deviated from 45 degrees due to an environmental temperature of an element (for example, 45+γ degrees: 45>γ>−45), by ideally setting the optical axis of the liquid crystal director at one of the switching states in parallel to or vertically to the polarization plane of the display device side in the wobbling operation, the polarization plane of the transmission light is unvaried in this switching state. In this case, the polarization plane is not rotated, so that 100% of light is refracted in the direction of the extraordinary optical axis 10 of the quartz plate 4 as shown in FIG. 1, and the shift from the optical axis is provided. At this time, there is little component on a Z-axis.

Further, since the apparent cone angle is equal to (45+γ) degrees in the other switching state, the polarization plane of the transmission light is rotated by 90 degrees or more when γ is a positive value, and it is rotated by 90 degrees or less when γ is a negative value. When the polarization plane is completely rotated by 90 degrees, the component on the Z-axis reaches substantially 100% as shown in FIG. 2. However, as shown in FIG. 6, when the rotation of the polarization plane is deviated from 90 degrees by an angle γ, the component on the Y-axial direction which serves as a polarization component is also increased, so that those components which are deviated not only in the Z-axial direction, but also in the Y-axial direction are contained. Accordingly, in this case, a pixel shifting effect for originally improving the resolution is reduced. Particularly, it has been found out that deterioration in the effect of improving the resolution is caused by a leaked component at the pixel shift time.

Figure 6A:
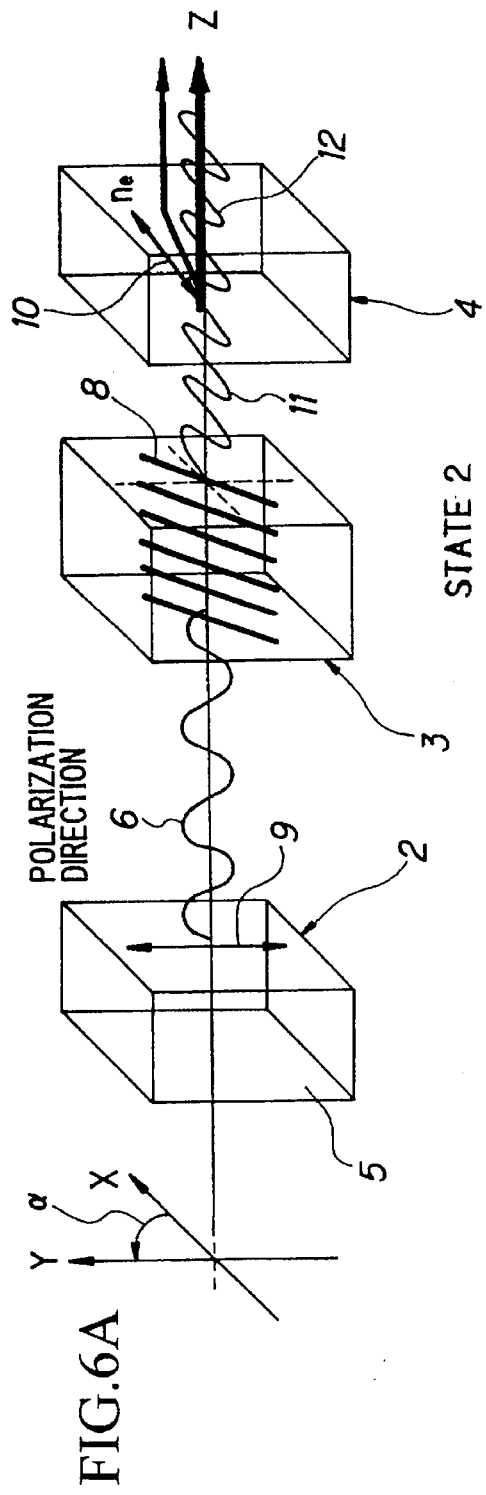
FIGS. 6A–6C are schematic and graphical views showing shift of an extraordinary axis of FLC of the display device like FIG. 2.
Figure 6C:
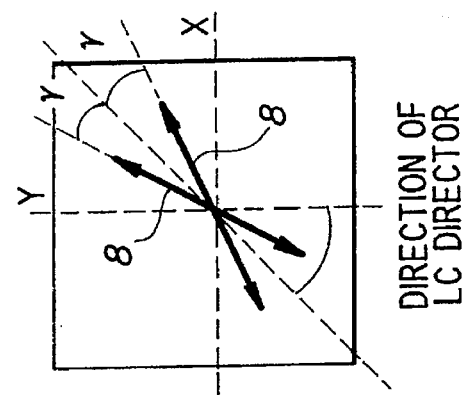
Figure 6B:
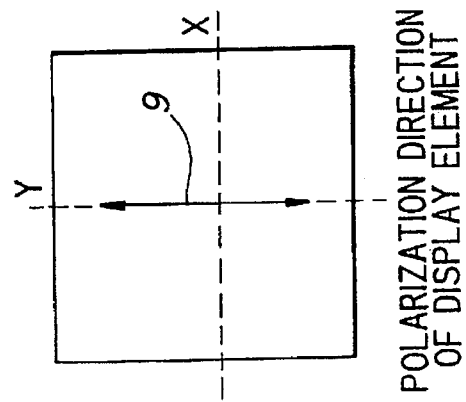

Here, the cone angle of the liquid crystal as shown in FIGS. 6A–6C will be further described. FIGS. 6A–6C corresponds to the intersection angle between FLC extraordinary optical and polarization direction of display element being deviated from 45° by γ.

When the cone angle of the liquid crystal is not 45 degrees, leakage of light (that is, cross-talk) occurs between odd and even fields. As a result, for example when the odd and even fields are white and black respectively, strips could be observed with sufficient contrast if the wobbling is perfectly performed. However, if any leakage component exists, the white portion would become dark while the black portion would become bright, so that the contrast is reduced. For example when the original contrast of the display device is 100:1, 100% white level would be reduced to 90.1% while 0% white level (black level) would be reduced to 10.9% if there is 10% cross-talk between fields. Therefore, the total contrast is equal to 90.1:10.9=8.27:1, and thus the contrast is greatly reduced. FIG. 7 shows an example of cross-talk between fields at wobbling time.

Since a contrast of 8:1 or more is required to use the display device practically, it is important to reduce the cross-talk between the fields to about 10% or less (the effect of improving the resolution could be obtained only if the contrast is ensured).

An optical system for estimating a cross-talk amount is shown in FIG. 8. The system is for measuring optical transmission of wobbling time. The optical system comprises a polarization microscope 70 (OPTIPHOTO-POL produced by Nikon company), a visible spectrophotometer (Otsuka Denshi K.K. 100) 71, and a combination 72 of a personal computer and a monitor.

The light emitted from a halogen light source 73 is passed through a polarizer 74, an FLC device 7, an analyzer 75 and a quartz fiber 76, and then subjected to a spectroscopic operation by a visible spectroscope 71 to obtain the spectrum of the light. The polarizer 74 and the analyzer 75 are disposed in parallel to each other. When the polarization plane suffers no rotation by the FLC 7, 100% of light transmitted through the polarizer 74 is transmitted through the analyzer 75, and enters the spectroscope 71. However, when the shift $\zeta$ of the FLC molecular director from the Y-axis is not equal to zero, the light from the polarizer 74 suffers rotation of its polarization plane. If the gap is further adjusted for $\zeta$=45 degrees, the polarization plane could be rotated just by 90 degrees. As a result, no light is transmitted through the analyzer 75, and the transmittance is equal to 0%.

Here, a rotation characteristic of the polarization plane when the liquid crystal director is rotated in accordance with variation of the cone angle is estimated. That is, if the transmittance is equal to 0%, the wobbling operation could be sufficiently performed. On the other hand, if the transmittance is equal to 10% for example, 10% of an incident light would leak to a field component at the opposite side. An actual experiment result is shown as follows.

Figure 10:
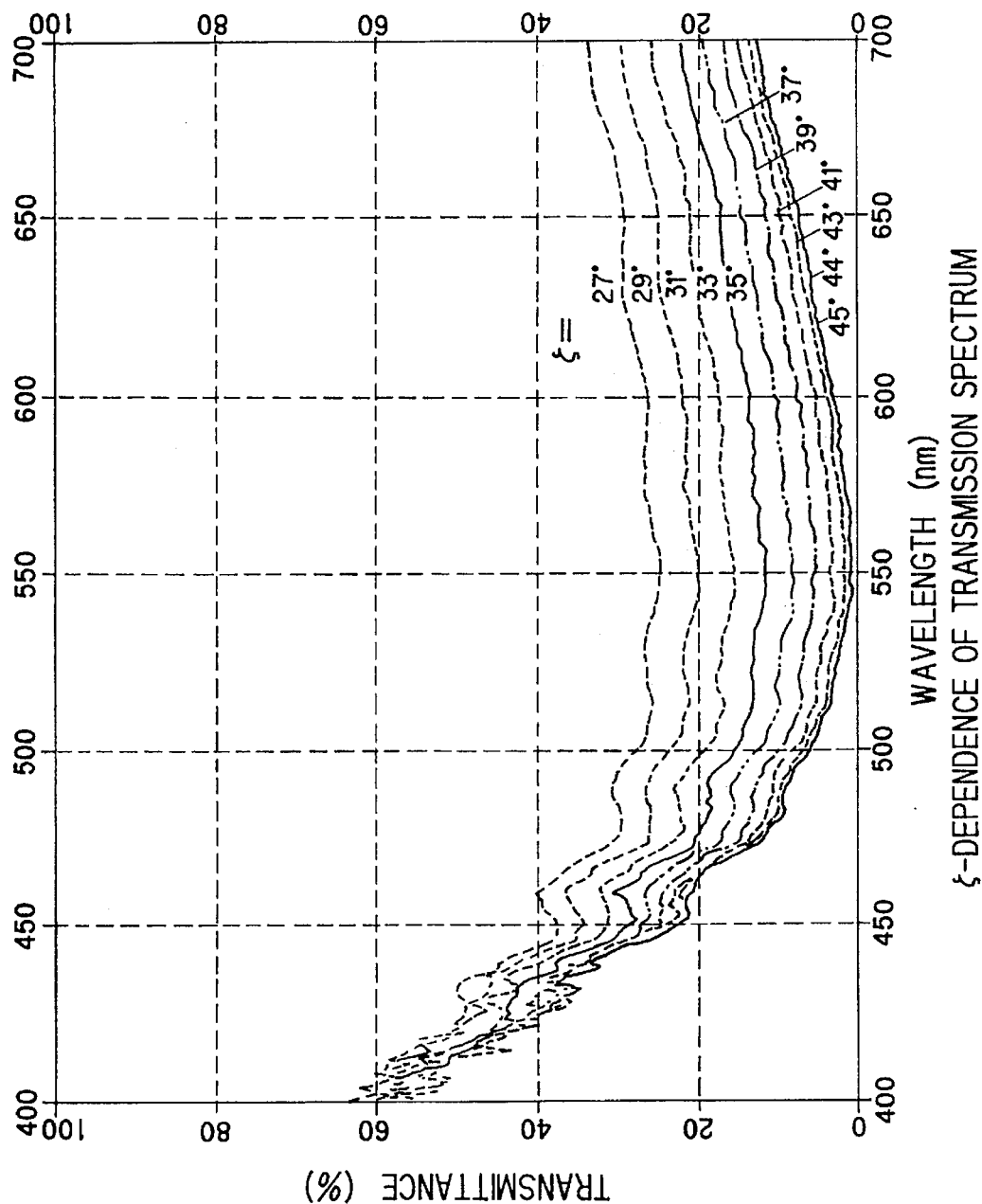
FIG. 10 is a graph showing variation of transmission spectrum of liquid crystal.
Figure 11A:
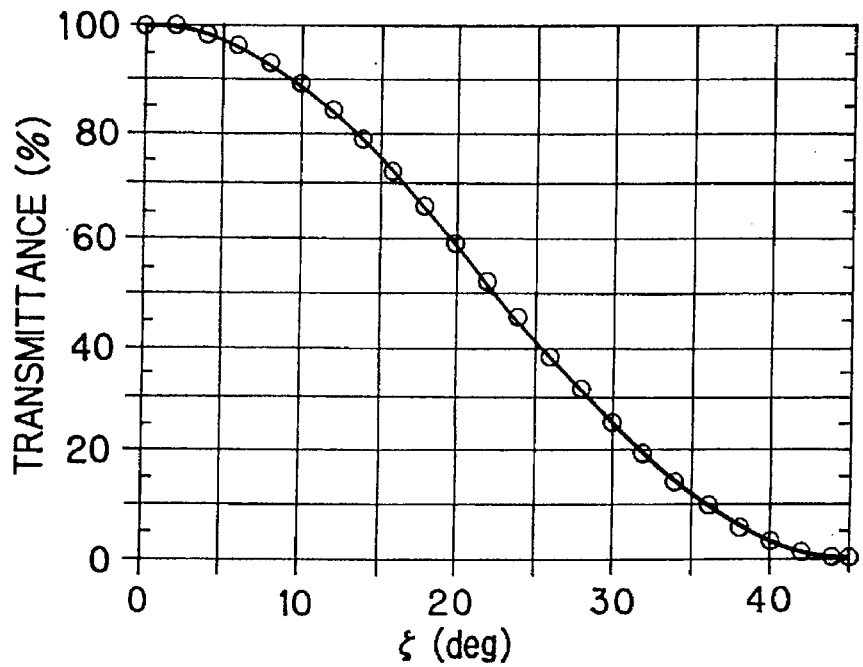
FIGS. 11A and 11B are a graph showing variation of transmittance.

FIGS. 9 and 10 show spectrum variation in accordance with variation of $\zeta$. Further, FIGS. 11A and B show the transmittance variation in accordance with variation of $\zeta$ for the wavelength of the minimum transmittance with the maximum transmittance plotted at 100%.

Here, $\zeta$ below 0 degree shows a mirror image relationship at 0 degree, and $\zeta$ above 45 degrees shows a mirror image relationship at 45 degrees. In order to keep 8 or more in contrast (that is, transmittance below 10% or above 90%), $\zeta$ is required to be below about ±10 degrees, 36 degrees to 54 degrees.

Theoretically, the transmittance when the polarizer and the analyzer are in parallel to each other is represented by the following equation:

$$I/I_o = \sin^2(2\zeta) \cdot \cos^2(\pi \Delta n \cdot d/\lambda)$$

Figure 11B:
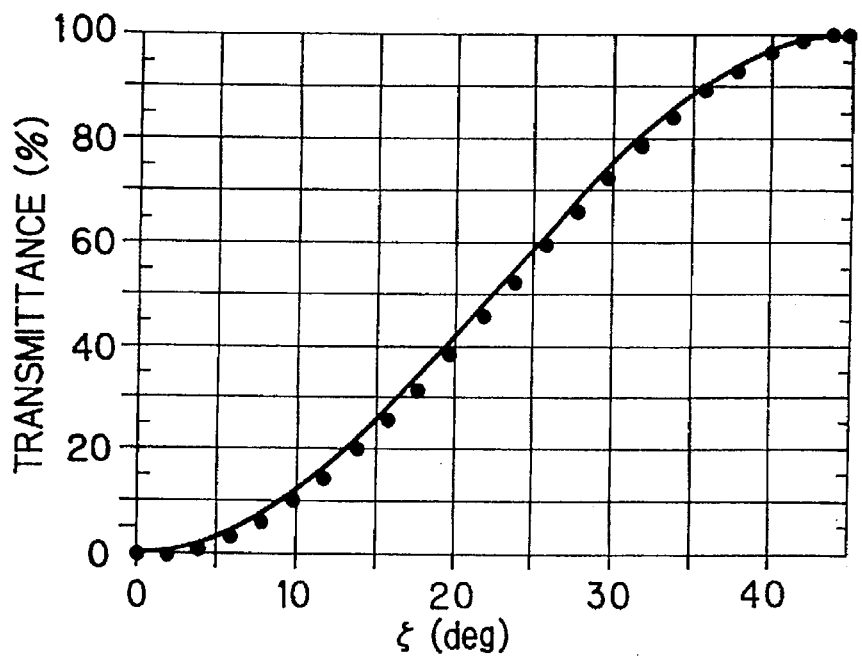
Figure 12:
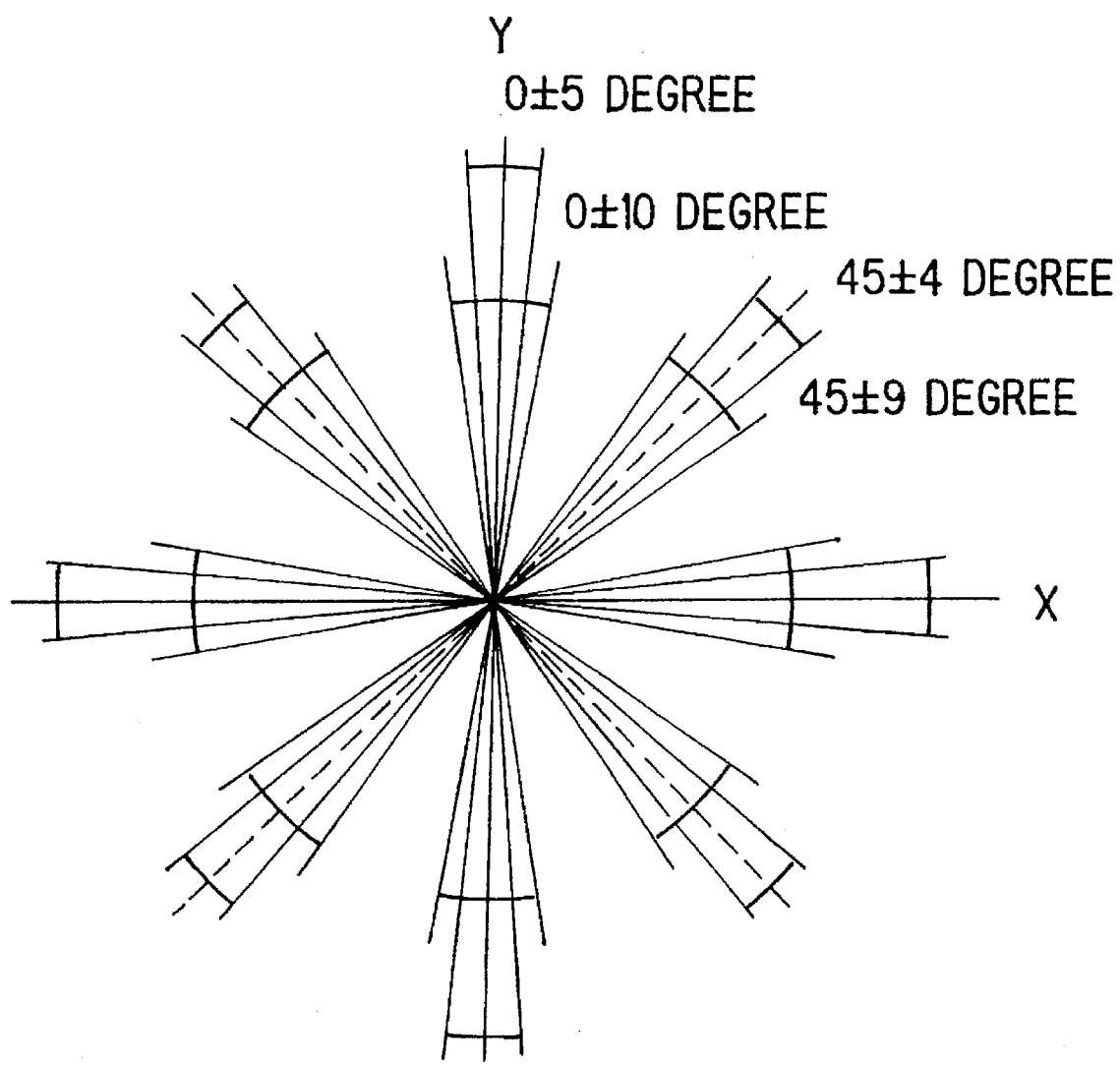
FIG. 12 is a schematic view showing a cone angle preferable for liquid crystal.

Here, $\lambda$ represents wavelength, $\Delta n$ represents birefringence index, and d represents gap. By calculating the intensity of transmitted light under a condition that $\pi \Delta n \cdot d/\lambda = \pi$ and plotting the calculated result, it substantially corresponds to an actually-measured value, and it is apparent that the restriction condition is more moderate in the actually-measured value (see FIG. 11B). Further, in order to obtain contrast of 40 or more using the above method, the transmittance is required to be below 1.5%, and thus $\zeta$ is required to be below about ±5 degrees, 41 degrees to 49 degrees. That is, by calculating these values in terms of the apparent cone angle, it has been found out that in order to improve the resolution using the wobbling operation, $\theta$ is required to be in the range of 26 to 64 degrees, preferably in the range of 36 to 54 degrees. It is apparent that the same is satisfied in other quadrants in FIG. 12.

Accordingly, in order to improve the deterioration (asymmetry) of the resolution at the pixel (picture element) shifting, it has been found out that an angle $\delta$ at which a bisector 16 of the intersection angle of the two switching states intersects to the polarization plane (Y-direction) of light from the display device or a line (X-direction) perpendicular to the polarization plane is preferably equal to 22.5 degrees ideally.

Figure 13B:
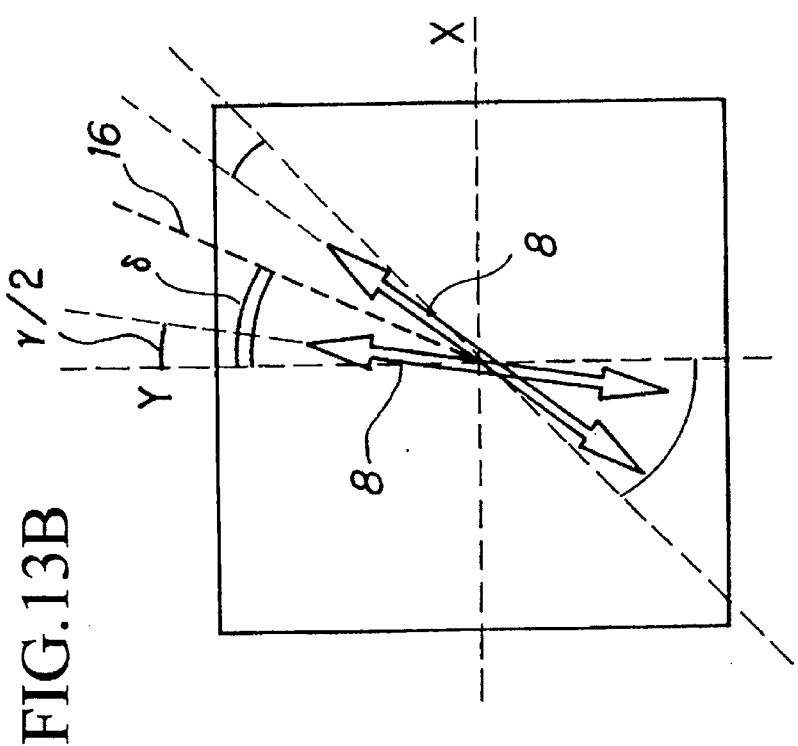
FIGS. 13A –13B are schematic views showing an improved liquid crystal director direction.
Figure 13A:
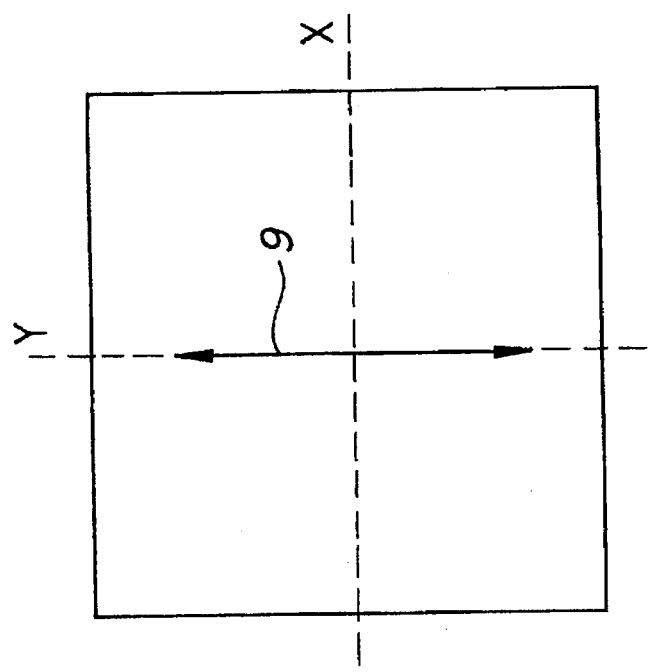
Figure 14A:
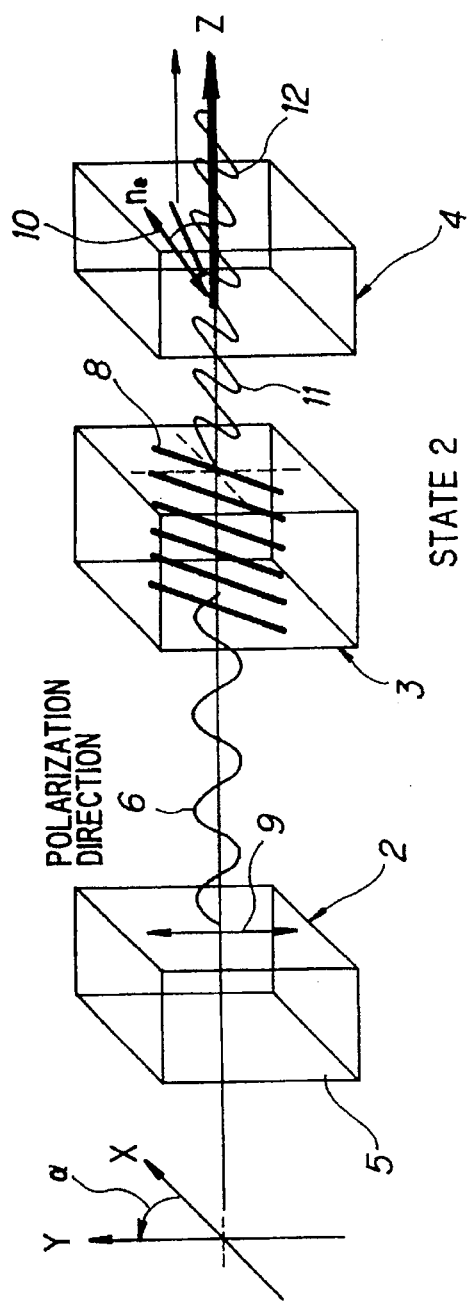
FIGS. 14A–14B are schematic and graphical views of the liquid crystal director in the state 2 like FIG. 2.
Figure 14C:
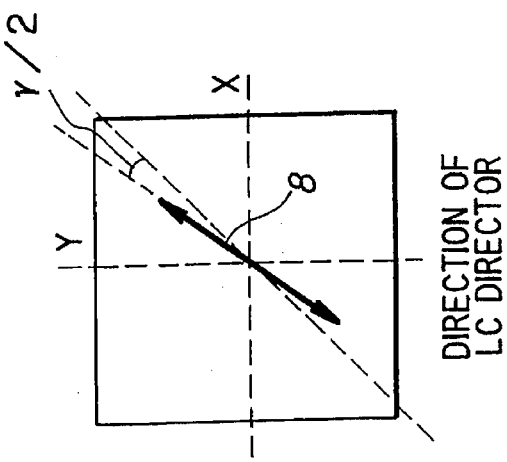
Figure 14B:
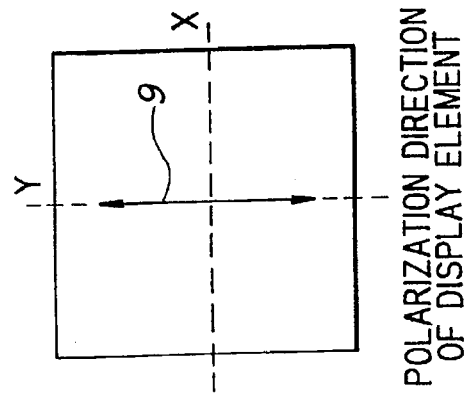
Figure 16:
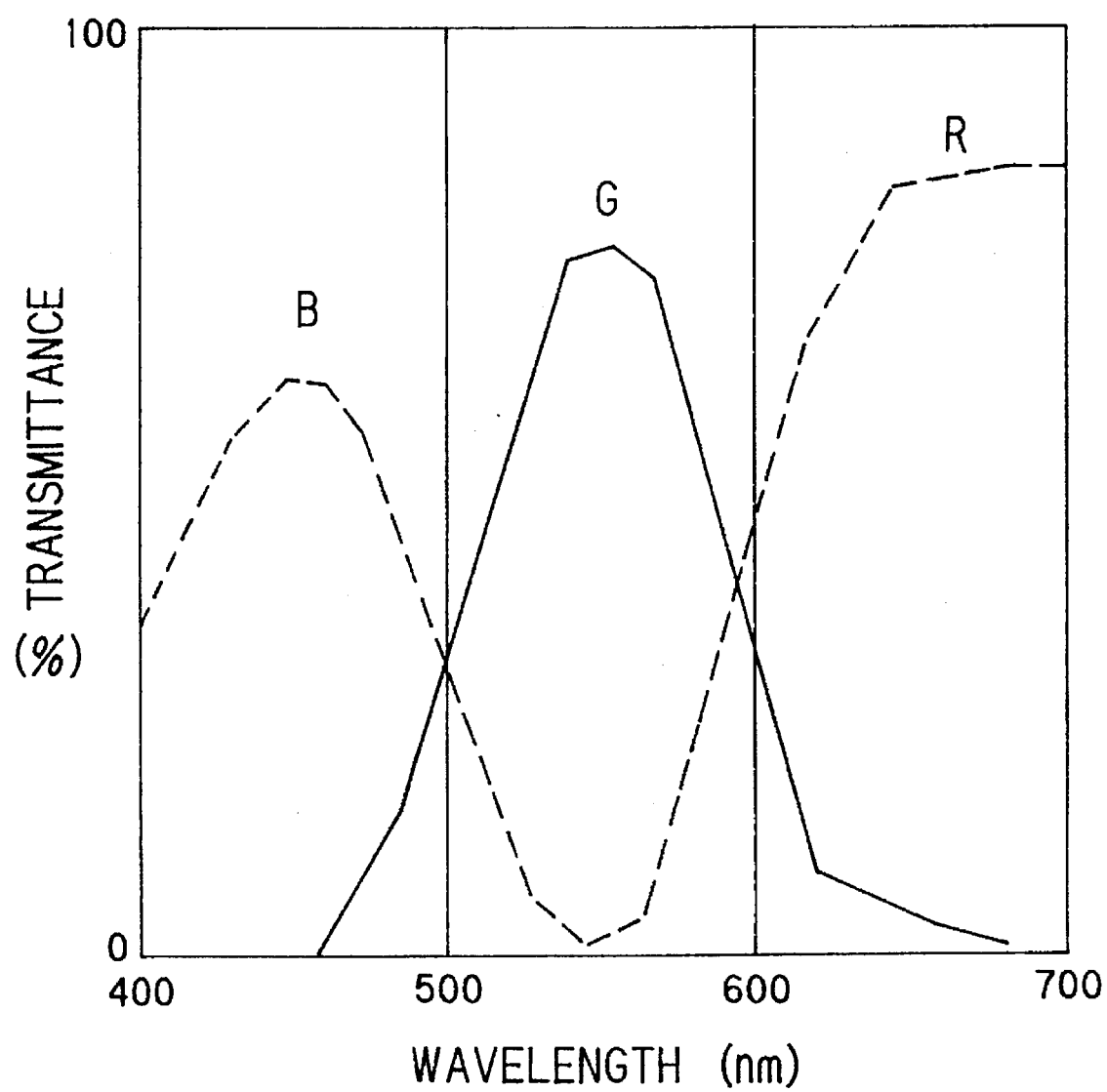
FIG. 16 is a graph showing a transmission spectrum of RGB filters used in the display device.

FIG. 13 describes the definition of angle $\delta$ introduced to improve reduction of effect of pixel deviation. The angle $\delta$ represents an intersection angle of a bisector of an intersection angle between two switch states to a polarization plane of light from display element, or a line perpendicular to the polarization plane.

As described above, by orienting the liquid crystal director 8 as described above, any cross-talk occurs in both of the switching states as shown in FIGS. 14A–C and 15A–C. However, the cross-talk in each switching state is small, and the sum of the cross-talks is smaller than when any cross-talk occurs in only one switching state because these cross-talks occurring in the switching states are averaged, so that the effect of improving the resolution is not deteriorated.

Considering the range of $\delta$-axis on the basis of the same consideration manner as described above, $\delta$ is only 22.5 degrees for the apparent cone angle $\theta$ of 26 or 64 degrees, however, for the apparent cone angle $\theta$ of 45 degrees, the $\delta$ range is preferably within 22.5±10 degrees, and more preferably within 22.5±5 degrees.

Here, the range of the cone angle $\theta$ and the intersection angle $\delta$ at which the bisector of the two switching states intersects to the polarization plane of the light from the display device or the line perpendicular to the polarization plane are made clear on the basis of the following wobbling experiment result.

That is, through the consideration of the axis fixing at one side, the original resolution of the liquid crystal display device whose resolution is to be improved can be improved from 240 TVlines to 370 TVlines by the wobbling effect for the $\theta$ range of 26 to 64 degrees. Further, for the $\theta$ range of 36 to 54 degrees, high resolution without color change could be obtained. Through consideration of the position of $\delta$-axis for the $\theta$ range of 36 to 54 degrees, it was found out that there was no color change for $\delta$=22.5±10 degrees and the resolution was improved to 370 TVlines or more. Further, in the range where $\theta$=36 to 54 degrees and $\delta$=22.5±5 degrees, the cross-talk between the fields is reduced, and the contrast ratio between the fields is increased. Therefore, it was visually proved that the resolution was improved to 390 TVlines.

The estimation of the resolution was made by video-inputting signals from a resolution estimating pattern of NTSC (video signal pattern generator: MTSG-1000 produced by Sony) and observing the resolution of white and black lines.

With respect to the phase difference, the liquid crystal itself has a wavelength-dependence of birefringent amount thereof, and thus it is difficult to performing a matching over all wavelength ranges. The following consideration is made for a case where a liquid crystal display whose resolution is to be improved comprises a single plate of RGB trio picture elements (forming a pixel) (for a white and black display, one picture element=one pixel). RGB filters used have main transmission wavelengths of 650 nm(R), 559 nm(G) and 450 nm(B), respectively. Here, in consideration of visibility of human eye to resolution, since R(red):G(green):B(blue) =3:6:1, the main wavelengths of R, G and B may be weighted with sensitivity to obtain a weighted average wavelength and provide a phase difference of a half of the weighted average wavelength.

That is, the optimum phase difference =450 nm×0.1+550 nm×0.6+650 nm×0.3=570 nm, and thus it may be adjusted to the half wavelength of 285 nm. The phase shift of the half wavelength is important to effectively rotate the polarization plane as described later.

Actually, the pixel shift was experimentally made using ferroelectric liquid crystal devices having various phase differences, and the result of the experiment is shown in the following table 3. According to this experiment, the high-resolution effect was obtained for a phase-difference range of 130 nm to 370 nm which was measured a light source of 632.8 nm (He—Ne laser beam). Even in a highly resolved cell, a frame suffered a color change for the phase difference below 137 nm and the phase difference exceeding 350 nm, and thus it could not be practically used. Therefore, in order to improve resolution of a panel of a signal plate in which RGB picture elements are dispersed in a mosaic form, the phase difference which is measured with a light source of 632.8 nm (He—Ne laser beam) is more preferably in a range of 140 nm to 350 nm.

TABLE 3

(PHASE DIFFERENCE EFFECT ACTING ON PIXEL SHIFT EFFECT)

| C.G (μm) | P.D (nm) | R.I.E | C.F |
|---|---|---|---|
| 1.02 | 102.50 | Unrecognizable | Large |
| 1.32 | 136.59 | Slight | Large |
| 1.70 | 166.40 | Present | Present |
| 1.83 | 210.40 | Present | No |
| 1.84 | 210.40 | Present | No |
| 2.04 | 256.97 | Present | No |
| 2.06 | 244.39 | Present | No |
| 2.10 | 259.30 | Present | No |
| 2.10 | 263.69 | Present | No |
| 2.10 | 249.91 | Present | No |
| 2.23 | 284.52 | Present | No |
| 2.41 | 302.49 | Present | Present |
| 2.51 | 303.34 | Present | Present |
| 2.52 | 306.36 | Present | Present |
| 2.75 | 323.29 | Present | Present |
| 2.81 | 340.20 | Present | Present |
| 2.86 | 345.76 | Present | Present |
| 3.02 | 364.52 | Slight | Large |
| 3.24 | 397.20 | No | Large |

C.G.: cell gap, P.D.: phase difference, R.I.E.: resolution improving effect, S.E.: color change of frame Further, when a liquid crystal display whose resolution is to be improved comprises a triple-plate projection type of display, a phase difference may be set for each of color filter characteristics of R, G and B. In this case, representing the upper limit and lower limit of the wavelength range of the transmittance characteristic of each filter by $\lambda_{Max}$, $\lambda_{Min}$ respectively, a permissible phase difference is preferably in the range of $\lambda_{Max}/2$ to $\lambda_{Min}/2$.

When R, G, B fluorescent emitters are used as light sources, R, G and B become bright line spectra. Therefore, in this condition, the wavelength range of each of R, G and B is very narrow. Usually, in R, G and B filters, the wavelength ranges of the respective filters are overlapped with one another, and they have a width of ±100 nm with a wavelength of λc at the center. Accordingly, it is effective that the wavelength range has ±100 nm width for the center wavelength of each light source. That is, the effective phase difference range is preferably from (λc−100)/2 to (λc+100)/2 (unit:nm) where λc represents the center wavelength.

Figure 17A:
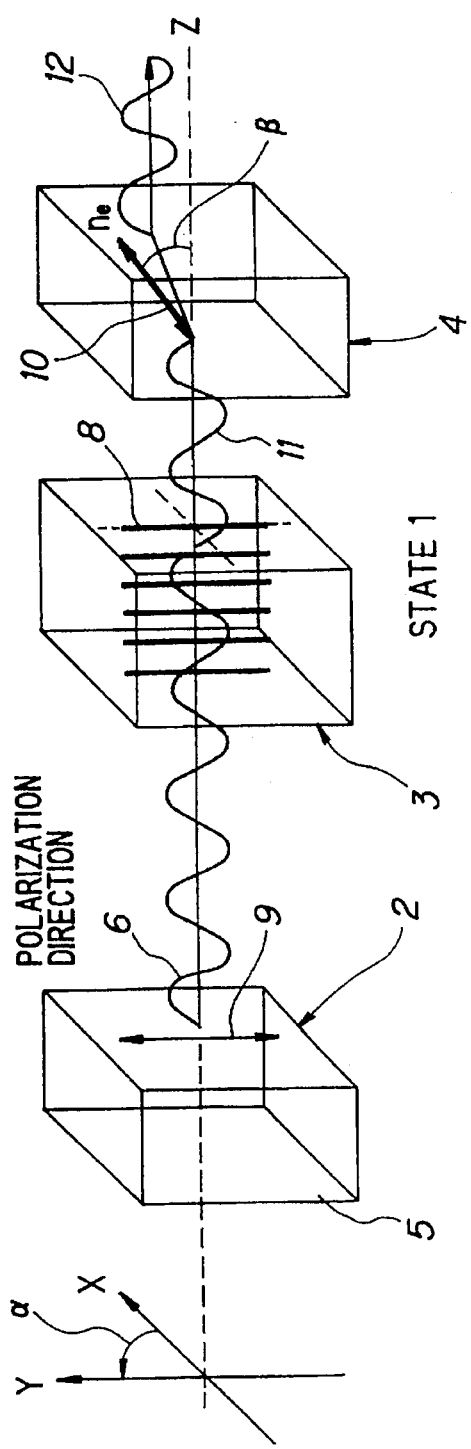
FIGS. 17A–17B are schematic views showing the display device in each switching state.
Figure 17B:
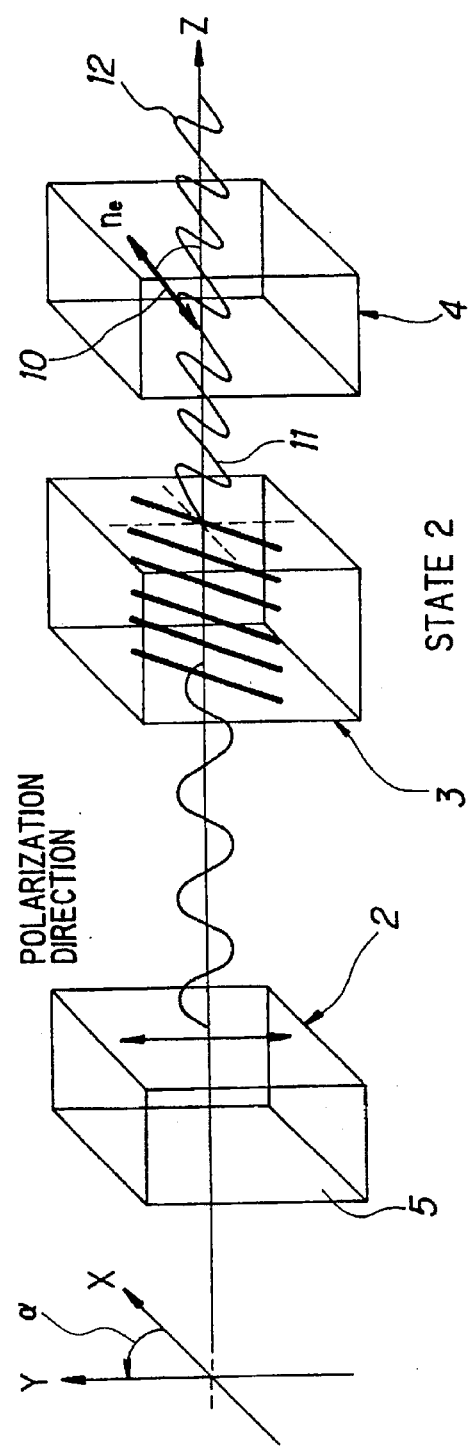

FIGS. 17A and 17B shows switching states of a concrete combination of respective elements of the liquid crystal optical device of this invention. Any display device such as an active matrix TN liquid crystal, an STN liquid crystal display device, a ferroelectric liquid crystal display device, an antiferroelectric liquid crystal display device, an SH display device or the like may be used as the liquid crystal device 2 to be combined. In this case, a combination with the TN liquid crystal will be described.

Figure 18A:
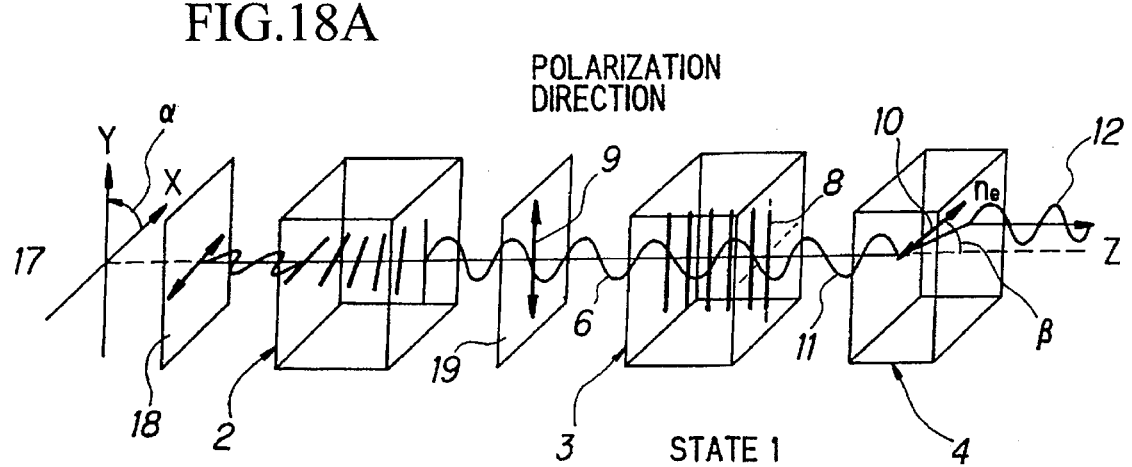
FIG. 18A–18B are schematic views showing the display device when a normally white TN liquid crystal display device is used.
Figure 18B:
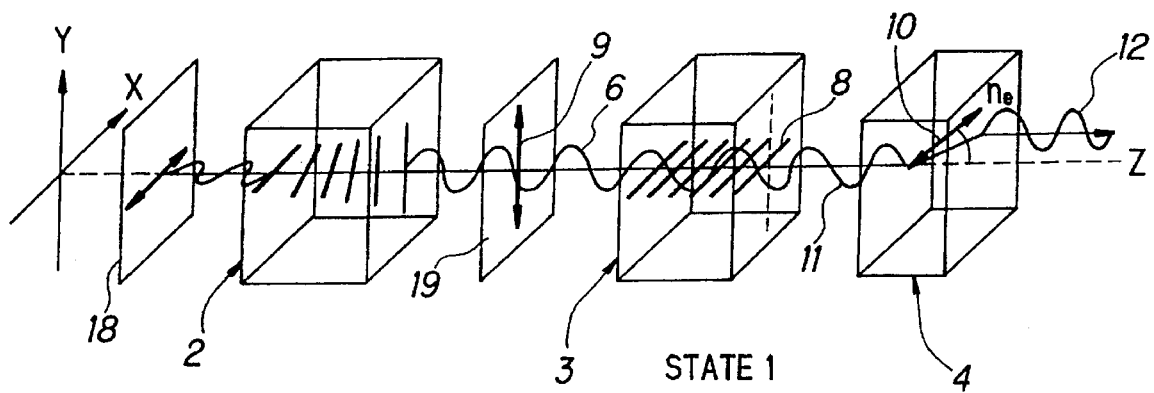
Figure 18C:
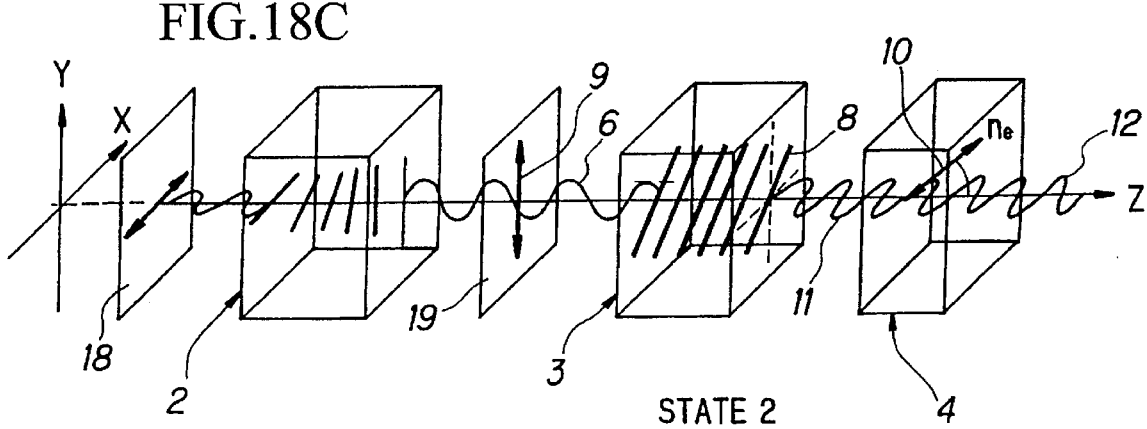

For a normally white TN liquid crystal display device shown in FIGS. 18A–C, light from a light source is transmitted through the TN liquid crystal in a state where no electric field is applied to the TN liquid crystal. FIGS. 18A–18C describe normally black TN LC display element In this case, a combination of back light 17-polarizer 18-TN liquid crystal 2-polarizer 19 or a combination of reflection plate-polarizer 18-TN liquid crystal 2-polarizer 19 corresponds to a TN liquid crystal display device similar to the prior art, and transparent electrodes are provided at both surfaces of each of the TN liquid crystal device 2 and the ferroelectric liquid crystal device 3.

In this case, as the intensity of an applied electric field is increased, a twisted state of the TN liquid crystal is more released, so that light is gradually transmitted through the polarizer to perform a gradation display. All transmitted light from the TN liquid crystal device 2 are converted to the same linearly polarized light by the polarizer 19 before the ferroelectric liquid crystal device 3, so that the pixel shift can be performed in accordance with the operating principle as described above.

As described above, this invention is applicable to any type of liquid crystal display insofar as light emitted from the display device is a substantially linearly polarized light.

Figure 19A:
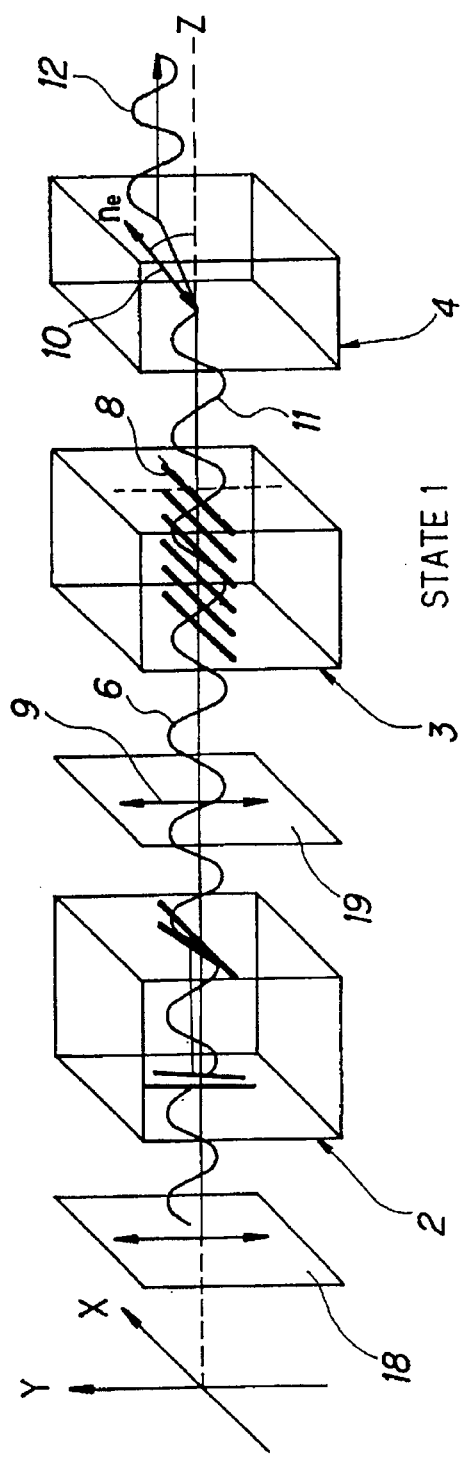
FIGS. 19A–19B are schematic views showing the display device when a normally black TN liquid crystal display device is used.
Figure 19B:
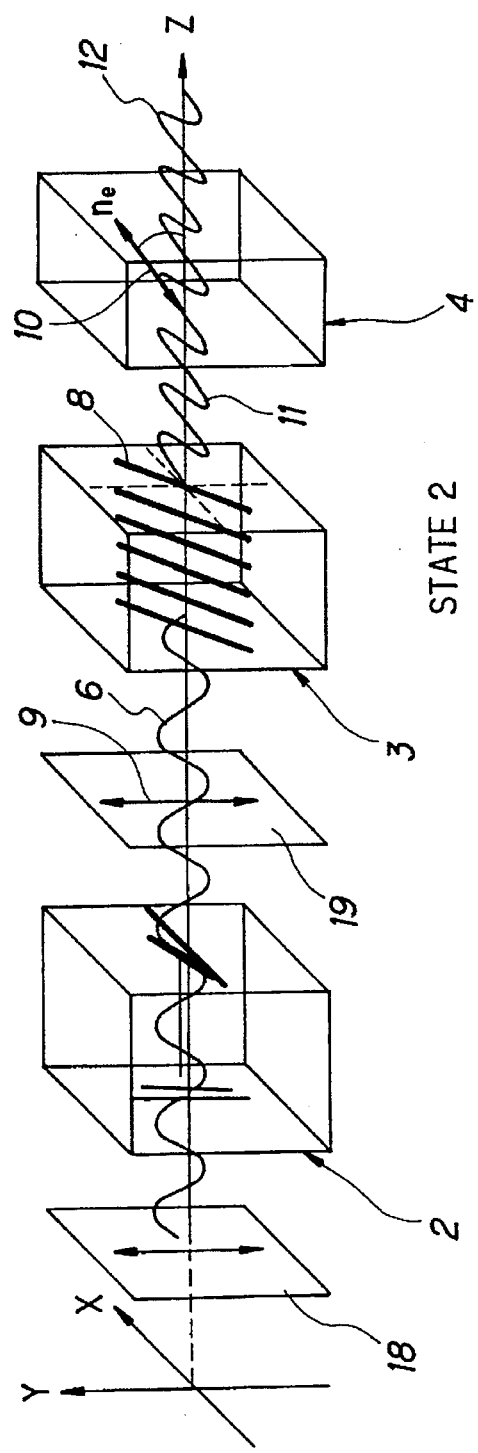

FIG. 19A and FIG. 19B show a normally black TN LC display element with the electric field on state, normally black.

The embodiment as described above relates to a display device having a polarizing function, however, this invention is also applicable to a display device having no polarizing function.

Figure 20A:
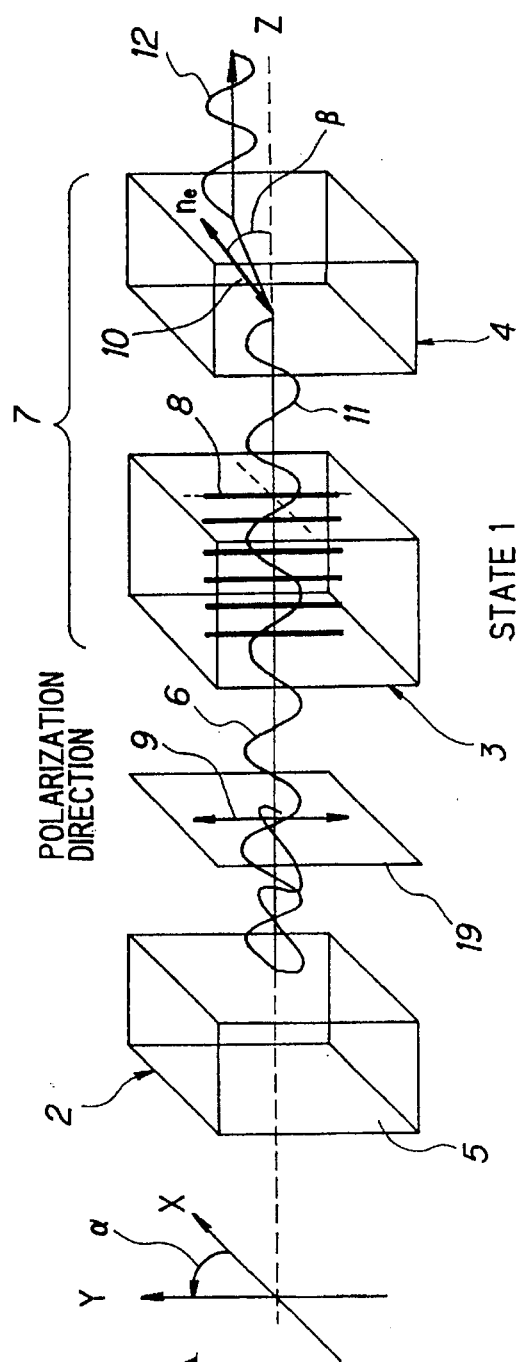
FIGS. 20A–20B are schematic views showing a display device using a display element having few polarization components.
Figure 20B:
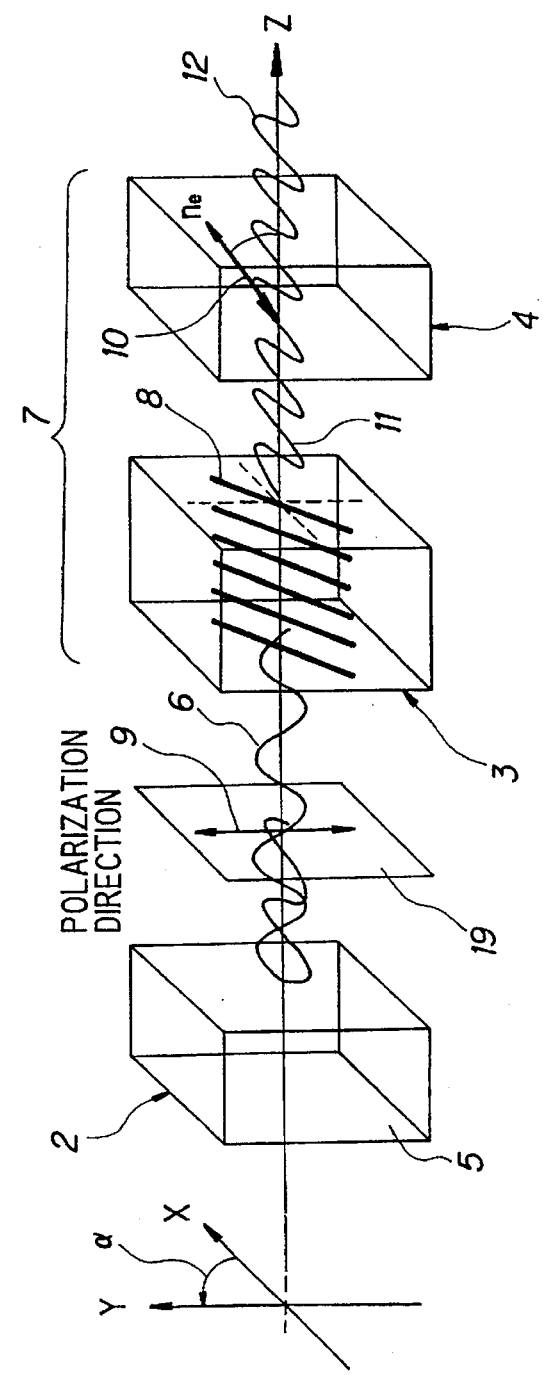

When a polarization degree of light from a display picture element 5 is small as shown in FIGS. 20A and 20B, a polarizer 19 may be inserted into an optical path connecting the display device 2 and the pixel shifting unit 7 in order to polarize the light. The same optical disposing condition as the liquid crystal display device as described above is usable.

As an usable non-polarization display 2 may be used a spontaneously light-emitting type of display device such as a plasma display, an LED display or the like.

As described above, the wobbling element 7 using the phase modulating unit (ferroelectric liquid crystal, antiferroelectric liquid crystal or smectic A liquid crystal having electrically inclination effect) 3 such as a representatively-used chiral smectic liquid crystal or the like which can be driven at a video rate is disposed between a liquid crystal, plasma, LED or other type of display having discretely-arranged picture elements and the retina of a viewer, thereby enabling the wobbling operation (pixel shift operation). Here, the following elements [1] and [2] are usable as the phase modulating unit 3 and the birefringent medium respectively:

[1] Any element which has at least two states for a switching state of ferroelectric liquid crystal, antiferroelectric liquid crystal or smectic A liquid crystal having electrical inclination effect which can be driven at a video rate, and is optically disposed so that a polarization plane can be rotated by a chiral smectic liquid crystal device in which the extraordinary optical axes of at least two states are intersected to each other at an angle of 26 to 64 degrees.

[2] Any element which comprises a transparent substrate for providing shift of an optical axis in accordance with a polarization direction of incident light, and which is specifically disposed (a) so that it has an equivalently uniaxial extraordinary optical axis component in a wobbling direction, or (b) so that facing surfaces of the substrate through which the light is transmitted are not in parallel to each other and the apparent extraordinary optical axis is parallel or vertical to the plane which is perpendicular to the both surfaces.

Next, a forming method of a constituent element (cell) of the device 3 and an operation characteristic will be described.

[1] Ferroelectric liquid crystal switching device

Figure 21:
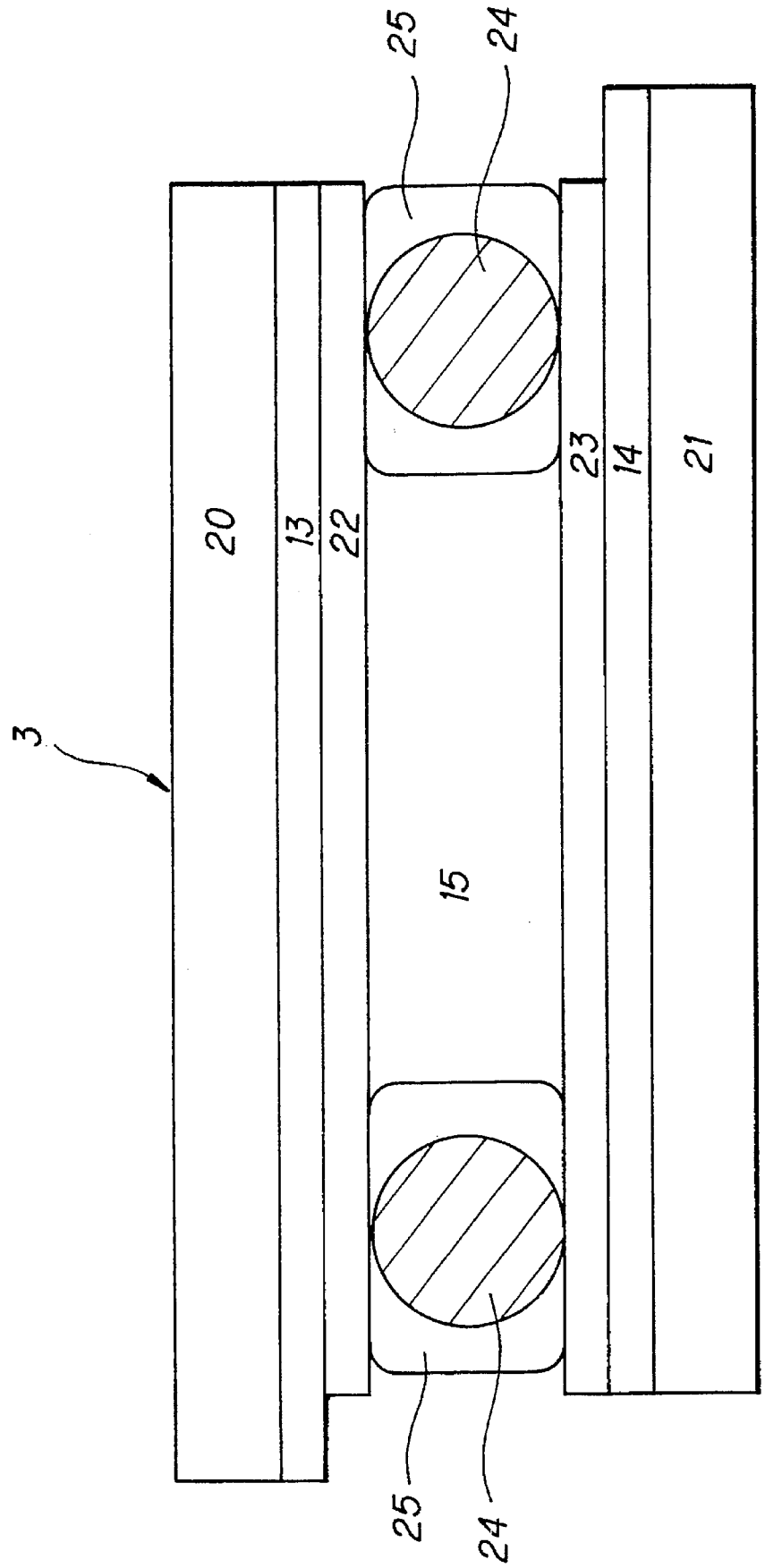
FIG. 21 is a cross-sectional view showing a liquid crystal cell serving as a phase modulating unit using a FLC liquid crystals.

The cell construction is shown in FIG. 21. That is, transparent electrodes (for example, ITO of 100Ω/□) 13 and 14 were provided on transparent glass substrates 20 and 21 respectively, and oblique deposition films 22 and 23 of SiO serving as liquid crystal alignment films were formed on the transparent electrodes 13 and 14. The following method was adopted to form the SiO oblique deposition films. That is, a substrate was disposed vertically above a SiO deposition source in a vacuum-deposition apparatus, and the vertical line and the normal of the substrate are intersected to each other at 85 degrees. SiO was vacuum-deposited on the substrate at a substrate temperature of 170° C., and then baked at 300° C. for a hour.

The substrates having alignment films thus formed are fabricated so that the alignment-treated directions thereof were opposite (antiparallel) to each other at the facing surfaces thereof, and glass beads (circular beads: diameter of 0.8 to 3.0 μm (produced by Shokubai Kasei)) 24 whose size corresponded to a desired gap length were used as a spacer. The spacer was provided in various kinds of manners in accordance with the size of the transparent substrates. If the area of each transparent substrate is small, for example, 0.3 wt % of spacer is dispersed into a seal member for adhesively attaching a surrounding portion (UV-curable adhesive member (Photorec: produced to Sekisui Chemistry K.K.) 25 to control the gap between the substrates. If the substrate area is large, the circular beards are dispersed on the substrate at an average density of 100 balls/mm$^2$, and then the cell surrounding portions are adhesively attached to each other with the seal member as described above with ensuring liquid crystal injection holes while a gap is kept between the substrates.

Thereafter, ferroelectric liquid crystal (for example, CS-1014 produced by Chisso Corp.) was injected under a reduced pressure in a state of showing fluidity of an isotropic phase temperature or a chiral nematic phase temperature. After the injection of the liquid crystal, it was gradually cooled, and the liquid crystal on the glass substrate which located around the injection holes was removed. Thereafter, the result was sealed with epoxy-based adhesive agent to thereby form a ferroelectric liquid crystal device. The ferroelectric liquid crystal used may be any material produced by Chisso Corp. or E. Merck company or BDH company, the following ferroelectric liquid crystal compounds or non-chiral liquid crystals containing these compounds. That is, no restriction is imposed on the kind of the ferroelectric liquid crystal and its phase series. Only a condition required for the used ferroelectric liquid crystal is that it shows a chiral smectic liquid crystal phase in the temperature range where it is used.

It was clarified on the basis of an X-ray structure analysis that the liquid crystal layer of the chiral smectic liquid crystal used in this embodiment had an antiparallel quasi-bookshelf structure, a parallel chevron structure or quasi-bookshelf structure in accordance with the combination in the alignment-treating direction.

ESTER-BASED SmC* LIQUID CRYSTAL CONTAINING TWO BENZENE RINGS

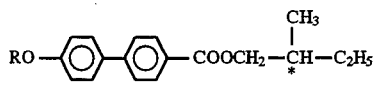

R = $C_8H_{17}$: C46.1° $S_C$*43.7°) $S_A$64.1° I

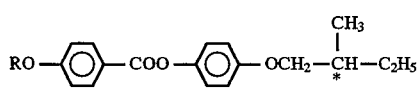

R = $C_{12}H_{25}$: C50.5° Sc*51.2° $S_A$65° I

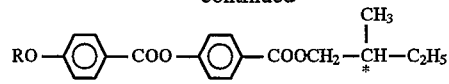

R = $C_6H_{17}$: C34.0° ($S_C$*29.8°) $S_A$54.5° I

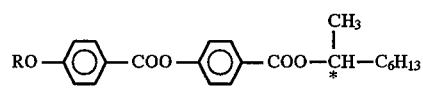

R = $C_{10}H_{21}$: C30.5° ($S_C$*22.2°) I

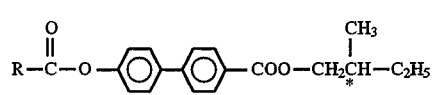

R = $C_{10}H_{21}$: C44.5° $S_C$*47° $S_A$62° I

ESTER-BASED SmC* LIQUID CRYSTAL CONTAINING THREE BENZENE RINGS

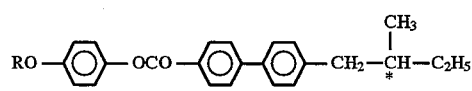

R = $C_8H_{17}$: C76° $S_C$*88.6° Ch155.4° I

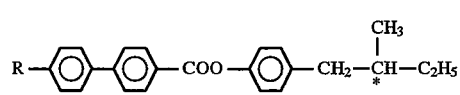

R = $C_8H_{17}$: C48° $S_3$71° $S_C$81° $S_A$137° Ch140° I
C40° $S_X$60° $S_C$*68° $S_1$71° $S_C$*81° $S_A$135° Ch140° BP141° I

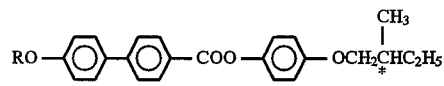

R = $C_8H_{17}$: C100.2° $S_B$105.8° $S_C$*144.9° $S_A$189.3° I

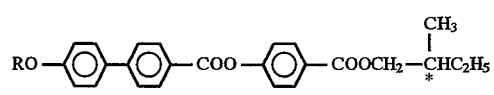

R = $C_8H_{17}$: C62° $S_3$67.3° $S_C$*138.5° $S_A$189.3° I

SmC* LIQUID CRYSTAL OF PHENYLPYRIMIDINE

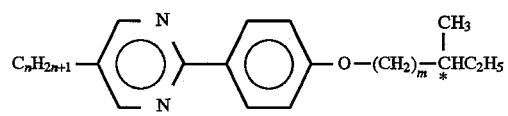

n = 8, m = 5,: C3° $S_1$14.2° $S_C$*48.6° $S_A$59.0° I

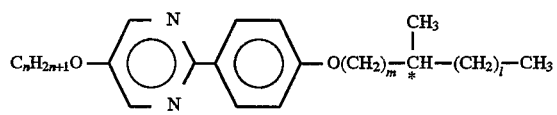

n = 8, m = 5, l = 1: C40.7° $S_C$*82.8° $S_A$89.1° I

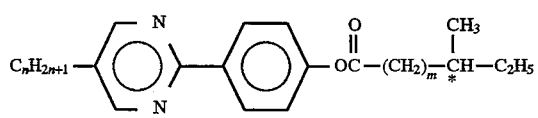

n = 8, m = 4: C36.7° $S_C$*44.8° I

REPRESENTATIVE SmC LIQUID CRYSTAL

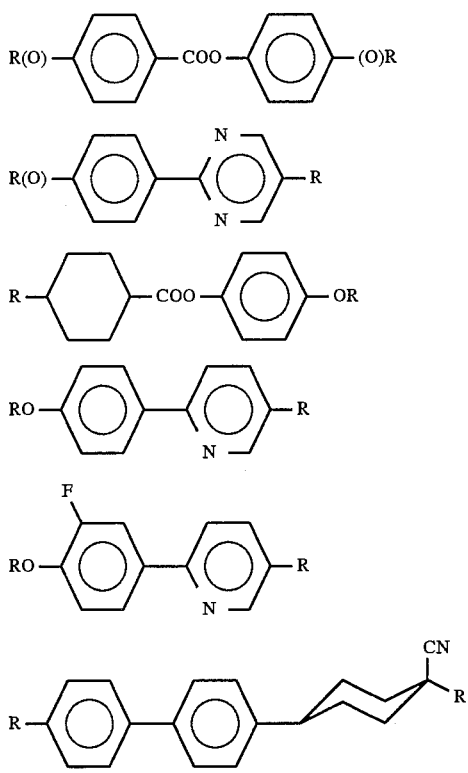

REPRESENTATIVE SmA-BASED LIQUID CRYSTAL

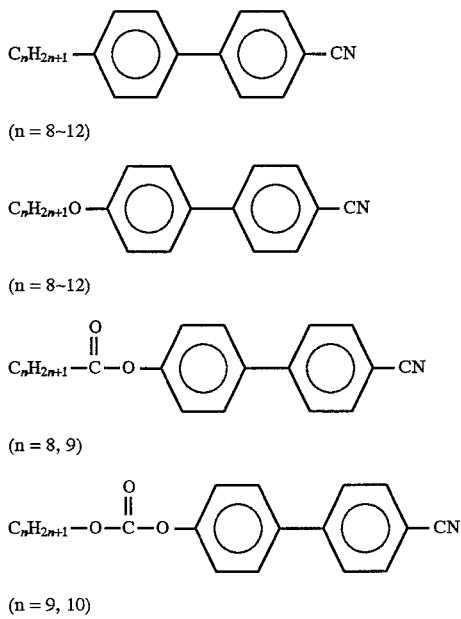

Further, in place of the chiral smectic liquid crystal, for example, the following antiferroelectric liquid crystal (AFLC) or smectic A liquid crystal is applicable insofar as its switching speed is high. <antiferroelectric liquid crystal>

The antiferroelectric liquid crystal was found out by Chandani, etc. in 1988, and it is characterized by the following three properties.

(1) A switching operation between three stable states of an antiferroelectric state and two ferroelectric states is usable.

(2) It shows a clear threshold characteristic and a high contrast can be obtained in a multiplex driving mode.

(3) Occurrence of internal polarization can be suppressed by alternately using plus and minus hysteresis, so that a sticking image hardly occurs.

This antiferroelectric liquid crystal material is characterized in that unlike the ferroelectric liquid crystal, most of compositions thereof are occupied by chiral liquid crystals (having large spontaneous polarization and its value is ten times as large as the ferroelectric liquid crystal), and that compounds having $CH_3$, $CF_3$, and $C_2H_5$ substitutional groups as substitutes for asymmetric carbon easily show antiferroelectricity and a core structure is expanded. For example, CS-4000 produced by Chisso company is usable.

<smectic liquid crystal having electrical inclination effect>

The electrical inclination effect means the following phenomenon. That is, in the smectic A phase constructed by chiral molecules, an inclination angle of orientation vector is induced by an electric field at a fixed temperature. In the smectic A phase, the orientation vector directs in the normal direction of a smectic layer, and freely rotated around the principal axis. However, when an electric field directing along the layer is applied, the free rotation is disturbed, and polarization P in the electric field direction is induced.

Assuming that a linear coupling of the polarization P and the inclination angle θ is represented by P=kθ, the following equation is satisfied:

$$P = (\epsilon\perp^* - \epsilon\perp 0)\epsilon_0 E$$

Therefore, $\theta = (\epsilon\perp^* - \epsilon\perp 0)\epsilon_0 E/k$, and thus there occurs an inclination angle which is proportional to an applied electric field E. Here, $\epsilon\perp^*$ and $\epsilon\perp 0$ represent dielectric constants of optically active racemic compounds and $\epsilon_0$ represents a vacuumdielectric constant. From this equation, it is apparent that as the electrical inclination effect becomes larger as the difference between the dielectric constants of the racemic compounds of the chiral liquid crystal is larger.

(Adjustment of phase difference on the basis of birefringence)

Birefringence index and phase transition temperature of ferroelectric liquid crystal used for the FLC device are shown in the following table 4.

TABLE 4

| (FLC PRODUCED BY CHISSO: BIREFRINGENCE INDEX, PHASE TRANSITION TEMPERATURE OF CS-1014) | | |
|---|---|---|
| FLC | $\Delta n = n_e - n_o$ | phase transition series |
| CS-1014 | 0.15 | Cr, −21 SmC*, 54 SmA, 69 N*, 81 Iso |

In the wobbling operation, it is sufficient to deviate the phase by 180 degrees in order to rotate the polarization plane of an incident light by 90 degrees through the liquid crystals. The following relationship is satisfied among the birefringence index ($n_e - n_o$), the cell gap d and the phase difference δ:

$$\delta = 2\pi d(n_e - n_o)/\lambda$$

Here, δ is set to be equal to π. In order to satisfy this setting, the cell gap d is set as follows:

$$d = \lambda/2(n_e - n_o)$$

However, since the intersection angle α between the liquid crystal molecules and the substrate (pre-tilt angle) is not zero degree, so that $n_e$ is decreased and thus the gap length d must be increased.

Here, ordinary index $n_o$ is not dependent on an incident angle, and equal to the index $n\perp$ in the minor axis direction of the liquid crystal molecules. That is, $n_o = n\perp$.

Specifically, $n_e$ is a function of the pre-tilt angle $\alpha$, and it is represented by the following equation:

$$n_e(\alpha) = \frac{n_{//} \cdot n_\perp}{\sqrt{n_\perp^2 \cos^2\alpha + n_{//}^2 \sin^2\alpha}}$$

d is dependent on the pre-tilt angle $\alpha$ as follows:

$$d = \lambda/2[n_e(\alpha) - n_o]$$

That is, $\alpha$ is calculated on the basis of the kind of the orientation film, and the optimum gap d can be calculated on the basis of the above equation. Accordingly, any kind of orientation film such as inorganic orientation film of SiO or the like or an organic alignment film of polyimide, polyamide, polyvinyl alcohol (PVA) or the like may be used.

Further, since the gap length d becomes infinite from the above equation for the pre-tilt angle $\alpha$ above 90 degrees, the pre-tilt angle is required to be in the range of 0 to 89 degrees. However, it is difficult to control the pre-tilt angle above 45 degrees, and thus it is practically preferable that the pre-tilt angle is in the range of 0 to 45 degrees.

The following table 5 shows electro-optical characteristics when an inorganic orientation film (SiO oblique deposition film). The measurement of the phase difference $\delta$ (Retardation) was made with an automatic birefringence measuring device of OAK company, and a two-wavelength system comprising an He—Ne(632.8 nm) laser and a semiconductor laser beam source (780 nm) was used because the value of the phase difference exceeded $\lambda/4$.

TABLE 5

(Electro-optical CHARACTERISTICS OF FLC DEVICE)

| FLC Sample | | CS1014 | | CS1014 | | CS1014 | |
|---|---|---|---|---|---|---|---|
| GAP (μ) | | 1.83 | | 1.70 | | 1.84 | |
| Phase difference (nm) | | 210.4 | | 166.4 | | 210.4 | |
| Apparent cone angle (θ) | | 43.1 degree | | 43.6 degree | | 47.0 degree | |
| Square wave | Applied voltage | 30 Hz, ±15 V | | 30 Hz, ±15 V | | 30 Hz, ±15 V | |
| | Response 10-90% T* | 270 μs | | 241 μs | | 113 μs | |
| | time 90-10% T* | 240 μs | | 210 μs | | 99 μs | |
| Pulse driving | Applied voltage | ±20 V | ±30 V | ±20 V | ±30 V | ±20 V | ±30 V |
| | Pulse width (μs) | 420 | 200 | 300 | 200 | 420 | 250 |
| | Response 10-90% T* | 147 μs | 90 μs | 105 μs | 72 μs | 60 μs | 41 μs |
| | time 90-10% T* | 133 μs | 80 μs | 95 μs | 63 μs | 55 μs | 38 μs |

*: T = Transmittance

It is apparent from this table that any of the FLCs show the phase difference which is a half of an used optical wavelength, and it has a specification showing that it can rotate the polarization plane of an incident light by about 90 degrees.

Figure 22:
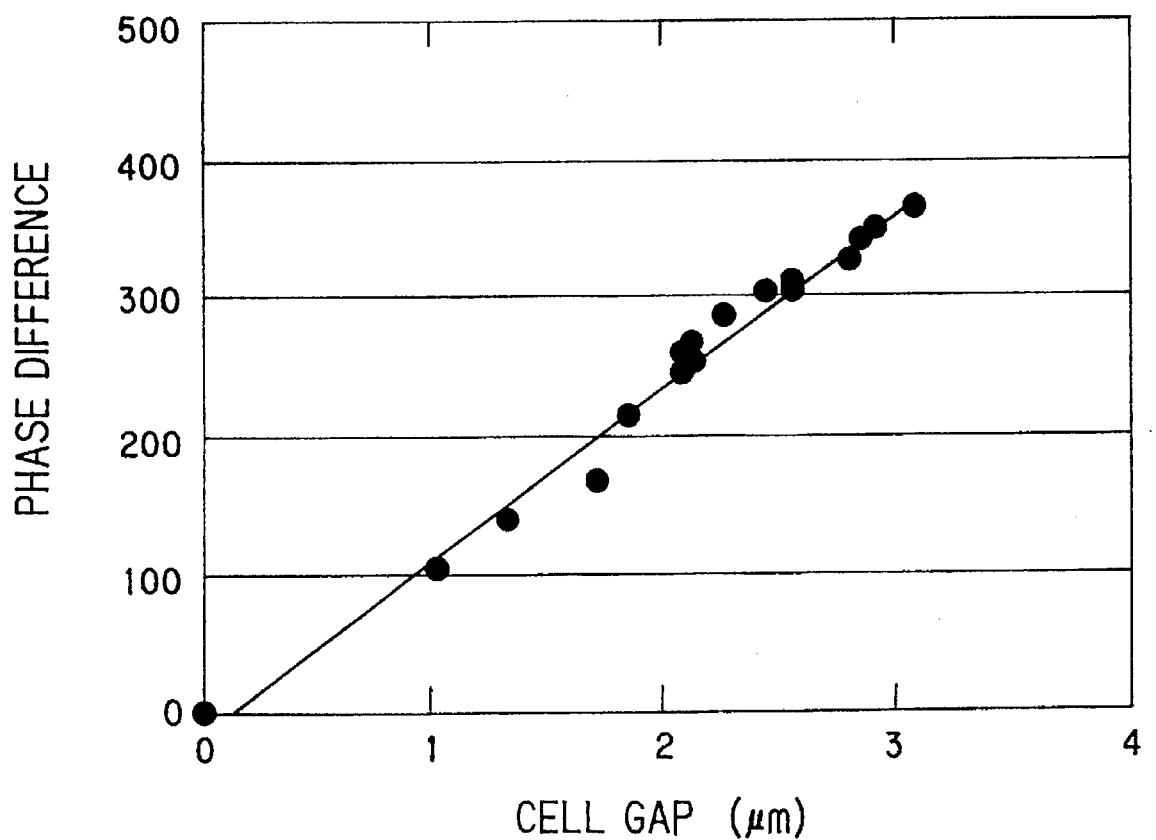
FIG. 22 is a graph showing variation of a phase difference with variation of a cell gap of the liquid crystal cell.

Further, by adjusting the cell gap of this SiO oblique deposition cell, wobbling cell having various phase differences were formed. The result at a measured wavelength of 632.8 nm is shown in the following table 6. By plotting these data, a substantially linear relationship as shown in FIG. 22 is obtained, and it is apparent that the phase difference can be arbitrarily set through control of the gap. These cells were used to consider the phase difference range as described above.

TABLE 6

(RELATIONSHIP BETWEEN GAP AND PHASE DIFFERENCE OF CS-1014 LIQUID CRYSTAL/SiO OBLIQUE DEPOSITION ANTIPARALLEL CELL)

| GAP (μm) | PHASE DIFFERENCE (nm) |
|---|---|
| 1.02 | 102.50 |
| 1.32 | 136.59 |
| 1.70 | 166.40 |
| 1.83 | 210.40 |
| 1.84 | 210.40 |
| 2.04 | 256.97 |
| 2.06 | 244.39 |
| 2.10 | 259.30 |
| 2.10 | 263.69 |
| 2.10 | 249.91 |
| 2.23 | 284.52 |
| 2.41 | 302.49 |
| 2.51 | 303.34 |
| 2.52 | 306.36 |
| 2.75 | 323.29 |
| 2.81 | 340.20 |
| 2.86 | 345.76 |
| 3.02 | 364.52 |
| 3.24 | 397.20 |

Figure 23A:
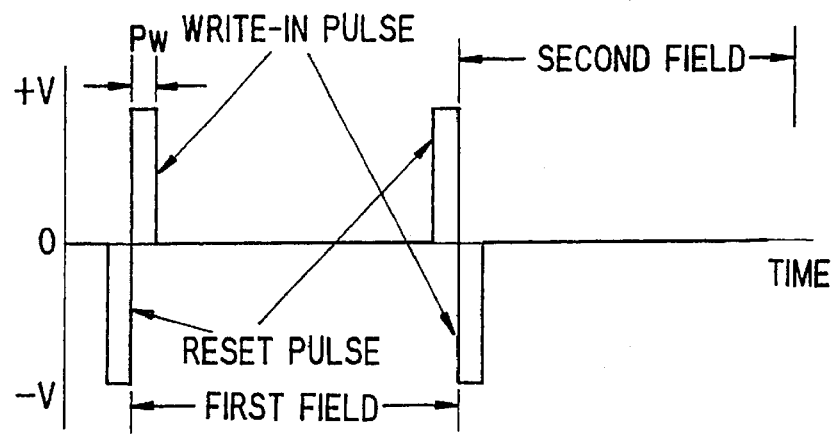
FIGS. 23A, 23B and 23C show waveform diagrams showing various kinds of driving methods for the phase modulating unit.
Figure 23B:
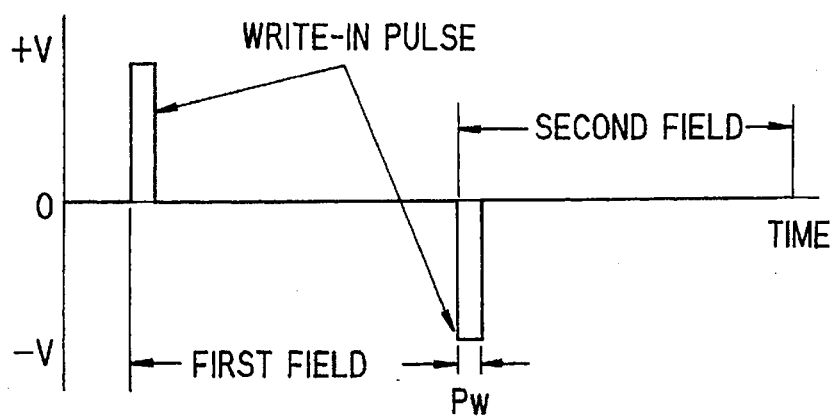
Figure 23C:
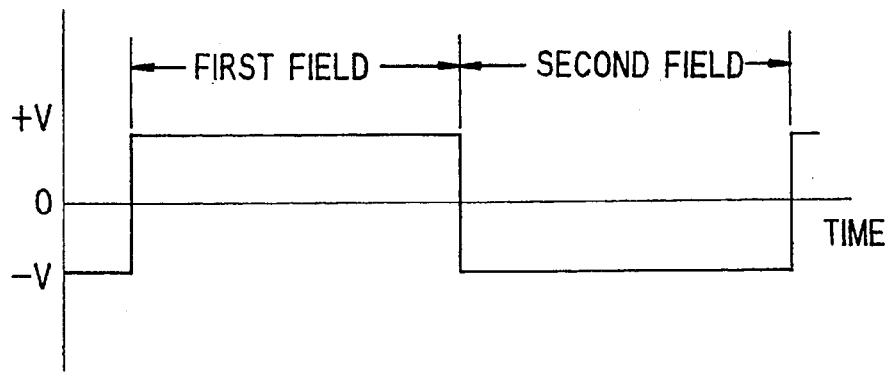

A conventional general FLC driving method is applicable as a driving method for these ferroelectric liquid crystal devices. FIGS. 23A to 23C show driving waveforms of one frame and two fields.

FIG. 23A shows a pulse driving with a reset pulse, and a method of keeping an electrically neutral condition within a field by applying a reset pulse just before a write-in operation. In this method, a DC component is hardly applied to the liquid crystal for a long time. In place of the FLC, the AFLC is also usable.

FIG. 23B shows a pulse driving having no reset pulse, and a method of keeping an electrically neutral condition within a frame. In place of the FLC, the AFLC is also usable.

FIG. 23C shows a square wave driving, and a method of keeping an electrically neutral condition within one frame. In this method, a DC voltage is applied for a longer time than in the pulse driving method, however, it has higher reliability when elements are highly insulated from one another. In place of the FLC, the electrical inclination effect type of smectic A is also usable. (High-speed responsibility of FLC)

Switching characteristics based on the above driving waveforms are shown in the table 5. Both of the leading edge (10–90%T) and the trailing edge (90–10%T) show high-speed responsibility of μsec order, so that sufficient response within one field can be ensured, and a pixel shift effect at a video rate can be effectively obtained.

Particularly at the wobbling (pixel shifting) time, it is preferable that the response times of the leading and trailing edges are below one third of a field time, and the ratio of the rise-up time and the fall time is preferably two times or less of each other.

In this point, in a case where a nematic liquid crystal is used, even when it has a high speed responsibility, its rise-up time at a voltage apply time is relatively short, but its fall time at an off-time is long. Therefore, a switching operation within a field cannot be sufficiently performed, and thus the effective pixel shift cannot be obtained. In a pixel shifting element of twisted nematic liquid crystal, the rise-up time and the fall time at a transmittance variation of 0 to 90% is set to about 15 msec (room temperature) at minimum, and thus it is very difficult to realize the effective pixel shift even using 2:1 line interlaced scanning system of NTSC (1/60 sec (16.7 ms) per field). Further, if a 4:1 line interlaced scanning system is applied with same number of frames, it is equal to 1/120 sec(8.3 ms) per field, and thus no following is performed. In this point, the pixel shift method using the ferroelectric liquid crystal device is more effective because a ferroelectric liquid crystal element has a shorter switching time than a nematic liquid crystal element. The rise-up and fall times of the ferroelectric liquid crystal element is in μsec order, and thus they are below several milliseconds for liquid crystals having the latest responsibility.

The following table 7 shows the comparison of the response times of various kinds of liquid crystals, and the response speeds of liquid crystals usable for this invention are remarkably high.

TABLE 7

| TNLC | FLC | AFLC | EIELC |
| --- | --- | --- | --- |
| 20–100 ms | 1–500 μs | several tens–500 μs | several tens–500 μs |

[2] Birefringent transparent substrate for shifting an optical axis in accordance with the polarization direction of incident light (a) An element in which an equivalently uniaxial extraordinary optical axis 10 exists on the same plane as the Z-axis as shown in FIG. 1, and it is not in parallel to the axis.

Figure 24:
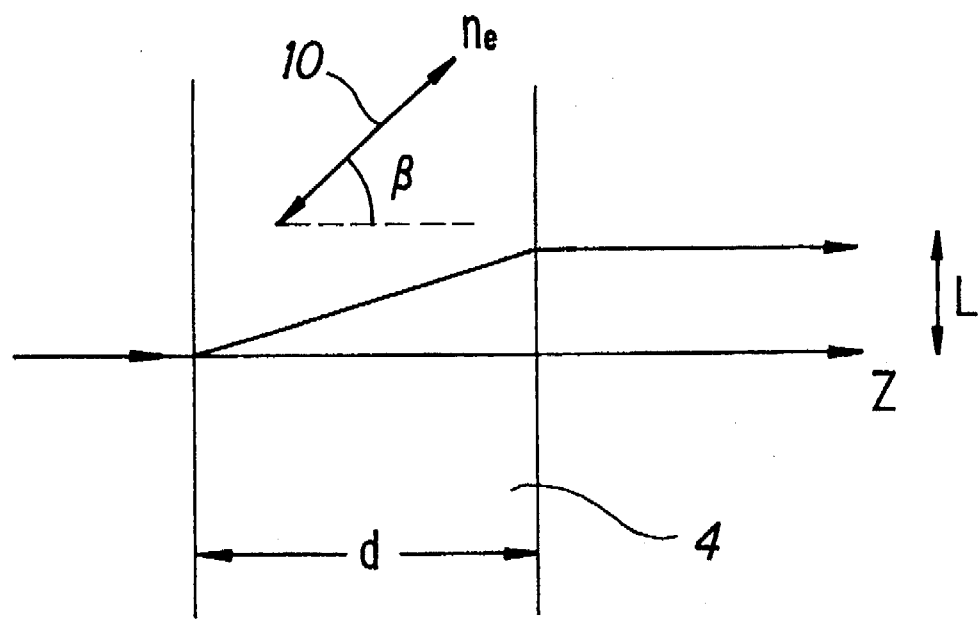
FIG. 24 is a schematic view showing shift of an optical axis by a birefringent medium.

FIG. 24 shows the mechanism for appearance of optical axis shift due to birefringent medium.

For example, the shift L of the optical axis in a quartz plate is calculated in accordance with the following equation. As shown in FIG. 24, an angle at which the extraordinary optical axis 10 of the birefringent transparent medium 4 intersects to the optical axis of a wobbling optical system is represented by β, and the thickness of the quartz plate 4 is represented by d. Here, the ordinary index ($n_o$) and the extraordinary index ($n_e$) of the quartz plate 4 are equal to 1.55336 and 1.54425 respectively, and $\Delta n = n_e - n_o = 0.0091$. In order to improve the vertical resolution of an active matrix TN liquid crystal display having 103000 picture elements in 0.7-inch size, the following condition is adopted to provide a shift L=24.5 μm: β=45 degrees, d=4.17 mm.

$$l_s = d \cdot \frac{(n_e^2 - n_o^2) \cdot \tan\beta}{n_e^2 + n_o^2 \cdot \tan^2\beta}$$

Here, the β range for effectively developing the shift L of the optical axis is from 10 to 80 degrees. This shift of the optical axis is varied in accordance with the pitch of the picture elements. Further, the following element (b) is applicable as a method of shifting the optical axis with a polarization switch.

(b) An element comprising a substrate having facing surfaces through which light is transmitted and which are not in parallel to each other, and whose extraordinary optical axis is in parallel to or vertical to the plane which is perpendicular to both of the surfaces.

Figure 25B:
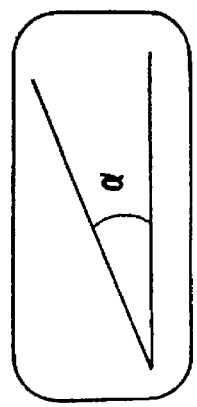
FIGS. 25A and 25B are perspective and enlarged views of a wedge-shaped cell serving as a birefringent medium.
Figure 25A:
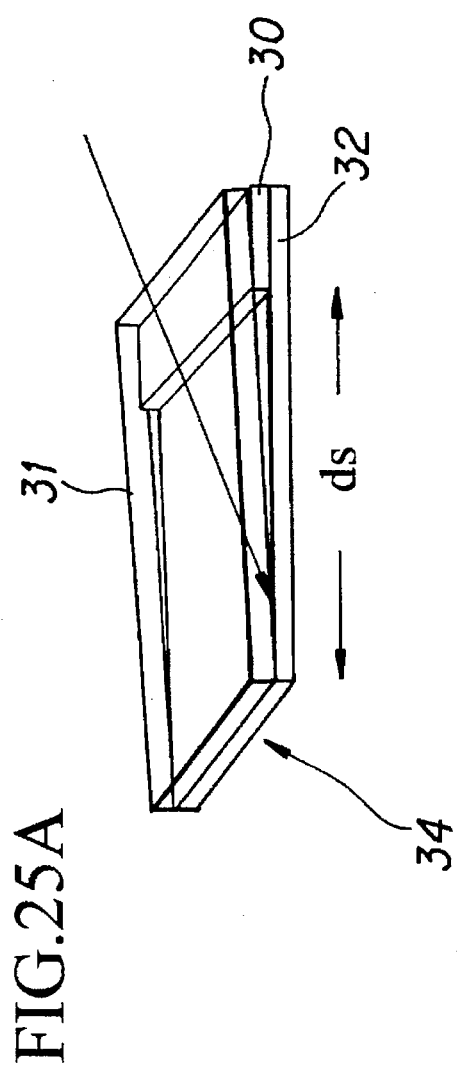

FIGS. 25A and 25B show a wedge-shaped nematic liquid crystal cell. This cell 34 comprises substrates 31 and 32, a spacer formed of polyethylene terephthalate (PET) film 30 which is fixed between the substrates 31 and 32 so that these substrates are intersected at an angle of α, and liquid crystal 33 injected into a gap between the substrates.

The distance ds is equal to 21 mm. The spacer film 30 is 125 μm thick. Thus, tan α=0.125/21, and α=0.341°.

The cell was designed so that the optical shift L of the ordinary and extraordinary lights is set to 30.7 μm.

The used nematic liquid crystal: ZL1-2008-000 produced by E. Merck company $n_e = 1.707$ $n_o = 1.517$ (note) Data measured by E. Merck
(Aligning treatment direction and arrangement direction and optical properties)

In order to use the birefringence of the liquid crystal most effectively, a polyimide-based rubbing film (Ube's U-Varnish) having small pre-tilt angle was used as an orientation film. The pre-title angle was actually measured to be about 1 degree or less.

Figure 26A:
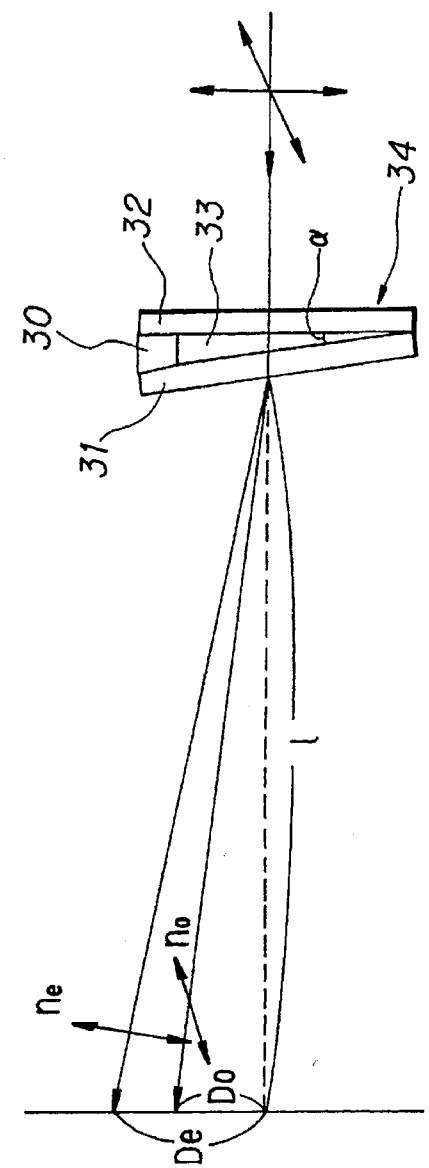
FIGS. 26A–26C are schematic views showing an optical property of the wedge-shaped cell.
Figure 26B:
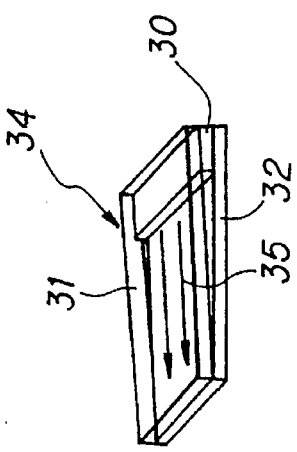
Figure 26C:
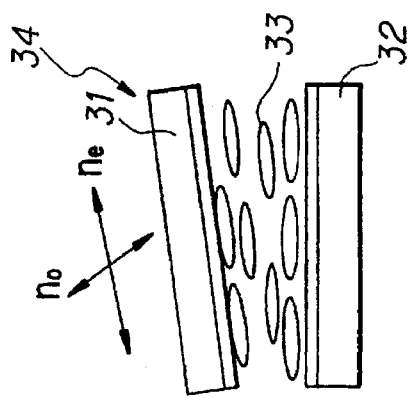
Figure 27A:
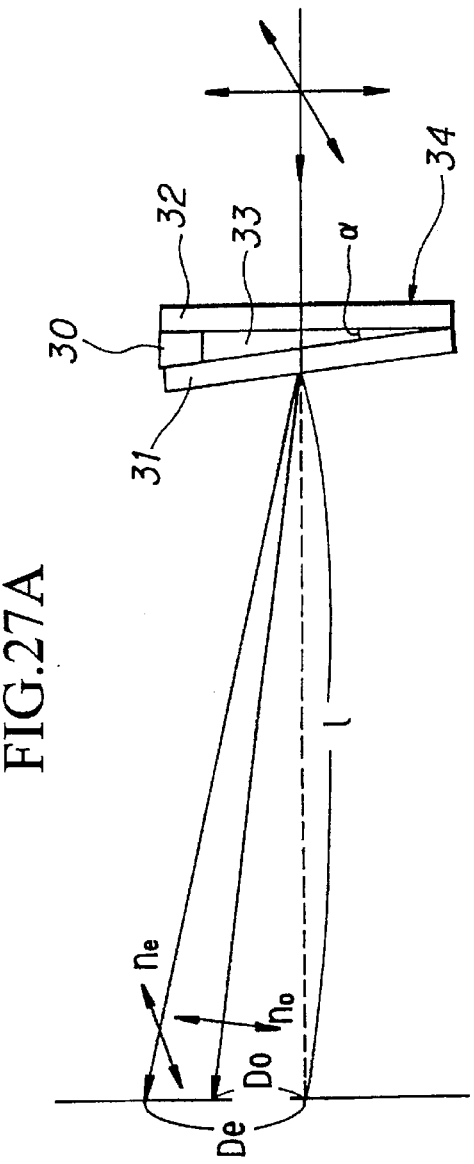
FIGS. 27A–27C are schematic views showing an optical property of another wedge-shaped cell.
Figure 27B:
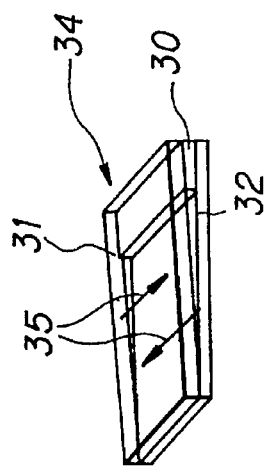
Figure 27C:
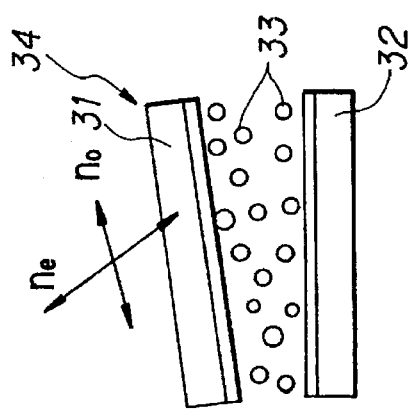

The rubbing was performed in a one direction, and its direction is indicated by an arrow 35 as shown in FIGS. 26 and 27. FIGS. 26A–C and 27A–C illustrate orientation direction and optical properties of liquid crystal (LC) in a wedge cell of type 1 and type 2 respectively. A combination of orientation is set to a parallel orientation in a type 1, (FIGS. 26A–C) and antiparallel orientation in a type 2. After fabricating the cell, nematic liquid crystal is injected, and a peripheral portion is sealed with adhesive agent.

Here, representing refractive index by $n_i$, a wedge angle by α rad, and the distance from the cell to a screen by 1, the shift from the optical axis is equal to $D_i$. The refractive index $n_i$ is obtained in accordance with the following equation.:

$$n_i = \frac{\sin\left\{\tan^{-1}\left(\frac{D_i}{l}\right) + \alpha\right\}}{\sin\alpha}$$

Calculatively, by setting l=27 mm, $D_i = D_e = D_o = 30.7$ μm. Further, actually, the following result as shown in a table 8 was actually obtained for l=6450 nm.

TABLE 8

(OPTICAL CHARACTERISTIC DATA OF WEDGE-SHAPED CELL (He—Ne LASER)

| Cell No. | RD | PD1 (mm) | $D_e - D_o$ measured value (mm) | $D_e - D_o$ PER L = 27 mm (μm) |
| --- | --- | --- | --- | --- |
| 1 | type 1 | 6450 | 5.5 | 23.0 |
| 2 | type 1 | 6450 | 5.8 | 24.3 |
| 3 | type 2 | 6450 | 10.5 | 44.0 |
| 4 | type 2 | 6450 | 9.0 | 37.7 |

RD: rubbing direction, PD: projection distance

In the above case, the liquid crystal was used as the wedge-shaped optical element, however, in place of the liquid crystal, a birefringent medium may be formed by an injection molding of a resin having large birefringence such as polycarbonate or the like, or by laminating films. In this case, the extraordinary optical axis is the same as the liquid crystal.

The following is a general polycarbonate molecular structure of a polycarbonate film which is usable as a birefringent medium.

BISPHENOL A TYPE

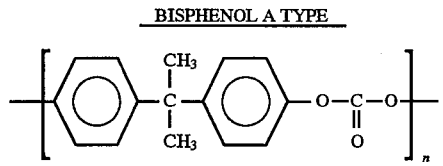

The polycarbonate resin pr having the above structure was injected into a minimax molding machine (a metal mold as represented by reference numeral 80 in FIG. 28) to form a wedge-shaped polycarbonate plate 81. That is, the polycarbonate resin was melted at about 300° C., and an injection molding was manually performed at a mold temperature of 60° C. The mold temperature at the molding time was reduced to increase melt viscosity, whereby the orientation of polycarbonate molecules is considered to be sufficiently performed. The relationship between the melt viscosity of polycarbonate, the molecular orientation and the birefringence was reported by Nagai ("Melt Viscosity and Flow Birefringence of Polycarbonate" J. Appl. Polym. Sci., Vol 44(1992)pp. 1171-1177).

Figure 28A:
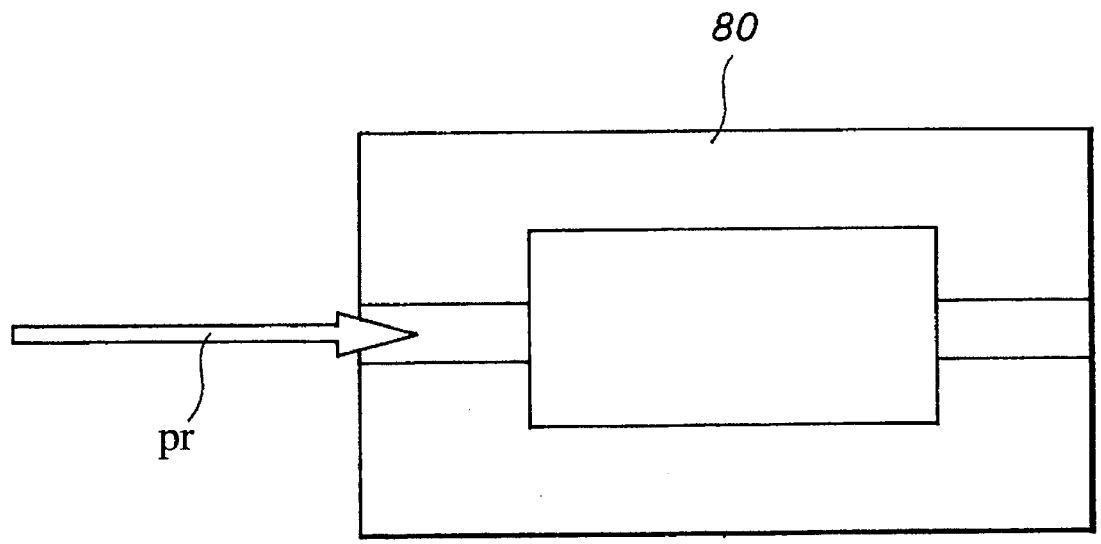
FIGS. 28A and 28B are front and perspective views showing a metal mold for another birefringent medium and the birefringent medium.
Figure 28B:
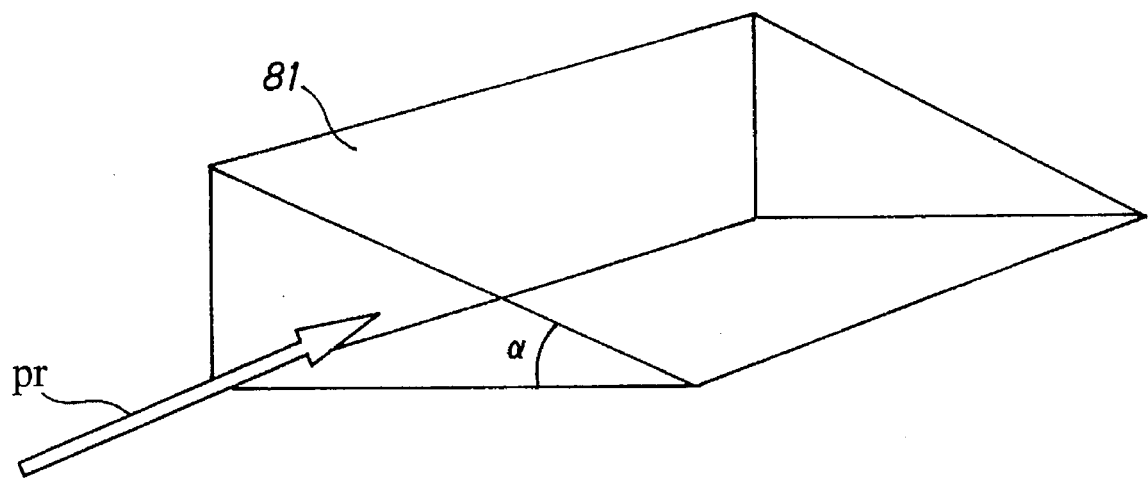

The surface of the used metal mold was subjected to a mirror polishing treatment with chromium, and it was designed in a shape as shown in FIG. 28 and in size of 15 mm×20 mm. The wedge-shaped polycarbonate 81 thus formed had an inclination angle α of 24 degrees, and it could provide 40 μm shift of the optical axis per 27 mm.

Next, the liquid crystal optical device according to this invention will be described.

Driving method to improve resolution of liquid crystal display device and its operation In the 2:1 line interlaced scanning system of NTSC, a perfect one frame can be formed with two fields. The first (odd) field and the second (even) field are interpolated to each other on positional information in a vertical direction, and the resolution is kept by increasing the number of fields per second. However, particularly when the number of vertical picture elements is small like a liquid crystal display device, the odd and even fields are over-written on the same scanning line, and thus the inherent resolution is reduced.

In this embodiment, the pixel shift is carried out while synchronizing the odd and even fields, and the resolution in the vertical direction is improved by applying an afterimage effect caused by replacing pictures at a high speed. The shift amount of the pixel shift will be hereunder described. Actually, a dot sequential or line sequential scanning system is adopted for the liquid crystal to perform a scanning operation in time series, however, in the following description the operation is assumed to be carried out simultaneously in order to make the understanding of the principle clear.

For a monochromatic display device, a triple-plate type of color display device or a color sequential display device:

Since the one switching element corresponds to one pixel, the resolution is improved by a simple shift in the pixel shift direction of the optical axis at a half distance of the distance between the center points of gravity of neighboring picture elements in the pixel shift direction (the distance between the centers of the display picture elements), and at the same time non-display portions between the picture elements (for example, black matrix) becomes unremarkable. However, the shift amount is not necessary equal to the accurate half distance of the distance between the center points of gravity of the neighboring picture elements.

Figure 29A:
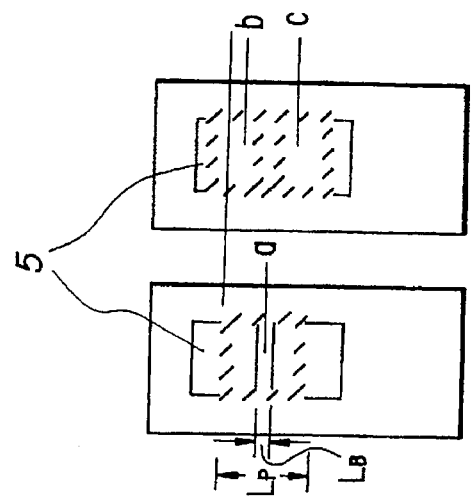
FIGS. 29A, 29B and 29C schematically show shift amount at the wobbling (pixel shift) time in respective cases.
Figure 29B:
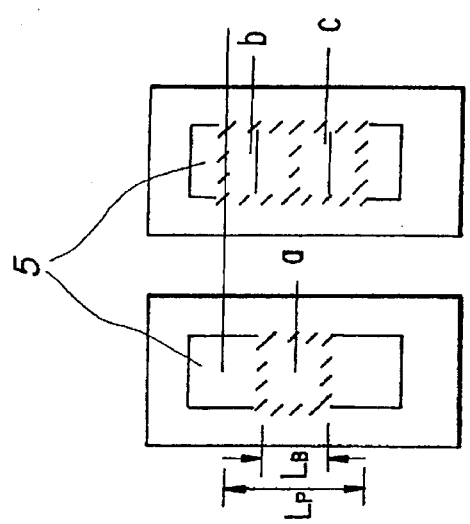
Figure 29C:
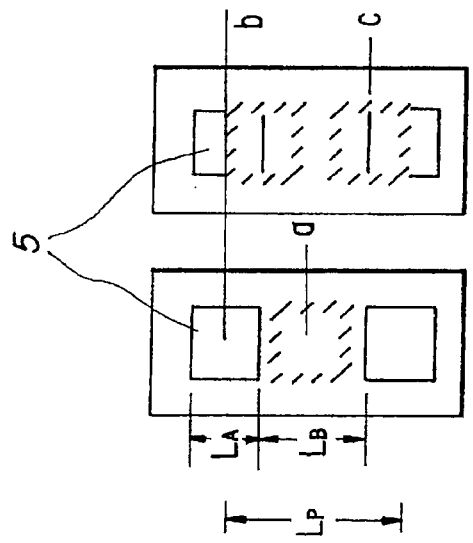

That is, as shown in FIGS. 29A to 29C, the effective shift amount is varied in accordance with the difference in aperture size between the black matrix portion and the picture element, When the black matrix portion has an aperture diameter which is equal to (FIG. 29B) or larger than (FIG. 29A) that of the picture element, a shift amount (a) which is half of the picture element pitch in a direction along which the resolution is required to be improved is optimum. However, its permissible degree is required to be a half of the aperture diameter of the picture element at which the shift of the picture-element position is recognizable. Further, when the black matrix portion is smaller than the aperture diameter of the picture element (FIG. 29C), the minimum shift amount corresponding to the length of the black matrix is effective (b, c).

Representing the length of the black matrix portion and the aperture diameter of the picture element for a length component in the pixel shift direction by $L_B$ and $L_A$, the picture-element pitch $L_P = L_A + L_B$, and the pixel shift amount L is represented as follows:

$$\mathrm{Min}(L_B, L_A/2) \leq L \leq \mathrm{Max}\ (L_P - L_B, L_P - L_A/2)$$

Representing this equation with $L_P$ and $L_A$, $$\mathrm{Min}(L_P - L_A, L_A/2) \leq L \leq \mathrm{Max}\ (L_A, L_P - L_A/2)$$

Min(x,y) and Max(x,y) of the above equations represent functions providing smallest and largest values of x, y, respectively.

Figure 34:
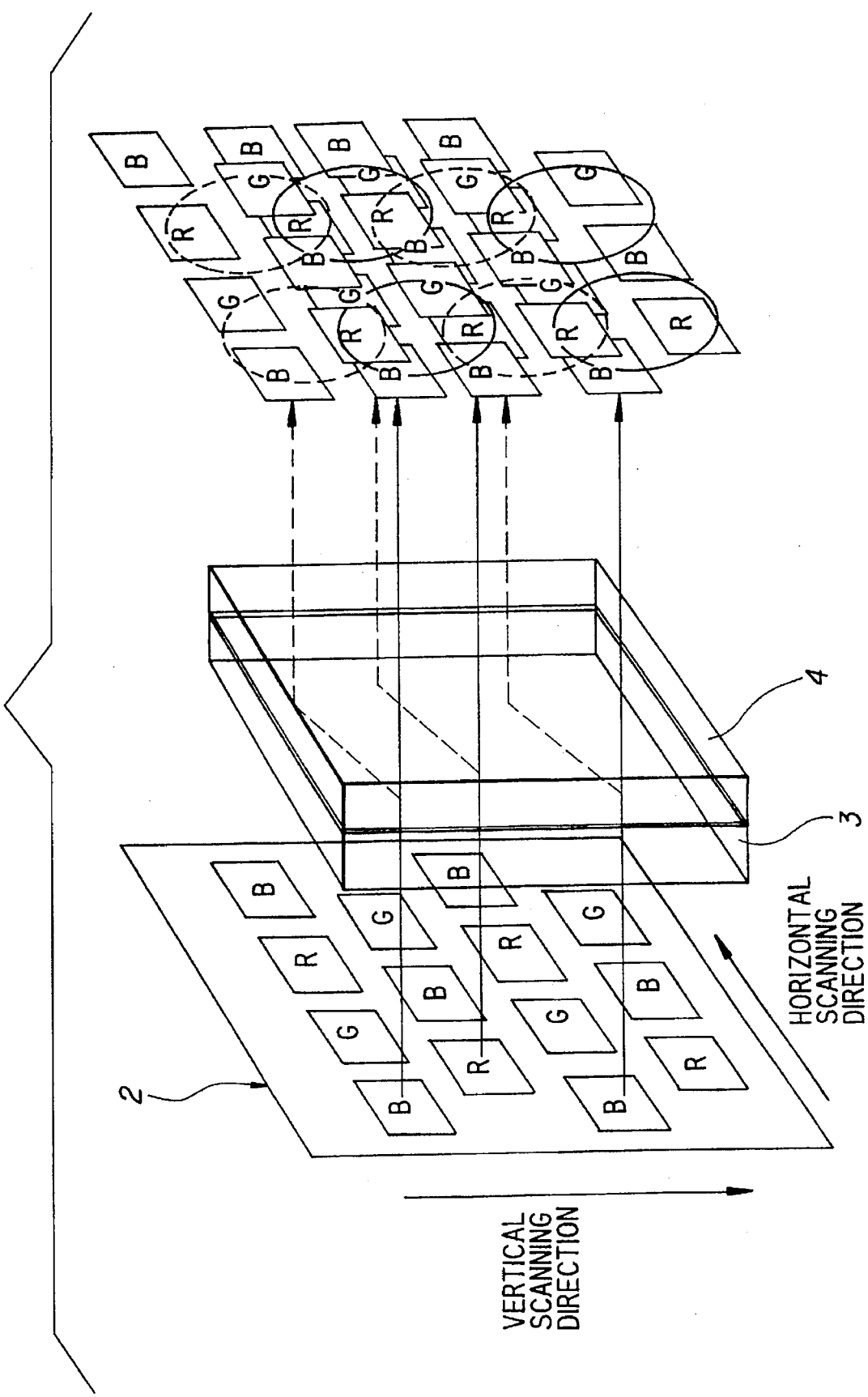
FIG. 34 is a schematic view showing a wobbling state of an RGB delta arranged display device.

As described above, by performing the pixel shift in the vertical direction, the resolution in the vertical direction is improved as shown in FIG. 30. FIG. 30 describes an example of performing high resolution in vertical direction. Likewise, by performing the pixel shift in the horizontal direction, the resolution in the horizontal direction can be improved (FIG. 31). FIG. 31 describes an example of performing high resolution in horizontal direction. Further, by performing the pixel shift in an oblique direction, the resolution in the vertical and horizontal directions can be improved (FIG. 32). FIG. 32 describers an example of performing high resolution in vertical and horizontal direction. For color liquid crystal display device having color filters:

In an ordinary color display device, a pixel comprises a trio of R, G and B color filters. An example of performing high resolution in a horizontal direction of RGB in-line arrangement of display elements in shown in FIG. 33. A (FIG. 33), a delta arrangement (FIG. 34) or the like may be used as a method of arranging the R, G, B filters. FIG. 34 illustrates an example of performing high resolution in horizontal direction of RGB delta arrangement of display elements. The shift amount of the optical axis in this case may be set to a half of the distance between centers of gravity of the nearest RGB trio areas in the pixel shift direction.

The pixel shift direction of the pixel shift device as described above may be not only the vertical direction, but also the two-dimensional direction containing the horizontal direction or the oblique direction, and the resolution in any direction along which the pixel shift is performed can be improved. Further, by setting the aperture diameter of the picture element for the length component in the pixel shift direction for the picture element trio of RGB and setting the length of the black matrix to $L_B$, the pixel shift range may be set under the same condition as the monochromatic display device as described above. Range of the divisional number of a driving electrode in a pixel shift operation:

In principle, those devices whose resolution is to be improved as described above require a pixel shift in synchronization with each switching operation for each picture element. In this case, in the dot sequential scanning, pixel shift elements whose number corresponds to the number of picture elements are required like a TFT (Thin Film Transistor) matrix. Further, in the line sequential scanning, the electrode must be divided into parts whose number corresponds to the number of horizontal scanning lines.

Accordingly, when the number of horizontal scanning lines of a display device whose resolution is required to be improved is represented by N, it is ideal in the line sequential scanning operation that the transparent electrode is divided into N parts (1/N-division). However, in order to improve the resolution, a pixel shift element which is equivalent in cost is required. Accordingly, the inventor has considered that the upper limit of the electrode division can be reduced with a human factor to perform a cost-down, and made the following experiment.

When the pixel shift element is combined with the TFT color liquid crystal display device as described above and the timing of the switching of the ferroelectric liquid crystal display device was made vertical synchronization with the vertical synchronization signal, the resolution of about a quarter of a panel in the vertical direction was improved from 240 TV lines to 370 TV lines even when the switching of the FLC device of the whole panel is performed in no consideration of the time-series data.

Through this experiment, it was found out that the resolution was effectively improved even by the division in the vertical direction till about a quarter. That is, in order to improve the resolution, the pixel shift element to be combined with the display element having the horizontal scanning line number N may be divided into N parts to one part in the vertical direction. However, in order to improve the resolution of the whole panel, it is preferably divided into N parts to three parts. Further, in consideration of an electrode processing precision, a cost, etc., the division is preferably made at a divisional number below an integer of N/2 or (N+1)/2.

Specific example of resolution-improvement of the FLC pixel shift element having five-division (five-segmented) electrode structure.

Figure 35A:
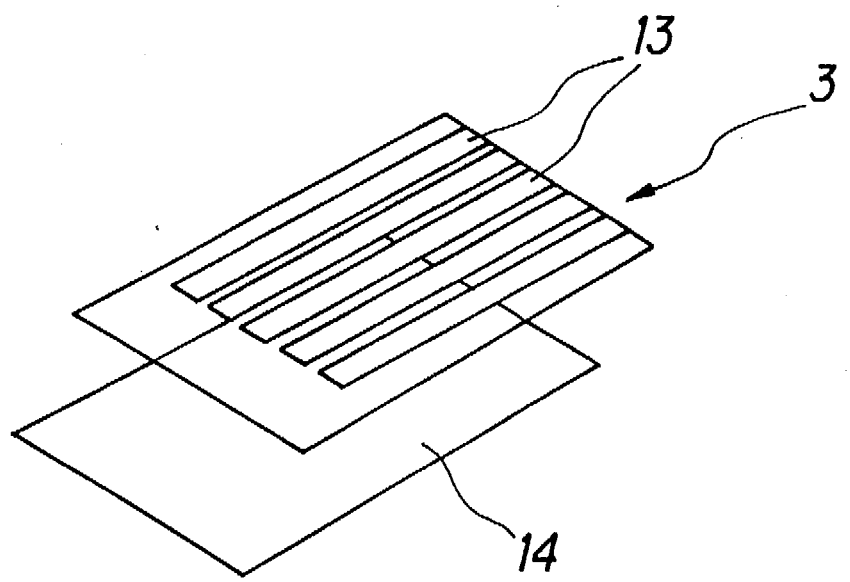
FIGS. 35A and 35B are a perspective view showing a divided electrode in the phase modulating unit.
Figure 35B:
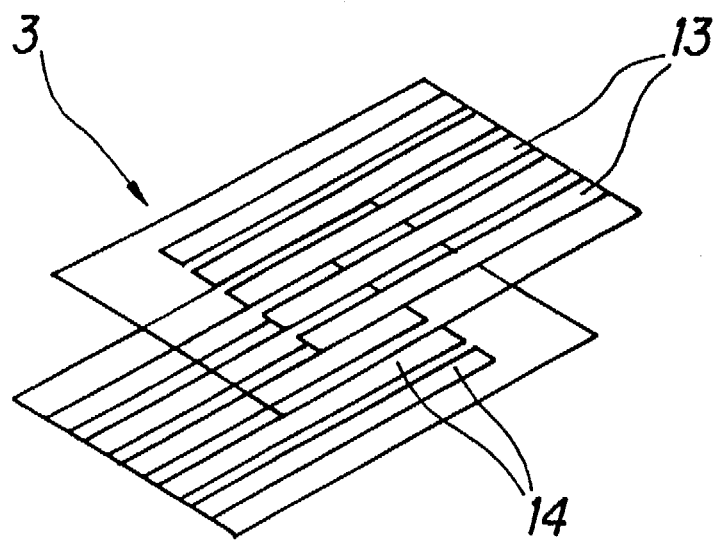

FIGS. 35A and 35B show a combination of the divided (segmented) electrode. The divided electrode was formed. That is, transparent electrodes (ITO) 13 and 14 were formed on a glass substrate, and an electrode was etched to be divided into five parts. The distance between the ITO electrodes (etching portion) was set to 10 μm. In order to prevent breakdown due to potential difference between the electrodes, that is, in the point of voltage proof, etc, the distance between the electrodes was required to be larger than the cell gap (further, shorter than the non-display portion). In this case, the cell gap was set to 1 μm to 3.0 μm. The divided electrode may be designed to have a common electrode at one side thereof or have divided electrodes at both sides thereof. FIG. 35A illustrates a five-division/common divisional electrode; and FIG. 35B illustrates a five-division/five-division divisional electrode.

Further, an SiO alignment film was used as an alignment film, and the same cell fabrication method and liquid crystal injection method as the single-electrode cell were used. The liquid orientation direction was adjusted in consideration of the pixel shift direction.

With respect to a synchronization signal of the pixel shift element:

Interlaced scanning (INTERLACE)

In a cinema, pictures of 24 frames are displayed every second, and in a television pictures of 25 or 30 frames are displayed every second. However, in the display of 24 to 30 frames every second, there is large flicker disturbance, and it cannot be practically usable. Therefore, in the cinema, one frame is irradiated twice, and a display of 48 frames per second is repeated. In the TV, a repetitive number per second is increased without increasing a transmission band width by using the interlaced scanning method. In Standard of Japan, 2:1 line interlaced scanning method is used.

Figure 36B:
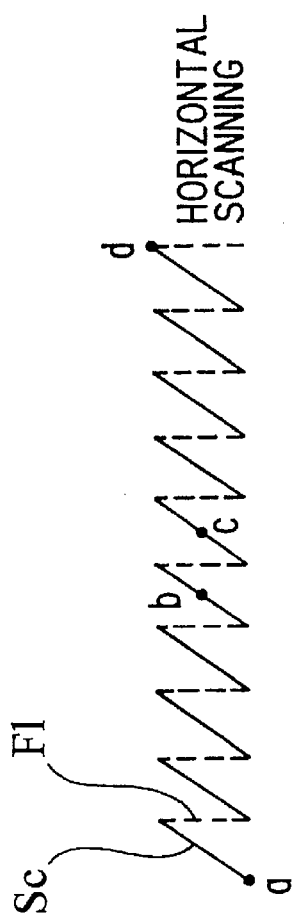
FIGS. 36A and 36C are views showing an interlace scanning method.
Figure 36C:
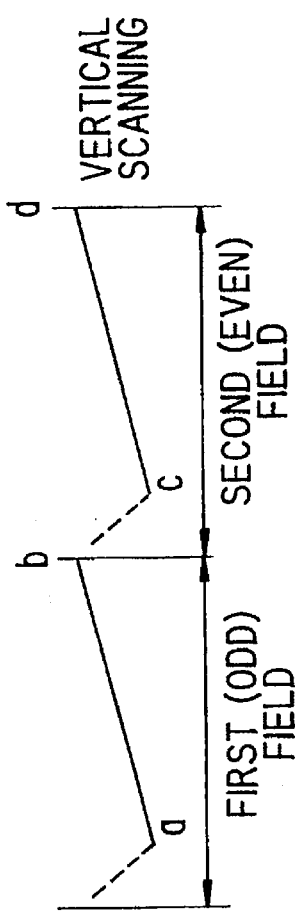
Figure 36A:
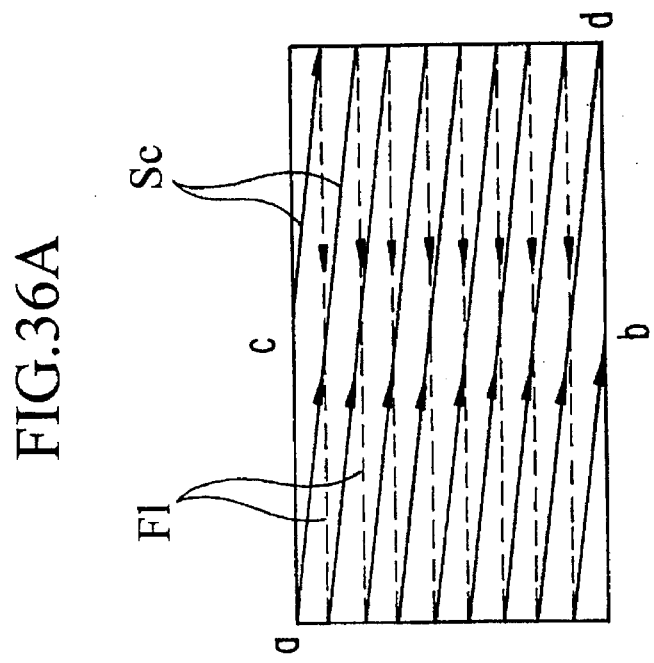

That is, as shown in FIGS. 36A–C, a scanning operation which starts from a-point reaches b-point through horizontal scanning operations of N/2, using scanning Sc and flyback F1 and shifts to c-point during a vertical retrace period. Further, it reaches d-point through horizontal scanning operations of N/2, and returned to the a-point during a vertical retrace period again. The period from d-point to b-point is called as "first (odd) field", and the period from b-point to d-point is called as "second (even) field". In the 2:1 line interlaced scanning system, a complete frame (one frame) can be formed with two fields. Besides, 3:1, 5:1 line interlaced scanning systems may be used. FIGS. 36A–36C show a 2:1 vertical blanking period.

When the frame display is conducted in a line sequential scanning operation such as NTSC system or the like, the resolution of a present CRT has little problem because it is analogue. However, as described above, for a display having discretely-arranged picture elements such as a liquid crystal, plasma, EL or the like, a large amount of horizontal position information are lacked because of its discrete picture-element arrangement, information on scanning lines is lacked, or the position resolution of the brightness signal is reduced (that is, the resolution of the display is reduced).

Here, a method of achieving the timing of the pixel shift (wobbling) will be described. FIG. 37 describes a TV synchronizing signal and its waveform.

A television signal comprises a brightness signal, a vertical synchronization signal, a horizontal synchronization signal, a color signal and a color synchronization signal for each field. In this embodiment, vertical synchronization pulses of odd (first) and even (second) fields are detected, a synchronization signal is transmitted to a FLC driver, and then a drive waveform which is delayed every channel is transmitted to an FLC cell.

Figure 38:
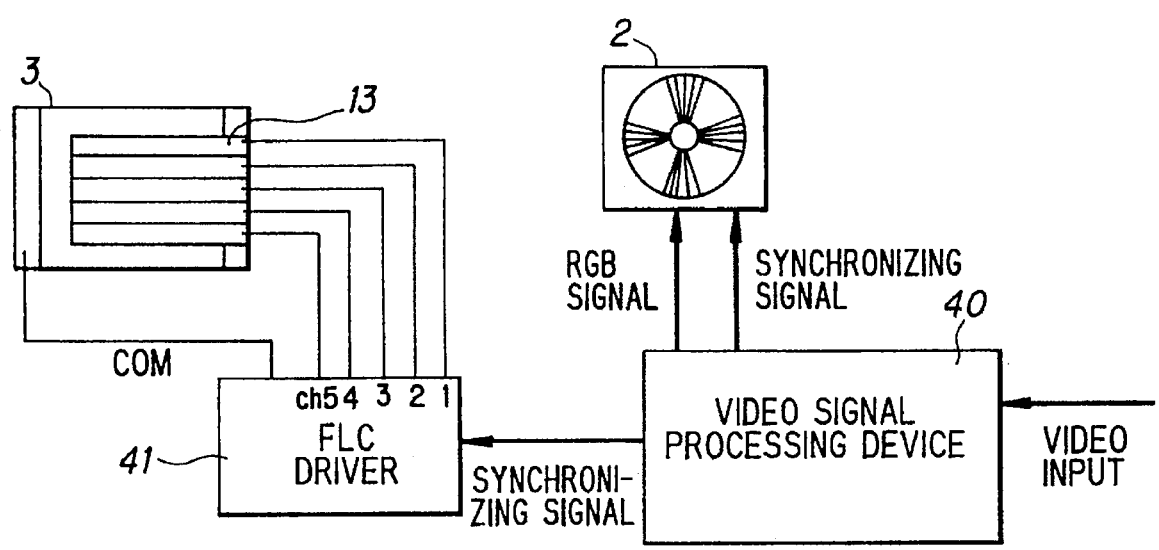
FIG. 38 is a block diagram showing a connection relationship between respective elements of the display device.

With respect to synchronization among divided FLC device, FLC drive circuit and video signal processing system:

FIG. 38 describes an electrode structure, connection and synchronization between driving circuit and video signal and its waveform.

FIG. 38 shows the construction of the electrode and a connection method of the drive circuit and the video signal processing system. That is, the synchronization pulse of each of the odd field (first field) and the even field (second field) and the RGB signal are supplied to the display device 2, and at the same time the vertical synchronization pulse of each field is detected to transmit the synchronization signal to the FLC driver 41, and then transmit to the FLC cell a drive waveform which is delayed every channel in a driver 41.

A drive waveform of divided FLC element is designed as shown in FIG. 39, the whole ITO side is used as a common electrode, the five-divisional electrode side is divided into Ch1 to Ch5, and a pulse driving as shown in FIG. 39 is performed. That is, the time of a field is divided into five parts on the basis of the detected vertical synchronization signal, and a delay is sequentially supplied in each channel. Accordingly, it is important that the driving of the TN liquid crystal display device 2 is synchronized with the driving of the FLC device 3. General FLC driving method and rectangular waveform driving method can be applied to these driving waveforms.

Further, a concrete method of changing the direction of the pixel shift will be described. A method of improving the resolution of the vertical direction of the display device 2 (FIG. 40) and a method of improving the resolution of the horizontal direction of the display device 2 (FIG. 41) will be described. Through the result, it was proved that the resolution of a desired direction could be improved.

Figure 41B:
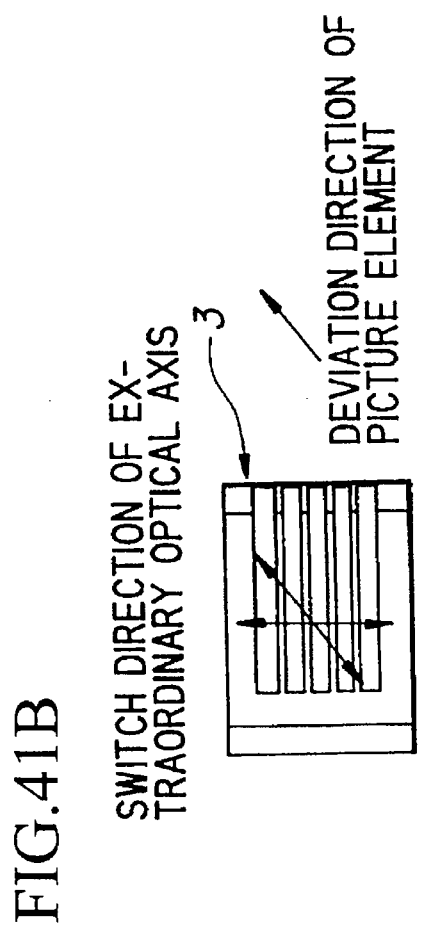
FIGS. 41A and 41B are schematic views showing another display device using the above elements.
Figure 41A:
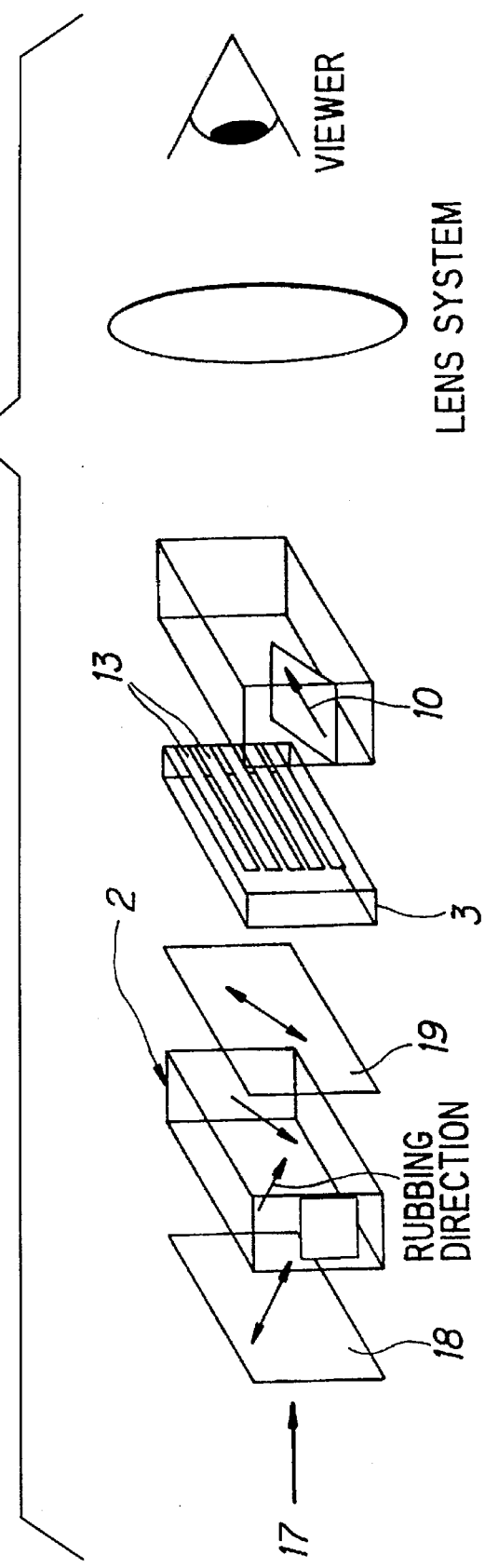

FIG. 40 shows the method of performing high resolution in vertical direction of display element. FIG. 41 describes a method of performing high resolution in vertical and horizontal direction of display element (deviation of picture element is slant direction).

The resolution improvement of the five-divisional FLC device was considered in consideration of a drive condition, an optical arrangement and a pixel shift amount. Through this consideration, an active matrix TN liquid crystal display having 103000 picture elements and 0.7-inch size was improved in resolution from 240 TV lines to 370 TV lines over the whole panel thereof, and further the black matrix serving as the non-display portion was unremarkable, so that a frame having high resolution and smooth image quality could be obtained.

Figure 42:
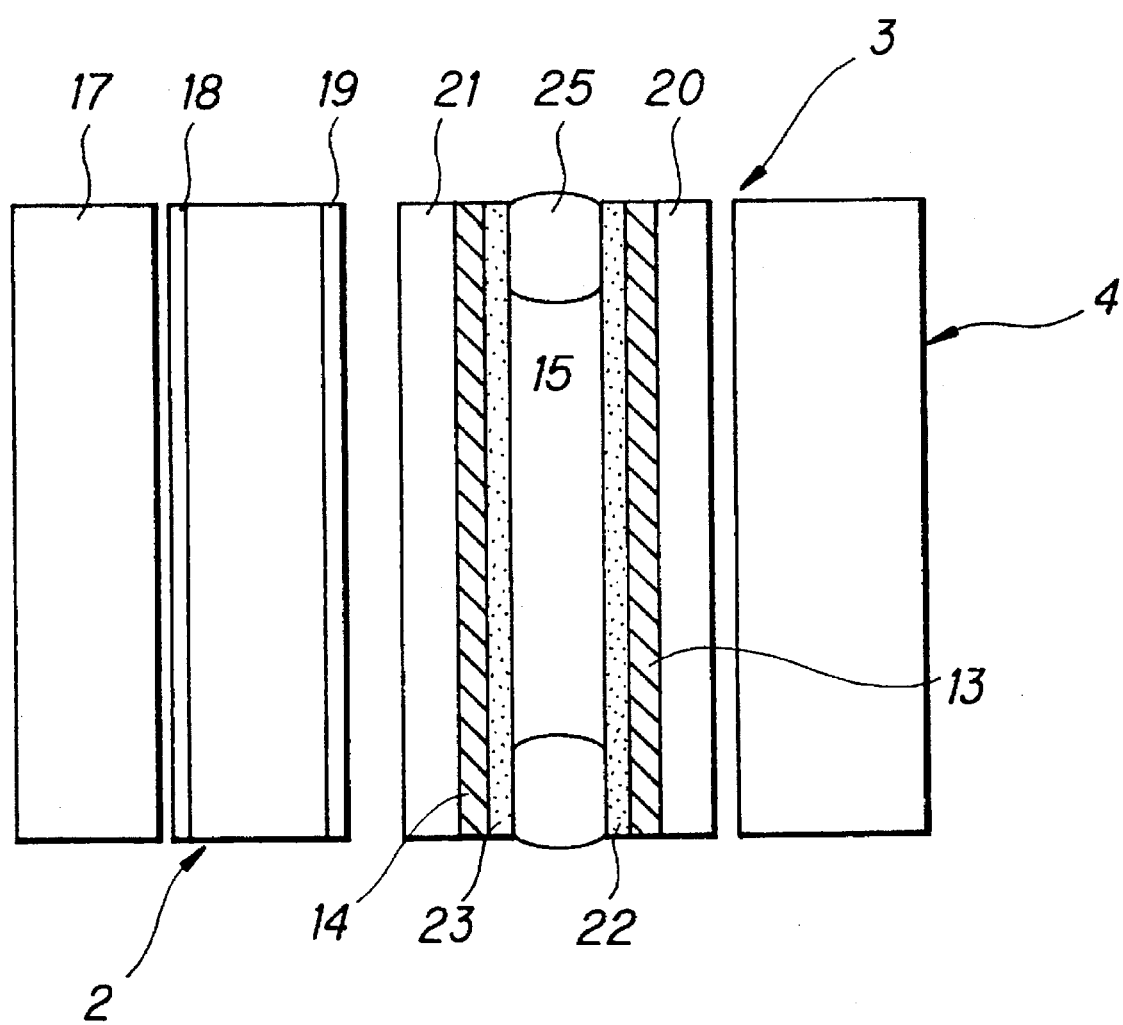
FIG. 42 is a cross-sectional view showing a structure of the display device.
Figure 43:
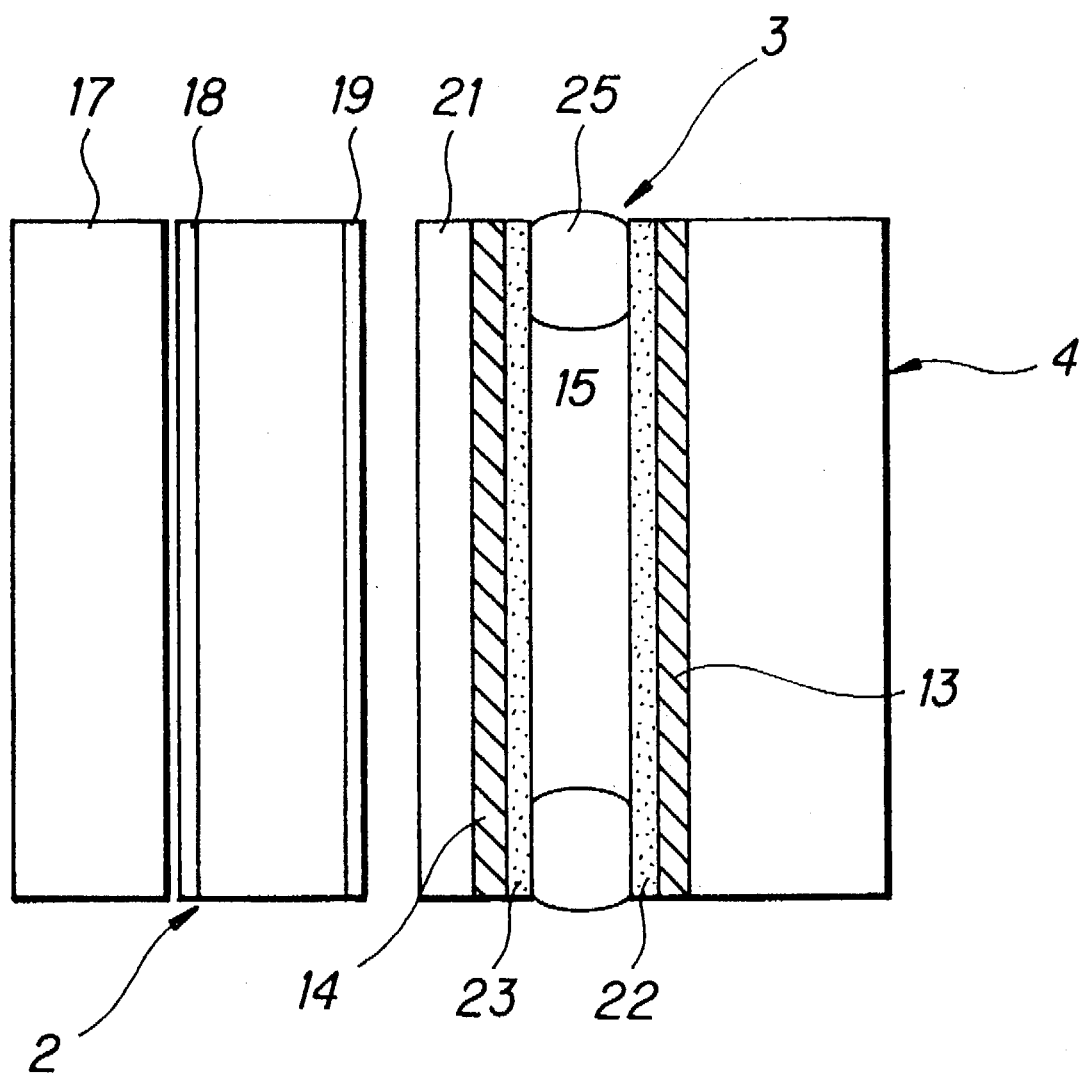
FIG. 43 is a cross-sectional view of another structure of the display device.
Figure 44:
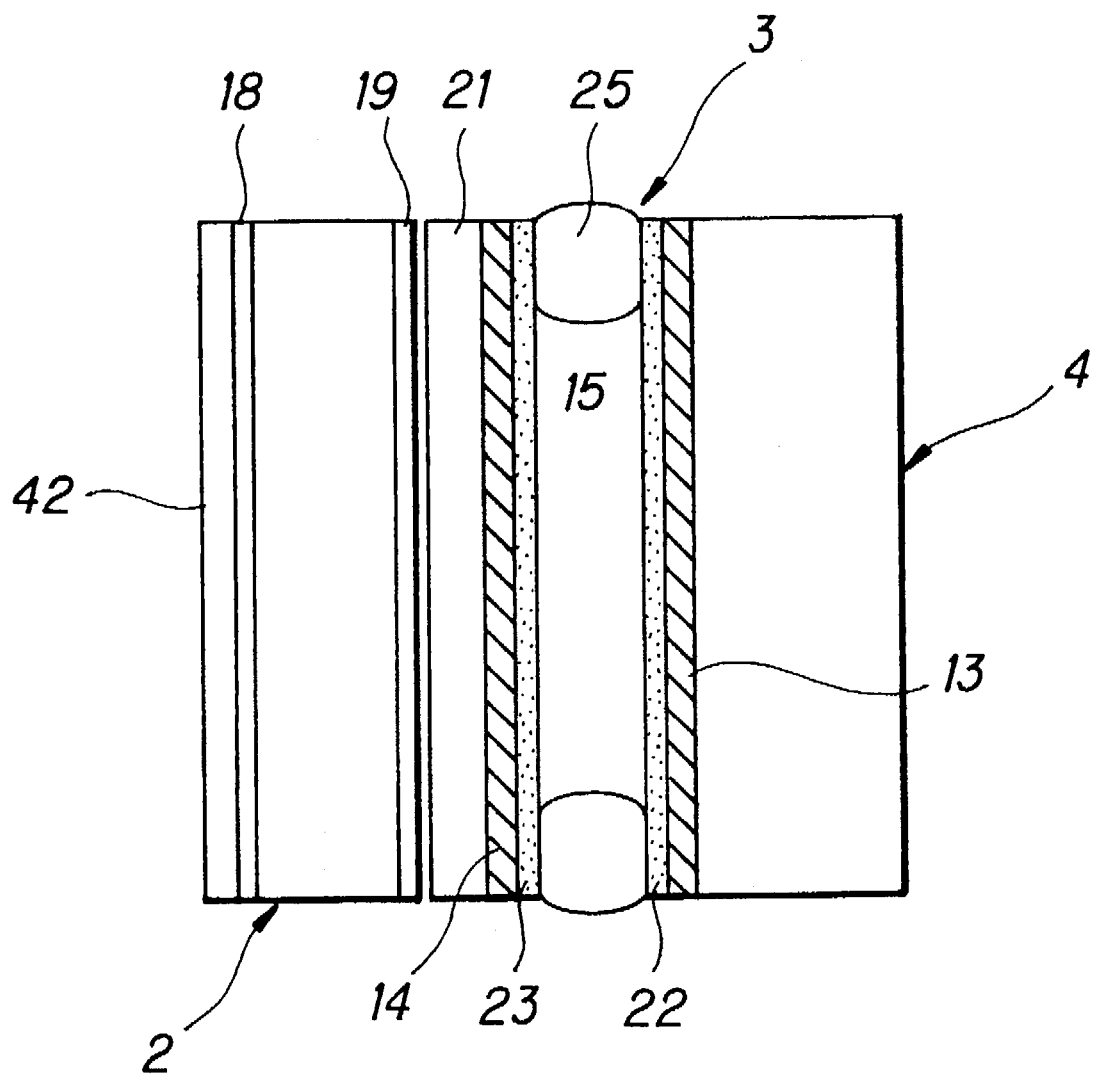
FIG. 44 is a cross-sectional view of another structure of the display device.

Improvement on other structures:

In the above embodiment, the chiral smectic liquid crystal device 3 is formed with the transparent glass substrates 20 and 21 as shown in FIG. 42. In order to more reduce the cost, volume and weight, as shown in FIGS. 43 and 44, one of the transparent substrates (20) may be replaced by a quartz plate 4, and the quartz plate may be provided with a transparent electrode 13 and an alignment film 22 to be unified to the chiral smectic liquid crystal device 3. By matching refractive index, reflection can be suppressed and transmittance can be also improved. In FIG. 44, a reflection plate 42 is further provided at the display device 2 side to improve a display performance.

These resolution improving techniques are applicable to any type of display device, such as a direct vision type, a reflection type, a projection type or the like. Of these types, three examples of the projection type of display are shown in FIGS. 45 to 47.

Figure 45:
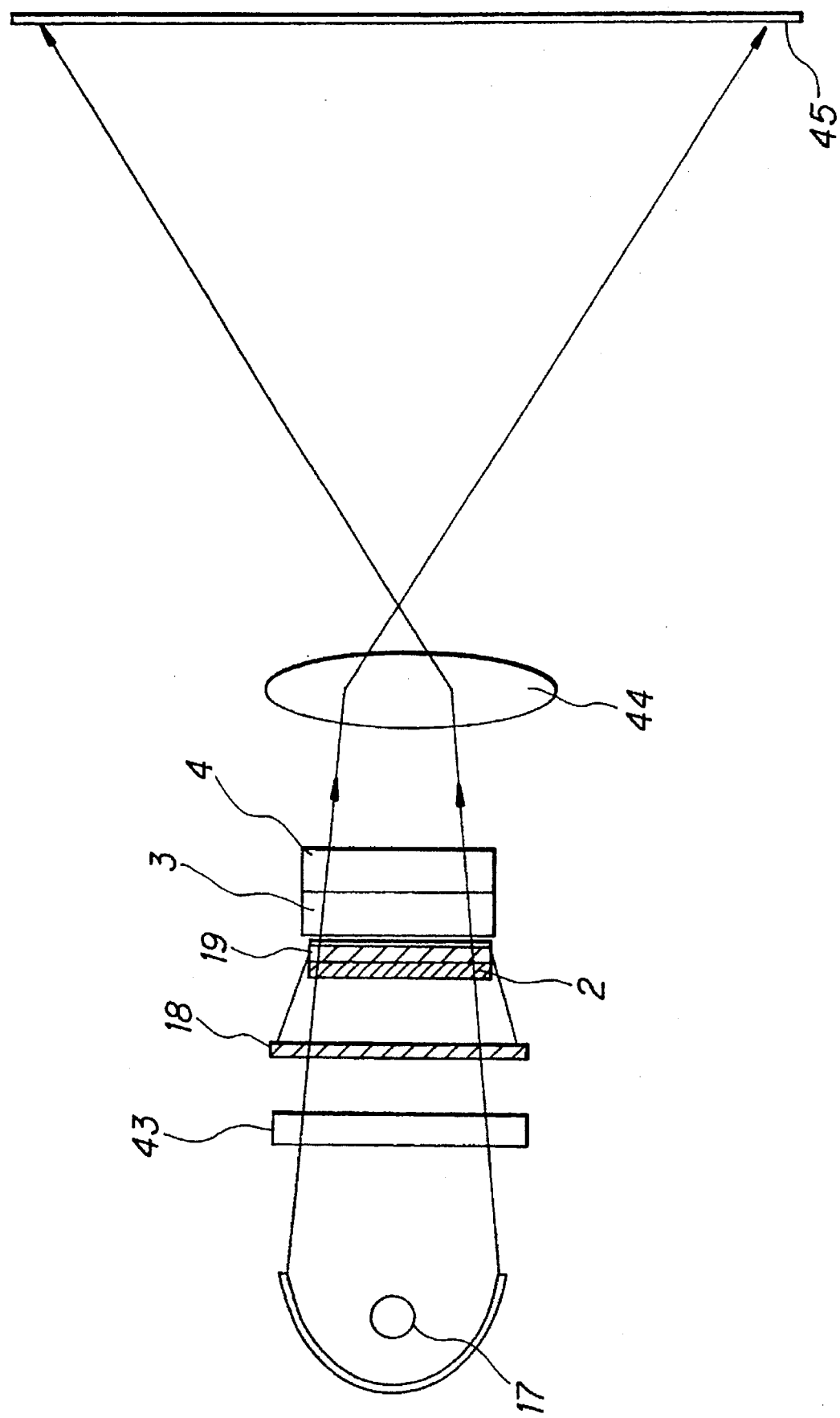
FIG. 45 is a cross-sectional view showing an example of a display to which the display device is applied.

In the embodiment shown in FIG. 45, an applied example for single-plate projection type of display, light from a halogen lamp 17 is passed through a cold filter 43, and guided to the display device 2 as a back light. Thereafter, the wobbling processing as described above is carried out and then an image is projected from a lens system 44 to a screen 45.

Figure 46:
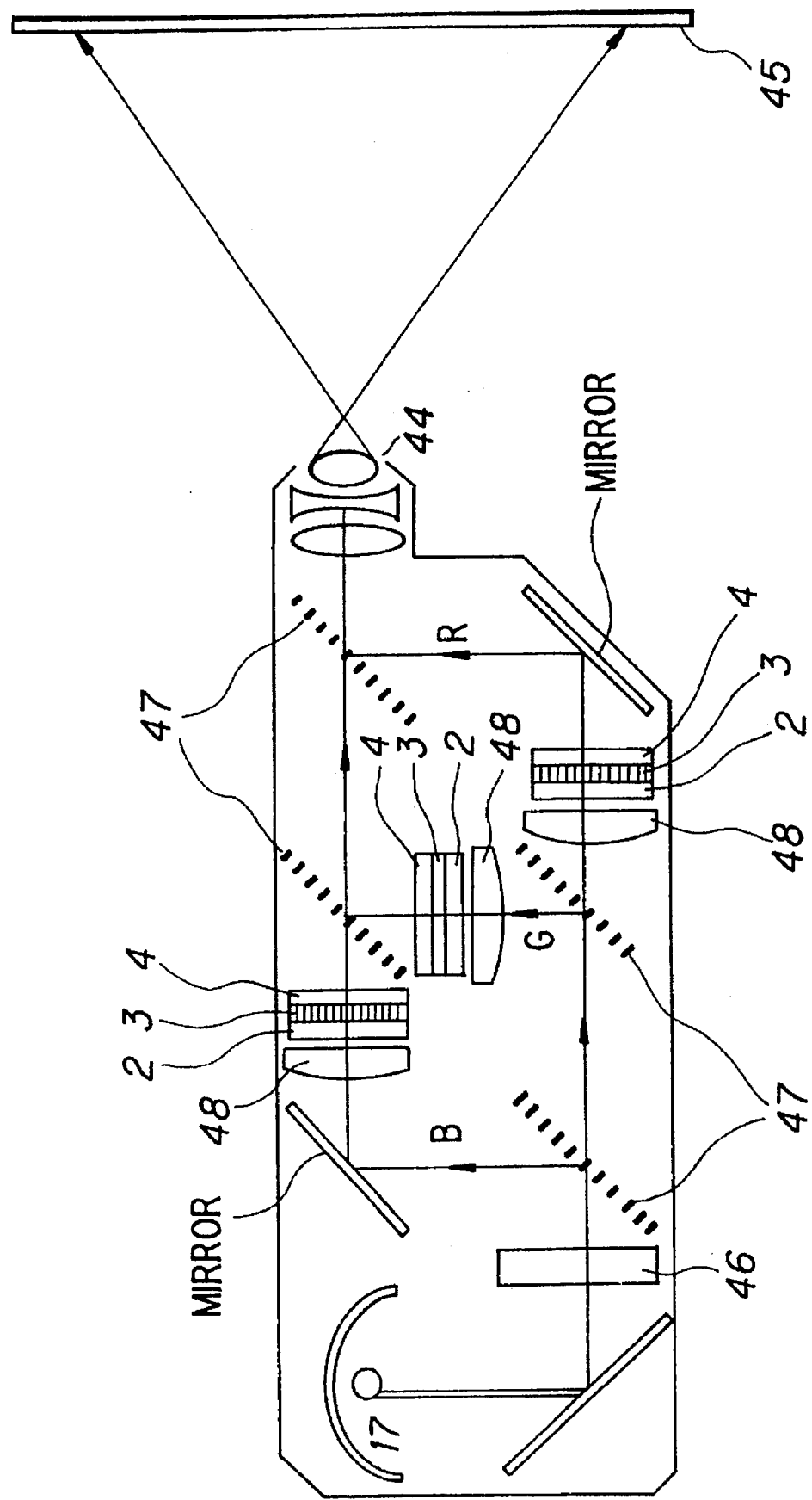
FIG. 46 is a cross-sectional view showing another example of the display to which the display device is applied.

FIG. 46 shows a mirror type display, an applied example for three-plate projection type of display. In this display, light from a light source 17 is passed through a filter 46, and then divided into lights having predetermined wavelengths (R, G and B) by a dichroic mirror 47. Thereafter, the separated lights are irradiated from a condenser lens 48 to respective wobbling elements to be wobbled, and then composited with each other again. The composite light is projected onto a screen 45.

Figure 47:
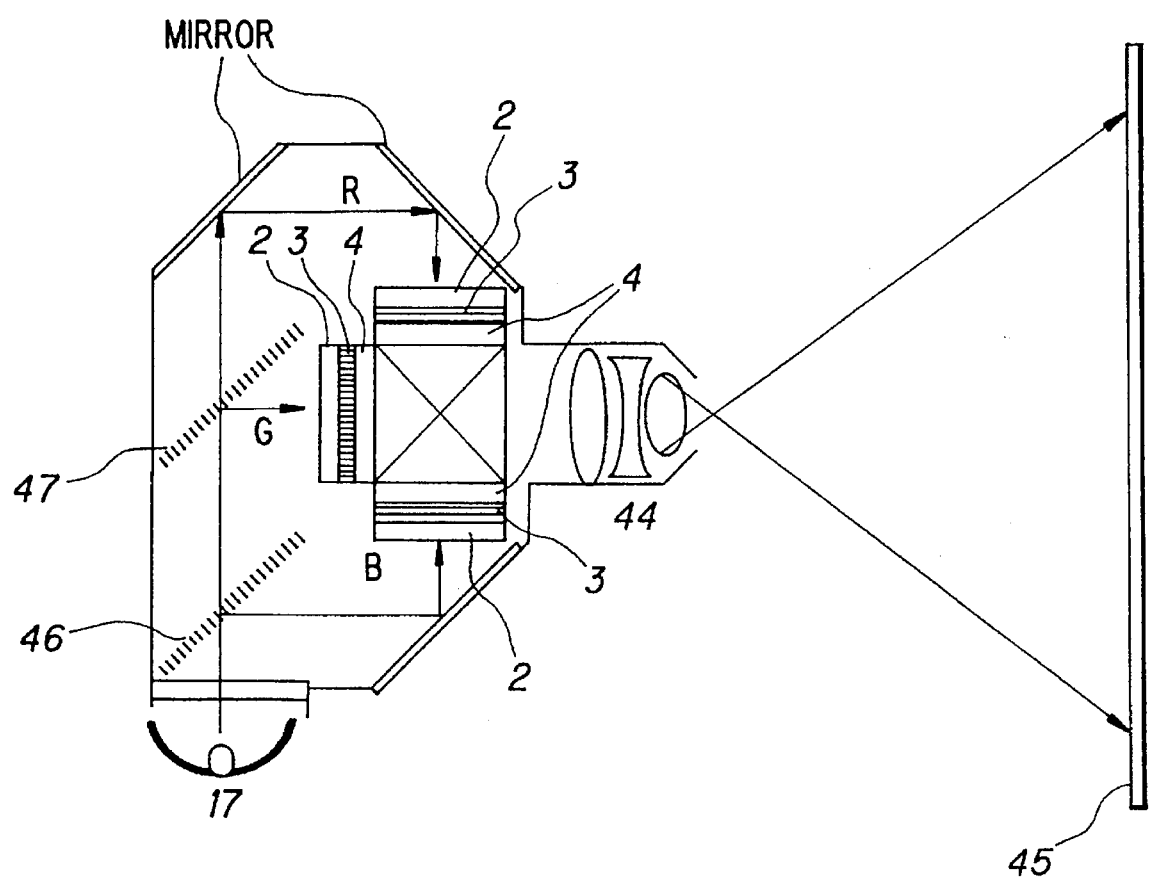
FIG. 47 is a cross-sectional view showing another example of the display to which the display device is applied.

FIG. 47 shows a prism type display, an applied example for three-plate projection type of display. This display is basically similar to the display of FIG. 46 except that lights are composited with each other through a dichroic prism 48.

The resolution improving technique as described above is applied in a visible band because it is used as a display.

Application to image pick-up device

This invention is applicable not only to the display device 2, but also to a case where the wobbling element 7 as described above is disposed in an optical path between the subject and an image pick-up device having discretely-arranged picture elements such as a CCD or the like.

When this invention is applied to an image pick-up device 71 shown in FIGS. 48A–C and 49A–C, the same various conditions, the same principle and the same description as adopted for the above display device are preferably used. In the following description, the same content as the display device will not be repetitively described, those points which are inherent to the image pick-up device will be mainly described.

Figures 48A, 48B, 48C:
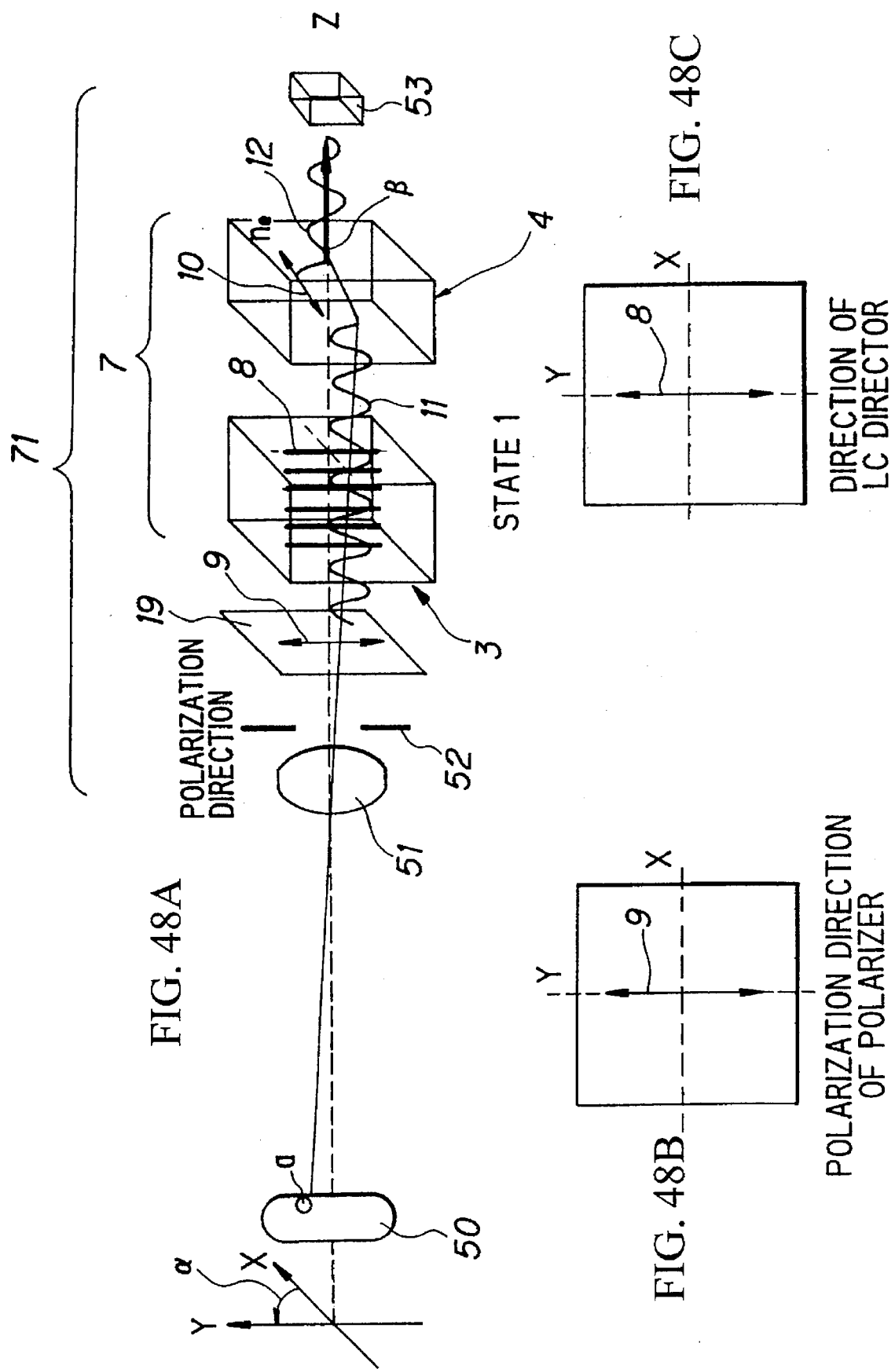
FIGS. 48A–48B are schematic and graphical views showing an image pick-up device in a state 1 according to another embodiment of this invention.

FIGS. 48A–C correspond to when FLC extraordinary optical axis is coincident with polarization direction of polarizer; and FIGS. 49A–C correspond to when FLC extraordinary optical axis intersects to polarization direction of polarizer at 45°.

In a case where an image pick-up device, for example, a CCD is used, in order to improve the resolution of a CCD (for example, ⅓ inch size) in a horizontal or vertical direction or in both of horizontal and vertical directions at the same time, β is set to 45 degrees, and a pixel shift amount is adjusted by adjusting the thickness d of the quartz plate. Since the horizontal pitch and the vertical pitch of the ⅓-inch CCD are equal to 6.35 μm and 7.4 μm, the pixel shift amounts for the resolution improvement in the respective direction may be set to 3.18 μm and 3.7 μm which are half of the respective pitches. Further, for the pixel shift in the oblique direction, a shift corresponding to the length of a rectangular whose both sides are horizontal and vertical components is required, and in this case it may be set to 4.88 μm.

For example, in order to provide a shift of L=3.7 μm, β=45 degrees, and d=0.63 mm. In this case, the β-range of effectively developing the optical axis shift L is from 10 to 80 degrees.

When the image pick-up device is used, the subject, the polarizer, the FLC device, the birefringent substrate and the image pick-up device are disposed in this order in the optical path between the subject and the image pick-up device 53. In this case, a lens system, an iris and a wavelength limiting filter may be disposed at any position in an optical path between the subject and the image pick-up device.

As shown in FIGS. 48A–C and 49A–C, an irradiation light component a from the subject 50 is passed through a lens 51 and a diaphragm 52 and polarized in a pixel shift direction by a polarizer 19 when the switching state of the ferroelectric liquid crystal device 3 is in a state 1. Since the polarization plane of the light and the extraordinary optical axis 8 of the ferroelectric liquid crystal device 3 are parallel to each other, the transmission light is irradiated to the quartz plate 4 having birefringence with keeping its polarization plane. In the quartz plate 4, the extraordinary optical axis of the quartz is contained on the polarization plane of the incident light. Therefore, the light which is polarized in the Y-axis direction is refracted in a direction along which the extraordinary optical axis of the quartz plate is inclined, and when it is emitted to the air layer again, it is in parallel to the optical axis, whereby the optical axis of the incident light is deviated, and the light is irradiated to each pixel of the CCD image pick-up device 53.

On the other hand, when the ferroelectric liquid crystal device 3 is in a switching state 2, since the polarization plane and the extraordinary optical axis 8 are intersected to each other at about 45 degrees, the transmission light is rotated in the direction of the extraordinary optical axis and its polarization state is varied as follows: linear polarization (Y-axis direction)→elliptic polarization→circular polarization→linear polarization (X-axis direction) in the ferroelectric liquid crystal device. Therefore, the polarization plane is rotated from its initial state by 90 degrees, and then irradiated to the quartz plate 4. In the quartz plate 4, since the extraordinary optical axis of the quartz is not contained on the polarization plate of the incident light, the incident light is not refracted and directly passes through the quartz plate 4 to the air layer again with keeping its optical axis, and irradiated onto each pixel of the CCD image pick-up device 53. That is, an image pickup operation is conducted on an a' portion of the subject. The shift of the optical axis between the states 1 and 2 is utilizable as the operating principle of the pixel shift.

When the apparent cone angle is deviated from 45 degrees (for example, 45+γ degrees: 45>γ>−45), in the wobbling operation, by ideally setting the optical axis of the liquid crystal director at one of the states in parallel to or vertically to the polarization plane of the polarizer, the polarization plane of the transmission light is not varied in this state. In this case, since the polarization plane is not rotated, 100% light is refracted in the direction of the extraordinary optical axis of the quartz plate 4 as shown in FIG. 48, for example, and it is deviated from the optical axis. At this time, there is little component other than the component at the point.

At the other switching state, the apparent cone angle is equal to 45+γ degrees, so that the polarization plane of the transmission light is rotated by 90 degrees or more for a positive γ while it is not rotated for a negative γ. When the polarization plane is rotated by just 90 degrees, as shown in FIG. 49A–C, the a' component becomes 100%. However, when the rotation of the polarization plane is deviated from 90 degrees by an angle of γ as shown in FIG. 50A–C, a component in the Y-axis direction is also increased as a polarization component, so that there occurs a slight leakage to neighboring image pick-up picture elements in the Y-direction. Accordingly, in this case, the original pixel shifting effect to improve the resolution is slightly reduced.

FIGS. 50A–C correspond to when the intersection angle between FLC extraordinary optical axis and polarization direction of polarizer is deviated from 45° by γ.

In view of the foregoing, for the same reason as described in FIG. 13, it is sufficient that the angle δ at which the bisector of the intersection angle between the two states is intersected to the polarization plane of the polarizer or the line perpendicular to the polarization plate is set to 22.5 degrees ideally. By arranging the liquid crystal director 8 as described above, there occurs any cross-talk in both switching states as shown in FIGS. 51 and 52. However, the cross-talk at each switching state is small, and the sum of the cross-talks at both switching states becomes smaller than the cross-talk at one switching state, so that the effect of improving the resolution is not reduced.

The θ range and the angle δ at which the bisector of the two switching states is intersected to the polarization plane of the light or the line perpendicular to the polarization plane became clear through the following result of the wobbling experiment.

That is, through a consideration of the axis fixing at one side, it was proved that the CCD resolution could be improved by the wobbling effect in the θ range of 26 to 64 degrees. Further, it was found out that the CCD resolution could be improved without color change in the θ range of 36 to 54 degrees.

Further, through a consideration of the position of the δ-axis in the θ range of 36 to 54 degrees, it was proved that there was no color change and the high resolution was obtained at δ=22.5±10 degrees. Further, in the θ range of 36 to 54 degrees and at δ=22.5±5, the cross-talk between the fields was reduced, and the contrast ratio between the fields was increased, so that the resolution was more improved.

The estimation of the resolution was made by conducing an image pickup on an striped resolution estimating panel, converting an image data to a video signal, displaying the video signal on a CRT monitor and then observing the displayed image.

FIGS. 53A–B shows a concrete arrangement of the device. For an optical system such as a video camera, a still video camera or the like, since most of incident light from the outside is not polarized, it is characterized in that a polarizer is inserted between the outside (subject) and a ferroelectric switching element, and no restriction is imposed on the positional relationship between a lens and a diaphragm. The other optical arrangement is performed as follows: subject-lens-diaphragm-polarizer-ferroelectric switching element-transparent substrate having uniaxial optical anisotropy-image pickup device which are arranged in this order. Any kind of image pickup device to be combined, such as CCD, MOS type of device or the like may be used.

These image pickup devices serve as a light receiving element unlike the display device, so that the spatial resolution of the subject can be improved. In this case, the simultaneous system can be conducted in place of the sequential system for the display device. Therefore, the switching portion of the FLC device 3 may simultaneously act on the whole surface of the CCD device, and the spatial electrode division of the phase modulating unit 3 is not required. That is, when there is no optical shift because the picture elements of the CCD image pickup device are discretely arranged, each picture element has only a, b and c positional resolutions. However, by dividing a frame, storing information on a, b and c in a simultaneous mode, transmitting the information, storing positional information on a', b' and c' through the pixel shift by the ferroelectric liquid crystal device 3 at a next field, transmitting the positional information, and re-compositing it with the information of the first field to improve the vertical resolution twice.

Particularly in order to improve not only the vertical resolution, but also the horizontal resolution, one frame must comprise three fields, four fields. In order to satisfy this requirement, high-speed responsibility is required for the ferroelectric liquid crystal device. In the twisted nematic pixel shift device, the total of the rise-up and fall times at the transmittance variation of 0 to 90% is equal to about 15 msec at minimum (at room temperature), and it is very difficult to realize this requirement even in the 2:1 line interlaced scanning system of NTSC (1/60 second (16.7 ms) per field). Further, if the 4:1 line interlaced scanning system with the same frame number is applied, it is 1/120 second (8.3 ms) per field, the following is never performed. In this point, in the pixel shift method using the ferroelectric liquid crystal device, its switching time is shorter than the TN liquid crystal, and it is effective. The sum of the rise-up and fall times of the ferroelectric liquid crystals is in μsec order, and it is below several milliseconds for the liquid crystal having the latest response speed. For Monochromatic image pick-up device, triple-plate type color image pick-up device:

Since one switching element unit corresponds to one pixel, the resolution is improved simply by the shift of the optical axis which corresponds to a half of the distance between center points of gravity of one pixel in a resolution-improving direction. The permissible range is suitable to be 50% to 150% of the shift length. Image pickup device having color filters:

A trio of R, G and B color filters comprise one pixel. The R, G and B filters may be arranged in the delta arrangement, the in-line arrangement or the like, and the shift amount of the optical axis may be set to a half of the distance between centers of gravity of the nearest R, G and B trio area in a resolution improving direction. Further, its permissible range is suitable to be 50 to 150% of the shift length.

Figure 54A:
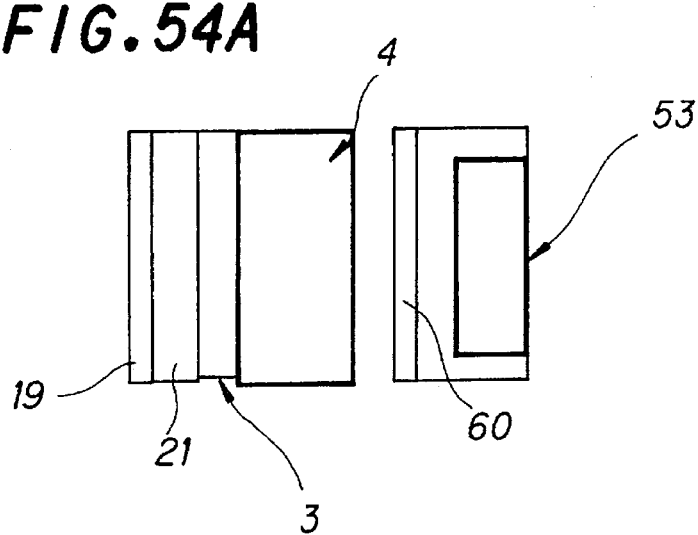
FIGS. 54A, 54B and 54C are a cross-sectional view showing structure examples of the image pick-up device.
Figure 54B:
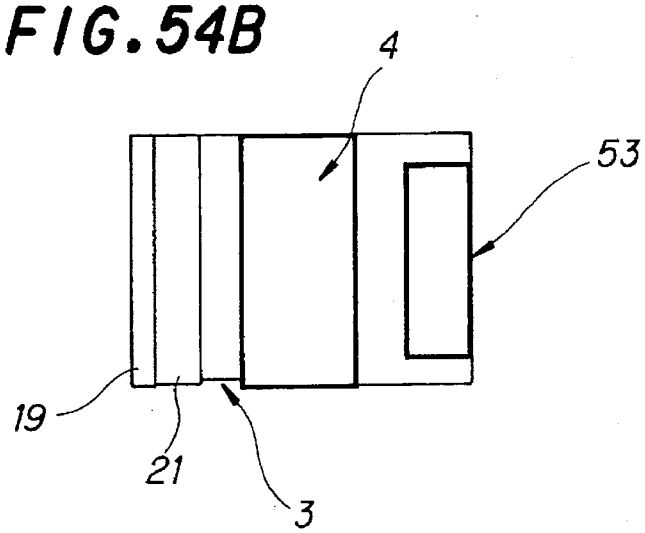
Figure 54C:
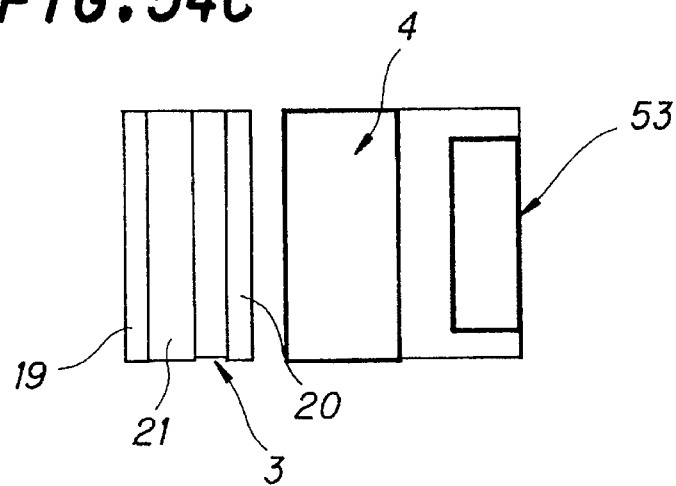

Improvement on other structures:

In the above embodiments, the ferroelectric liquid crystal device 3 is formed of a substrate different from the quartz plate 4. In order to more reduce its cost, volume and weight, as shown in FIGS. 54A to 54C, the quartz plate 4 is provided with a transparent electrode and an orientation film (not shown), and it is unified to the ferroelectric liquid crystal device 3 to form a pixel shift unit. The pixel shift unit thus formed is disposed through a protection glass substrate 60 on the whole surface of a CCD (A), or the quartz plate side is adhesively attached to the CCD device without protection glass substrate 60 (B). In FIG. 54C, the CCD 53 and the quartz plate 4 are unified to each other, and the FLC device 3 are designed in the same structure as described above.

Each of these cells thus formed is actually installed into a video camera: Handycam TR-1 (produced by Sony), and the result of the actual installation will be described. Prior to the description of the result, an infrared-ray cut filter and a low-pass filter will be first described.

Figure 55:
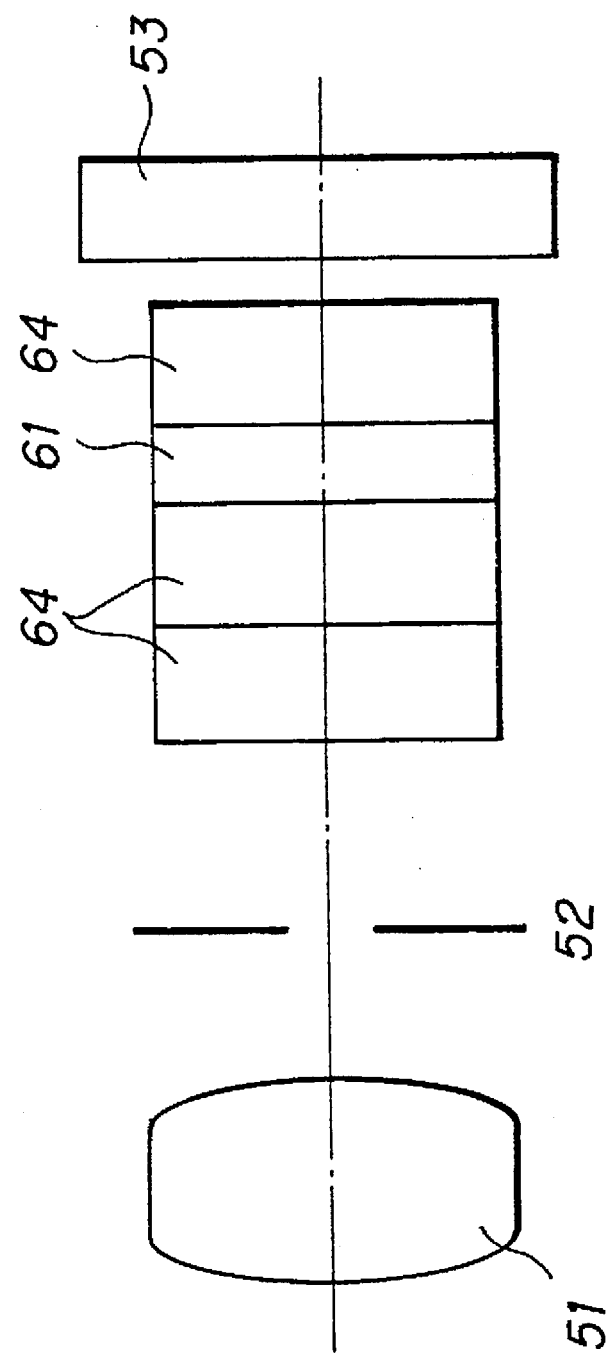
FIG. 55 is a schematic view showing an actual installation state of a quartz optical low pass filter.

[1] For ordinary visible image pickup:

A semiconductor image pickup device such as a CCD image pickup device has a broad sensitivity band of 380 to 1200 nm. When an ordinary visible image is picked up, it is unintentionally picked up till a infrared-ray band which is insensitive to human eyes, and thus it adversely affects the image. Accordingly, the infrared-ray cut filter is required to be inserted between the subject 50 and a CCD image pick-up device 53 as shown in FIG. 55. FIG. 55 describes a method of using low-pass filter of light receiving unit of video camera.

Figure 56A:
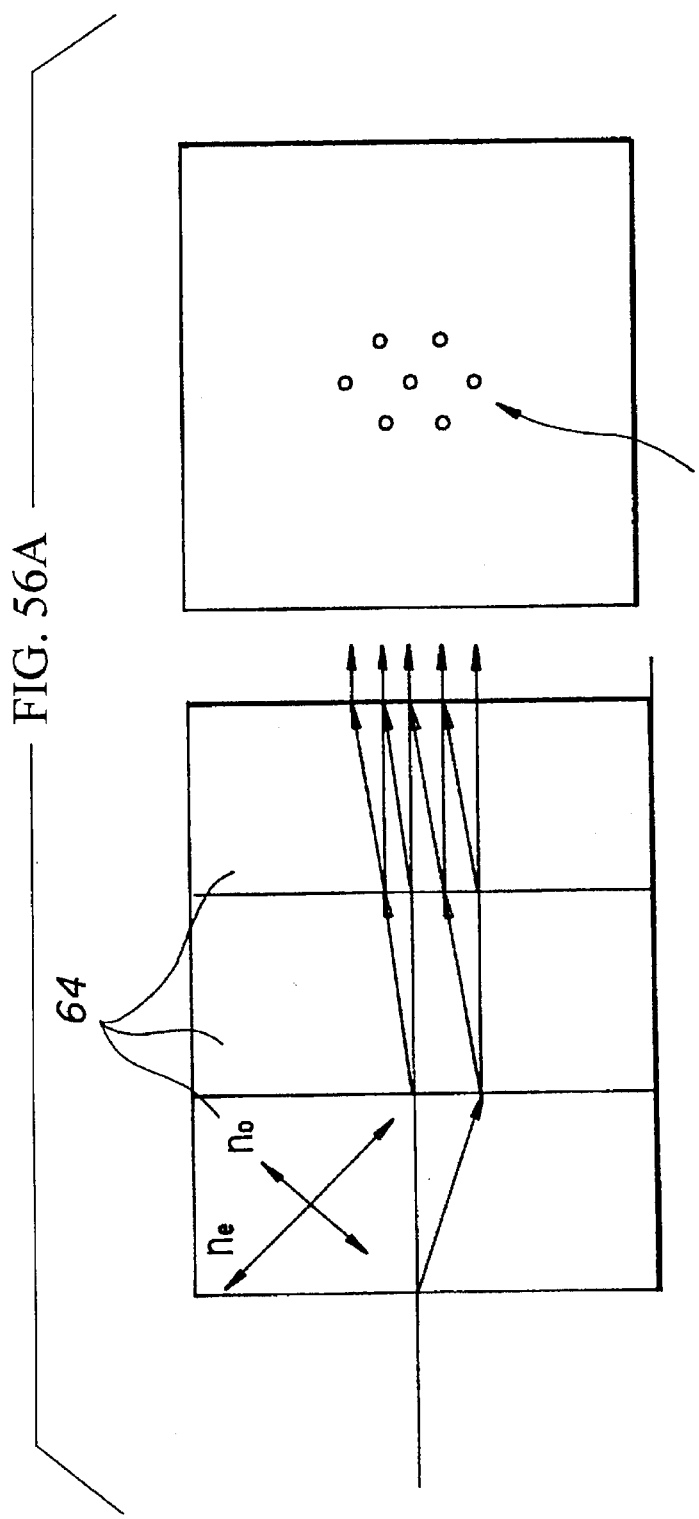
Figure 56B:
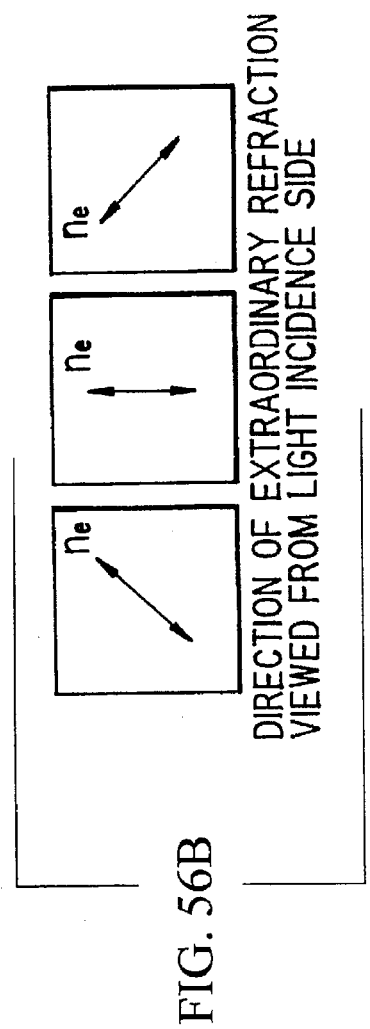

In this embodiment, a case where the pixel shift unit is combined with an infrared-ray cut filter (for cutting wavelength above 700 nm) 61 is shown. Further, since it is insufficient to cut high-frequency components with only the quartz plate used for the wobbling element, an optical low pass filter is required. Therefore, a 7-points blurring quartz low pass filter (having plural quartz plates 64) which is generally used in a CCD video camera of high image quality is combined (FIGS. 55 and 56A,B). FIGS. 56A,B describe optical low-pass filter of 7-points blur which is installed in CCD video camera of high image quality.

In this low pass filter, an incident light is blurred to two points in one quartz plate by using its birefringence, and a two-point image is further blurred to a four-point image by laminating the other quartz plates which are rotated around the optical axis. The four-point image is further blurred to a 7-point image by a third quartz plate, thereby improving a low pass filter characteristic.

That is, through the blurring of the incident light as described above, high-frequency components of the spatial frequency of image information are removed, and problems in moire fringes and in color dummy signals can be avoided. When one quartz plate is used, only the high-frequency component in the Y-direction can be removed, however, in the above case the high-frequency components in the x, y directions can be cut or dispersed. Therefore, the effect of the high-frequency components on an image (occurrence of moire fringe patterns or color dummy signals in an imaged image-output) can be more reduced with keeping sensitivity to low-frequency components.

An actual installation example without the low pass filter as described above is shown in FIG. 57, and an actual installation example with the low pass filter as described above is shown in FIG. 58. In both cases, the pixel shift unit (wobbling element) 7 is disposed before the CCD 53.

Figure 57:
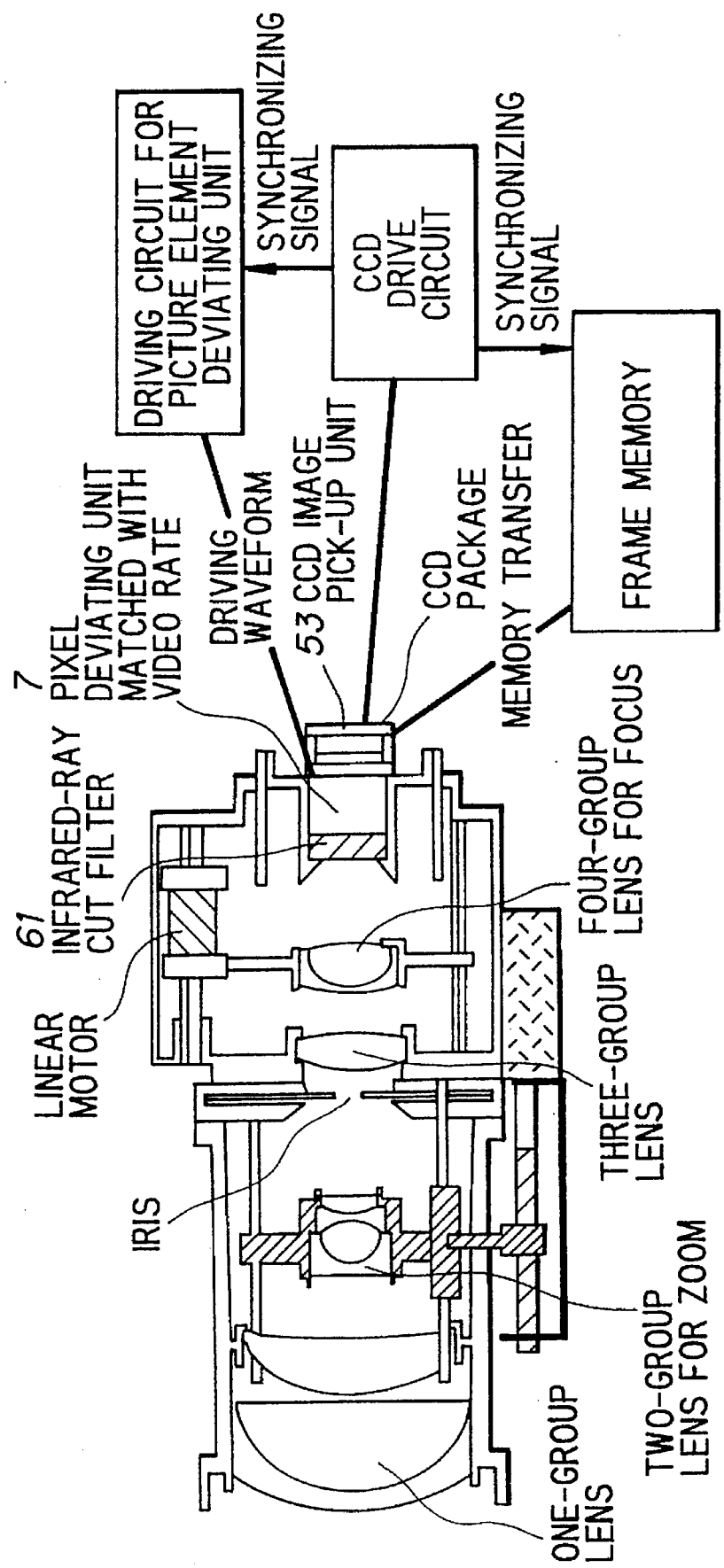
FIG. 57 is a cross-sectional view showing an actual installation state of the image pick-up device.
Figure 58:
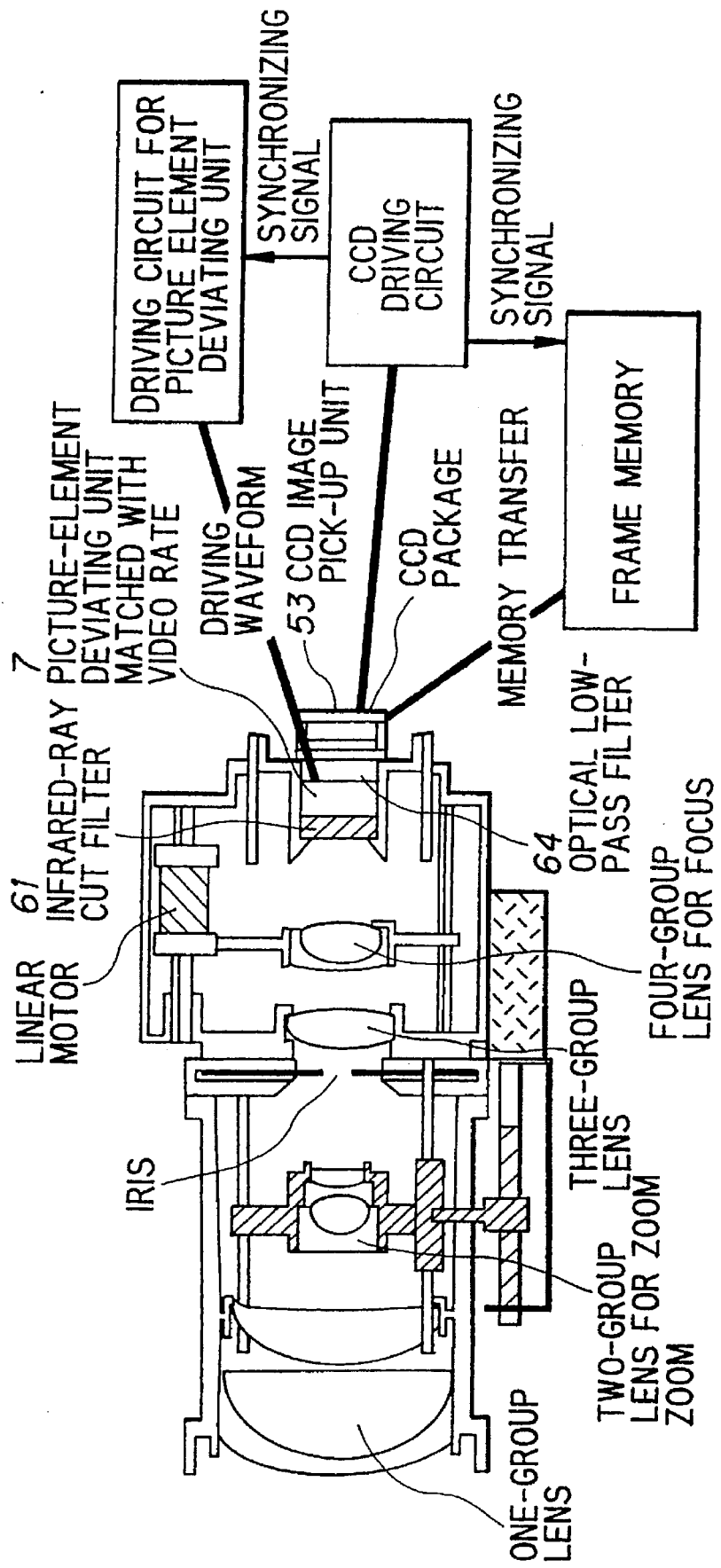
FIG. 58 is a cross-sectional view of another actual installation state.

FIG. 57 describes a visible band image pick-up type example of installation of wobbling element into HANDY CAM SONY TR-1[⅓' CDD]. FIG. 58 describes a visible band image pick-up type example of installation of wobbling element and optical low-pass filter into HANDY CAM SONY TR-1[⅓' CDD].

In a case where a low pass filter 64 is used, when the first extraordinary optical axis of the low pass filter intersects to a polarized light at the wobbling time at 30 to 60 degrees, the effect of the low pass filter can be obtained. However, in the other cases, the low pass filter characteristic is varied in accordance with the field. In this case, by inserting a quarter wavelength plate (not shown) between the pixel shifting unit 7 and the optical low pass filter, the difference in low pass filter characteristic between fields can be reduced, and the sufficient low pass filter characteristic can be obtained.

FIG. 59 shows a color decomposing camera system using three CCDs. In FIG. 59, a CCD drive circuit and a wobbling element drive circuit are omitted. FIG. 59 describes a visible band image pick-up type example of installation of wobbling and polarizer into 3 CCD camera system.

[For Image pickup of infrared-ray]

The image pickup can be performed in only a near infrared band which is originally insensitive to human eyes by utilizing a near infrared band of a semiconductor image pickup device such as a CCD image pickup device. In this case, no infrared cut filter is required.

In this case, in order to perform the image pickup of only an infrared image, a visible cut filter (for cutting wavelength below 760 nm) is required to be inserted between the subject and the CCD. With this construction, an image of a temperature distribution of the subject or the like can be obtained. The image pickup wavelength at this time is over 700 to 1200 nm, and thus the phase difference of the pixel shift unit is required to be half of the above wavelength range, that is, 350 to 600 nm.

Next, another embodiment according to this invention in which a birefringent medium for phase adjustment (phase compensating medium) is used in the embodiments as described above will be described.

According to the following embodiment, by providing a phase compensating medium for rotating the polarization plane in a range of 400 nm to 700 nm by 90 degrees into the device, the cross-talk in both of the switch states can be further reduced, and the resolution can be further improved. Installation example of phase compensating medium FIGS. 60A and 60B show a wobbling element 107 and a liquid crystal optical display device 101 in which a phase compensating medium 100 is installed. FIGS. 60A and 60B describe an example of phase-compensation type wobbling.

In FIG. 60A, the slow axis 108 of the ferroelectric liquid crystal (FLC) device 3 is substantially perpendicular to the slow axis 118 of the phase compensating medium 100 having the substantially same phase difference as the FLC device 3. Therefore, the phase difference occurring in the FLC device 3 can be canceled by the phase compensating medium 100 having the opposite phase as the FLC device 3.

Accordingly, a polarized light 6 from the display picture element 5 is incident to the birefringent medium 4 for optical axis shift without suffering rotation of its polarization plane so as to be apparently in parallel to the extraordinary optical axis whose polarization plane is inclined at an angle of β, whereby the optical axis is shifted.

In FIG. 60B, the slow axis 108 of the FLC device 3 is set to a state 2 in response to a switching operation which is executed by applying an electric field to the FLC device 3. As a result, a new composite slow axis is formed by the slow axis 108 of the FLC device 3 and the slow axis 118 of the phase compensating medium 100 is inclined to the Y-axis by 45 degrees. Accordingly, the polarization plane is rotated by 90 degrees by the composite slow axis, and is kept in parallel to the X-axis. Therefore, the light is incident to the birefringent medium 4 for the optical axis shift so as to be apparently vertical to the extraordinary optical axis 10 whose polarization plane is inclined at β angle, and thus the optical axis is not shifted. FIG. 61A shows the arrangement of the optical axis where the apparent cone angle of the FLC is represented by θ. In this figure, P1 represents the direction of a polarization plane in parallel to the Y-axis, or a polarization axis of a polarizer. P2 represents an axis parallel to the X-axis, and is perpendicular to the extraordinary optical axis 10 in the birefringent medium for optical axis shift, whose polarization plane is inclined at an angle of β. LC1, LC2 represents the slow axis of each switching state of the FLC device 3, and PC represents the slow axis 118 of the phase compensating medium 100.

In this embodiment, the following optical axis arrangement is adopted. That is, the slow axes LC1 and LC2 at the respective switching states of the FLC device are at a line-symmetrical position with respect to the axis of the polarization plane P1 of the incident light. Further, by disposing the slow axis PC of the phase compensating medium substantially vertically to one switching state, for example, LC1, the polarization plane P1 is rotated toward the LC1 axis due to the effect of the LC1 of the FLC device, however, its rotation is canceled by the PC having the substantially same phase difference as the LC1, and returned to the original polarization plane P1. By applying an electric field to the FLC device to perform the switching operation of the FLC device and set the slow axis to LC2, the polarization plane P1 is rotated toward the LC2 axis, and is further rotated toward the axis side of the slow axis PC due to the effect of the slow axis PC of the phase compensating medium, so that the polarization plane P1 is rotated to the position of a polarization plane P2 by the total effect of the FLC device and the phase compensating medium. That is, the composite slow axis (LC2+PC) of the LC2 and the PC is intersected to the P1 just at π/4.

Further, by using the same element as the used FLC device 3 as the phase compensating medium 100, the variation of the cone angle due to variation of temperature or the like can be set off. FIG. 61B is an explanatory diagram for the principle for this. That is, in place of the phase compensating film shown in FIG. 61A, a second FLC device is used. The slow axis of the second FLC for phase compensation is represented by PCLC1, PCLC2.

First, the second FLC is set to PCLC1 by a memory state of the second FLC device or applying a voltage, and the first FLC device is switched to LC1 and LC2 by applying an electric field. Through this operation, the same effect as obtained when the phase compensation film shown in FIG. 61A is obtained. Further, the same wavelength-dependence of birefringence index is usable in the first and second FLCs, and thus the effect of the phase compensation is more excellent.

Figure 4:
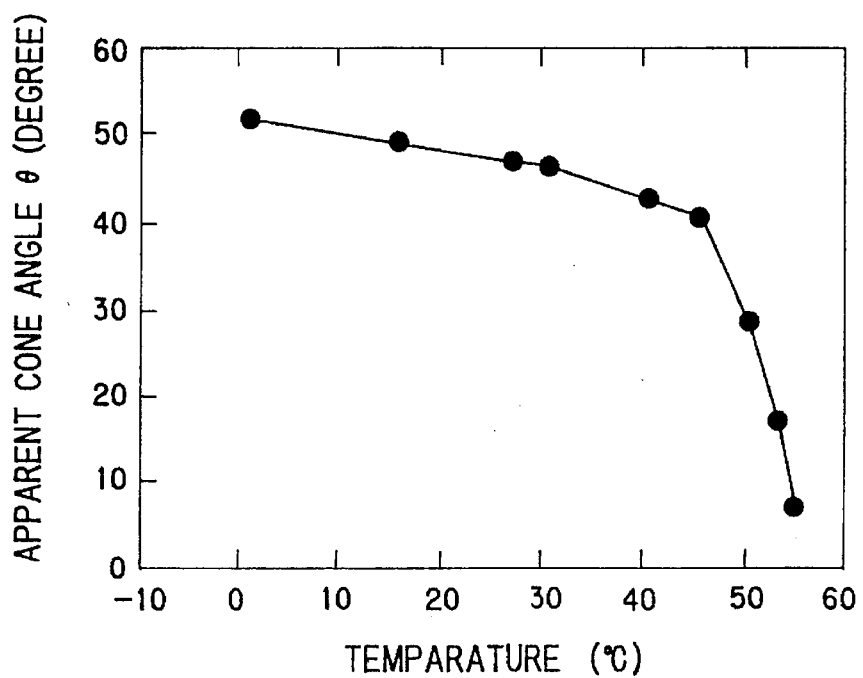
FIG. 4 is a graph showing a temperature-dependence of the cone angle.
Figure 5:
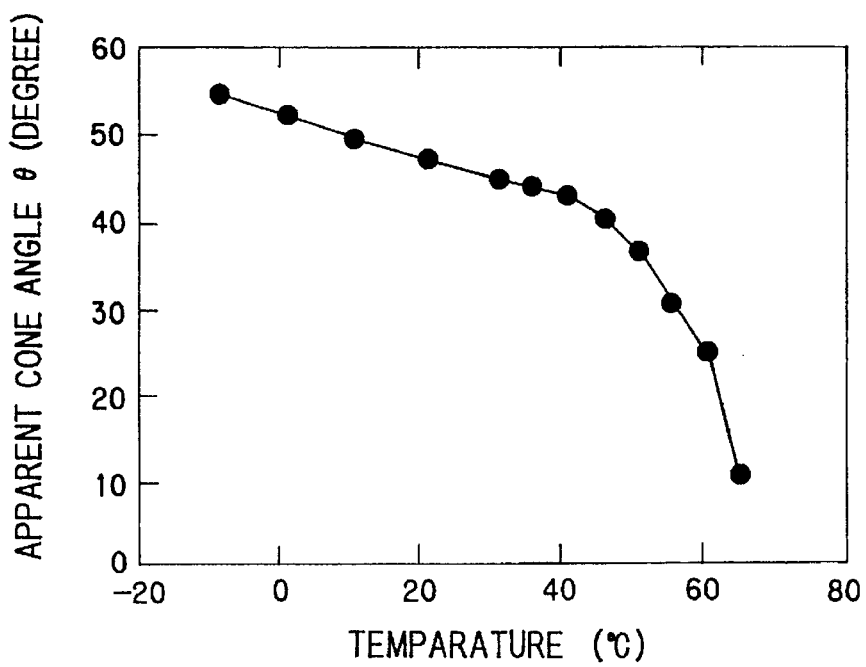
FIG. 5 is a graph showing a temperature-dependence of the cone angle of another liquid crystal.

When the environmental temperature of the device is varied, the apparent cone is varied as shown in FIGS. 4 and 5. In the construction shown in FIG. 61A, any light leakage between odd and even fields at a wobbling time, that is, any cross-talk occurs. However, in FIG. 61B, the same temperature variation occurs in the arrangement of the slow axis of the second FLC device, so that the intersection angle between the LC1 and the PCLC1 is constantly equal to π/2 and the phase difference is canceled. On the other hand, the composite slow axis (LC2+PCLC1) which is formed of the LC2 and the PCLC1 is intersects to P1 and P2 at π/2 at all times. Therefore, the temperature-dependence of the phase difference slightly remains, however, the cross-talk can be reduced.

In this embodiment, a CS-1014 liquid crystal/SiO obliquely deposited antiparallel cell is used. The cell gap is set to 2.1 μm, and the phase difference at 632.8 nm is equal to 263.69 nm. The same optical system for estimating the cross-talk amount as shown in FIG. 8 is used.

In FIG. 61C, the slow axis of (LC2+PC) length represents magnitude of birefringence; and in the slow axis of (LC1+PC) the absolute value of birefringence is small because of cancellation and its direction is insignificant. Also, FIG. 62 shows an optical arrangement without phase compensation.

Figure 62:
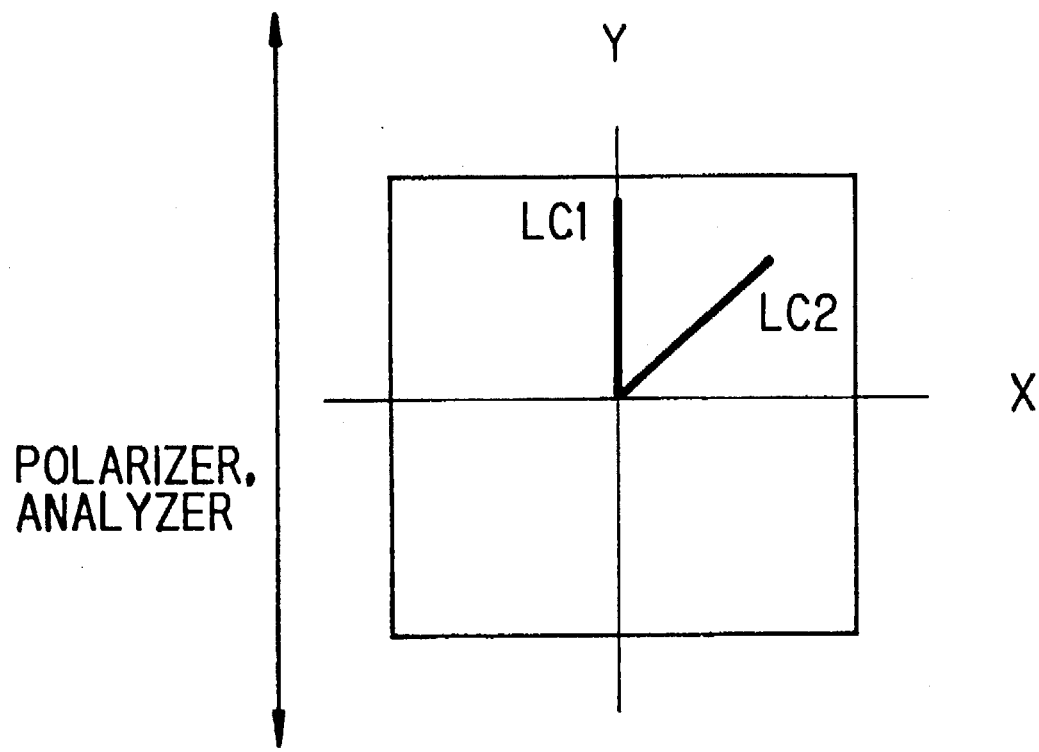
FIG. 62 is a schematic diagram of an optical arrangement when no phase compensation is made in the display device.
Figure 63A:
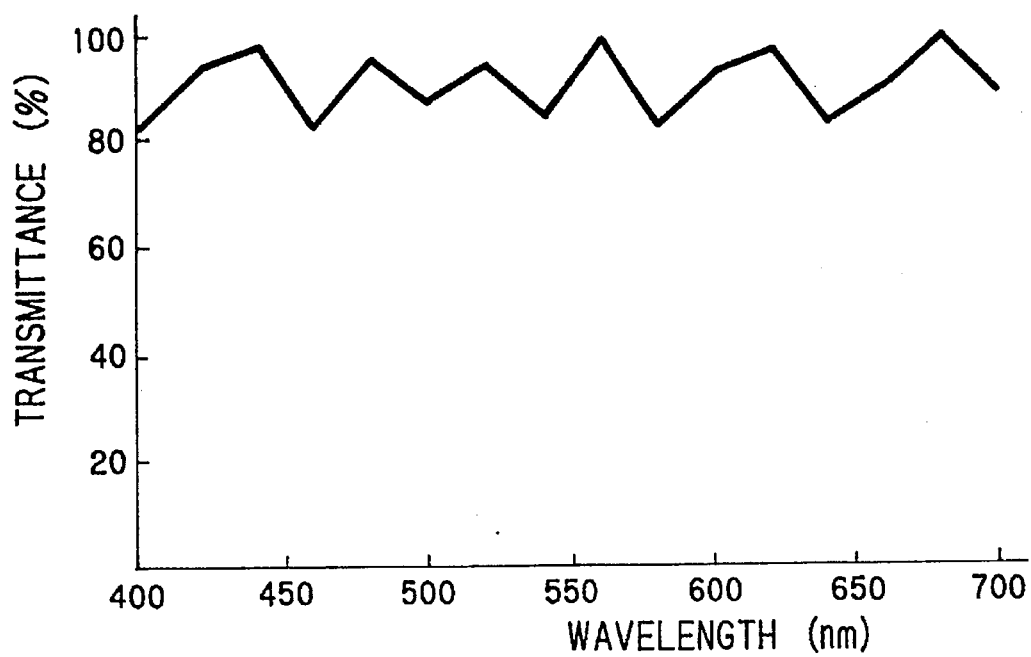
FIGS. 63A and 63B are transmittance spectra at each state in the optical arrangement.
Figure 63B:
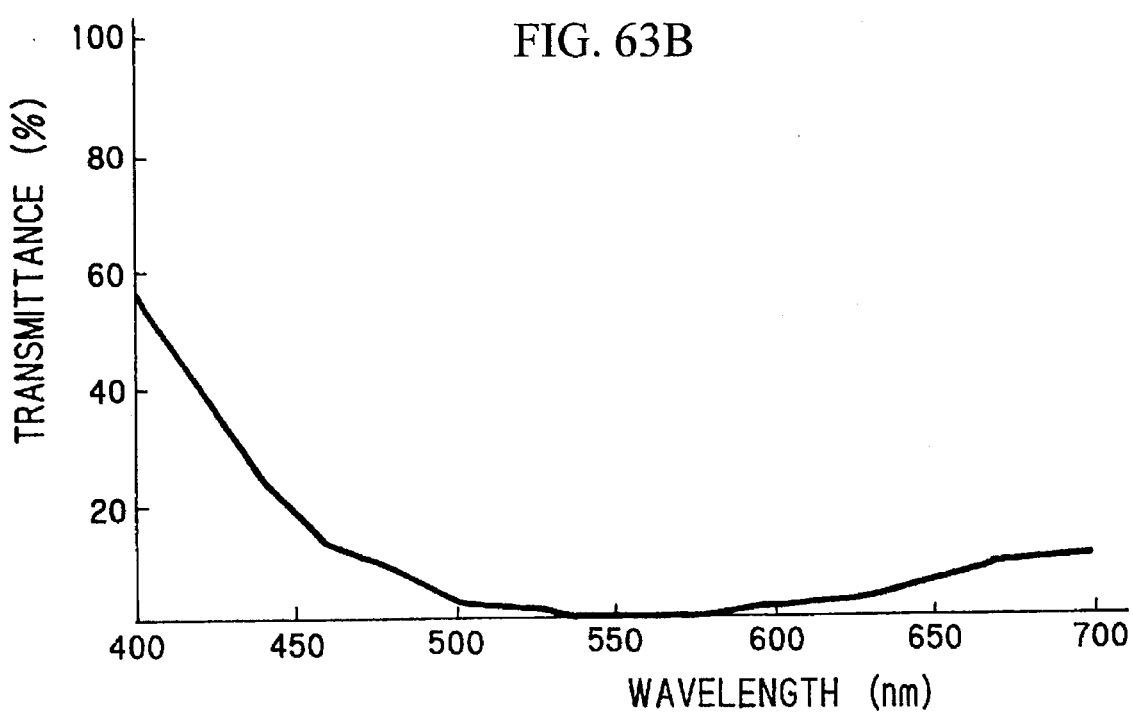

FIG. 63A and 63B show a spectral diagram obtained when the FLC device is disposed as shown in FIG. 62 and the switching operation is conducted by applying an electric field. The transmittance spectra of switch state LC1 and LC2 shown in FIGS. 63A and 63B are in optical arrangement without phase compensation. In this arrangement, the polarization light from the polarizer is transmitted through the analyzer without suffering rotation of its polarization plane in the LC1 state. On the other hand, in the LC 2 state, the polarization light from the analyzer suffers the rotation of its polarization plane, and absorbed by the analyzer in accordance with the rotational amount thereof, so that the intensity of the transmission light is varied. In this case, a component of about 550 nm wavelength suffers rotation of its polarization plane by just 90 degrees.

Figure 64:
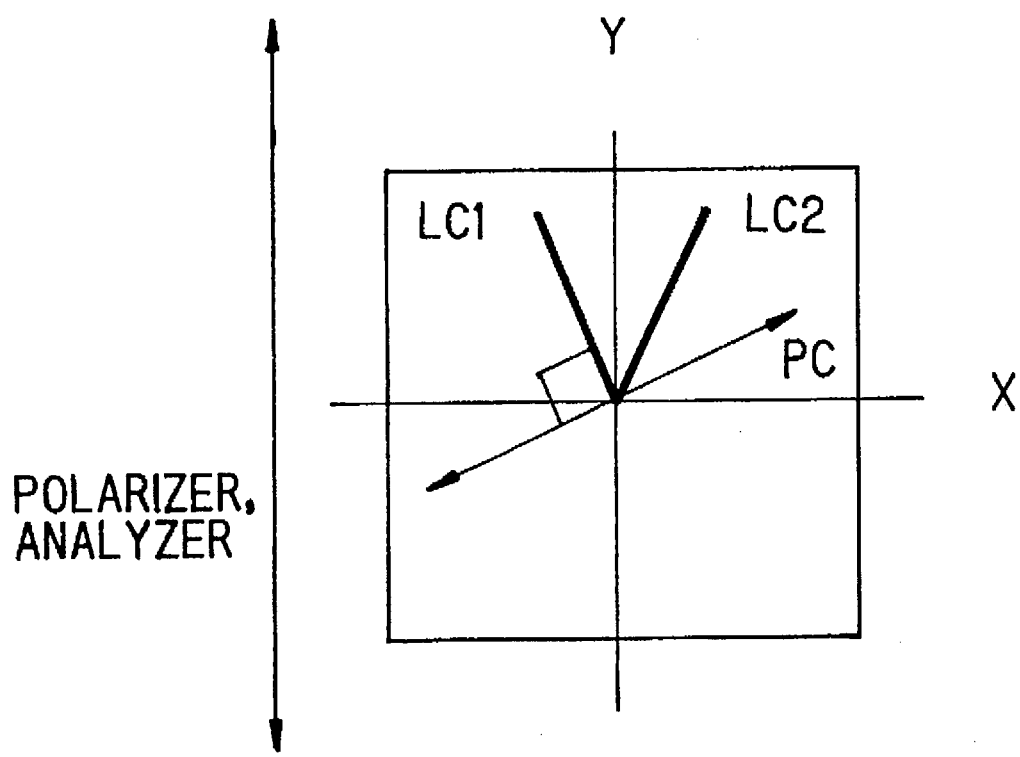
FIG. 64 is a schematic diagram of an optical arrangement when the phase compensation is made in the display device.

In order to further improve this characteristic, the phase compensation film 100 as shown in FIGS. 60A and 60B is disposed. The optical system for a measurement system is arranged as shown in FIG. 64. FIG. 64 shows a phase compensated optical arrangement. FIGS. 65A and 65B are spectral diagrams obtained by the optical system. FIGS. 65A and 65B describe in phase-compensated optical arrangements. According to this diagram, in the LC1 switching state, the polarization plane is not rotated because the phase difference is canceled by the PC, and thus the light can be transmitted through the analyzer in the substantially whole wavelength range of 450 to 700 nm. On the other hand, in the LC2 switching state, the polarization plane is rotated by 90 degrees and the light is absorbed by the analyzer because the polarization plane thereof is perpendicular to the analyzer. Therefore, the transmission probability of the light is substantially equal to zero.

The resolution improvement using the phase-compensated wobbling element as described above was experimentally considered.

The experiment result when no phase compensation was made is shown in the following table 9. According to this table 9, the effect of the resolution improvement can be visually confirmed, and it provides high resolution of 390 lines at maximum, and there is any color change of a frame due to variation of the gap.

TABLE 9

(PHASE DIFFERENCE EFFECT ACTING ON PIXEL SHIFTING EFFECT)

| C.G (μm) | P.D (nm) | R.I.E | C.F |
|---|---|---|---|
| 1.02 | 102.50 | Unrecognizable | Large |
| 1.32 | 136.59 | Slight | Large |
| 1.70 | 166.40 | Present | Present |
| 1.83 | 210.40 | Present | No |
| 1.84 | 210.40 | Present | No |
| 2.04 | 256.97 | Present | No |
| 2.06 | 244.39 | Present | No |
| 2.10 | 259.30 | Present | No |
| 2.10 | 263.69 | Present | No |
| 2.10 | 249.91 | Present | No |
| 2.23 | 284.52 | Present | No |
| 2.41 | 302.49 | Present | Present |
| 2.51 | 303.34 | Present | Present |
| 2.52 | 306.36 | Present | Present |
| 2.75 | 323.29 | Present | Present |
| 2.81 | 340.20 | Present | Present |
| 2.86 | 345.76 | Present | Present |
| 3.02 | 364.52 | Slight | Large |
| 3.24 | 397.20 | No | Large |

C.G.: cell gap, P.D.: phase difference, R.I.E.: resolution improving effect, C.F.: color change of frame On the other hand, the phase compensation film 100 having the same phase difference as the FLC device, in this case, polycarbonate film (produced by Nitto Denko K.K., for example) was used. For a device having 2.1 μm gap, a phase compensation film of 260 nm was used.

The experiment result is shown in the following table 10. According to the table 10, it is apparent that the color change of the frame is reduced, and a gap range for providing high resolution is broadened. In addition, the cross-talk due to the shift of the optical axis between the first and second fields is reduced, and the contrast of each field is improved. Therefore, the resolution is more improved than when no phase compensation is made. The resolution is improved to 450 to 480 TVlines.

TABLE 10

(PHASE DIFFERENCE EFFECT ACTING ON PIXEL SHIFTING EFFECT)

| C.G (μm) | P.D (nm) | R.I.E | C.F |
|---|---|---|---|
| 1.02 | 102.50 | Unrecognizable | Present |
| 1.32 | 136.59 | Slight | Slight |
| 1.70 | 166.40 | Present | No |
| 1.83 | 210.40 | Present | No |
| 1.84 | 210.40 | Present | No |
| 2.04 | 256.97 | Present | No |
| 2.06 | 244.39 | Present | No |
| 2.10 | 259.30 | Present | No |
| 2.10 | 263.69 | Present | No |
| 2.10 | 249.91 | Present | No |
| 2.23 | 284.52 | Present | No |
| 2.41 | 302.49 | Present | No |
| 2.51 | 303.34 | Present | No |
| 2.52 | 306.36 | Present | No |
| 2.75 | 323.29 | Present | No |
| 2.81 | 340.20 | Present | No |
| 2.86 | 345.76 | Present | No |
| 3.02 | 364.52 | Present | No |
| 3.24 | 397.20 | Slight | Slight |

C.G: cell gap, P.D.: phase difference, R.I.E.: resolution improving effect, C.F.: color change of frame This result shows that by conducting the phase compensation on the wobbling element, the resolution can be improved without color change when the phase difference of the FLC device which is measured using a light source of 632.8 nm is in the range of 160 to 380 nm. That is, this result shows that any element having the same phase difference as the FLC device in the range of 160 to 380 nm may be selected as the phase compensation film to be combined with the FLC device.

As described above, through the phase compensation, the cross-talk between the fields at the wobbling time can be reduced, and the contrast ratio between the fields can be improved, so that the resolution can be more improved.

Through the phase compensation, in the switching state LC1, the phase difference is canceled by the PC as shown in FIG. 61C, so that the magnitude of the birefringence is small and the direction of the slow axis is insignificant. However, in the switching state LC2, there occurs a composite slow axis at the position of (LC2+PC) which is intersected to P1, P2 by 45 degrees, however, the composite slow axis (LC2+ PC) is deviated from 45 degrees in accordance with variation of the cone angle due to shift of the aligning treatment direction and temperature variation. This shift is too intensive to neglect the birefringence, and thus the same consideration as described above was made.

Representing by $\delta 1$ an intersection angle at which a bisector between P1 or P2 and the slow axis of one switching state after phase compensation, which provides a larger absolute value of birefringence, of the two switching states of the liquid crystal of the phase-compensated phase-modulating optical unit, is intersected to the polarization plane (P1) of light from the display device or the line (P2) perpendicular to the polarization plane (P2), as a result of consideration on the $\delta$-axis position in the range of $\theta=36$ to 54 degrees, it became clear that no color change occurred in the range of $\delta 1 = 22.5 \pm 10$ degrees, the cross-talk between the fields was reduced and the contrast ratio between the fields was improved, so that the resolution was more improved.

In place of polycarbonate, the following no colored and transparent polymer film such as aromatic polyester may be used as the phase compensation film. Usable phase compensation film material:

polystyrene resin, copolymer of styrene-maleic anhydride, AS resin (copolymer of acrylonitrile-styrene); methacrylic resin; vinyl acetate resin, copolymer of ethylene-vinyl acetate; cellulose-based plastics, particularly cellulose acetate (Cell-OCOCH$_3$), cellulose propionate acetate (Cell-OCOCH$_3$, —OCOC$_2$H$_5$), cellulose acetate-butylate (Cell-OCOCH$_3$, —OCOC$_3$H$_7$), polyamide resin which is represented by nylon; polycarbonate; denatured polyphenylene ether; thermoplastic polyester resin (PET:polyethylene terephthalate, PBT:polybutylene terephthalate, PCT:polycyclohexane terephthalate, PBN:polybutylene naphthalate ); polyphenylene sulfide (polythioether sulfone, polythioether ketone, polysulfide sulfone, polysulfide sulfone ketone); polysulfone; amorphous polyallylate; polyether sulfone; polyether imide; polyether ketone; polyamide imide; polyimide, aromatic polyester group containing a π-electron system in main-chain type of polymer liquid crystals; and side-chain type of polymer liquid crystals in which liquid crystal is introduced into a side chain of acrylate group, for example.

The common point of these materials is that a phenyl group, that is, the structure of a π-electron system is contained in a molecular structure, and with this chemical structure, the wavelength-dependence of refractive index of ordinary and extraordinary lights is similar to that of the FLC device, and thus it is preferable to the phase compensation in a broad wavelength range. That is, by using polymer material containing the π-electron system, the cross-talk which is an integrated amount in the used wavelength range between the fields at the wobbling time can be more suppressed than the wobbling element having no phase compensation.

The slow axis of these phase compensation films is determined by a method of positively promoting the molecular orientation with a drawing treatment (inflation method, roll drawing method, etc.) in a film forming process (extrusion in a melt state or extrusion into a spinning bath in a solution state), or a drawing treatment (roll drawing method or the like) after the film formation. That is, when electrons are liable to move in parallel to molecular chains (polycarbonate, aromatic polyester or the like), the molecule orientation axis substantially corresponds to the slow axis. On the other hand, when electrons are liable to move vertically to molecular chains (polystyrene), the slow axis is substantially vertical to the molecule orientation axis.

Further, TAC (triacetyl cellulose) is usually attached to a polarizer as a protection film. In this case, no improvement in cross-talk is made because of no phase difference. For the wobbling operation, a phase compensation plate satisfying the above characteristic must be further provided to the polarizer.

Even if the phase compensation film 100 is disposed between the display device 2 and the FLC device 3 as shown by an imaginary line of FIGS. 60A and 60B, the same effect as described above is obtained. Alternately, the phase compensation film 100 may be provided between the FLC device 3 and the birefringent medium 4, and between the display device 2 and the FLC device 3. In this case, variability of the phase adjustment is expected to be improved.

Figure 66A:
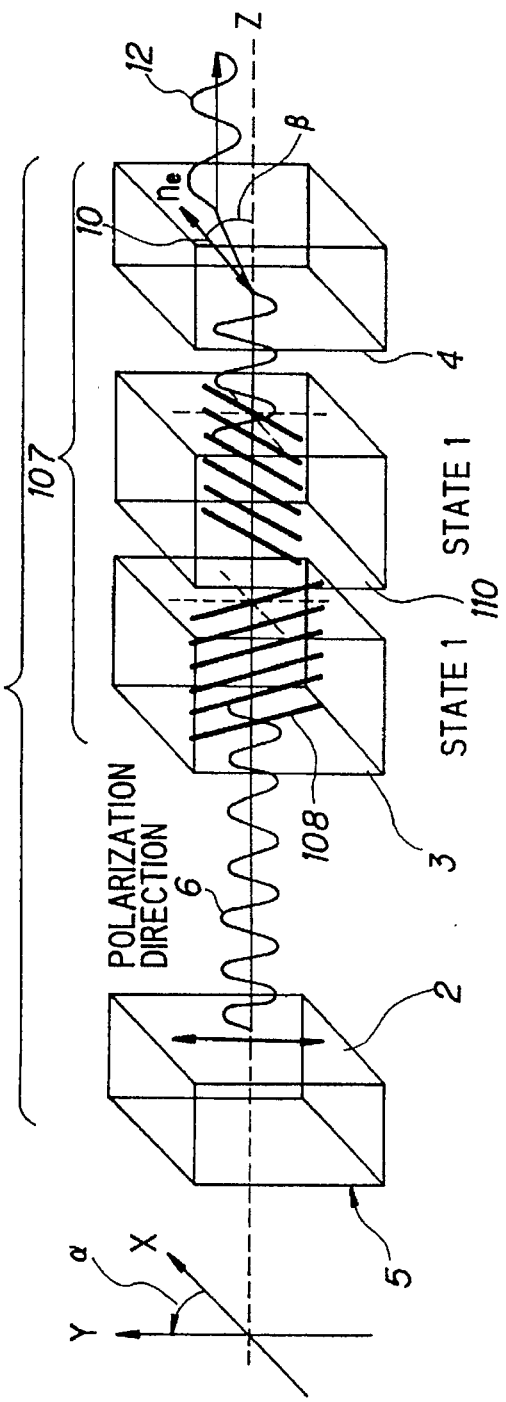
FIGS. 66A and 66B are a schematic view of another embodiment of the display device at each switch state.
Figure 66B:
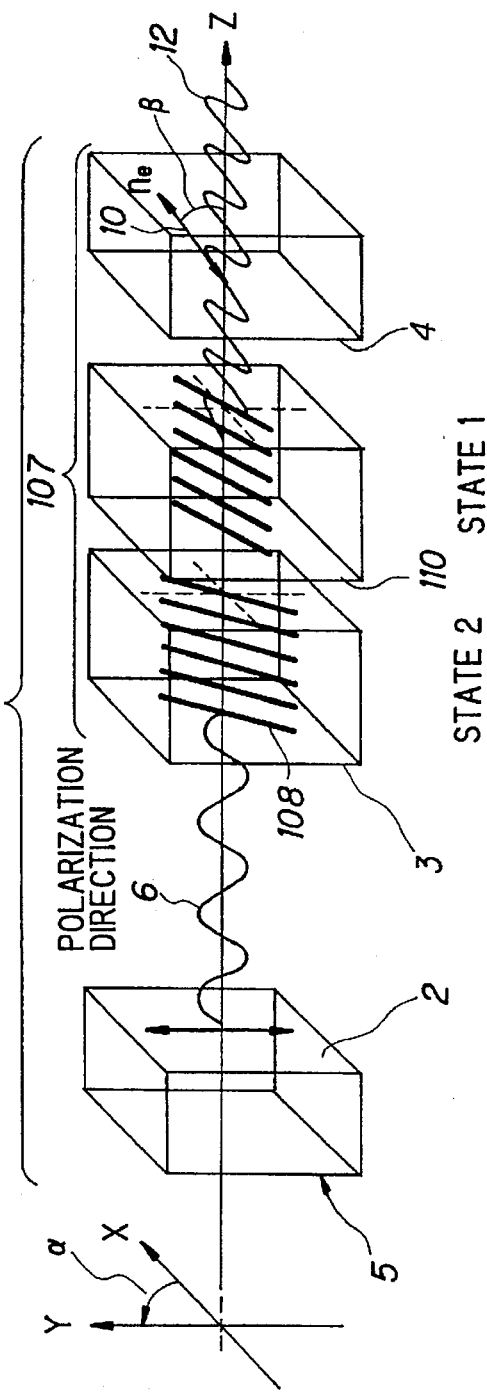
Figure 67A:
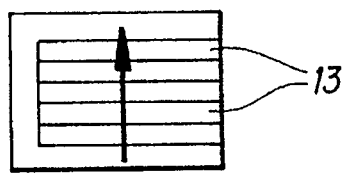
FIGS. 67A–67F are plan views of a substrate showing the directions of various kinds of orientation treatments of the display device.
Figure 67B:
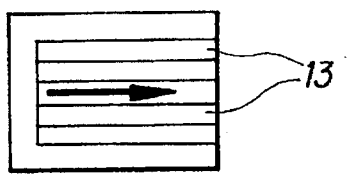
Figure 67C:
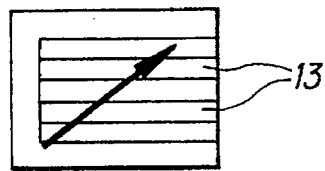
Figure 67D:
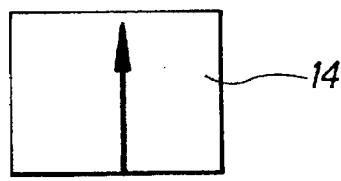
Figure 67E:
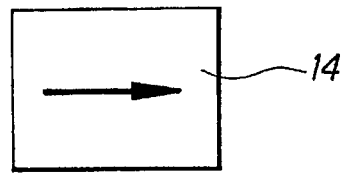
Figure 67F:
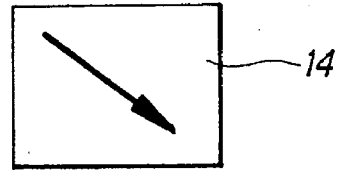

FIGS. 66A and 66B show an embodiment in which the FLC device 3 is combined with a phase compensation FLC device 110 to perform the phase compensation. FIGS. 66A and 66B show example 2 of phase-compensation type wobbling.

In this embodiment, as the combined phase compensation FLC device 110 was used an element having the same specification as the switching FLC device 3. Further, the same optical axis arrangement as shown in FIG. 61B was adopted. In order to keep the state 1 of the phase compensation FLC device 110, the memory state of the FLC or the voltage supply state can be utilized.

Considering the temperature-dependence of the cone angle of the CS-1014 liquid crystal shown in FIG. 4, it was apparent that the cone angle moderately varied in the temperature range of 0° C. to 45° C., and sharply varied at a temperature above 45° C. Accordingly, by confirming it with a projector system shown in FIG. 79 as described later, the environmental temperature of the FLC device was about 23° C. at an initial state, and reached about 45° C. after three minutes. Further, considering the outside temperature at 30° C., the environmental temperature of the FLC reached 50° C.

When a polycarbonate film was used as a phase compensation medium, it was confirmed that the resolution was improved from 240 TVlines of an original liquid crystal display device to 450–480 TV lines until the environmental temperature of the FLC device reached 45° C. However, the resolution was improved to about 370–380 TVlines at the environmental temperature of 50° C. On the other hand, when the FLC device 110 having the same specification as the FLC switch device was combined as the phase compensating medium, it was confirmed that the resolution was improved from 240 TVlines of the original liquid crystal display device to 450–480 TVlines until the environmental temperature of the FLC device reached 45° C. Further, the resolution was improved to about 400–430 TVlines at the environmental temperature of 50° C. That is, it was confirmed that the reduction in resolution due to temperature variation could be suppressed.

The same effect as described above could be obtained by disposing the phase compensating FLC device 110 between the display device 2 and the switching FLC device 3.

In the above embodiment, the phase compensation medium 100 or 110 is disposed in front of or behind the FLC device 3. In the following embodiment, the phase compensation films are simultaneously in front of and behind the FLC device 3.

The phase compensation films were formed of polycarbonate film, and disposed so that the sum of the phase differences of these films were substantially equal to that of the FLC device with keeping the optical axes thereof. In this embodiment, the FLC device had a gap interval of 2.1 μm, and the polycarbonate films had the phase differences of 100 nm and 160 nm, respectively. With this construction, the resolution was improved to 450–480 TV lines whose resolution was the same level as a case where one phase compensation film was used.

In addition, a phase compensation system used for a liquid crystal display device, particularly an STN (Super Twisted Nematic) liquid crystal display device may be applied. In this system, as described in "Handbook of Liquid Crystal Display Manufacturing Technique", pp36–37 issued by Science Forum K.K. (supervised by Rhuji Shimada), a phase compensation plate is laminated on a STN liquid crystal panel which is sandwiched between glass substrates, and then this laminated plate is also sandwiched between polarizers, whereby the color change of the frame which is a disadvantage of the STN system is suppressed. A large number of phase compensation plates may be used in some cases because lamination of phase compensation films having different optical axis directions makes the display device more accurate.

With respect to the lamination of plural phase compensation films, as described in "Handbook of Liquid Crystal Display Manufacturing Technique", pp184–185 issued by Science Forum K.K. (supervised by Rhuji Shimada), the birefringence ($\Delta n$) of the phase difference film is generally dependent on the wavelength $\lambda$ as shown in the following equation:

$$\Delta n(\lambda) = A + B/(\lambda^2 - \lambda_o^2)$$

(A, B represents constants, and $\lambda_o$ represents the wavelength of absorption edge)

This wavelength dependence of the birefringence varies in accordance with the material of the film, and thus the wavelength dispersion characteristic of the lamination of many phase compensation films can be controlled by combining different kinds of materials (for example, polycarbonate and polypropylene, or polycarbonate and polyvinyl alcohol, etc.) and adjusting a lamination angle of slow axes. This method is the phase compensation technique which has been used in the conventional STN.

By applying this technique to the phase compensation medium in the wobbling element according to this invention, the wavelength dependence of the birefringence of the phase compensation film can be matched to the wavelength dependence of the birefringence of the liquid crystal material used in the wobbling element, whereby the cross-talk of the wobbling element can be reduced.

In the above embodiment, the display device has polarization. However, this invention is also applicable to a display device having no polarization.

That is, for a plasma display, an LED display or the like (that is, when polarization degree of light from a display picture element is small), a polarizer may be inserted into an optical path between the display device and the pixel deviating unit to polarize the light. The same optical arrangement condition as the liquid crystal display device may be used.

Next, the liquid crystal device into which the phase compensation medium as described above is installed will be described in more detail.

Driving method when phase compensation is made

The driving waveform shown in FIG. 39 may be used, however, in this case a driving waveform shown in FIG. 70 was used. A polyimide alignment film JALS-1524 produced by Nippon Synthetic Rubber was used as an alignment film in a wobbling cell.

The polyimide alignment film was formed as follows. A polyimide solution was coated using a spin cast method or a gravure printing method and then baked to obtain an alignment film of 80 nm thickness. As described below, the rubbing direction is different from a case where no phase compensation is made.

That is, in FIGS. 67A–67F, the top surface is at the polyimide alignment film side, however, the alignment treatment direction as indicated by an arrow is in parallel or vertical to the pixel shift direction when the pixel shift is made in a horizontal or vertical direction to the pixel shift direction. When the pixel shift is made in an oblique direction, the alignment treatment direction is preferably in parallel to the diagonal direction of the frame. FIGS. 67A–67F show direction of various kinds of orientation treatments.

Figure 68A:
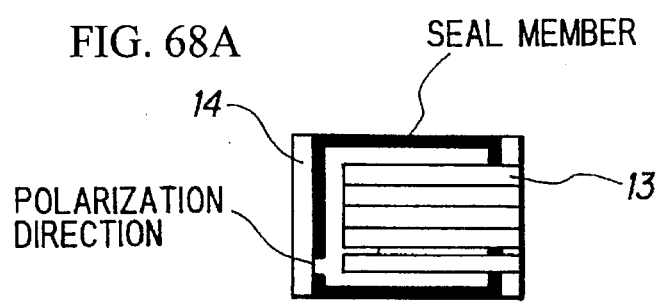
FIGS. 68A–68C are plan views showing a status when a liquid crystal cell is fabricated in the display device.
Figure 68B:
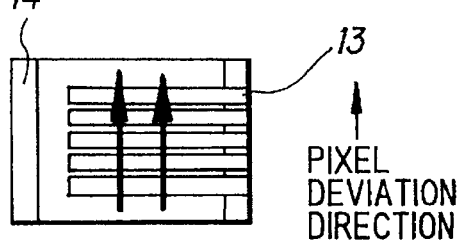
Figure 68C:
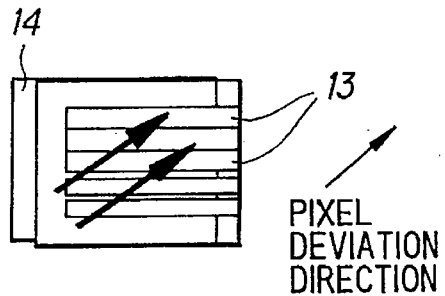

Further, the cell fabrication direction was set so that the rubbing treatment direction was in parallel or antiparallel to the pixel shift direction at the alignment film side, and a gap was set to about 2 μm using a spacer-dispersed seal member. FIG. 68A shows a cell fabricating method; and FIGS. 68B and C show pixel deviation direction and orientation treatment direction after cell fabrication. FIG. 68A shows a state where upper and lower substrates are jointed to each other to fabricate a cell, and FIGS. 68B and 68C show the relationship between the alignment treatment direction and the pixel deviating direction on the upper and lower substrates. In this case, the alignment direction after the cell fabrication was parallel to the pixel shift direction, however, it may be in antiparallel to the pixel shift direction.

The experimental consideration was made to a case where the pixel shift direction was vertical in the cell having both substrates disposed to face each other in parallel to each other. a phase compensation film produced by Nitto Denko K.K. (phase difference at 632.5 nm wavelength is 260 nm) was attached onto the cell upper surface with an adhesive member so that the extraordinary optical axis thereof is set to be vertical to the switching state of the ferroelectric liquid crystal director.

FIG. 69A shows a method of improving resolution in vertical direction of display device; and FIG. 69B shows the method of improving resolution in vertical and horizontal direction of display device.

Further, this cell was combined with a TN liquid crystal display device 2 as shown in FIGS. 69A and 69B, and the improvement of resolution was confirmed. FIGS. 69A and 69B also show a case where the pixel shift was made in an oblique direction.

FIGS. 70A–70E show an example of an used driving waveform of divisional FLC device. This driving waveform is effective to a twisting operation at a memory time in the ferroelectric liquid crystal display device. Particularly, it is effectively used when the memory characteristic of the FLC is weak, or the rotation effect of the polarization plane cannot be sufficiently obtained due to the twist of the liquid crystal alignment at the memory time.

That is, the driving waveform comprises the repetition of at least two positive pulses and at least two negative pulses subsequent to the positive pulses, and the absolute value of a first pulse of the same polarity pulses is set to be larger than that of a second pulse, so that the response speed can be increased by the first pulse and the apparent cone angle can be adjusted by the second pulse. Therefore, the device according to this invention can be driven with a lower voltage than the conventional device, the electrochemical stability of the liquid crystal can be improved, and the deterioration with time can be prevented. Further, since the apparent cone angle can be adjusted to 45±5 degrees, the lowering of the wobbling effect an be controlled.

When the improvement of resolution was studied for the 5-divisional FLC device in consideration of the drive condition, optical arrangement and the pixel shift amount as described above, the resolution can be improved from 240 TVlines to 450 TVlines or more over the whole surface of the panel in an active matrix TN liquid crystal display of 0.7 inch size and 103000 picture elements, and further the black matrix serving as the non-display portion becomes unremarkable, so that a high-resolution and smooth frame (picture) can be obtained.

FIGS. 71 to 74 show various examples of the arrangement of the phase compensation wobbling unit and the attachment position of the phase compensation film 100.

Figure 71:
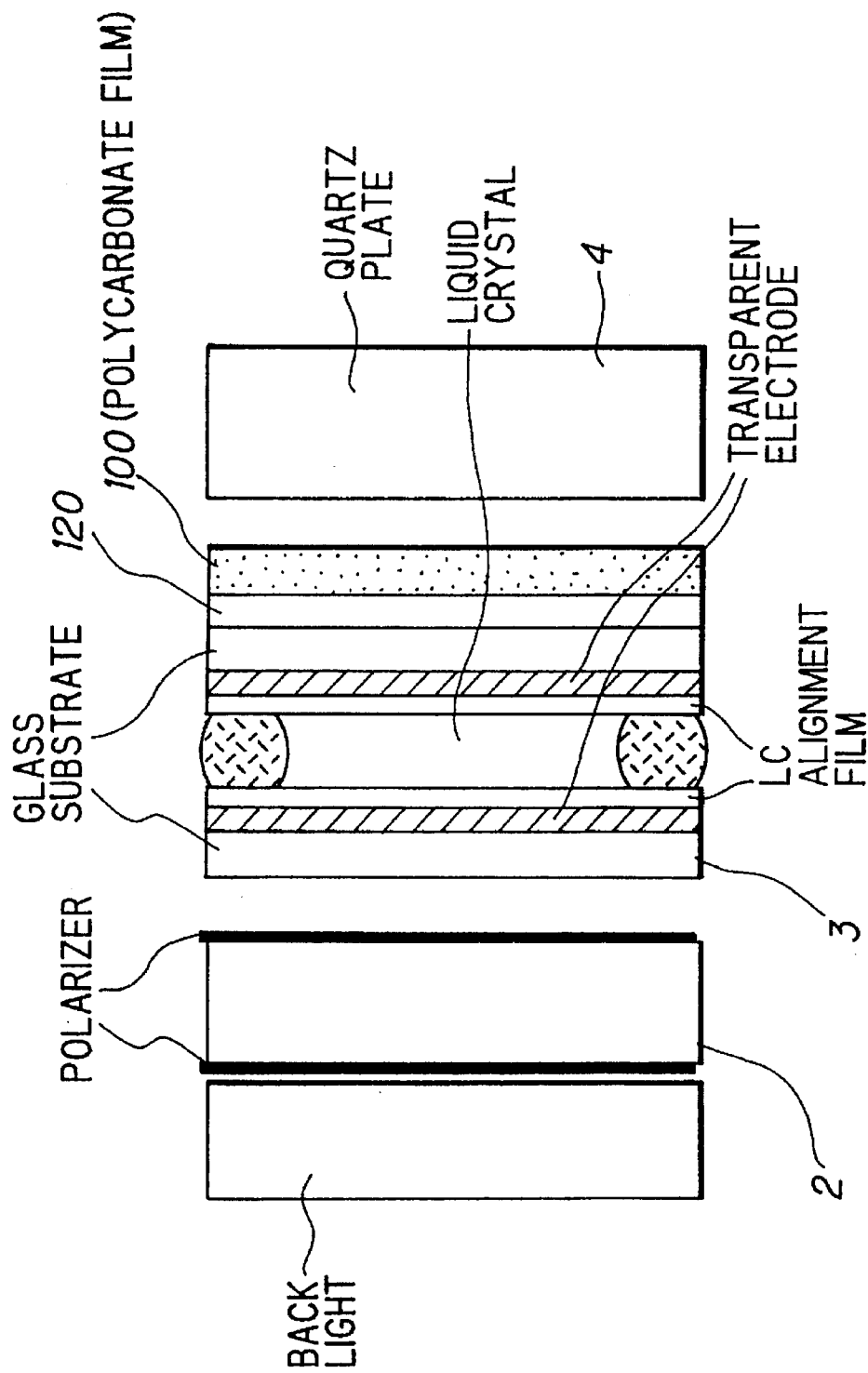
FIG. 71 is a cross-sectional view showing a structure of the display device.
Figure 72:
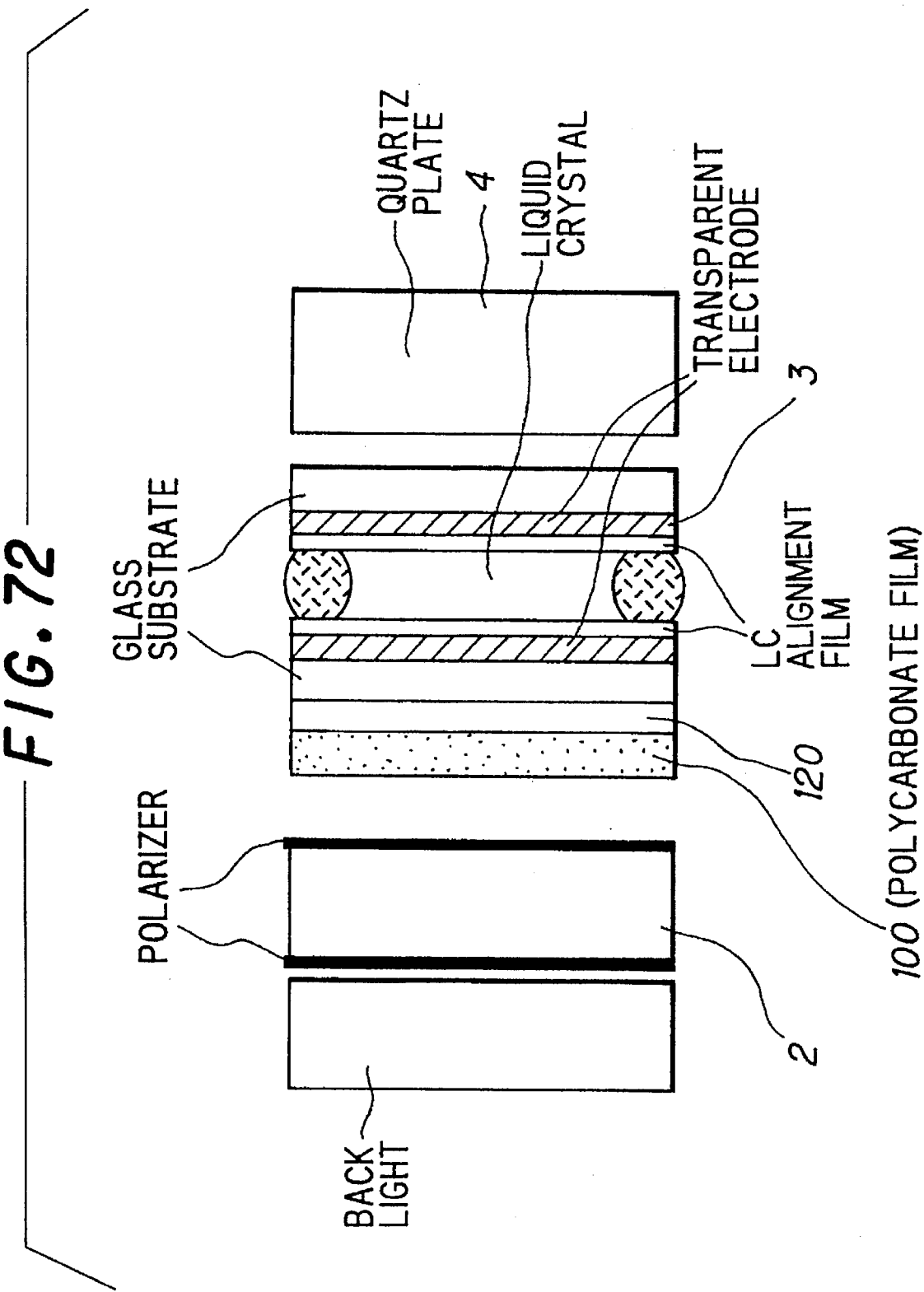
FIG. 72 is a cross-sectional view of another structure of the display device.
Figure 73:
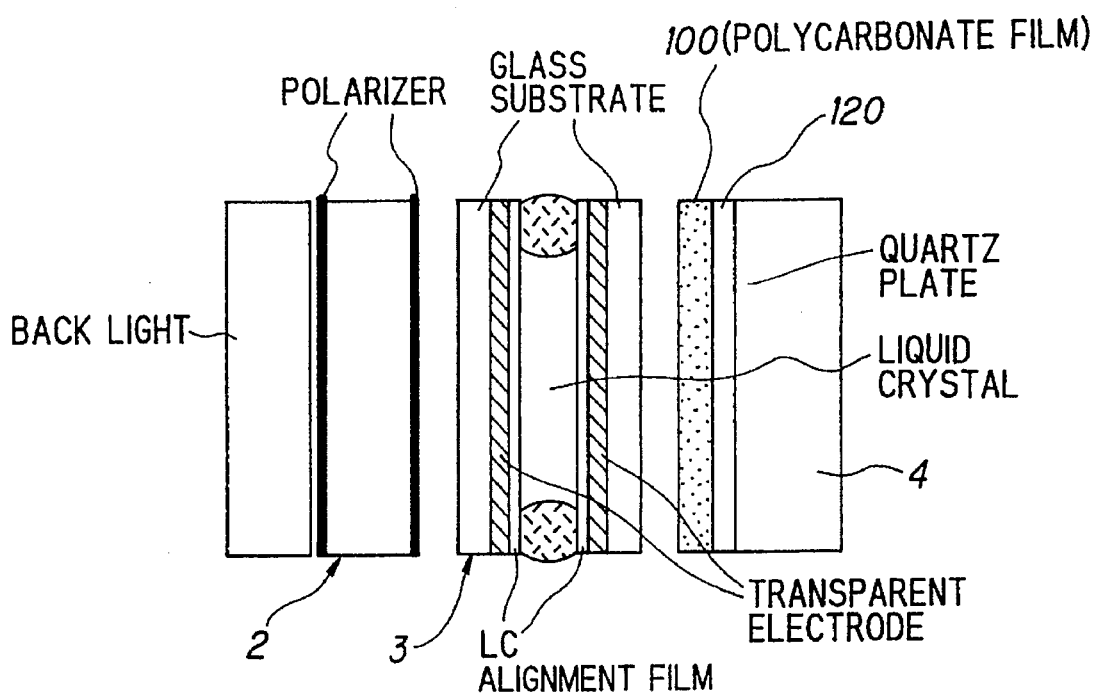
FIG. 73 is a cross-sectional view of another structure of the display device.
Figure 74:
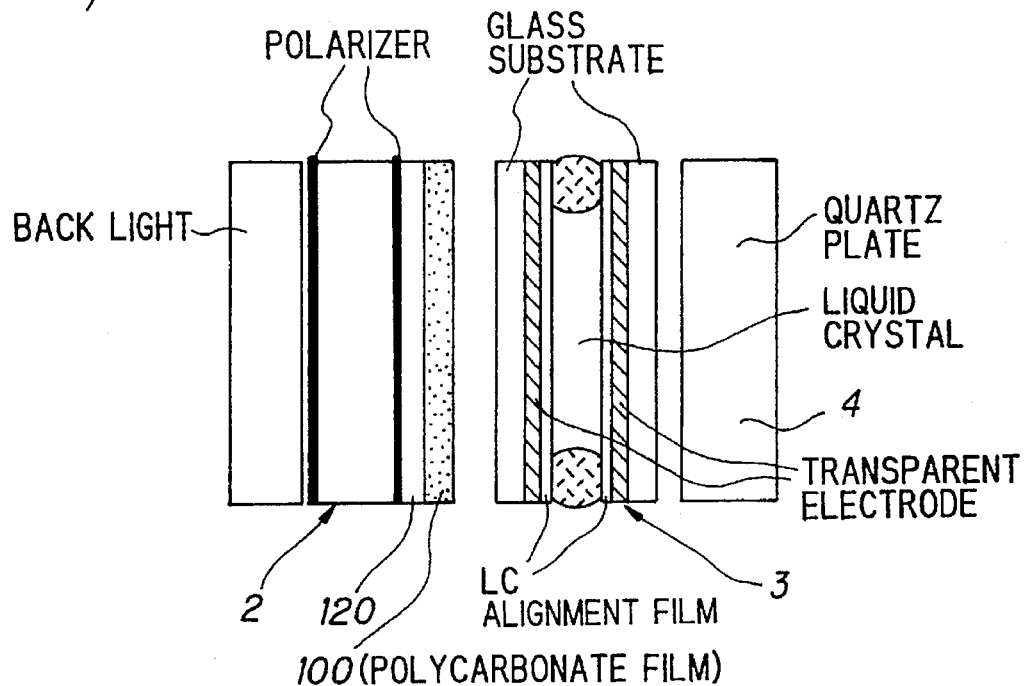
FIG. 74 is a cross-sectional view of another structure of the display device.

FIG. 71 describes an arrangement of phase-compensated wobbling element, when phase-compensation film is attached at a position between FLC device and quartz plate. FIG. 72 describes an arrangement of phase-compensated wobbling element, when phase-compensation film is attached between FLC device and display device. FIG. 73 describes when phase-compensation medium is attached at birefringement plate such as quartz plate. FIG. 74 describes when phase-compensation medium is attached at polarizer at TN LC display device side.

FIG. 71 shows an example when the phase compensation film 100 is attached between the ferroelectric liquid crystal device 3 and the quartz plate 4 through an adhesive member 120, and FIG. 72 shows an example when the phase compensation film 100 is attached between the ferroelectric liquid crystal device 3 and the display device 2 through the adhesive member 120. As described above, the attachment position of the phase compensation film 100 is effectively used in any case where the it is disposed in front of or behind an electro-optical element of smectic liquid crystal (for example, FLC device 3).

With respect to the attachment position of the phase compensation film 100, the smectic liquid crystal electro-optical element may be directly attached to the birefringent medium such as the quartz plate 4 or the like or the display device 2 as shown in FIGS. 73 and 74 in place of the FLC device side because the alignment of the liquid crystal is generally liable to be disturbed at the attachment time of the phase compensation film. In this case, no disturbance of the alignment of the liquid crystal occurs, and the performance and yield can be improved. Further, the phase compensation film may be attached onto the upper surface of the polarizer of the TN liquid crystal display device.

Figure 75:
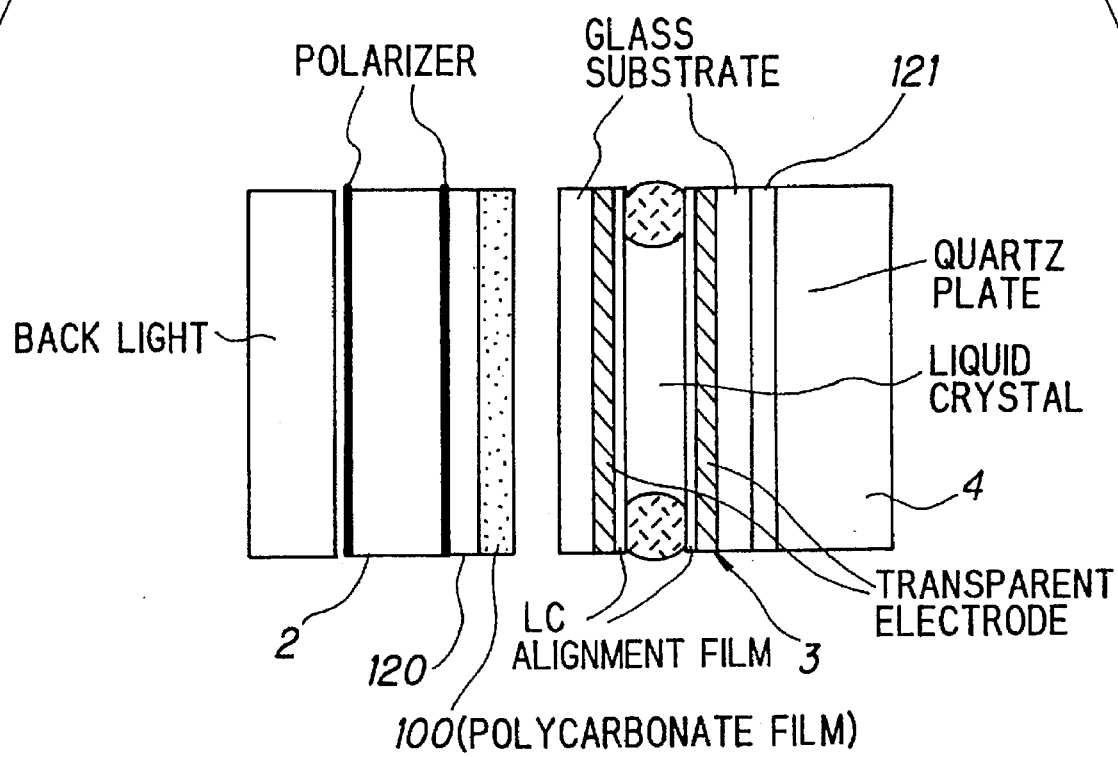
FIG. 75 is a cross-sectional view of another structure of the display device.
Figure 76:
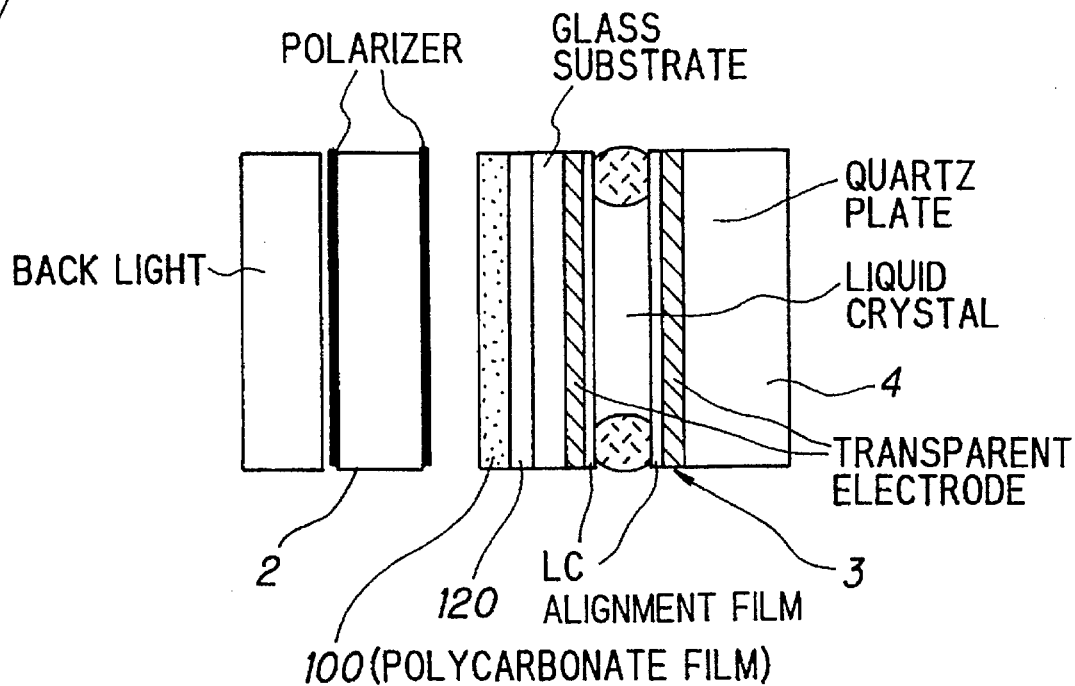
FIG. 76 is a cross-sectional view of another structure of the display device.

Further, in order to improve the transmittance of the wobbling unit, as shown in FIG. 75, the birefringent medium (quartz plate 4) and the electro-optical element 3 may be attached to each other with an optical adhesive agent 121 having refractive index near to the refractive indexes of the birefringent medium 4 and the glass substrate. With this structure, reflection at the interface of air/quartz plate can be reduced, and the transmittance can be improved. Other improvements on structure:

In the above example, the chiral smectic liquid crystal device 3 is formed with a transparent glass substrate. In order to reduce cost, volume (size) and weight, the following modification as shown in FIG. 76 may be made: the transparent substrate is replaced by the quartz plate 4, a transparent electrode and an alignment film are provided to the quartz plate, and it is unified to the chiral smectic liquid crystal device 3. In addition, the reflection can be suppressed and the transmittance of light can be improved by alignment of refractive indexes.

Figure 77:
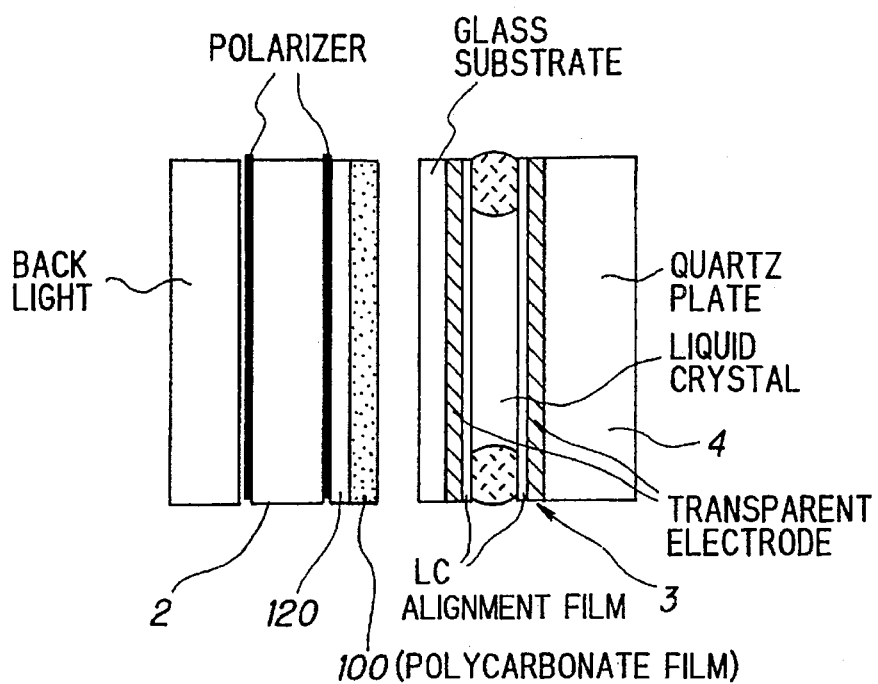
FIG. 77 is a cross-sectional view of another structure of the display device.

FIG. 77 shows an example where the transparent substrate is replaced by the quartz plate 4 like FIG. 76, and the phase compensation medium 100 is attached to the polarizer plate at the TN liquid crystal display device 2 side.

The resolution improving technique as described above is also applicable to any type of display device, such as the direct vision type as shown in FIG. 69, the projection type as shown in FIGS. 78 to 82, etc. FIGS. 78 to 82 correspond to FIGS. 45 to 47 respectively, except that the phase compensation medium 100 is provided at a prescribed position, and the same operating principle is basically used.

Figure 78:
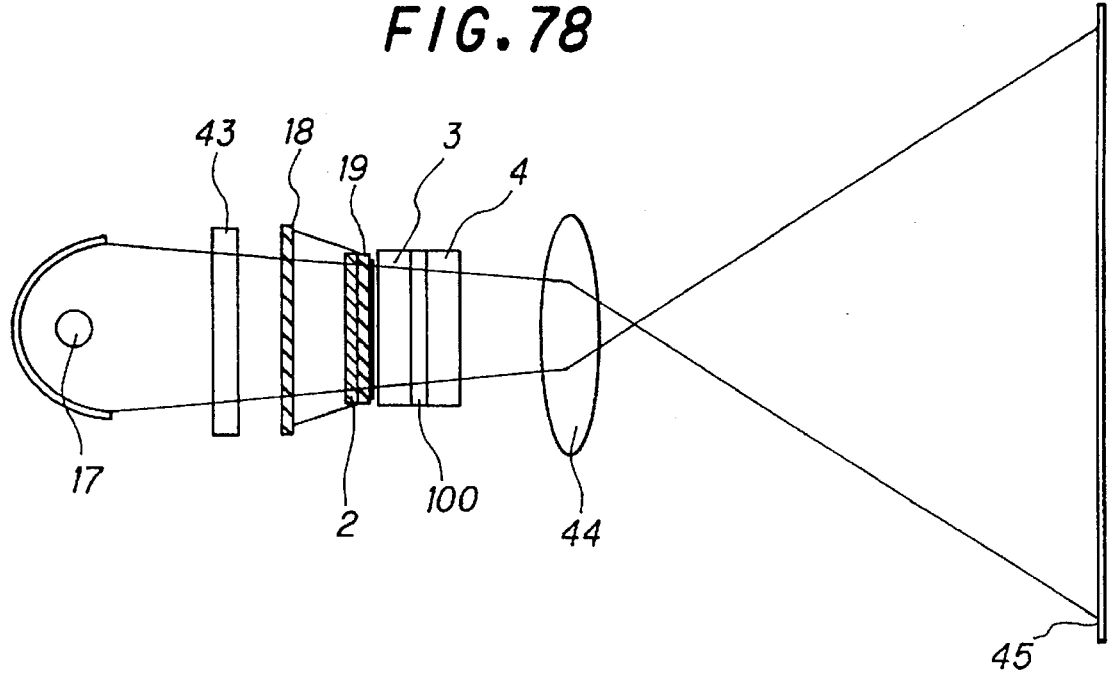
FIG. 78 is a cross-sectional view of another structure of the display device.
Figure 79:
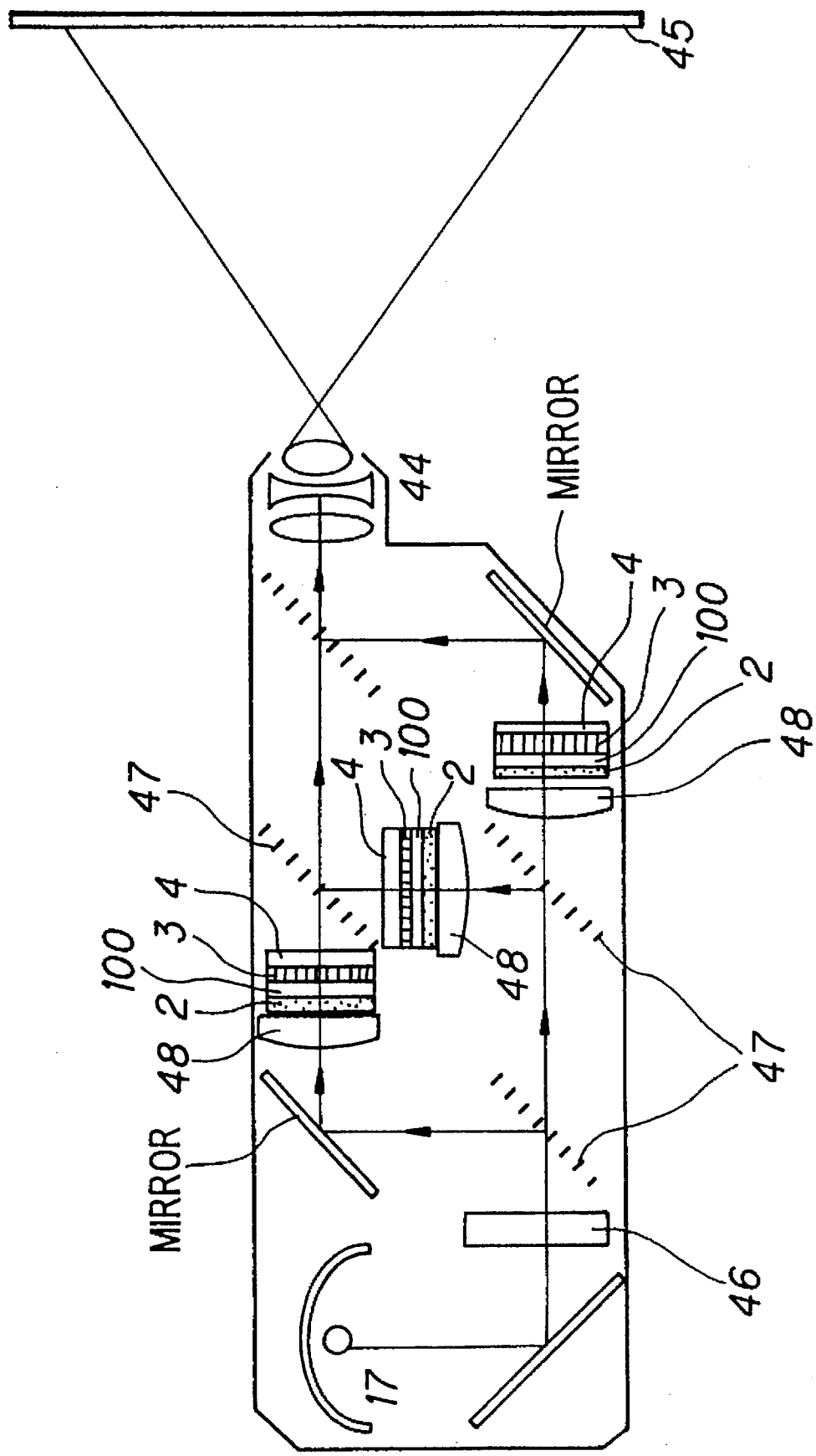
FIG. 79 is a cross-sectional view of an applied example to a display.
Figure 80:
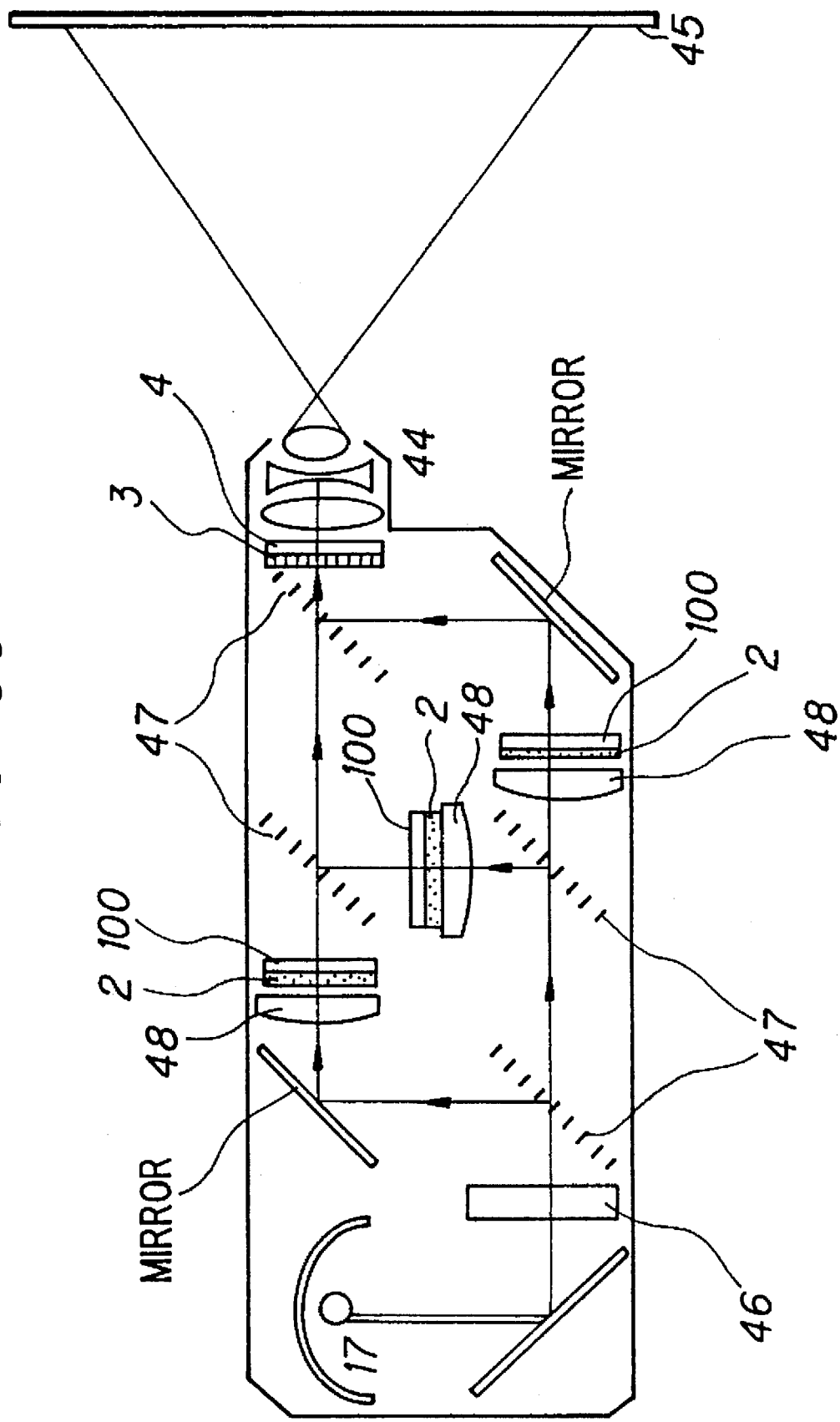
FIG. 80 is a cross-sectional view of another applied example of a display.
Figure 81:
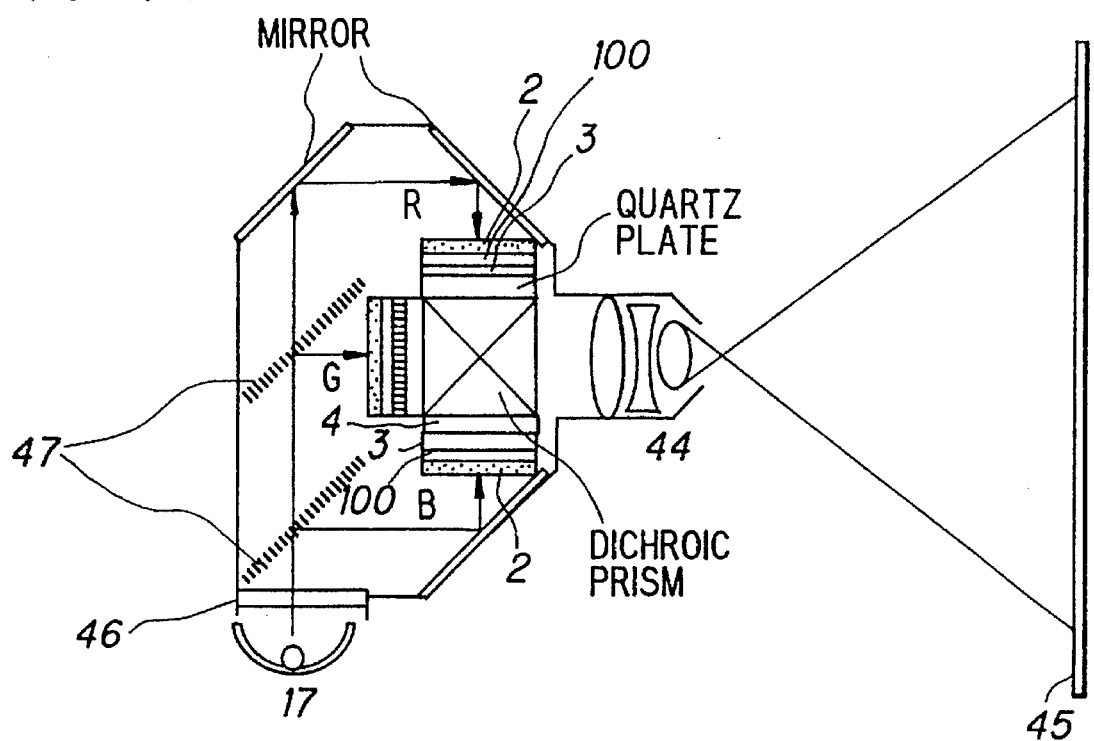
FIG. 81 is a cross-sectional view of another applied example of a display.
Figure 82:
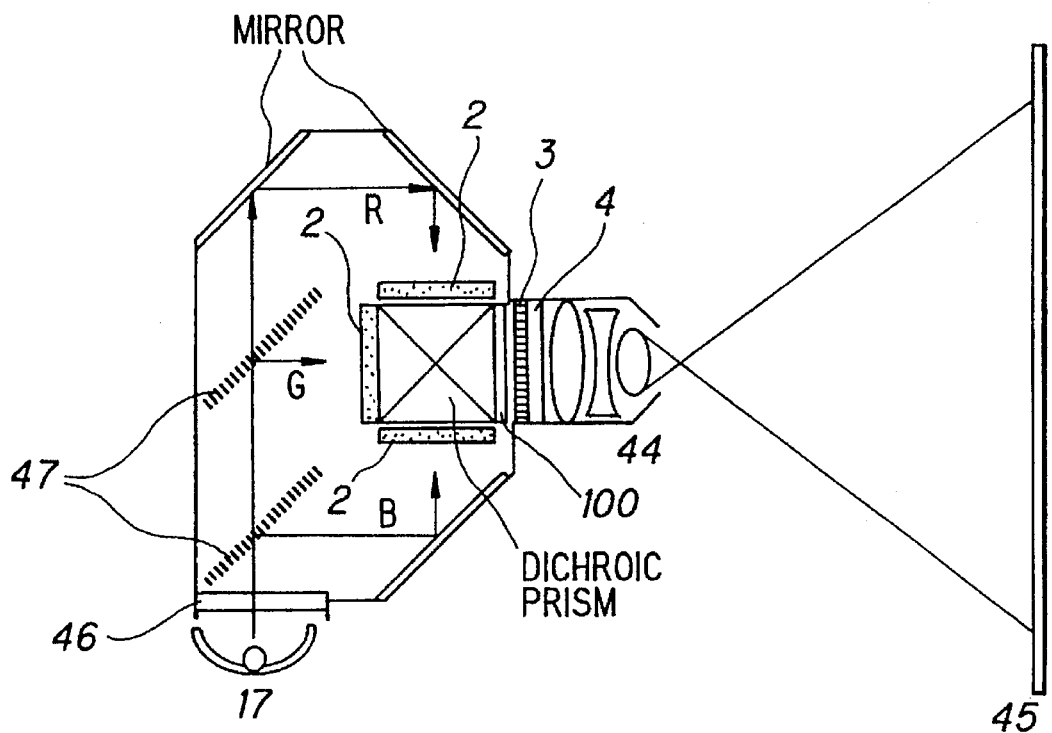
FIG. 82 is a cross-sectional view of another applied example to a display.

FIG. 78 describes an example of single-plate type of display. FIG. 79 describes an arrangement for a case where phase-compensation film is attached to dichroic prism, an example of triple-plate projection display (mirror-type: arrangement where wobbling element is secured to each LC display panel). FIG. 80 describes an example of triple-plate projection type of display (mirror type: arrangement where wobbling element is disposed in front of projection lens, and phase-compensation film is secured to each LC display panel). FIG. 81 is an example of triple-plate display (prism type: arrangement where wobbling element is secured to each 1c display panel). FIG. 82 is an example of triple-plate projection type of display (prism type: arrangement where wobbling element is disposed in front of projection lens, and phase-compensation film is attached to dichroic prism).

Application to image pick-up device

The phase compensation effect as described above may be applied to the imager (image pick-up device) as described above. In this embodiment, an used FLC device having an electrode which is not divided into plural parts was used. This is because an imaging (image pick-up) operation is conducted at the same time and thus no time shift is required. When a polycarbonate film was used as the phase compensation medium, the optical axis shift could be accurately shifted in a broad wavelength range, and the resolution improving effect could be improved.

Figure 86:
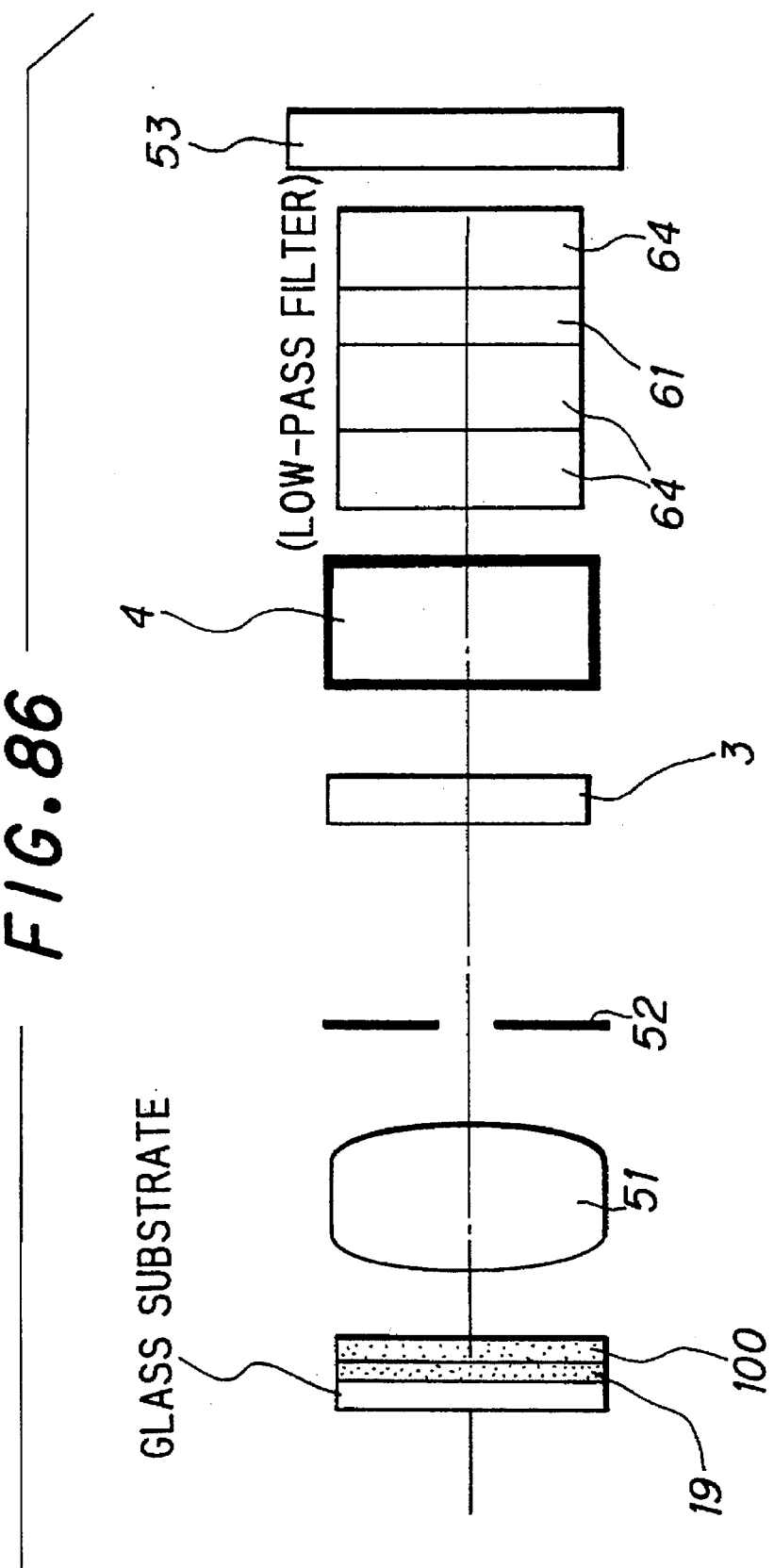
FIG. 86 is a cross-sectional view of another structure of the image pick-up device.
Figure 87:
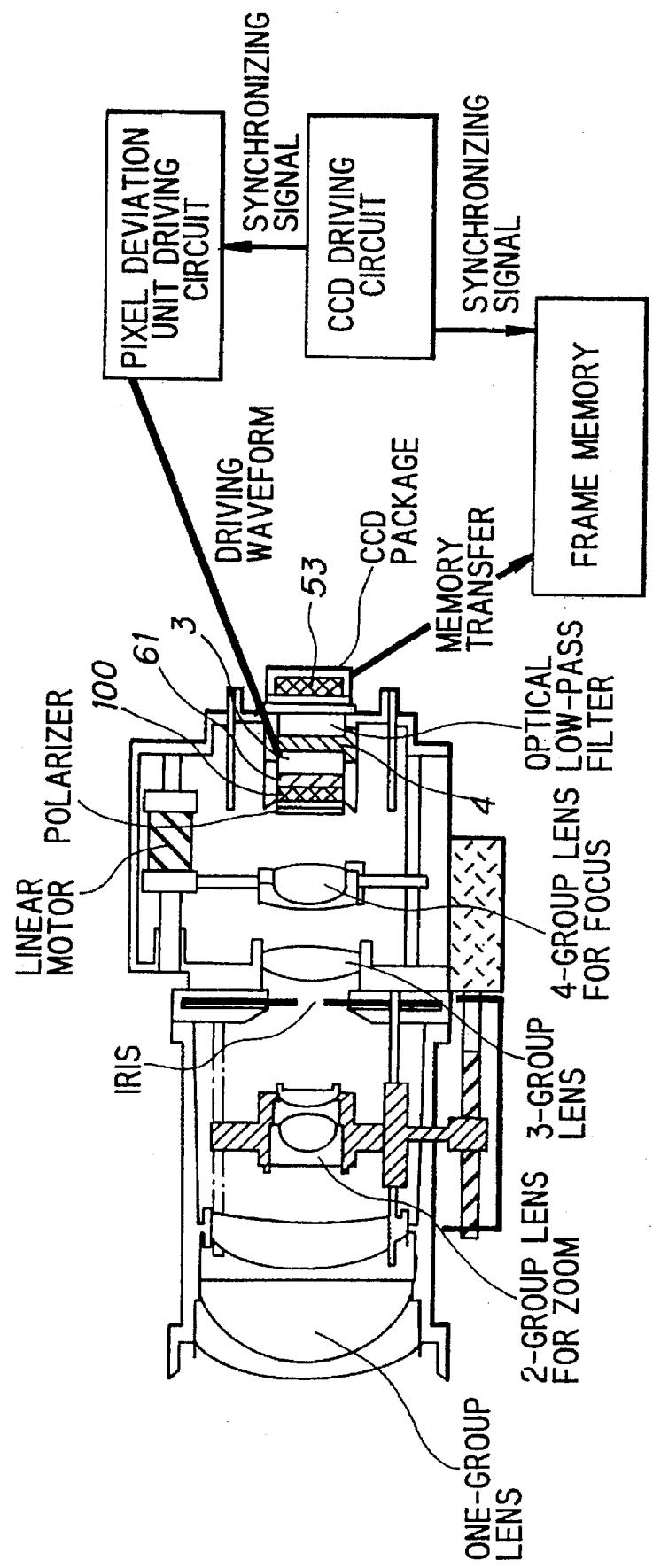
FIG. 87 is a cross-sectional view of an installation example of the image pick-up device.

Specific installation examples are shown in FIGS. 83 to 88. FIG. 84 describes when phase-compensation film is disposed between FLC device and birefringement medium for optical axis shift. FIG. 85 describes when polarizer-phase compensation film are disposed between FLC device and lens. FIG. 86 describes when polarizer and phase-compensation film are disposed between lens and subject. FIG. 87 describes an installation example of wobbling element into HANDY CAM SONY TR-1[⅓' CCD]. In all cases, the resolution could be improved by the effective pixel shift. FIG. 87 shows an installation example where the phase compensation was applied to a Handycam TR1 of Sony. These figures correspond to FIGS. 53 to 59, except that the phase compensation medium 100 is provided to a prescribed position, and the same operating principle is basically used.

In the imager as described above, anisotropy of birefringent index $\Delta=n_e-n_o=0.0091$ of a low-pass filter using a quartz plate was used to remove moire fringes, color dummy signals, etc. of a CCD image pick-up device. However, when an incident light to the low-pass filter is a linearly polarized light, the effect of the low-pass filter is reduced.

Accordingly, a quarter wavelength plate 130 is disposed between the birefringent medium 4 for optical axis shift and the low-pass filter. The reason for this resides in that when the quarter-wave plate is disposed so that the slow axis thereof is intersected to each polarized light from the birefringent medium at about 45 degrees, the linearly polarized light is converted to a circularly polarized light, and thus the effect of the low-pass filter can be sufficiently obtained.

Figure 88:
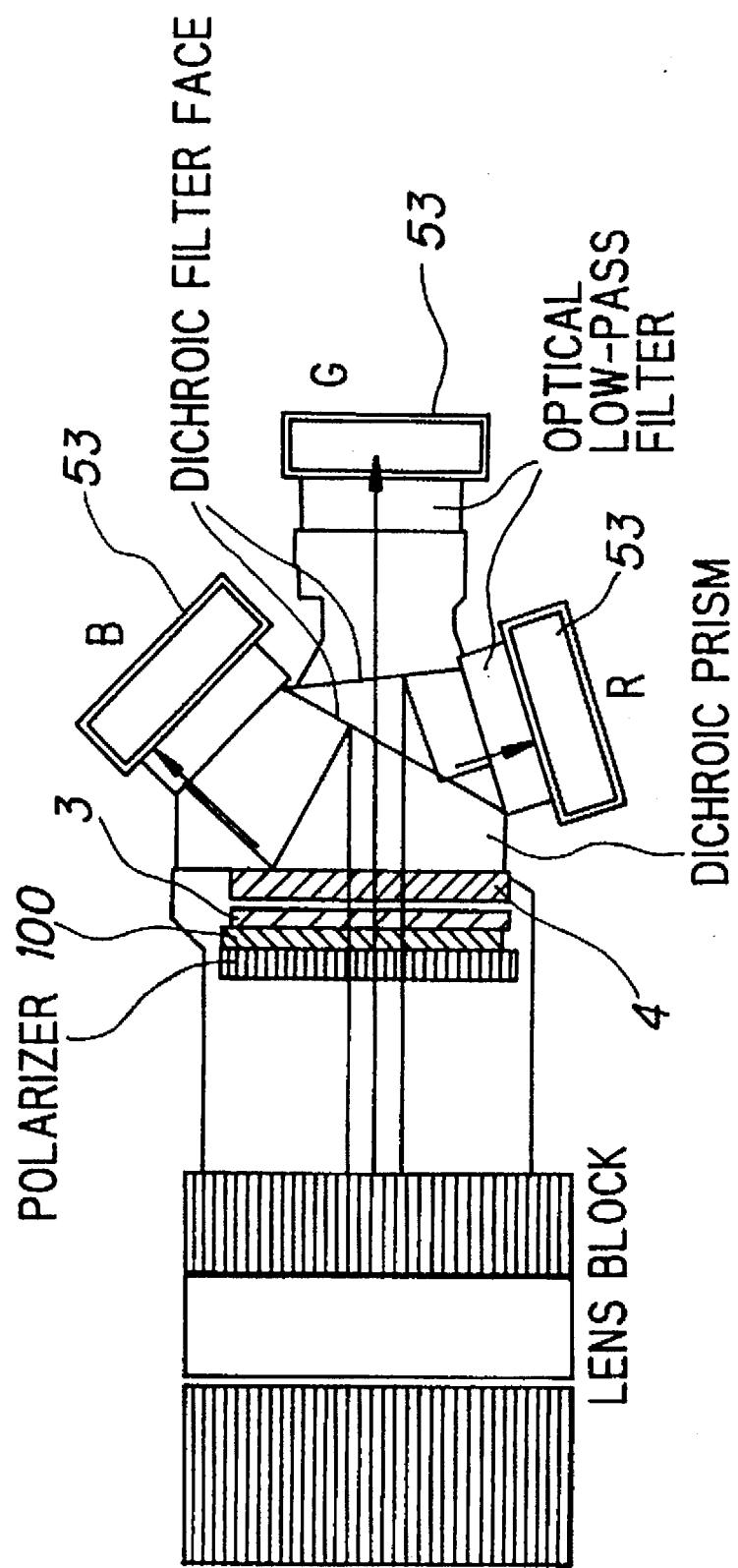
FIG. 88 is a side view of another installation example of the image pick-up device.

FIG. 88 describes installation example of wobbling element and polarizer into 3 CCD camera system (illustration of CCD driving circuit, wobbling element and polarizer are omitted).

Figure 89A:
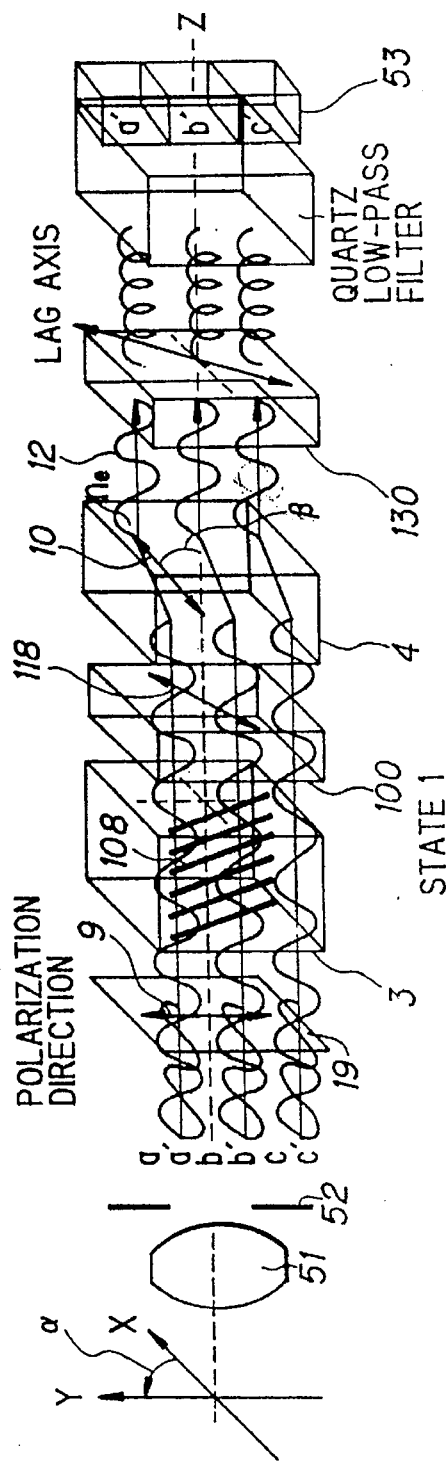
FIGS. 89A and 89B are a schematic view of another embodiment of the image pick-up device according to this invention.
Figure 89B:
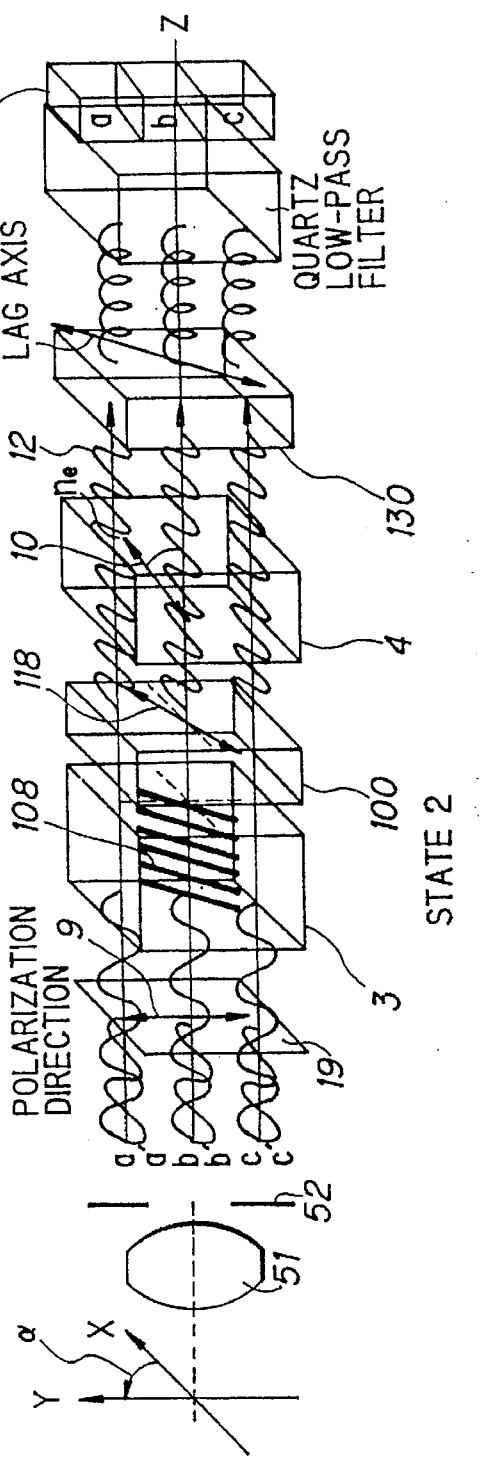

For example, in the case shown in FIG. 89A, the polarized light 12 which emits from the birefringent medium 4 for optical axis shift and is in parallel to the Y-axis is converted to a left-handed circularly-polarized light rotating toward the slow axis when passing through the quarter wavelength plate 130, and then enters the quartz low-pass filter. On the other hand, in the case shown in FIG. 89B, the polarized light 12 which emits from the birefringent medium for optical axis shift and is in parallel to the X-axis is converted to a right-handed circularly-polarized light rotating toward the slow axis when passing through the quarter plate 130, and then enters the quartz low-pass filter. The light suffers no polarization effect in the quartz low-pass filter, and the optical low-pass filter effect is effectively used. As a result, the image pick-up operation can be performed for an image with high resolution and with reducing the moire fringes, the color dummy signals, etc.

Various modifications may be made to the embodiments as described above on the basis of the technical idea of this invention.

For example, various modifications may be made to the liquid crystal device, the structure, material and shape of the used elements, the fabrication method, etc. The substrate is not necessary formed of a glass plate, but it may be formed of any optically transparent material.

This invention is applicable to not only optical systems such as display devices and image pickup devices as described above, but also wobbling elements which can be installed into the system.

As described above, the optical device according to this invention comprises a phase modulating optical unit in which at least one material selected from the group consisting of ferroelectric liquid crystal (FLC), antiferroelectric crystal (AFLC) and smectic liquid crystal (SmA) having electrical inclination effect is injected into a gap between substrates, and an optically transparent birefringent medium. The polarization of incident light is varied by the phase modulating optical unit to deviate the polarization plane of the light, and the incident light is selectively refracted by the birefringent medium, so that the wobbling operation can be effectively performed for discretely-arranged picture elements, and both of resolution and image quality can be improved.

Further, in all liquid crystals such as ferroelectric liquid crystal, etc. which are used for the phase modulating optical unit, the direction of the liquid crystal director is liable to be varied in accordance with action of electric field, and thus these liquid crystals have high-speed responsibility. Therefore, the driving at a video rate can be sufficiently performed.

What is claimed is:

1. An optical device including:

a phase modulating optical unit comprising a plurality of optically transparent base members each of which includes an optically transparent electrode and an alignment film formed in this order, wherein said optically transparent base members are spaced from one another at predetermined intervals so that the electrode and the alignment film of a base member is confronted to the electrode and the alignment film of another base member, and at least one kind of liquid crystal selected from the group consisting of ferroelectric liquid crystal and smectic liquid crystal having an electrical inclination effect is injected into gaps between said base members; and an optically transparent birefringent medium positioned relative to said phase modulating optical unit to receive polarized light transmitted through said phase modulating optical unit for selectively shifting the optical axis of said light in response to the polarization direction of said light;

wherein said phase-modulating optical unit and said birefringent medium are sequentially disposed in an optical path between a view position and a display device whose resolution is to be improved, or between a subject and an image pick-up device to thereby form a wobbling element, and the display device or the image pick-up device is wobbled one-dimensionally or two-dimensionally.

2. The optical device as claimed in claim 1, wherein said birefringent medium comprises a transparent substrate which deviates an optical axis in accordance with the polarization direction of an incident light thereto, and it is disposed to have a component of equivalently uniaxial extraordinary optical axis in a wobbling direction, or so that facing surfaces of said substrate through which the light is transmitted are not in parallel to each other and an apparent extraordinary axis is in parallel to or vertical to a plane which is vertical to both of said facing surfaces.

3. The optical device as claimed in claim 1, wherein said wobbling element is driven at a video rate.

4. The optical device as claimed in claim 1, wherein said display device or said image pick-up device whose resolution is to be improved comprises a liquid crystal display device, a spontaneous light emission type of display device or a charge coupled device in which picture elements are discretely arranged.

5. The optical device as claimed in claim 1, wherein when light from a display device whose resolution is to be improved or the subject is not polarized, an element for polarizing an incident light is disposed in an optical path between said wobbling element and said display device or subject.

6. The optical device as claimed in claim 1, wherein used liquid crystal comprises chiral smectic liquid crystal having liquid crystal layer structure of bookshelf, quasi-bookshelf or chevron structure.

7. The optical device as claimed in claim 6, wherein the pre-tilt angle of the chiral smectic liquid crystal is set to 0 to 45 degrees.

8. The optical device as claimed in claim 1, wherein the apparent cone angle θ of the used liquid crystal is set to 26 to 64 degrees.

9. The optical device as claimed in claim 1, wherein a bisector between the directors of two switch states of the liquid crystal used for said phase modulating optical unit is intersected to a polarization plane (P1) of or a line (P2) perpendicular to the polarization plane (P1) at an angle $\delta=22.5\pm10$ degrees when no phase adjustment (compensation) is conducted, and in said phase-modulating optical unit which is subjected to phase adjustment (compensation), a bisector between P1 (or P2) and the slow axis of birefringence having a larger absolute value in the switch states of the liquid crystal after the phase compensation is intersected to the polarization plane (P1) of light from the display device or the line (P2) perpendicular to the polarization plane (P1) at an angle of $\delta 1=22.5\pm10$ degrees.

10. The optical device as claimed in claim 1, wherein a liquid crystal display serving as a display device whose resolution is to be improved or an image pickup device comprises a single plate in which a trio image of red, green and blue constitutes a pixel, a phase difference measured by a light source of 632.8 nm is in a range of 130 nm to 370 nm.

11. The optical device as claimed in claim 1, wherein a liquid crystal display serving as a display device whose resolution is to be improved or an image pickup device comprises a triple-plate when the upper limit and lower limit of the wavelength range of a transmittance characteristic of each filter to be combined are represented by $\lambda_{Max}$ and $\lambda_{Min}$, a permissible phase difference is in the range of $\lambda_{Max}/2$ to $\lambda_{Min}/2$, and when fluorescent emitters of red, green and blue are used as light sources, each effective phase difference range is from $(\lambda c-100)/2$ to $(\lambda c+100)/2$ where the center wavelength thereof is represented by $\lambda c$ (the unit of each phase difference is "nm").

12. The optical device as claimed in claim 1, wherein when the wavelength range for image pickup contains an infrared band (wavelength: 700 to 1200 nm), the phase difference measured with a light source of 632.8 nm is in the range of 350 nm to 600 nm.

13. The optical device as claimed in claim 1, wherein said phase modulating optical unit is driven with a bipolar voltage.

14. The optical device as claimed in claim 1, wherein the rise-up and fall times of a driving voltage are below one-third of a field time at a wobbling time, and the ratio of the rise-up and fall times is two times or less of each other.

15. The optical device as claimed in claim 1, wherein representing a pixel aperture (a picture-element aperture for a monochromatic frame or a triple-plate, an aperture for picture-element trio of red, green and blue for a single plate) and a pixel pitch by $L_A$ and $L_p$, a pixel shift amount L is set to satisfy the following inequality:

$$\text{Min}(L_p-L_A, L_A/2) \leq L \leq \text{Max}(L_A, L_p-L_A/2)$$

where Min(x,y) and Max (x,y) represent functions which provide smallest and largest values of x,y, respectively.

16. The optical device as claimed in claim 1, wherein a display device having a horizontal scanning line number of N is combined with a phase modulating optical unit having a driving electrode which is divided into one to N segments.

17. The optical device as claimed in claim 16, wherein the distance of the divided electrodes is longer than a gap interval of liquid crystal cells.

18. The optical device as claimed in claim 16, wherein the driving of said display device is synchronized with the driving of said phase modulating optical unit on the basis of detected video vertical synchronizing signals, a one-field time is divided into parts whose number is equal to the number of required electrodes and a time delay within a field is sequentially provided at each channel of said phase modulating optical unit to perform a driving operation.

19. The optical device as claimed in claim 1, wherein the driving of said image pick-up device is synchronized with the driving of said phase modulating optical unit on the basis of the synchronizing signals, an image pick-up operation is carried out within each field, and data are transferred, whereby a frame can be formed.

20. The optical device as claimed in claim 1, wherein said birefringent medium and said phase modulating optical unit are attached to each other with an optical adhesive agent.

21. The optical device as claimed in claim 1, wherein a quartz plate serving as a birefringent medium is provided with a transparent electrode and an alignment film, and unified to a liquid crystal device.

22. An optical device including:
   a phase modulating optical unit comprising a plurality of optically transparent base members each of which includes an optically transparent electrode and an alignment film formed in this order, wherein said optically transparent base members are spaced from one another at predetermined intervals so that the electrode and the alignment film of a base member is confronted to the electrode and the alignment film of another base member, and at least one kind of liquid crystal selected from the group consisting of ferroelectric liquid crystal and smectic liquid crystal having an electrical inclination effect is injected into gaps between said base members;
   an optically transparent birefringent medium positioned relative to said phase modulating optical unit to receive polarized light transmitted through said phase modulating optical unit for selectively shifting the optical axis of said light in response to the polarization direction of said light; and
   a phase adjusting birefringent medium which is disposed behind and/or in front of said phase modulating optical unit, and serves to rotate the polarization plane in a broad wavelength range by about 90 degrees to shift the optical axis.

23. The optical device as claimed in claim 22, wherein said birefringent medium for phase adjustment comprises any material selected from the group consisting of an element composed of liquid material containing a π-electron system, an active liquid crystal element which is sandwiched at least between transparent electrodes, and a polymer film containing a π-electron system, whereby a cross-talk which corresponds to an integral value in an used wavelength range between fields (at a wobbling time) is reduced to a value lower than a cross-talk of a wobbling element which is not subjected to the phase adjustment.

24. The optical device as claimed in claim 23, wherein said birefringent medium for phase adjustment is formed of any material selected from the group consisting of smectic liquid crystal element which is optically transparent and uniformly orientated (containing chiral liquid crystal), nematic liquid crystal element, main-chain type of polymer liquid crystal, side-chain type of polymer liquid crystal, aromatic polyester-based film, polycarbonate film, polystyrene or styrene-based resin film, methacrylate-based resin film, vinyl-based resin film, cellulose-based film, polyamide-based resin film, polyphenylene-based film, polyphenylene sulfide based film, polysulfone-based film, amorphous polyallylate film, polyether sulfone based film, polyether imide based film, polyether ketone based film, polyamide imide based film and polyimide based film.

25. The optical device as claimed in claim 24, wherein said phase-adjusting medium for the display device is not directly attached to said phase-modulating optical unit.

26. The optical device as claimed in claim 24, wherein said phase-adjusting medium for the image pick-up device and a polarizer are not directly attached to said phase-modulating optical unit formed of chiral smectic liquid crystal.

27. The optical device as claimed in claim 22, wherein the phase difference of said phase-modulating optical unit formed of chiral smectic liquid crystal, the phase difference of said birefringent medium for phase adjustment, the axis of the polarization of incident light, the slow axis of said phase-modulating optical unit, the slow axis of said birefringent medium for phase adjustment, and the direction of the extraordinary optical axis of said birefringent medium are adjusted so that the polarization plane is rotated by about 90 degrees in a broad wavelength range to minimize the cross-talk of the wobbling.

28. The optical device as claimed in claim 27, wherein the alignment treatment direction of said phase-modulating optical unit formed of chiral smectic liquid crystal is in parallel or vertical to the direction of said shift in the optical axis.

29. The optical device as claimed in claim 28, wherein the alignment treatment is performed by a rubbing or vacuum-deposition method.

30. The optical device as claimed in claim 27, wherein the phase difference at 632.8 nm of said phase-modulating optical unit formed of chiral smectic liquid crystal is in a range of 160 nm to 380 nm.

31. The optical device as claimed in claim 27, wherein said birefringent medium for phase adjustment shows retardation of 160 nm to 380 nm and thus has the same retardation at 632.8 nm as said phase-modulating optical unit of chiral smectic liquid crystal.

32. The optical device as claimed in claim 22, wherein the slow axis of said birefringent medium for phase adjustment is substantially perpendicular to the slow axis of any one of the two switching states of the liquid crystal director of said phase-modulating optical unit.

33. An optical device including:
   a phase modulating optical unit comprising a plurality of optically transparent base members each of which includes an optically transparent electrode and an alignment film formed in this order, wherein said optically transparent base members are spaced from one another at predetermined intervals so that the electrode and the alignment film of a base member is confronted to the electrode and the alignment film of another base member, and at least one kind of liquid crystal selected from the group consisting of ferroelectric liquid crystal and smectic liquid crystal having an electrical inclination effect is injected into gaps between said base members; and
   an optically transparent birefringent medium positioned relative to said phase modulating optical unit to receive polarized light transmitted through said phase modulating optical unit for selectively shifting the optical axis of said light in response to the polarization direction of said light:
   wherein said optical device is designed in a direct vision type, a reflection type or a projection type of display.

34. The optical device as claimed in claim 33, wherein said optical device is used in a visible wavelength range.

35. An optical device including:
   a phase modulating optical unit comprising a plurality of optically transparent base members each of which includes an optically transparent electrode and an alignment film formed in this order, wherein said optically transparent base members are spaced from one another at predetermined intervals so that the electrode and the alignment film of a base member is confronted to the electrode and the alignment film of another base member, and at least one kind of liquid crystal selected from the group consisting of ferroelectric liquid crystal and smectic liquid crystal having an electrical inclination effect is injected into gaps between said base members; and an optically transparent birefringent medium positioned relative to said phase modulating optical unit to receive polarized light transmitted through said phase modulating optical unit for selectively shifting the optical axis of said light in response to the polarization direction of said light;

said phase modulating optical unit and said birefringent medium are combined with a solid image pick-up device to form a visible or infrared image pick-up device.

36. The optical device as claimed in claim 35, wherein said wobbling element, an optical low-pass filter and said solid image pick-up element are combined with one another.

37. The optical device as claimed in claim 36, wherein a quarter-wave plate is disposed in an optical path between said wobbling element and said optical low-pass filter.

* * * * *